United States Patent [19]

Matthews et al.

[11] Patent Number: 4,581,486
[45] Date of Patent: * Apr. 8, 1986

[54] ELECTRONIC AUDIO COMMUNICATIONS SYSTEM WITH USER ACCESSIBLE MESSAGE GROUPS

[75] Inventors: Gordon H. Matthews, Plano; Thomas B. Tansil; Michael L. Fannin, both of Dallas, all of

[73] Assignee: VMX, Inc., Richardson, Tex.

[*] Notice: The portion of the term of this patent subsequent to Feb. 1, 2000 has been disclaimed.

[21] Appl. No.: 427,532

[22] Filed: Sep. 29, 1982

Related U.S. Application Data

[63] Continuation-in-part of Ser. No. 97,240, Nov. 26, 1979, Pat. No. 4,371,752.

[51] Int. Cl.$^4$ .............................................. H04M 3/50
[52] U.S. Cl. .................................. 179/18 B; 179/6.02
[58] Field of Search ..................... 179/18 B, 6.02, 6.17, 179/6.18, 6.09, 6.03, 6.01, 27 D, 5 P; 360/32, 12; 364/513.5, 513; 381/36; 370/60, 61, 62

[56] References Cited

U.S. PATENT DOCUMENTS

| 2,385,968 | 10/1945 | Deakin | 179/6.07 |
|---|---|---|---|
| 2,868,880 | 1/1959 | Celentano | 179/6.07 |
| 2,998,489 | 8/1961 | Riesz | 179/6.02 |
| 3,141,931 | 7/1964 | Zarouni | 179/6.11 |
| 3,175,039 | 3/1965 | Wilbourn, Jr. | 179/7.1 TP |
| 3,190,961 | 6/1965 | Fitzpatrick et al. | 179/6.02 |
| 3,226,478 | 12/1965 | Martin et al. | 179/6.11 |
| 3,286,033 | 11/1966 | Lemelson | 179/6.11 |
| 3,301,958 | 1/1967 | Blakeslee et al. | 179/6.02 |

(List continued on next page.)

FOREIGN PATENT DOCUMENTS

| 2412382 | 9/1975 | Fed. Rep. of Germany | 381/51 |
|---|---|---|---|
| 507854 | 4/1970 | U.S.S.R. | 179/6.07 |

OTHER PUBLICATIONS

"New Custom Calling Services", Bergland et al., International Switching Symposium, Paris, May 11, 1979, pp. 1-7.

"New Custom Calling Services," Nacon and Worral, International Conference on Communications, Boston, Mass., Jun., 1979, pp. 1-5.

"Unified Communications Systems Serves Five Hospitals at Detroit Medical Center", Carl O. Haven, *Communications News*, Jan., 1976, pp. 49-51.

"IBM Voice Storage Network Described," R. A. Frank, *Communications Weekly*, 1978.

"Prospectives in Voice Response from Computers," Wm. D. Chapman, *Proceedings of International Confer-*

(List continued on next page.)

*Primary Examiner*—Thomas W. Brown
*Attorney, Agent, or Firm*—Jerry W. Mills; Gregory M. Howison

[57] ABSTRACT

An advanced electronic telecommunications system is provided for the deposit, storage and delivery of audio messages to both user and non-users with limited access provided to the non-user under the control of the user. A Voice Message System (10) interconnects multiple private exchanges (12) of a subscriber with a central telephone office (22). Individual subscriber users may access the Voice Message System (10) through ON NET telephones (18) or OFF NET telephones (24). Selected non-users may be allowed access through the OFF NET telephones (24), the scope of the access of the selected non-users determined by a subscriber user. The Voice Message System (10) includes an administrative subsystem (60), call processor subsystem (62) and a data storage subsystem (64). The Voice Message System (10) enables the user to deposit a message in data storage subsystem (64) for automatic delivery to other addresses connected to the system. The user is also able to deposit a message for transmission to addressees of a unique group who are able to reply to all addressees in the group. The Voice Message System (10) also enables a user to access the system to determine if any messages have been in data storage subsystem (64) for him. Prerecorded instructional messages are deposited in the data storage subsystem (64) for instructing a user or a selected non-user on their progress in using the system.

13 Claims, 70 Drawing Figures

U.S. PATENT DOCUMENTS

| | | | |
|---|---|---|---|
| 3,400,378 | 9/1968 | Smith et al. | 340/870.11 |
| 3,403,383 | 9/1968 | Kienzle et al. | 370/61 X |
| 3,445,601 | 5/1969 | Whiteley et al. | 179/6.02 |
| 3,461,241 | 8/1969 | Menke | 179/5 P |
| 3,510,598 | 5/1970 | Ballin et al. | 179/18 BE |
| 3,538,257 | 11/1970 | Wright, Jr. et al. | 179/5 P |
| 3,595,999 | 7/1971 | Cole | 179/5 P X |
| 3,728,486 | 4/1973 | Kraus | 179/2 R |
| 3,780,227 | 12/1973 | Pirnie, Jr. et al. | 179/27 D X |
| 3,789,144 | 1/1974 | Doyle | 381/30 |
| 3,894,188 | 7/1975 | Konno | 179/6.11 |
| 3,934,095 | 1/1976 | Matthews et al. | 179/18 D |
| 3,938,091 | 2/1976 | Atalla et al. | 340/825.34 |
| 3,976,840 | 8/1976 | Cleveland et al. | 179/2 DP |
| 3,987,247 | 10/1976 | Fizer | 179/2 A |
| 3,995,121 | 11/1976 | Alvis | 179/16 EA |
| 4,002,842 | 1/1977 | Meyr et al. | 370/86 |
| 4,054,756 | 10/1977 | Comella et al. | 179/18 B |
| 4,068,099 | 1/1978 | Mikkola et al. | 370/62 |
| 4,072,825 | 2/1978 | McLay et al. | 179/18 B |
| 4,072,986 | 2/1978 | Heidergren | 360/12 |
| 4,114,139 | 9/1978 | Boyd et al. | 179/2 DP X |
| 4,121,052 | 10/1978 | Richard | 179/2 DP |
| 4,122,306 | 10/1978 | Friedman et al. | 179/6.06 |
| 4,138,597 | 2/1979 | Ashford | 370/67 |
| 4,140,876 | 2/1979 | Gagnon | 381/30 |
| 4,144,582 | 3/1979 | Hyatt | 364/900 |
| 4,154,988 | 5/1979 | Fechalos et al. | 179/18 B |
| 4,160,125 | 7/1979 | Bower | 179/18 B X |
| 4,188,507 | 2/1980 | Meri et al. | 179/6.02 |
| 4,196,311 | 4/1980 | Hoven | 370/48 |
| 4,218,738 | 8/1980 | Matyas et al. | 364/200 |
| 4,221,933 | 9/1980 | Cornell et al. | 179/6.17 |
| 4,229,624 | 10/1980 | Haben et al. | 179/18 E |
| 4,230,906 | 10/1980 | Davis | 381/38 |
| 4,247,910 | 1/1981 | Cornell et al. | 364/900 |
| 4,260,854 | 4/1981 | Kolodny et al. | 179/6.09 |
| 4,270,027 | 5/1981 | Agrawal et al. | 179/81 R |
| 4,272,810 | 6/1981 | Gates et al. | 364/900 |
| 4,371,751 | 2/1983 | Hilligoss, Jr. et al. | 179/5 R |
| 4,406,925 | 9/1983 | Jordan et al. | 179/18 B |

OTHER PUBLICATIONS ence on *Communications,* San Francisco, Jun., 1970, pp. 45-1 to 45-8.

"DMS-10 System Organization," Rushing & Totti, *Telesis* (Canada) 8/78, pp. 303–308.

"Petition for Waiver of American Telephone & Telegraph Company," before the Federal Communications Commission, Mar. 20, 1981.

"Reply Comments and Omnibus Motion of ECS Telecommunications, Inc. to Petition for Waiver of American Telephone & Telegraph Company", by Ray Besing, 5/14/81.

"Information Processing", *Business Week,* Jun. 9, 1980, pp. 80–82.

"Voice Message Service", *ECS Telecommunications, Inc.* (1980).

"The Voice Message Exchange", *Business Communications Review,* Jan.–Feb. 1981, pp. 37–40.

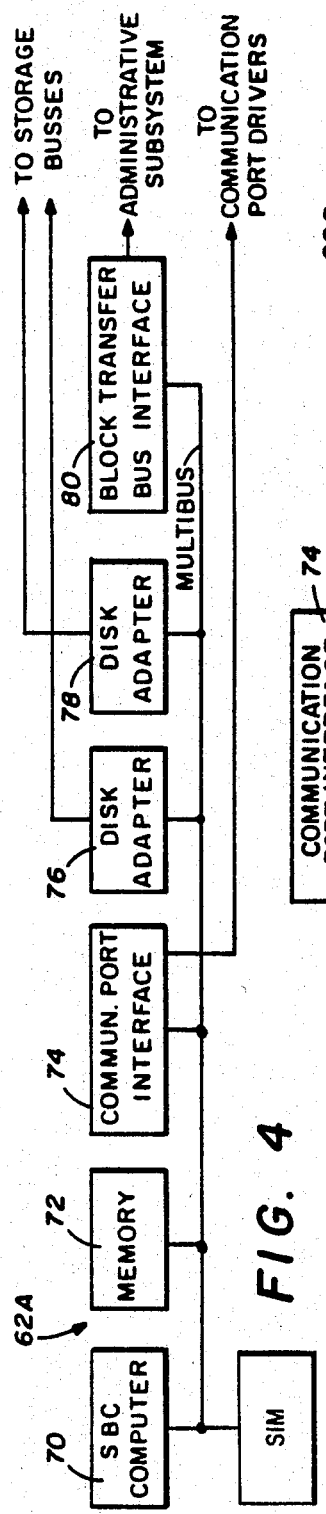
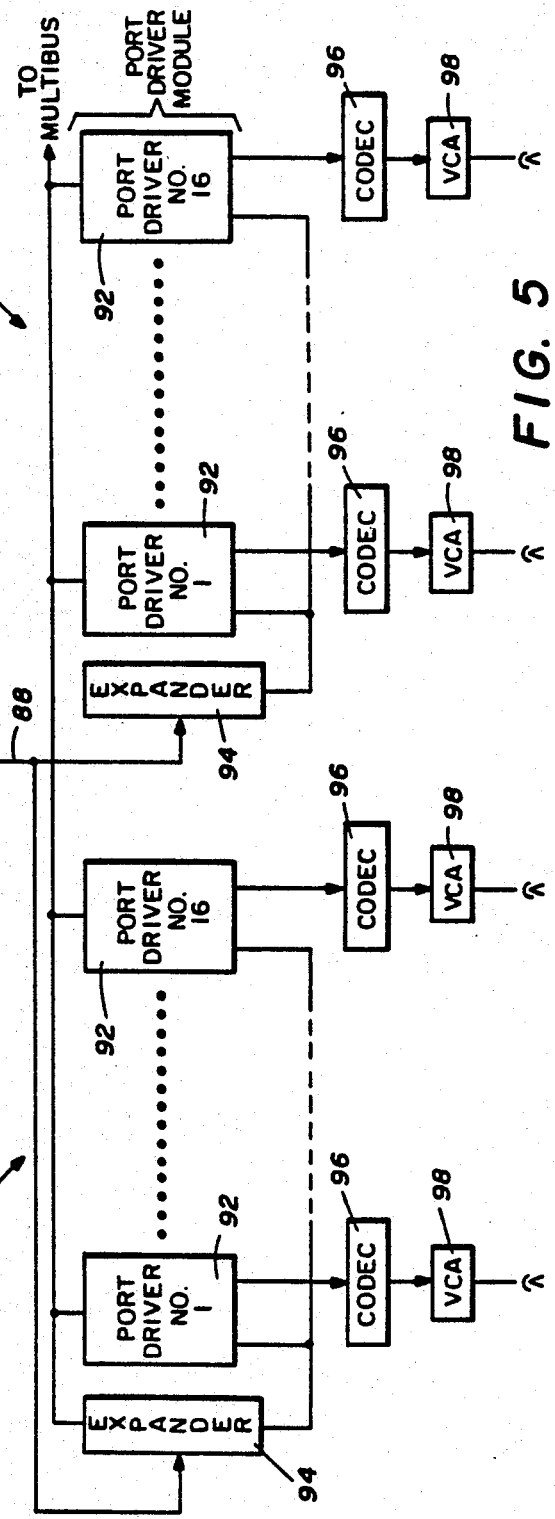
FIG. 4
FIG. 5

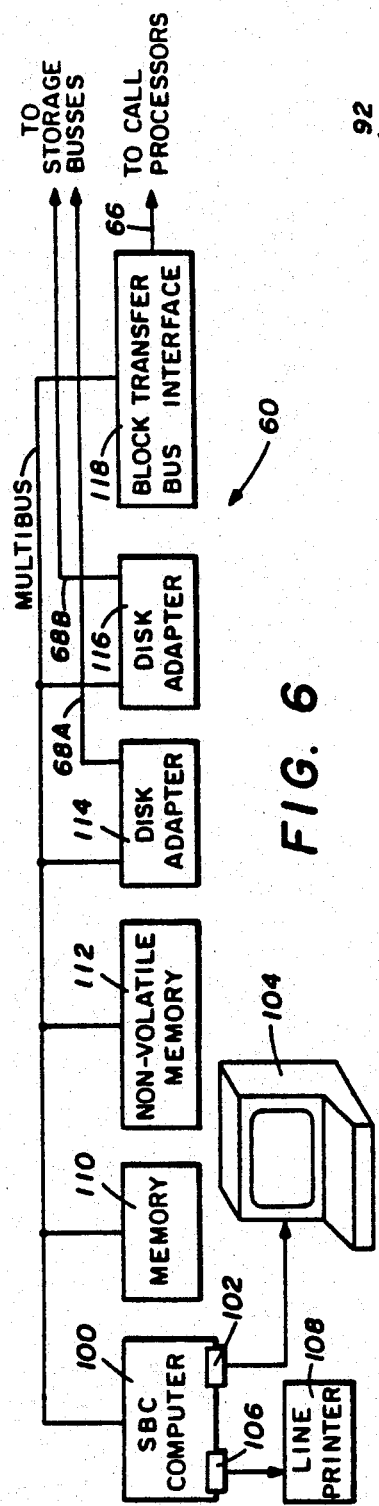
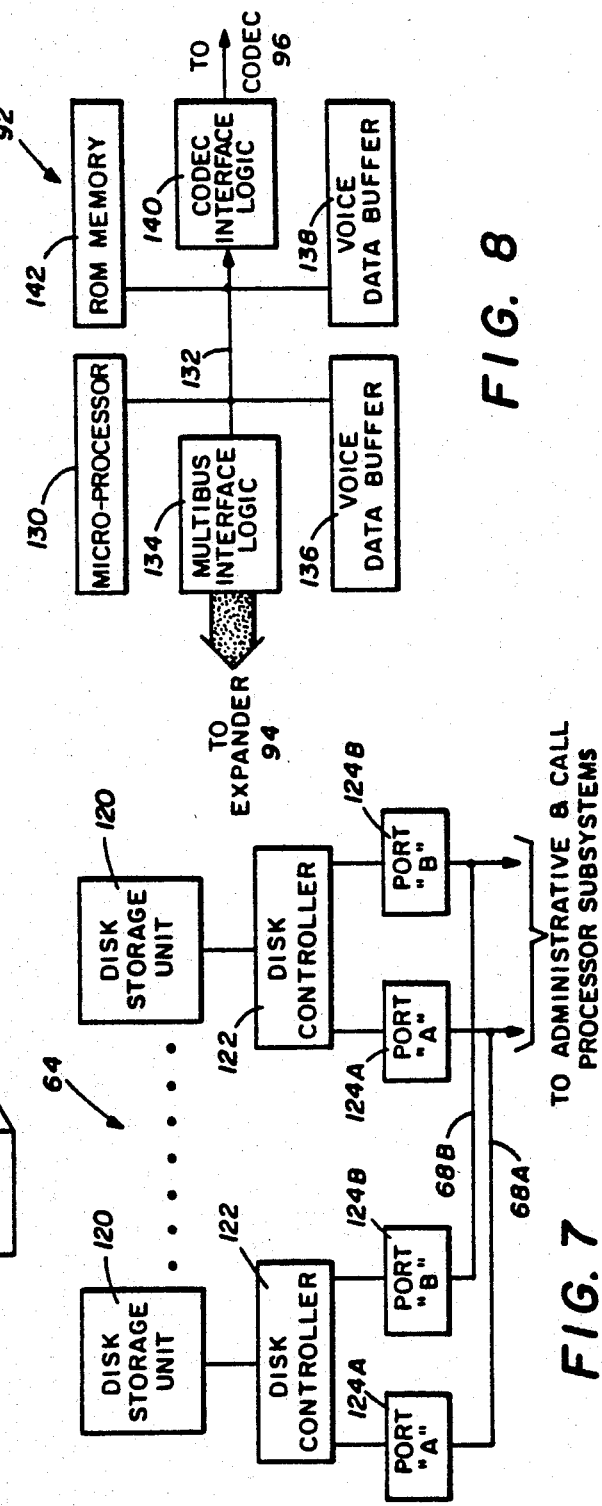
FIG. 6
FIG. 7
FIG. 8

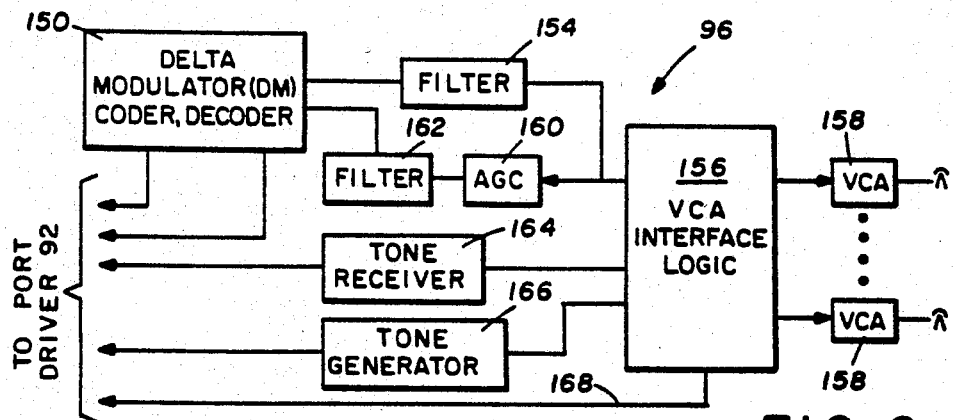
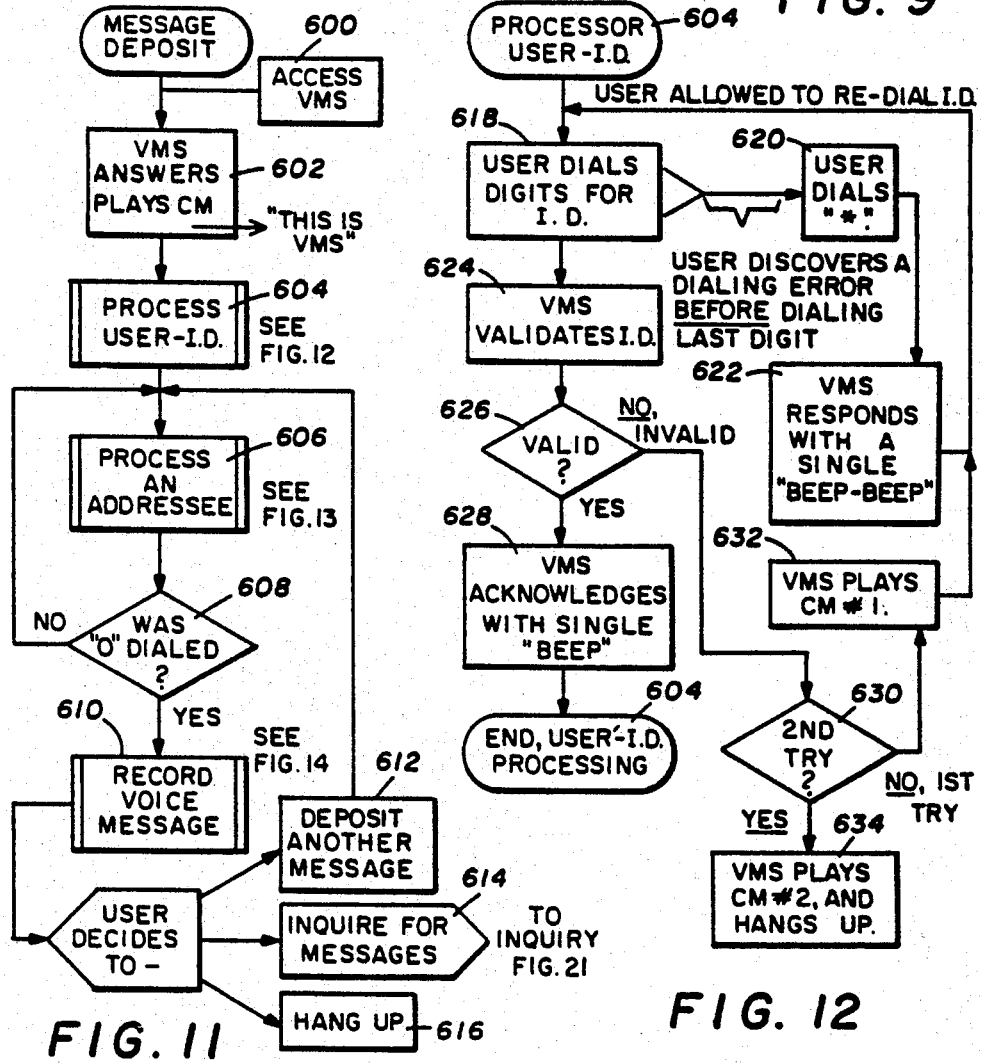
FIG. 9
FIG. 11
FIG. 12

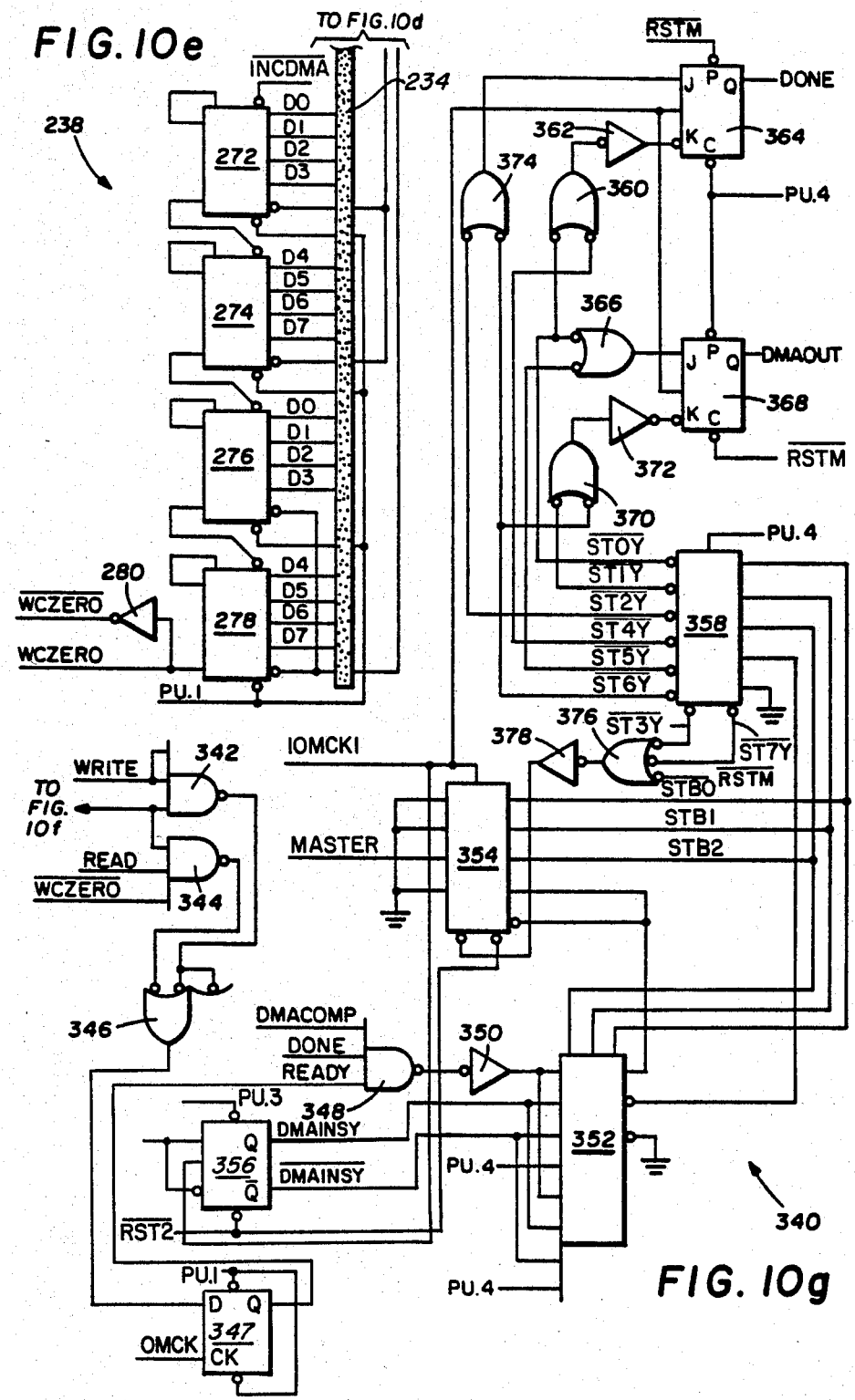

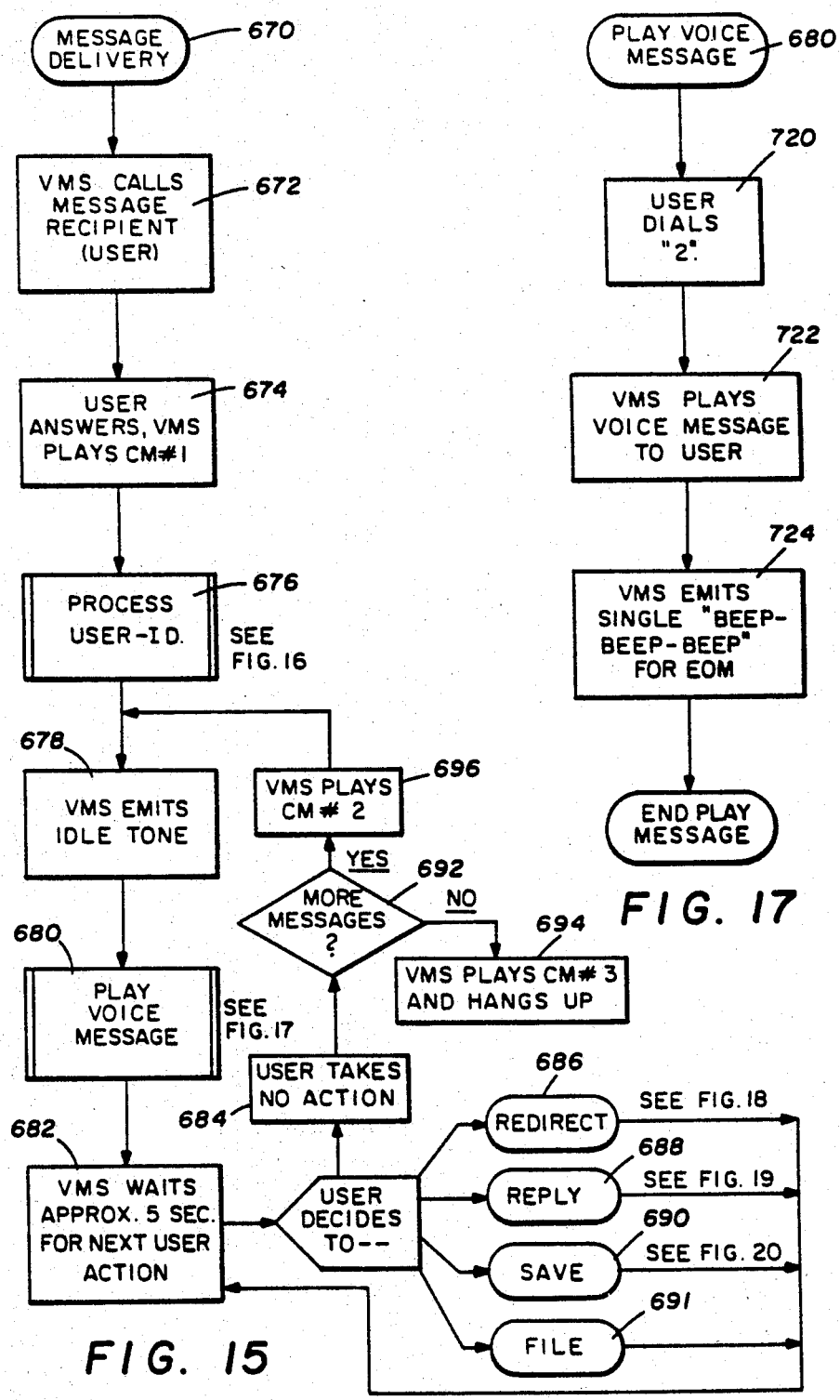

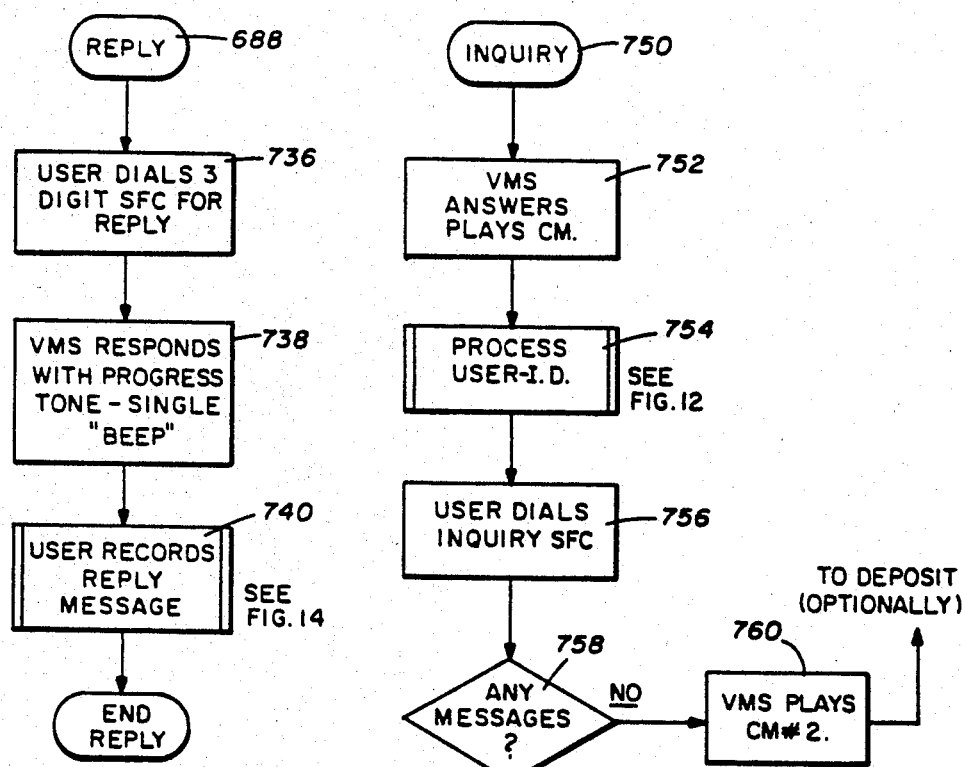
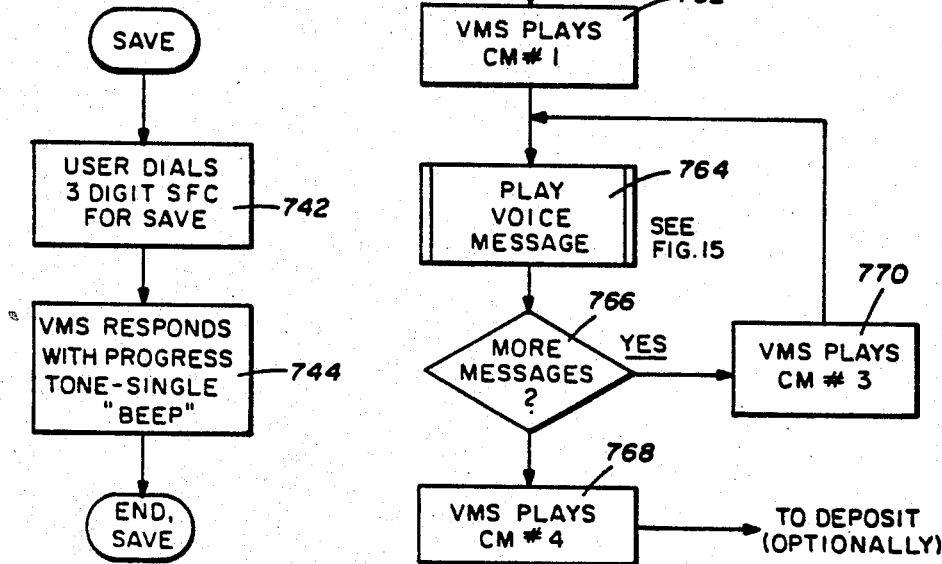
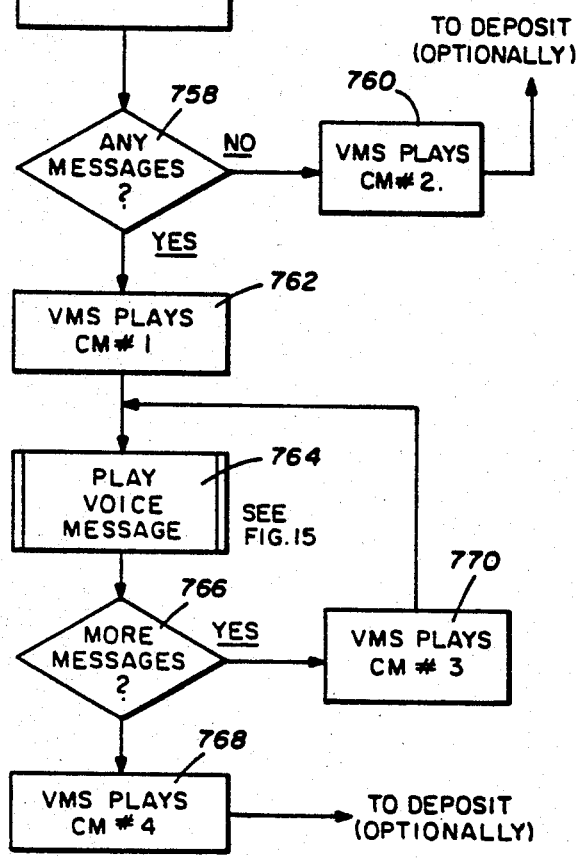
FIG. 19
FIG. 20
FIG. 21

4,581,486

ELECTRONIC AUDIO COMMUNICATIONS SYSTEM WITH USER ACCESSIBLE MESSAGE GROUPS

RELATED APPLICATIONS

This is a continuation-in-part of parent application Ser. No. 97,240 filed Nov. 26, 1979 now U.S. Pat. No. 4,371,752 issued Feb. 1, 1983.

TECHNICAL FIELD

This invention relates to telecommunication systems, and more particularly to an electronic digital signal processor controlled telecommunication system for the deposit, storage and delivery of audio messages that affords users the capability of addressing a plurality of addresses at one time with the same message.

BACKGROUND ART

The present day telephone system provides means for its subscribers to verbally communicate with one another. The verbal communications must occur in real time and require that the sender and recipient have simultaneous access to their telephone stations for communication. If the sender is unable to initially place the call at a time when the recipient has access to his telephone, the sender must continue to repeat the call until the recipient is present. Similarly, if the sender desires to send the same verbal message to a number of recipients, he must repeat this process of establishing telephone contact with each recipient and repeating the message. Thus, the present day method of delivering verbal communications is time consuming, and in the business community the time spent in such present day verbal communications is inefficient and reduces personal productivity.

While auxiliary devices, such as telephone recording systems, may be installed for individual telephone sets, such devices do not fill the need for the rapid and efficient delivery of verbal messages in the business community. A need has thus arisen for a centralized telecommunications system which eliminates many of the inconveniences, inefficiency and time consuming requirements of the existing telephone network.

One solution to this problem has been the very recently developed voice message systems that receive audio messages from telephone stations for storage and later retrieval by another party. Normally, the user must access an individual addressee and direct a message to this addressee. For multiple addressees, there is only limited ability available in the present systems to access all addressees with the same message and even more limitations for allowing the addressee to respond. In view of these limitations, there exists a need for allowing more versatility in addressing groups of addressees and in providing members of the group to reply.

SUMMARY OF THE INVENTION

The present invention described and disclosed herein comprises a method and apparatus for receiving, storing and forwarding audio messages from a user's telephone facility. The apparatus comprises an electronic digital signal processor for controlling the operation of the message system and a digital memory controlled by the signal processor for storing digital representations of the audio messages. A user access circuit enables the user to access the message system through analog signals transmitted from the user's telephone facility. A unique group of message addressees is selected to receive the message and then the message is transmitted to all of the addressees. Each of the addressees is then permitted to reply to the message. The reply is then transmitted to all of the message addressees.

In another embodiment of the present invention, the message is sequentially sent to only one addressee at a time. The system then pauses until a predetermined event occurs. After the predetermined event, the message is then transmitted to the next addressee. Other aspects and avantages of the present invention will become apparent hereinafter.

BRIEF DESCRIPTION OF DRAWINGS

Other objects and advantages of the present invention will be apparent from the following Detailed Description of the preferred embodiments thereof and from the attached Drawings of which:

FIG. 4 is a block diagram view of the call processor subsystem of the Voice Message System of FIG. 3;

FIG. 5 is a block diagram view of the communication port interface, port driver modules and Codecs connecting the telephone handsets (of the call processor subsystem of FIG. 4);

FIG. 6 is a block diagram view of the administrative subsystem for the Voice Message System of FIG. 3;

FIG. 7 is a block diagram view of the storage subsystem of the Voice Message System of FIG. 3;

FIG. 8 is a block diagram view of the port driver subsystem of the communication port interface of FIG. 5;

FIG. 9 is a block diagram view of the Codec of the port driver subsystem of FIG. 8;

FIG. 11 is a flow chart of the message deposit function of the voice message system;

FIG. 12 is the flow chart of the process user-I.D. subroutine of the message deposit function of FIG. 13 is the flow chart of the process and addressee subroutine of the message deposit function of the voice message system;

FIG. 15 is a flow chart of the message delivery function of the voice message system;

FIG. 17 is a flow chart of the play voice message subroutine of the message delivery function of the voice message system;

FIG. 19 is a flow chart of the reply special function code of the message delivery function of the voice message system;

FIG. 20 is a flow chart of the save special function code subroutine of the message delivery function of the voice message system;

FIG. 21 is a flow chart of the inquiry function of the voice message system;

DESCRIPTION OF PREFERRED EMBODIMENT

Figure 1:
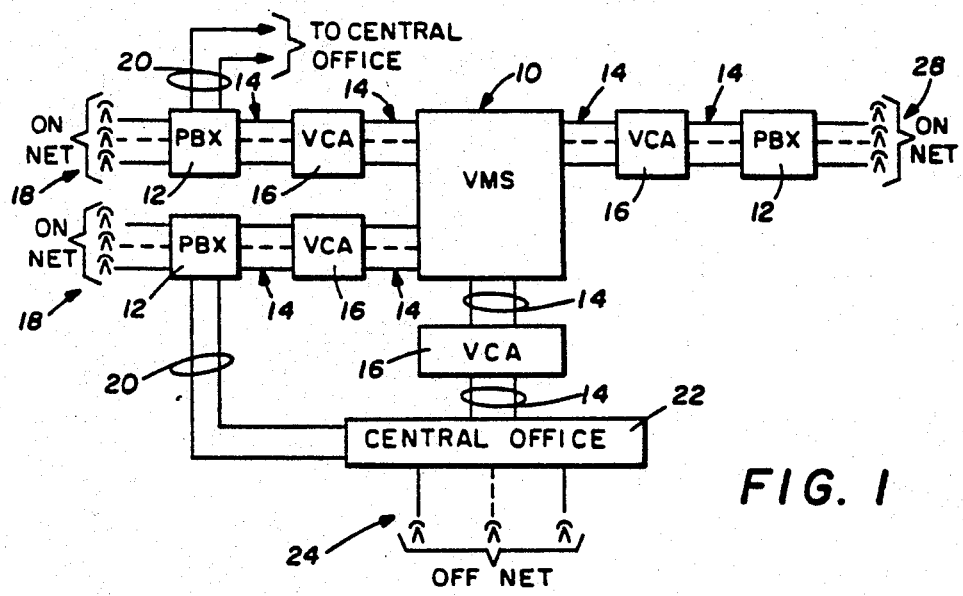
FIG. 1 illustrates a Voice Message System connected with the multiple private exchanges of a customer and the central office of the telephone company.

Referring to FIG. 1, a Voice Message System advanced verbal communication system (hereinafter "VMS") of the present invention is generally identified by the reference numeral 10. ("Voice Message System" is a trademark of Electronic Communication Systems, Inc.) The VMS system 10 is illustrated connected with a user's telephone communications network. The VMS system 10 is not limited to the particular telephone communications network illustrated in FIG. 1, as the present invention is capable of providing an improved communications network for a variety of user's telephone systems.

The telephone communications network illustrated in FIG. 1 includes multiple Private Branch Exchanges 12 (hereinafter "PBX 12") interconnected by tie lines 14 through Voice Connecting Arrangements (hereinafter "VCA") 16 to the VMS 10. The VMS 10 can also be connected to a PBX 12 with station lines. The VCA unit is supplied by the telephone company pursuant to Federal Communication Commission's tariff regulation to provide a line of demarcation between a private user's equipment and the telephone company's equipment. In addition to representing what are referred to as Private Branch Exchanges the term "PBX" also includes but is not limited to PABX (Private Automatic Branch Exchange), EPABX (Electronic Private Automatic Branch Exchange) and CBX (Computerized Branch Exchange), in addition to various off premises switching systems.

The user's telephones 18 connected to the PBX's 12 have access to the VMS 10 and are generally referred to as being on the network or "ON NET". The features of the VMS 10 may be utilized by a small customer with a single PBX 12 or by much larger customers having multiple PBX's 12 interfaced with a single VMS 10. Of course, the PBX's 12 of a large corporate customer may be separated and located in distant physical facilities. Remotely located PBX's 12 may be interconnected to a central VMS 10 by other means than the tie lines 14, e.g., they could be connected by a microwave relay system.

The user's PBX's 12 are also connected through telephone lines 20 to a central office 22, of the telephone company. In addition, the central office 22 is interconnected through tie lines 14 and VCA 16 to the VMS 10. The VMS 10 can also be connected to the central office 22 through central office trunks. Telephones 24 outside the customer's own telephone communications network or "OFF NET" allow a user access to the improved communication capabilities provided by the VMS 10.

Figure 2:
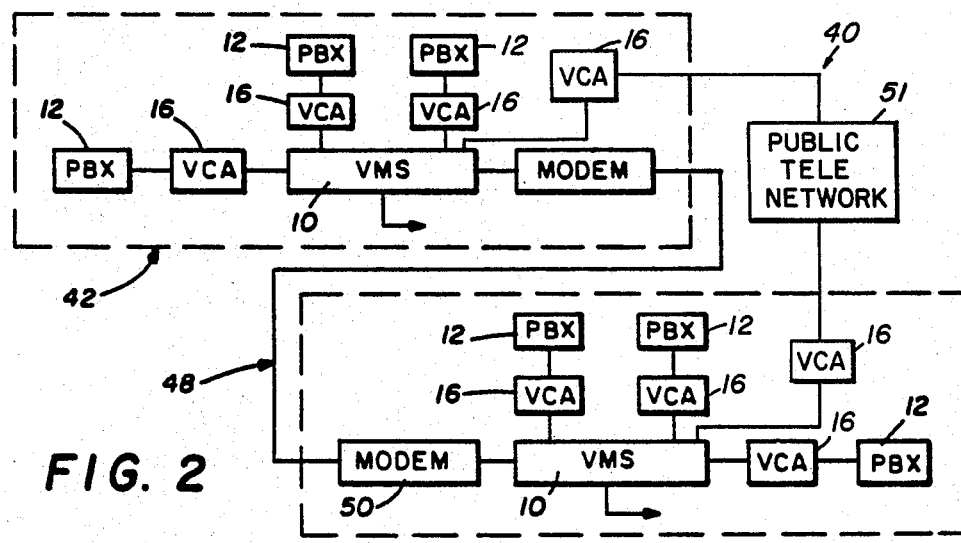
FIG. 2 illustrates a network of Voice Message Systems.

Referring to FIG. 2, a first VMS 10 is interconnected to a user's telephone communications network as illustrated in FIG. 1 and described above. The first VMS 10 is interconnected to a second VMS 10 to form a network of VMS systems 40. The first VMS 10 interconnected with its user's telephone communication equipment comprises a first node 42 of network 40, while the second VMS 10 with its user's telephone communication equipment comprises the second node 44 of network 40. The first VMS 10 is interconnected through a MODEM 46 for modulating the communications information from the first node 42 for transmission via the transmissions link 48 to a MODEM 50. The MODEM 50 demodulates the information for use by the second VMS 10 of the second node 44. The transmission link 48 could comprise a microwave relay system for connecting nodes 42 and 44 of the VMS network 40. Such a transmission link 48 could be transmitted through, a satellite communications system to provide an interconnection between distant VMS systems 10. The VMS systems are also interconnected through a public telephone network 51 for transmission of data in analog format. Of course, the number and arrangement of interconnected VMS systems 10 are not limited to the arrangement of VMS network 40 of FIG. 2.

Figure 3:
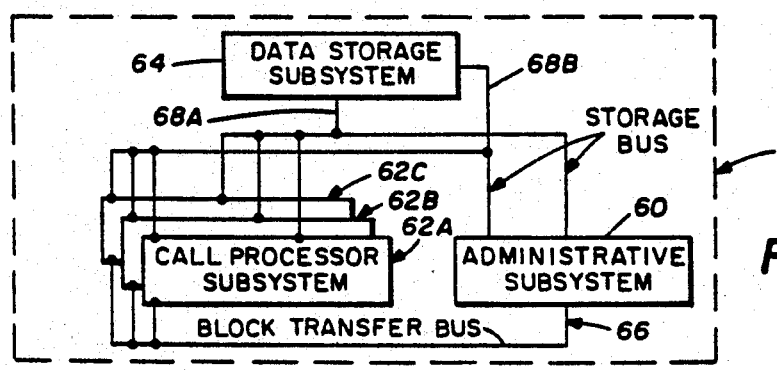
FIG. 3 is a block diagram of the Voice Message System of FIGS. 1 and 2.

Referring to FIG. 3, the VMS 10 of FIG. 1 includes the following subsystems: an administrative subsystem 60, call processor subsystems 62A-62C, and a data storage subsystem 64. There is only one administrative system 60 and data storage subsystem 64 for each VMS system 10, but there may be multiple call processor subsystems 62A-62C. The number of call processor subsystems 62A-62C required is a function of the number of telephone lines interfacing with the VMS 10. Thus, a VMS 10 may have one call processor subsystem 62A or any number of such subsystems. While there is one data storage subsystem 64 for the VMS 10, the size of the data storage subsystem 64 may vary, depending upon the number of disk files required for operation of the VMS 10. The data storage subsystem 64 functions as the storage medium for audio messages in the system. A message deposited from a caller is stored in the VMS system 10, and the message is later delivered to the addressee. Instructional messages are also stored in the data storage subsystem 64 to guide the user in using the VMS 10.

A block transfer bus 66 allows each call processor subsystem 62A-62C to be connected to the administrative subsystem 60, as well as allowing each of the call processor subsystems 62A-62C to communicate with one another.

Data storage buses 68A-68B connect the administrative subsystem 60, the call processor subsystem 62A-62C and the data storage subsystem 64. The administrative subsystem 60 and each of the call processor subsystems 62A-62C have access to each of the data storage buses 68A-68B. The two data storage buses 68A-68B serve two functions. First, it provides redundancy in the VMS system 10, so that, if data storage bus 68A misfunctions, data storage bus 68B allows the VMS 10 to continue to operate. Secondly, when both of the data storage buses 68A-68B are functioning, it doubles the bandwidth of the data to be transmitted between the data storage system 64 and the call processor subsystems 62A-C and administrative subsystem 60.

Referring to FIG. 4, the call processor subsystem 62A is illustrated in block diagram form. A single board computer 70 contains a microprocessor, some memory storage, and some input/output device interfaces. The single board computer 70 may be implemented by Intel's single board computer, from Intel, Model Number 80/30. The Intel 80/30 computer includes an 8085 microprocessor, a 16K RAM, 8K ROM, as well as some input/output device interfaces.

A call processor memory 72 provides memory for the call processor subsystem 62A and may be implemented by one or more individual boards containing RAM memory. A single board providing 64K bytes of RAM memory may be utilized as the call processor memory unit 72 and is commercially available from Intel as Model No. SVC064. A communications port interface 74 provides access to the communication port modules 90 of FIG. 5 described hereinbelow. Two identical disk adapters 76 and 78 interconnect with the data storage subsystem 64 of FIG. 3 through data storages buses 68A and 68B. Finally, a block transfer bus interface 80 is a hardware device required to interconnect with the block transfer bus 66 of FIG. 3.

The communication port interface 74, disk adapters 76 and 78, and the block transfer bus interface 80 are all implemented with an identical electronic unit, identified as a Universal Control Board. A Universal Control Board contains an Intal 8085 microprocessor, a RAM memory device, (approximately 500 bytes), a ROM memory device (approximately 2K-4K bytes), and a digital data bus interface. A Universal Control Board's function is determined by the program controlling the microprocessor. The schematic of a Universal Control Board is illustrated in FIGS. 10a-10m and described hereinbelow.

In addition to the memory provided in each of the Universal Control Boards, the communication port interface 74, disk adapters 76 and 78 and block transfer bus interface 80 all have access to the memory 72 of the call processor subsystem 62A. Thus, the microprocessors of these Universal Control Boards communicate with the single board computer 70 through the shared memory unit 72.

Referring now to FIG. 5, the communication port interface 74 of FIG. 4 interfaces with the communication port driver modules 90A-B through a communications port digital data bus 88. The communication port driver modules 90A-90B are identical with one another, and each port driver module 90A-B may include a maximum of 16 identical port drivers 92. An expander 94 is a device for expanding the communications port data bus 88 to the 16 port drivers 92 of each module 90A-B. The expanders 94 are also implemented by a universal control board, illustrated in FIGS. 10a-10m and described hereinbelow. Each port driver 92 is directly connected to a CODEC 96. The CODEC 96 is an abbreviated term for a circuit that functions as a coder/decoder. The CODEC 96 transforms the analog voice signal to a digital bit stream for processing in the VMS 10. The translated digital bit stream is fed up into the port driver 92 for distribution to the remainder of the VMS system 10. In addition, in transmitting a recorded message outbound from the VMS 10 to the user, the outbound digital bit stream comes from the port driver 92 into the CODEC 96 where it is translated back into an analog voice signal which is fed into the receiver of the telephone 18 of the user. A single communication port interface 74 can drive up to 32 port drivers 92, which is equivalent to 32 telephone circuits to the VMS 10.

As required by the FCC tariff regulations, the CODEC 96 interfaces through a voice connecting arrangement 98 with the telephone 18 of the user.

FIG. 6 illustrates the hardware implementing the administrative subsystem 60 of FIG. 3. The hardware implementing the administrative subsystem 60 is very similar to that implementing the call processor subsystem 62A illustrated in FIG. 4 and described above.

A single board computer 100 (hereinafter "SBC 100") operates as the central processing unit for the administrative subsystem 60, and it is implemented by a programmable single board computer, commercially available from Intel, Model No. 80/30. The SBC 100 has one input/output interface 102 connected to a cathode ray terminal 104, which serves as the operator's console for the VMS 10. The second input/output interface 106 of the SBC 100 drives a line printer 108. The line printer 108 functions to produce reports and status information concerning the operation of the VMS 10, and it also displays alarms for abnormal conditions during the system operation. One such alarm condition would result from the failure of a recorded message to be transmitted from the VMS 10 in a predetermined period of time.

A memory unit 110 comprised of printed circuit boards provides the memory for the administrative subsystem 60. The memory unit 110 may be made up of one or more individual printed circuit boards, each having 64K bytes of RAM. These printed circuit boards are commercially available from Intel, Model SBC064. A nonvolatile memory unit 112 provides memory for the administrative subsystem 60 so that the data stored in memory is not destroyed if the system loses power. The memory unit 112 could also be implemented with core memory having a capacity of 8 to 16K bytes.

Two identical disk adapters 114 and 116 interconnect through the data storage buses 68A-68B to the data storage subsystem 64 of FIG. 3. The disk adapters 114 and 116 are implemented with a Universal Control Board having its microprocessor programmed for the unit to run as a disk adapter. Finally, a block transfer bus interface 118 is connected to the block transfer bus 66 to the call processor subsystem 62A of FIG. 3. The block transfer bus interface 118 is also implemented with a Universal Control Board having a microprocessor programmed to control the unit's operation.

FIG. 7 is a block diagram view of the storage subsystem 64 of the VMS 10 of FIG. 3. FIG. 7 illustrates two identical disk storage units 120 with their associated disk controller 122. Each disk controller 122 interfaces with the remainder of the system through disk ports 124A and 124B through the data storage buses 68A and 68B. While FIG. 7 illustrates two identical disk storage units 120 with their associated disk controllers 122, the data storage subsystem 64 consists of any number of such identical units. The configuration of the VMS subsystem 10 of FIG. 3 requires a minimum of two disk storage units 120, but additional units may be added to increase the storage capacity of the system.

The entire disk storage unit 120 may be implemented by using a Storage Technology Corporation disk drive, Model Number 2700. The STC Model 2700 disk storage unit 120 is a rotating magnetic disk having a capacity for 200 million 8 bit bytes of digital or binary information. Each disk unit contains its own dedicated disk controller 122 which is built around a microprocessor. The disk controller 122 may be implemented with a Motorola microprocessor, Model Number 6801, 64K bytes of RAM memory, and it also includes a special purpose digital hardware to drive the input/output disk ports 124A and 124B into the disk unit 120 and to directly control the disk storage unit 120. As additional disk storage units 120 are added to the system, their associated disk ports 124A and 124B are connected to the data storage buses 68A and 68B.

The VMS system 10 is provided with a minimum of two disk storage units 120, since the functioning of the disk storage units 120 is essential to the entire VMS system. The two data storage buses 68A and 68B are provided to achieve redundancy in the system. If one of the buses goes out of service, then the other bus still has access to all of the disk units 120 through the single remaining bus. With a single data bus in operation, the system will still operate, but it will not have the same throughput capability in terms of the amount of data that can be processed by the VMS 10. However, when both disk storage buses 68A and 68B are running at normal operation, this allows twice as much information to be fed into and out of the storage system 64 than could be accomplished with a single data storage bus.

A separate disk controller 122 dedicated to the operation of each disk storage unit 120, enables blocks of information to be more efficiently transferred within the VMS 10. For example, in transferring a block of information from the call processor subsystem 62A or the administrative subsystem 60 to or from the disk storage unit 120, the transfer does not occur in real time from one of the data storage buses 68A or 68B onto the disk unit 120. The block of information is transferred into the RAM storage of the disk controller 122, and then the disk controller 122 controls the operation of transferring the block of information from its RAM directly into the disk unit 120. In this way, the VMS 10 storage bus 68A or 68B is not tied up for the period of time it takes to write a block of information directly onto the disk 120; rather, it is occupied only for the period of time it takes to transfer that block of information into the RAM of the disk controller 122.

FIG. 8 is a block diagram view of one of the port drivers 92 of FIG. 5. The central control unit of the port driver 92 is an Intel 8085 microprocessor 130 connected by an internal bus 132 to the remainder of the port driver system 92. The microprocessor 130 is programmed to control a digital logic hardware device, identified as a bus interface logic unit 134. The bus interface logic 134 is an 8 or 16 bit wide parallel data path serving as the electrical interface between the expander 94 in all of the port drivers 92. The bus interface logic 134 consists of a bus backpane into which are plugged the boards for the port drivers 92 and expanders 94.

Voice data buffers 136 and 138 are connected to the remaining components of the port driver 92 through the internal bus 132. The voice data buffers 136 and 138 function to temporarily store the incoming or outgoing data bit streams of the digitized voice signal incoming or outgoing to the CODEC 96. The voice data buffers 136 and 138 interface through a CODEC interface logic unit 40 to the CODEC 96. A ROM memory unit 142 stores the program for the microprocessor 130.

The operation of the dual voice data buffers 36 and 138 may be illustrated by the example of digitized voice data being received by the port driver 92 from the CODEC 96. The voice data entering the port driver 92 is temporarily stored in one of the dual voice data buffers 136 or 138. When the selected voice data buffer is full, that entire block of data is transmitted out to the expander 94 up to the communication port interface 74 of the call processor 62A. At the same time when the port driver 92 senses that the first voice data buffer is full, the second voice data buffer is used to store the subsequent voice data from the CODEC 96. The port driver system 92 is programmed to control the dual voice data buffers 136 and 138 in the transmitting mode and the storing mode. The voice data buffers 136 and 138 are implemented in RAM semiconductor memory in the range of 512-2K bytes.

FIG. 9 is a block diagram of the CODEC 96 of FIG. 5. A delta modulator 150 (hereinafter "DM 150") is connected to the port driver 92. The DM 150 functions as either a coder for converting analog signals to digital signals, or a decoder for converting digital signals to analog signals. The operating mode of the DM 150, whether it is functioning as a coder or decoder, is controlled by one of the interface signals 152 to the port driver 92. The DM 150 implements a particular technique for converting analog to digital and digital to analog.

The DM 150 decodes the digital wave form to an analog signal and passes it through filter 154 which is a voice band filter with a cutoff frequency of approximately 2700 hertz. The analog signal from the filter 154 is fed into a VCA interface logic 156, through a VCA 158 to the ON NET telephone 18. The VCA 158 is required by FCC Tariff Regulations as the line of demarcation between the equipment of the telephone company and the equipment of a private user.

The analog signal from the telephone 18 is transmitted through the VCA 158 and VCA interface logic 156 to an automatic gain control circuit 160, which serves to amplify the analog voice signal from the VCA. The amplified analog signal is then passed through another band pass filter 162 for passing frequencies in the range of approximately 300 hertz to 2700 hertz. The filtered analog signal is then fed into the DM 150, which is functioning as a coder, and transformed into a digital bit stream to be fed to the port driver 92.

The first function of the CODEC 96 has been described above in providing the data path for the incoming and outgoing voice signals from the telephone 18 to the VMS system 10. An ancillary function of the CODEC 96 is provided by a tone receiver 164, which receives the analog wave forms generated by the signal from a touch tone type of telephone 18 and converts these waveforms to digital information corresponding to the tone received. A tone generator circuit 166 provides the analogous function in converting digital signals from the VMS 10 to the receiver of the user telephone 18. The tone generator 166 functions to generate touchtones as well as progress tone acknowledging the status of the operation of the VMS 10. The tone generator 166 functions to form the outgoing dialing in a touch tone system. A pulse dialing path 168 is provided to receive pulse dialing coming in from a rotary telephone 18, and it also functions to do the outbound dialing to a rotary telephone 18.

FIGS. 10a-10m illustrate the Universal Control Board which is programmable to serve a number of functions in the VMS 10 described above. Universal Control Boards are utilized in the call processor subsystem 62A illustrated in FIG. 4 to function as the communication port interface 74, the disk adapters 76 and 78 and the block transfer interface bus 80. In addition, the expander 94 illustrated in FIG. 5 is implemented with a Universal Control Board. In the administrative subsystem 60, Universal Control Boards are programmed to function as the disk adapters 114 and 116 as well as the block transfer interface bus 118. The storage subsystem 64 illustrated in FIG. 7 utilizes a Universal Control Board to function as the disk controllers 122.

The hardware for implementing the Universal Control Boards is illustrated in FIGS. 10a-10m and described hereinbelow. The hardware of the Universal Control Board is identical for each of the above-described applications in the VMS 10. The programs stored in the ROM of each Universal Control Board determines its function. For instance, the communication port interface 74, disk adapters 76 and 78 and block transfer bus interface 80 of the call processor subsystem 62A comprise individual Universal Control Boards with identical hardware. The software program stored in the ROM determines whether the particular Universal Control Board functions as a communication port interface 74 or disk adapters 76-78 or the block transfer interface bus 80.

Figure 10A:
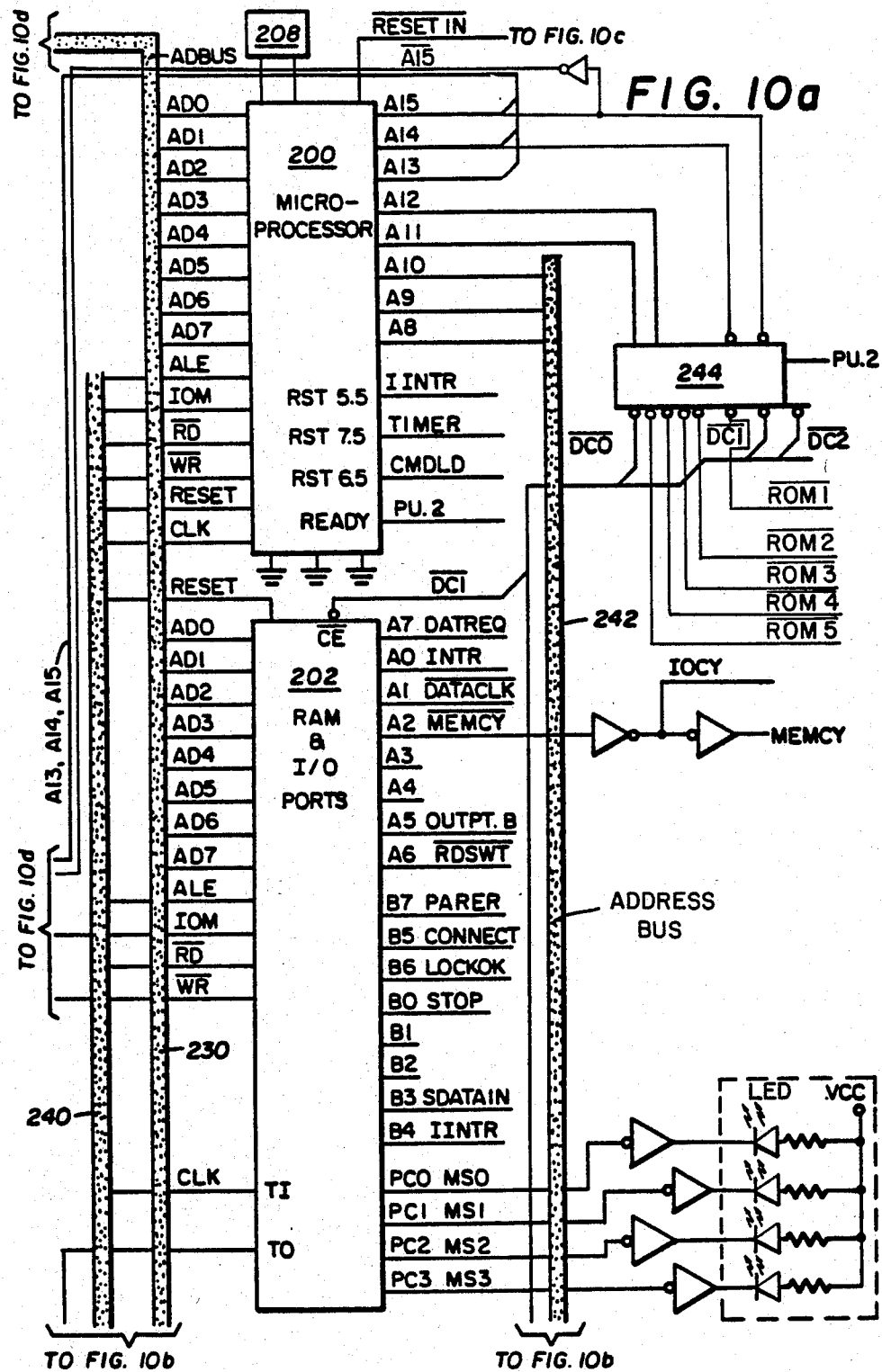
FIGS. 10a to 10n are the schematic drawings of the Universal Control Board programmable to function as the communication port interface disk adapters and block transfer bus interface of the call processor subsystem of FIG. 4, the expander of the communication port interface subsystem of FIG. 5 and the disk adapters and block transfer bus interface of the administrative subsystem of FIG. 6.
Figure 10B:
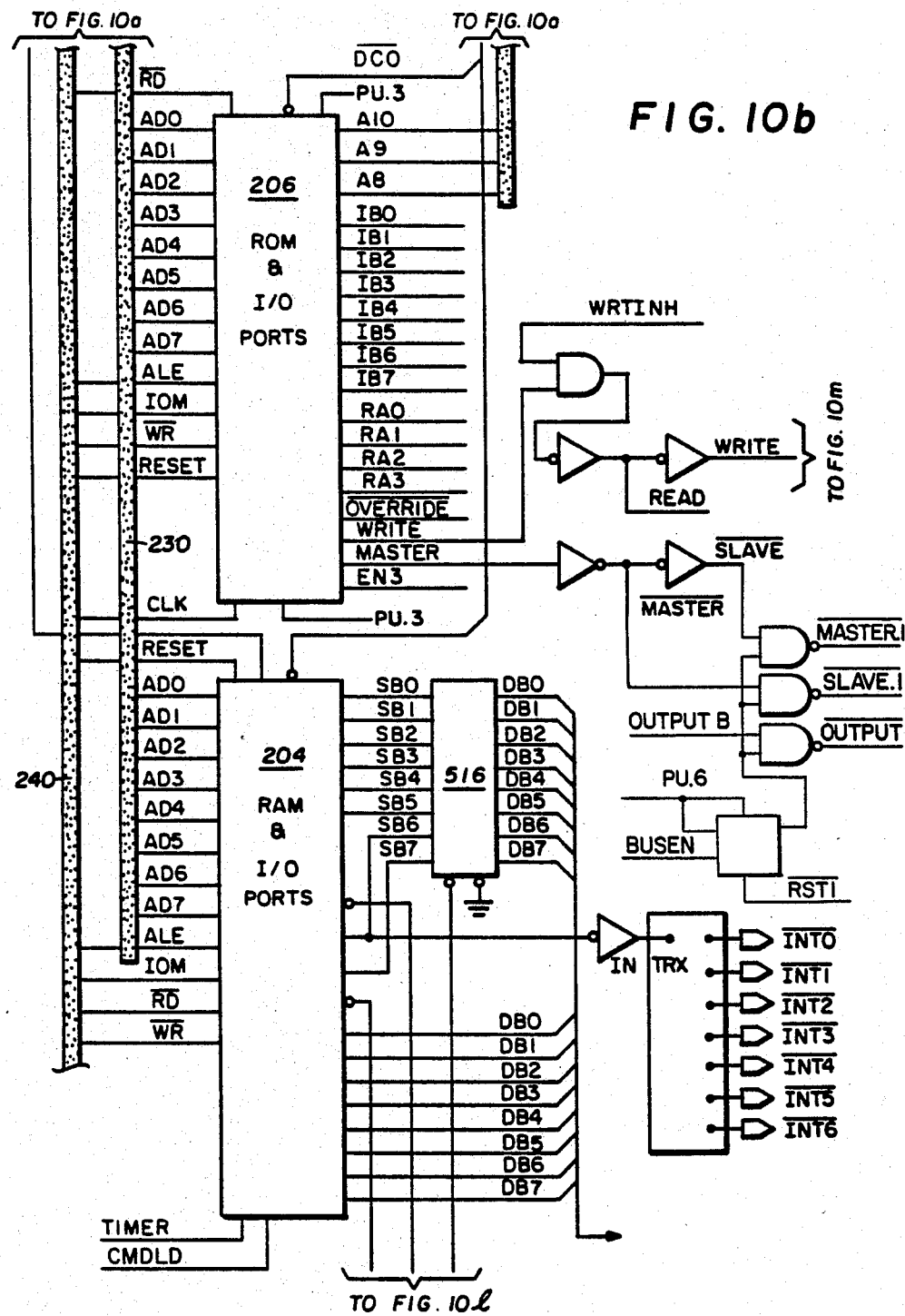
Figure 10C:
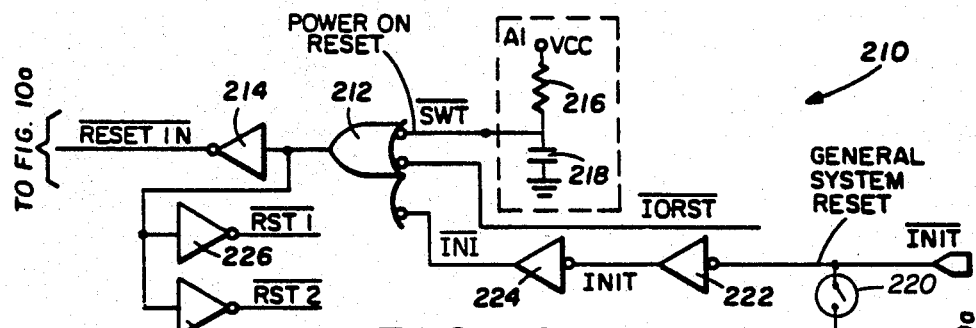

FIGS. 10a, 10b and 10c illustrate the basic microprocessor section of the board and includes a microprocessor 200 and memory input/output combination chips 202 and 204. The chips 202 and 204 have random access memory and I/O port features, while another combination chip 206 has a read only memory (ROM) in conjunction with I/O ports. Microprocessor 200 is available commercially from Intel as Model No. 8085; the combination chips 202 and 204 with RAM memory are commercially available from Intel Model No. 8155; and the ROM combination chip 206 is available from Intel as Model No. 8755.

A crystal 208 is the source of the clock signal for the microprocessor 200, determining how fast it will run and how much time is allotted for execution of an instruction.

As shown in FIG. 10c, reset circuitry 210 controls the start-up of the microprocessor 200 when it is turned on and provides the means for resetting microprocessor 200. There are three different ways in which the microprocessor 200 may be restarted. First, the "power on" reset signal comes into one pin of a reset OR gate 212 and goes through an inverter 214 to the microprocessor 200. The "power on" reset signal originates when system power is turned on and a resistor 216 slowly charges a capacitor 218. Manual reset switch 220 is provided to manually reset the system by generating a grounded signal through an invertor 222 and an invertor 224 to the input of the OR gate 212 to cause a reset any time it is desired by the operator. The second method of restarting the microprocessor 200 is from the IORST signal originating from another Universal Control Board connected to the same bus to provide a reset signal to reset OR gate 212. The third way to reset the microprocessor 200 is through the general system reset signal passing through inverters 222 and 224 to one pin of the reset OR gate 212. This signal is a general system reset and typically means that the reset occurred because everything in the system has been reset. This general system reset signal may be originated from another push button located elsewhere in the system, like reset switch 220, which individually resets this particular microprocessor 200.

The reset signal from the OR gate 212 is fed separately through inverters 226 and 228 to become reset signals "RST1" and "RST2" to provide logic resets to other logic on the Universal Control Board other than the microprocessor 200.

Figure 10D:
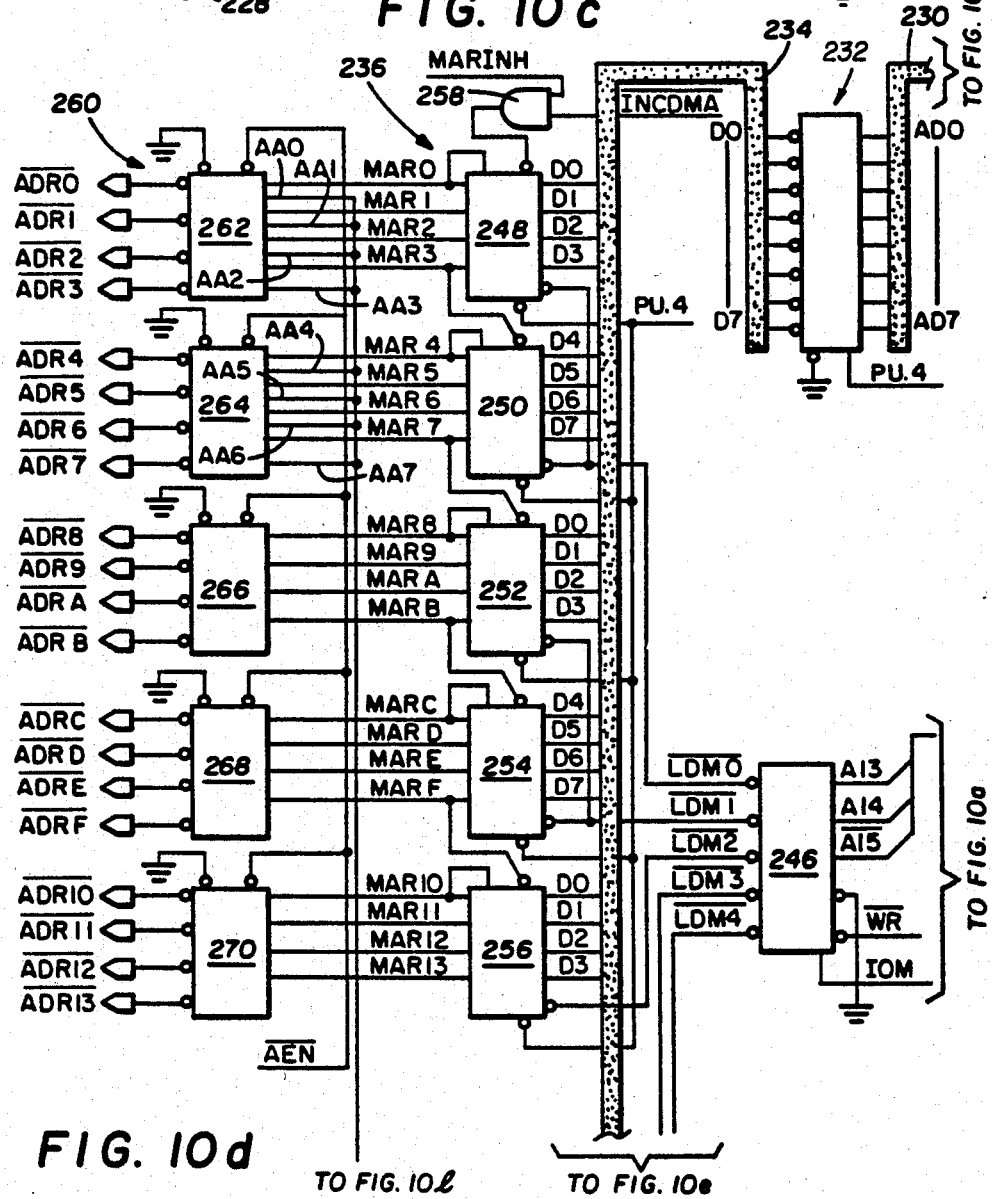
Figure 10F:
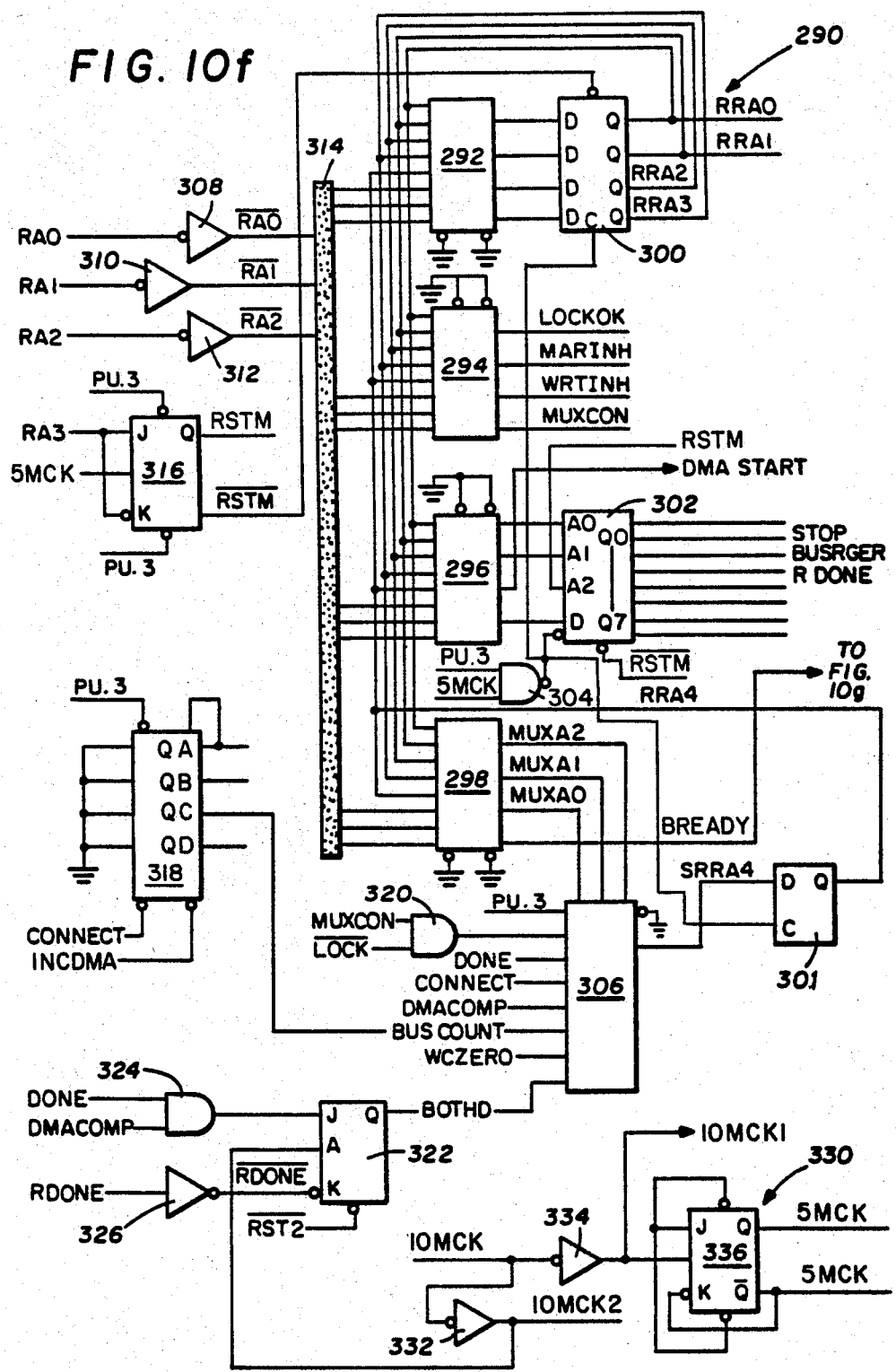
Figure 10H:
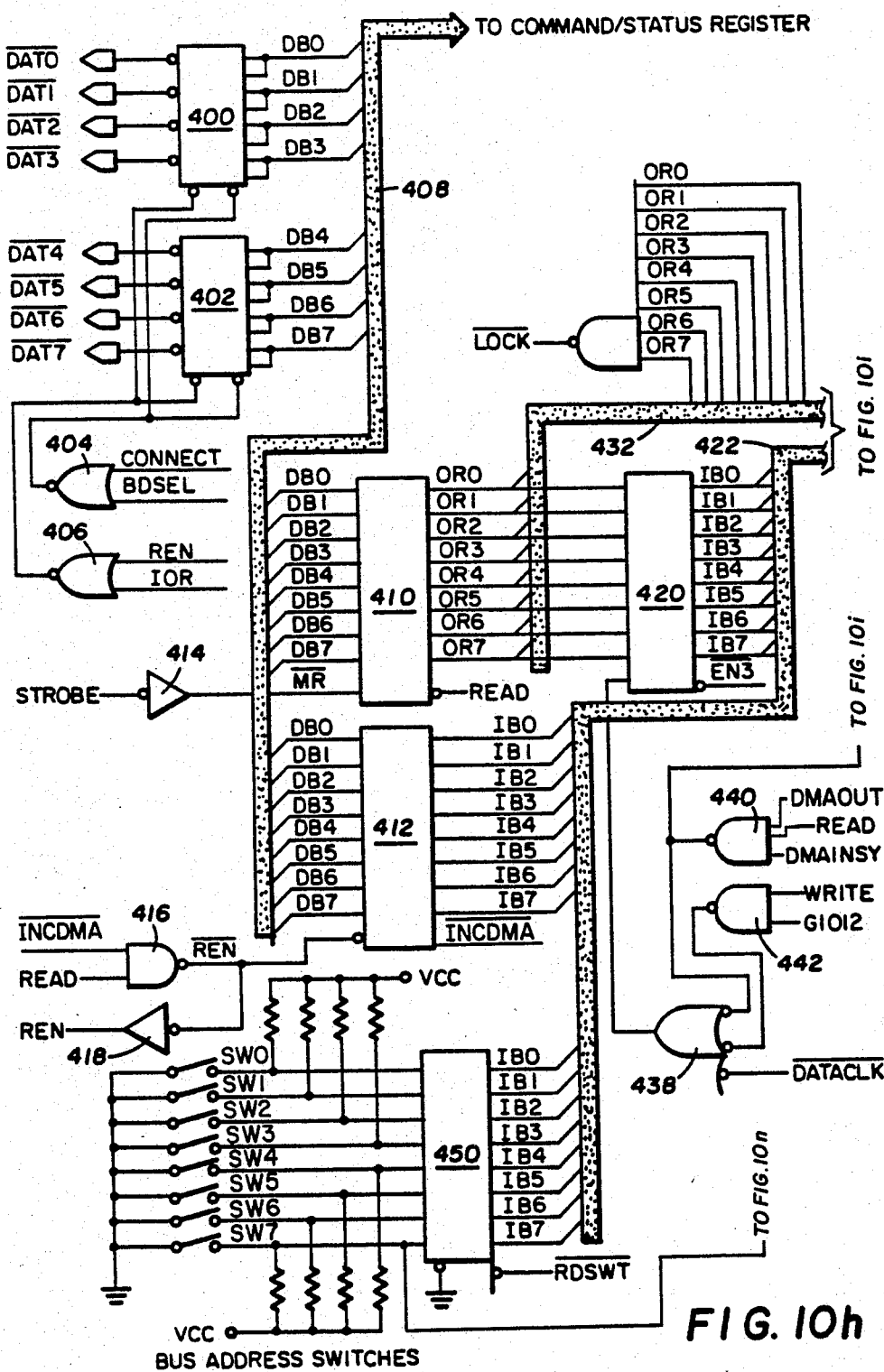
Figure 10I:
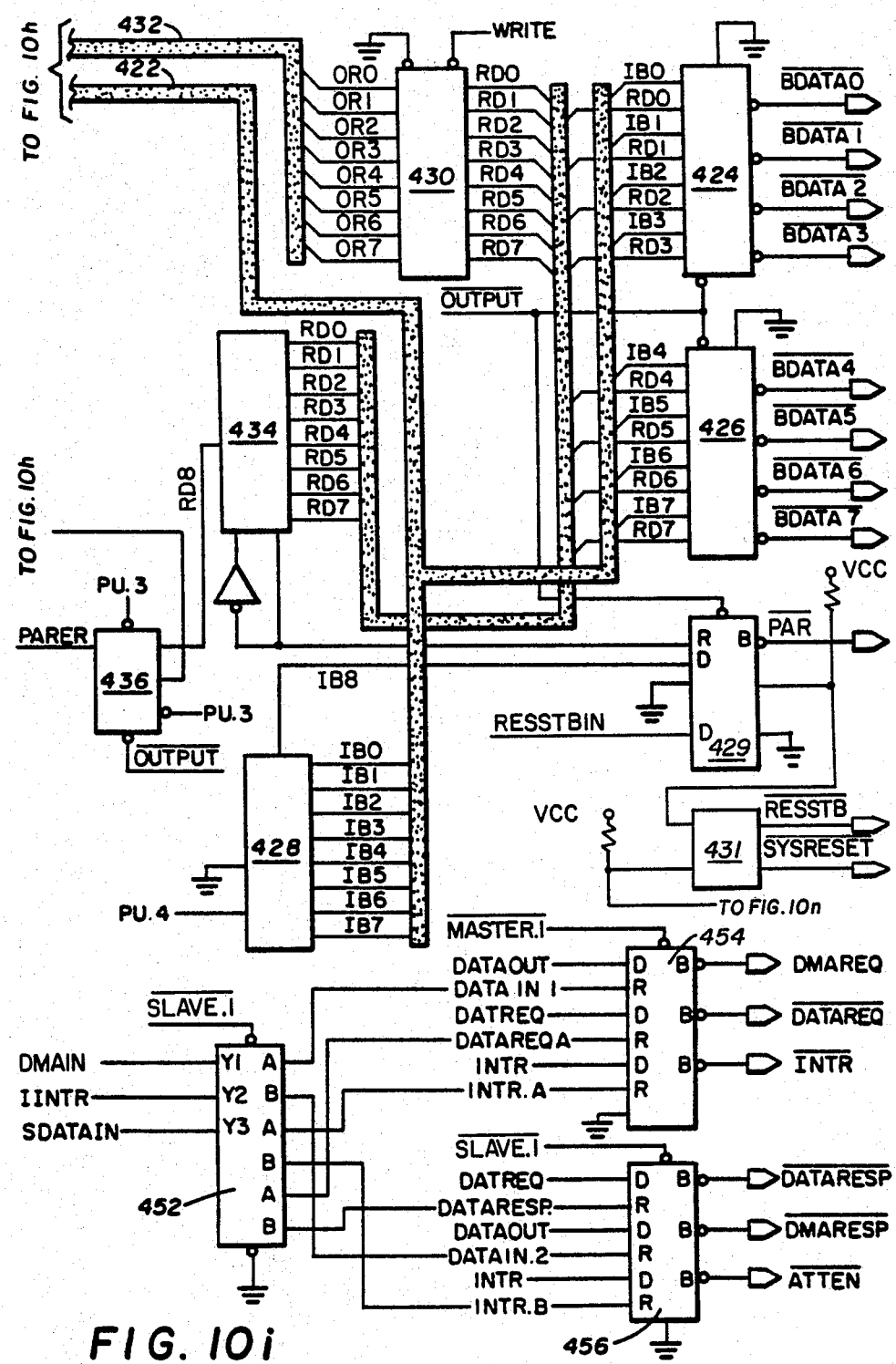
Figure 10J:
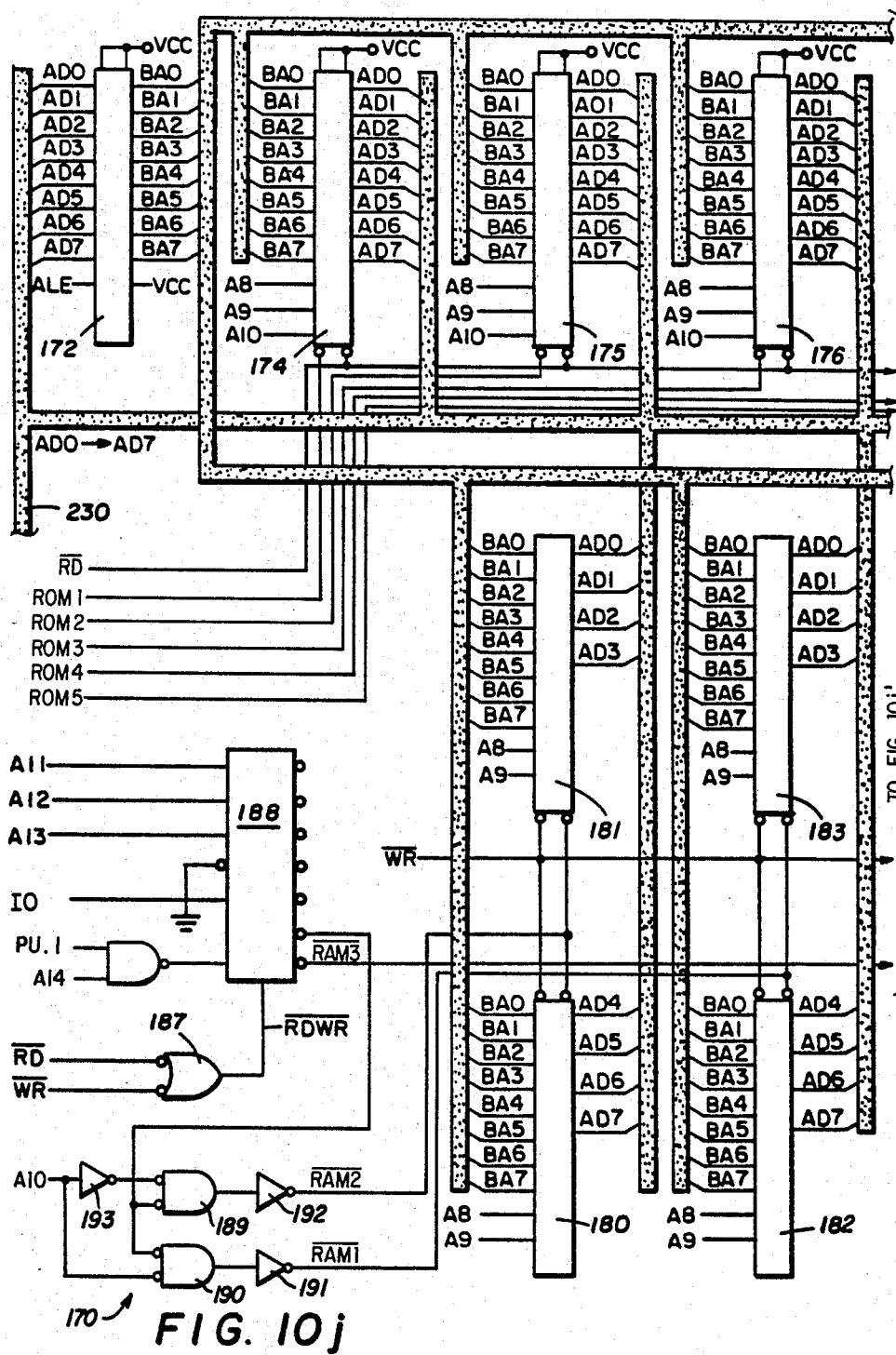
Figure 10J:
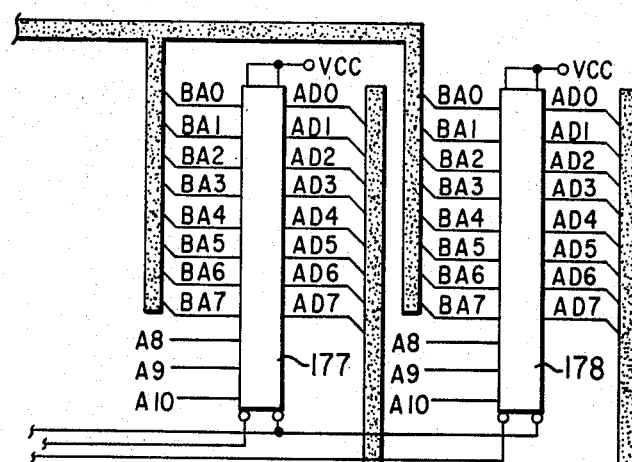

As shown in FIG. 10j, an extended memory unit 170 is provided as an extension to the memory of the microprocessor 200. The extended memory 170 comprises four functional units: (1) an address latch 172, (2) EPROM memory units 174, 175, 176, 177, and 178, (3) RAM memory units 180, 181, 182, 183, 184, and 186, and (4) address decoding chips 187, 188, 189, 190, 191, 192 and 193.

The address latch 172 is conditioned by the control signal ALE to capture the address information (AD-0-AD7) on an address data bus 230. The latched address is stored in address latch 172, which feeds its output to all the EPROM chips 174–178 as well as all the RAM chips 180–186.

The address decoding chips 187–193 decode the high order address signals A10, A11, A12, A13, as well as the control signals $\overline{RD}$ and $\overline{WR}$. These signals are used to generate the output signals $\overline{RAM1}$, $\overline{RAM2}$ and $\overline{RAM3}$. These signals control the activation of the individual EPROM chips 174–178 and RAM chips 179–186.

The EPROM memory units 174–178 contain the stored program of the Universal Control Board's 8085 processor. The combination of the address latch signals and the individual address decode signals control which EPROM chip and which byte in the EPROM chip, is selected. The EPROM chips apply the selective data to the bus 230.

The RAM memory units 180-186 contain variable bytes of data which are used by the Universal Control Board's 8085 processor. The RAM memory chips 179-186 are selected by the address decode signals RAM1, RAM2, and RAM3. The RAM memory units 179-186 are selected in pairs, each chip in the pair asserts four bits on the address data bus 230. Signals from the address latch 172 control which byte in the selected RAM chip is asserted on address data bus 230. The RAM chips 179-186 also use the signal $\overline{WR}$ to store data in the RAM chip from the address data bus 230.

As shown in FIGS. 10a, 10b and 10d an address data bus 230 is a bidirectional bus operating in a time multiplexed fashion. Part of the time the bus 230 represents an address memory that needs to be involved in a particular instruction, and at other times the bus 230 represents data that is involved in a particular transaction and an instruction. This means the data can be going into or out of memory or into or out of an input/output port. The address data bus 230 connects the signals AD-0-AD7 to one side of the bus repeater 232 for regenerating the data bus. The data signals D0-D7 are connected through a data bus 234 to a memory address register 236 and a word count register 238. A control bus 240 interconnects the various controls and timing signals from the microprocessor 200 to the rest of the components in the combination chips 202, 204 and 206 to instruct these devices in handling the signals on the address data bus 230.

The ALE signal originating in microprocessor 200 is the address latch used to tell the other components when the address data bus has an address on it. The other chips, 202, 204 and 206, have internal address registers which use the strobe to latch whatever information is on the address data bus 230 to save the address.

The IOM signal originates with the microprocessor 200 to tell the other components connected to the microprocessor 200 that the particular data transaction is either input/output or memory. The state of the signal tells the combination chips 202, 204 and 206, having input/output functions and memory functions, that the data on the data lines and address on the address lines should be used to control either the input/output ports or the memory ports. If the IOM signal is high, this represents an input/output transaction; and if the signal is low it represents a memory transaction, either a read or write transaction.

The next strobe signal of the microprocessor 200 is the $\overline{RD}$ read signal which is a timing signal to tell the other components that the microprocessor 200 is to perform a read function.

The next strobe signal is the $\overline{WR}$ write strobe originating with the microprocessor 200 to tell the other system components that the microprocessor 200 is to perform a write transaction, i.e., that it's going to originate in the microprocessor and end up in an external component.

The next control signal is the RESET signal originating in the microprocessor 200 which initializes the other combination chips 202, 204 and 206.

The final control signal on the control bus 240 is the CLK signal, which is a timing signal to the other combination chips 202, 204, and 206 so that the whole system is synchronized.

The remaining signals, A8-A15, originating from the microprocessor 200 to the ROM combination chip 206 to select which system component is to be involved in a particular input/output or memory transaction. As shown in FIG. 10a, address signals A11-A13, connected to an address decoder 244, may further select one of the chips 202, 204 and 206 in the system to be involved in a transaction through its output signals DC0, DC1, and DC2. In addition, address decoder 244 also enables the microprocessor 200 to select the desired ROM by outputting one of $\overline{ROM1}$, $\overline{ROM2}$, $\overline{ROM3}$, $\overline{ROM4}$, and $\overline{ROM5}$ signals. As shown in FIG. 10d, the address signals A13-A15 are connected to an input/output decoder 246 to decode these addresses into five unique signals to select certain registers to control the memory address register 236 and the word count register 238 of FIG. 10e. Of the five decoding signals provided by the input/output decoder 246, three of them, $\overline{LDM0}$, $\overline{LDM1}$ and $\overline{LDM2}$, are used by the memory address register 236. The remaining two decode signals of the input/output decoder 246, $\overline{LDM3}$ and $\overline{LDM4}$, are used by the word count register 238.

The memory address register 236 consists of address memory registers 248, 250, 252, 254, and 256. The function of the memory address register 236 is to address memory which is exterior to the Universal Control Board and connected to the Intel bus. The Intel bus is the main bus which connects all the Universal Control Boards to one system. The memory address register 238 can be loaded through input/output commands to an initial starting address, which allows another controller in the board to command it, incrementing its value through the $\overline{INCDMA}$ signal coming into one pin of an AND gate 258. The $\overline{INCDMA}$ signal comes from a bus timing control circuit 540 (FIG. 10m) on the Universal Control Board. The other signal to the AND gate 258, MARINH, originates from a ROM sequencer 290 (FIG. 10f) on the Universal Control Board and described below.

The output of the memory address register 236 is transmitted to address drivers 260, which consist of separate drivers 262, 264, 266, 268, and 270 connected to the memory address registers 248, 250, 252, 254, and 256, respectively. The address drivers 260 take the memory address bits individually from the address registers 248-256 and condition them to be placed on the Intel bus.

As shown in FIG. 10e, the word count register 238 consists of registers 272, 274, 276, and 278 having their inputs connected to the data bus bar 234 for receiving the data signals D0-D7. The word count register 238 may have a starting count loaded into its registers through an input/output command from the microprocessor 200. The word count register 238 is controlled by the $\overline{INCDMA}$ signal for generating an output signal, word count zero (WCZERO) signal, to control how many bus transactions occur. For protocol on the Universal Control Board, the WCZERO signal is passed through an inverter 280 to output the signal as $\overline{WCZERO}$.

As shown in FIG. 10f, a ROM sequencer 290 functions to control most of the logic on the Universal Control Board under the command of the microprocessor 200. The ROM sequencer 290 controls bus transactions and controls transactions with whatever other device is connected to the Universal Control Board on the other side of its cable.

The ROM sequencer 290 includes very high-speed memories in the form of interconnected PROMS 292, 294, 296 and 298. The input to the PROMS 292-298 is its address and its output is program instruction for other components of the Universal Control Board. The first four bits comprising the output of the PROM 292 is the next address of the ROM program, and it is stored in the next address register 300. The PROM 294 has as its output the four signals LOCKOK, MARINH, WRTINH, and MUXCON, which are applied elsewhere to the Universal Control Board. The PROM 296 has three bits of its program output to control an output latch 302, which is a way for the program to express what it would like to do in terms of output. The output latch 302 implements three signals: "STOP", "BUS-REQ" AND "RDONE". The output latch 302 is controlled by AND gate 304, having its input terminals connected to a 5 megahertz clock signal and a pullup signal. The fourth bit from the PROM 296 occurs in real time and is the DMA START signal, which is applied to a bus timing control circuit 540 of FIG. 10m. Finally, the last PROM 298 has three of its four bits of the program instruction to control an input multiplexer 306 to sample the various signals to see what their state is. The PROM 298 program output selects the input multiplexer 306 address and the output of the multiplexer stored as part of the next address register 301. The fourth bit of program instruction from the PROM 298 is the BREADY signal to a cable timing control circuit 340 of FIG. 10g.

As discussed above, four of the eight address bits for each of the PROMS 292, 294, 296, and 298 come from the next register address 300. A fifth address bit, SRRA4, comes from the output of the input multiplexer 306 through part of the next adress register 301. The remaining three address bits of the PROMS 292-298 are controlled by the signals RA0, RA1, and RA2 which come from the input/output port of the ROM combination chip 206 of the microprocessor circuit. The signals RA0, RA1 and RA2 are fed through inverters 308, 310 and 312 through a PROM control bus 314 to the inputs of the PROMS 292-298. A fourth signal, RA3, from the ROM combination chip 206 is fed to a flip-flop 316 controlled by a 5 megahertz clock signal to generate a reset signal $\overline{\text{RSTM}}$ which goes to the next address register 300 and a reset signal RSTM which goes to the output latch 302. The RA3 signal allows the microprocessor 200 to turn off the ROM sequencer 290 when the ROM sequencer 290 has finished a particular function requested of it.

The microprocessor 200 controls the ROM sequencer 290 by the three-bit command RA0, RA1 and RA3 which specifies the program function to be performed, setting a 0 in the RA3 bit which will release the ROM sequencer 290 by taking away the reset. When the ROM sequencer 290 finishes performing its function, it sets the "STOP" bit at the output latch 302 which the microprocessor circuit can sample through the RAM combination chip 202, and the ROM combination chip 206 responds by resetting the flip-flop 316, turning the ROM sequencer 290 off. The reset bit RSTM also serves as a fail-safe mechanism by allowing the ROM sequencer 290 only a certain amount of allotted time to perform its function. If too much time elapses, then the microprocessor circuit performs an error recovery procedure by unconditionally resetting the ROM sequencer 290.

The ROM sequencer 290 includes a bus cycle counter 318. The bus cycle counter 318 determines how many bus transactions have occurred by being incremented by the signal INCDMA every time a bus transaction occurs. By selecting a particular one of the Q outputs of the bus cycle counter 318, QA, QB, QC, and QD, the counter can be adjusted to count by 2, 4, 6, or 8. Bus cycle counter 318 functions to prevent the ROM sequencer 290 from monopolizing time on the Intel bus when the ROM sequencer 290 is doing a bus block transfer. During a bus block transfer the ROM sequencer in effect locks out the other Universal Control Boards on that bus. Bus cycle counter 318 causes the ROM sequencer 290 to periodically give up control of the bus so that some of the Universal Control Board can use it. The output signal from the bus cycle counter 318 is the BUSCOUNT signal to one input of the input multiplexer 306.

The input multiplexer 306 allows the ROM sequencer 290 to sample the state of a number of functions. An AND gate 320, receiving input signals $\overline{\text{MUXCON}}$ and $\overline{\text{LOCK}}$, has its output applied to one input terminal of the input multiplexer 306. The DONE signal from the cable timing control circuit 340 is applied to another input terminal of the input multiplexer 306. The CONNECT signal from the output of the contention logic circuit 460 is applied as another input signal of the input multiplexer 306. The DMACOMP signal is from the bus timing control circuit 540; another input signal. The WCZERO signal from the word count register 238 is also applied as an input signal.

The final input signal to the input multiplexer 306 is the BOTHD signal from a flip-flop 322. Flip-flop 322 has one pin connected to the output of AND gate 324, having its two inputs connected to the DONE signal from the cable timing control circuit 340, and the DMACOMP signal from the bus timing control circuit 540. The two "DONE" signals are connected to the input of the AND gate 324 to set the flip-flop 322. When the ROM sequencer 290 samples the input connected to the BOTHD signal of the input multiplexer 306, it can reset the flip-flop 322 by the RDONE signal originating from the output latch 302 and fed through an inverter 326. The flip-flop 322 may also be reset by the signal $\overline{\text{RST2}}$ from the reset circuitry 210.

A clock circuit 330 takes a ten (10) megahertz signal through an inverter 332 and feeds it through the flip-flop 322 to the ROM sequencer 290. The ten (10) megahertz clock signal is also fed through another inverter 334 to a divide-by-two flip-flop 336 to generate a 5 megahertz clock signal (5MCK) and an inverted 5 megahertz clock signal ($\overline{\text{5MCK}}$) for use elsewhere on the Universal Control Board.

Figure 10N:
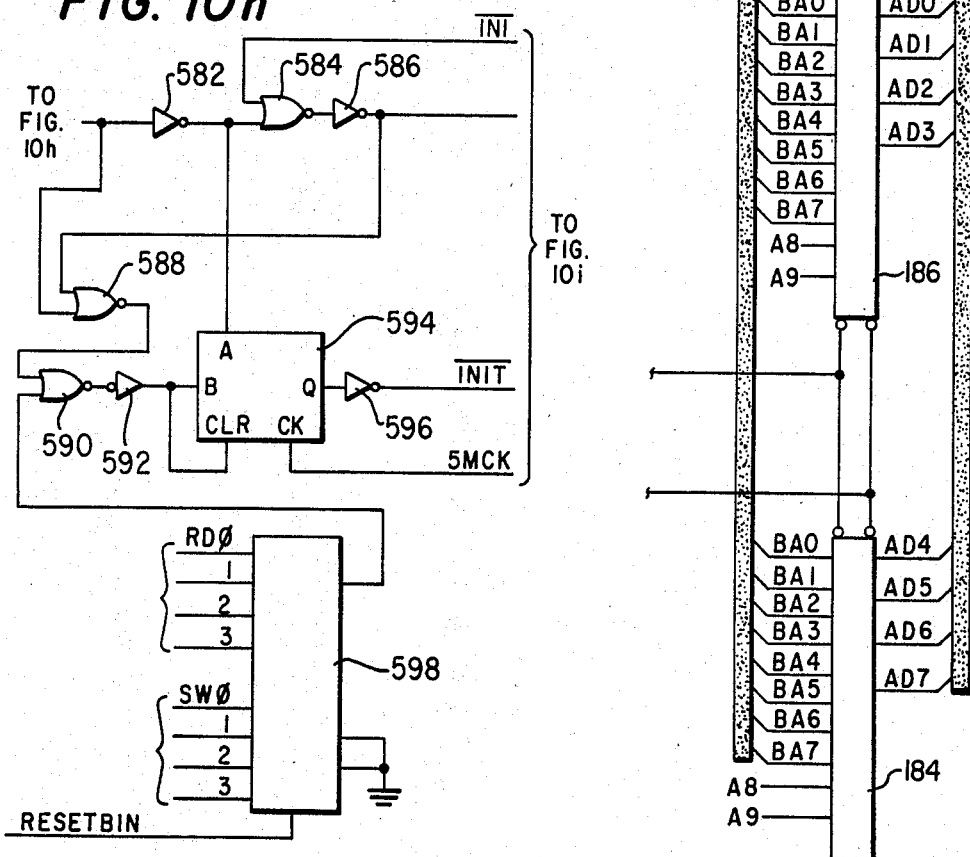

As shown in FIG. 10g, cable timing control circuit 340 participates in the bus timing on the cable by originating one of the two signals on the cable and sampling the other. The signal DMAOUT is an output command signal generated by the cable timing control circuit 340 and the DMAIN signal originated on the cable bus driver circuit. The BREADY signal is derived from the fourth output bit of the PROM 298 of the ROM sequencer 290 (FIG. 10f) and is connected to the inputs of NAND gates 342 and 344. A second input of the NAND gate 342 is connected to the WRITE signal from the ROM combination chip 206 and the $\overline{\text{WCZERO}}$ from the inverter 280 of the word count register 238. The output of the logic NAND gates 342 and 344 are fed through an OR gate 346 to produce the READY output signal as one input to the D input of a D-type flip-flop 347. The flip-flop 347 has its Q output connected to one input of a three input NAND gate 348 and the clock input thereof connected to the ten magahertz clock. The NAND gate 348 also has its input tied to the DONE signal feed back from the output of the cable timing control circuit 340 and the DMACOMP signal from the output of the bus timing control circuit 540 (FIG. 10m). The output of the NAND gate 348 is fed through an inverter 350 to one pin of an input multiplexer 352. The input address of the multiplexer 352 is controlled by the state lines STB0, STB1 and STB2 as the output of a counter 354. Counter 354 essentially reflects the state of the cable timing control circuit 340. The input multiplexer 352 is sampling the DMAIN signal fed through flip-flop 356 which generates the output signals DMAINSY and $\overline{\text{DMAINSY}}$ as the inputs to multiplexer 352.

The output of the input multiplexer 352 goes to an output multiplexer 358 to allow certain signals to occur when the proper input is detected. The output multiplexer 358 waits in state 0 until it receives a logic 1 from the output of the input multiplexer 352 which would cause the output multiplexer 358 to have an output on its state 0, causing a $\overline{\text{ST0Y}}$ signal output. The $\overline{\text{ST0Y}}$ output signal goes through OR gate 360 and inverter 362 to reset the DONE signal from the ouput of a flip-flop 364. The $\overline{\text{ST0Y}}$ signal is also fed through OR gate 366 to set the DMAOUT signal at the output of flip-flop 368. The presence of the DMAIN response from another Universal Control Board is sampled by the input multiplexer 352, and if it is in state 1 it causes the output multiplexer 358 and the signal $\overline{\text{ST1Y}}$ to be fed through OR gate 370 and inverter 372 to pin K of the flip-flop 368, causing DMAOUT to be reset. The input multiplexer 352 will change state upon a negative response from the other end of the cable of DMAIN going away, indicating that information has been taken off the cables. The change in state of the input multiplexer output 352 may cause the state 2 output, $\overline{\text{ST2Y}}$, to be generated by the output multiplexer 358 which is fed through the OR gate 374 to set the DONE output on the DONE flip-flop 364. The DONE signal is fed back to the input multiplexer 306 of the ROM sequencer 290 to indicate that the byte successfully moved to the other Universal Control Board. The output multiplexer 358 also has an output signal $\overline{\text{ST3Y}}$ fed through OR gate 376 and inverter 378 to reset the counter 354.

The sequence described above for setting and resetting the DONE and DMAOUT signals is basically the same whether the cable timing control circuit 340 is in the slave or master mode. The master mode operation was described above where the DONE flip-flop 364 and DMAOUT flip-flop 368 were set and reset by the signals ST0Y, ST1Y and ST2Y from the output multiplexer 358.

If the cable timing control circuit 340 is to operate in the slave mode, which means it is receiving a byte of data to be transmitted down a cable from another Universal Control Board, the slave signal will be generated from the ROM combination chip 206 to control the counter 354. The slave signal input to the counter 354 causes it to start out in state 4. The $\overline{\text{ST4Y}}$ signal is fed through one input of OR gate 360 and inverter 362 to reset the output of the DONE flip-flop 364. Response from the control board on the other end of the cable is the DMAIN signal sampled by the input multiplexer 352 to cause a state 5 output at the output multiplexer 358. The $\overline{\text{ST5Y}}$ signal is fed through the OR gate 366 to set the DMAOUT flip-flop 368. The cable timing control circuit 340 then waits for the DMAIN signal to go down which is detected by the input multiplexer 352 causing the state of the output multiplexer 358 to change to state 6. The $\overline{\text{ST6Y}}$ signal is fed through OR gate 374 to set the DONE output of flip-flop 364 and also fed through OR gate 370 and inverter 372 to reset the output of DMAOUT flip-flop 368. The output multiplexer 358 slave mode also has the output signal $\overline{\text{ST7Y}}$ fed through OR gate 376 and inverter 378 to reset the counter 354.

FIGS. 10h and 10i illustrate the circuit providing the data path for the movement of a piece of data. Bus data drivers/receivers 400 and 402 are integrated circuit chips which function as translation devices for data flowing between the bus and the Universal Control Board. The bus data drivers/receivers are controlled by NOR gate 404 having one of its input from the CONNECT signal from a contention logic circuit 460 (FIG. 10k) and an input from the BDSEL (board select) signal from an address decode circuit 490 (FIG. 10-l). A NOR gate 406 also controls the data drivers/receivers 400 and 402 and has its inputs connected to the REN signal and the IOR signal.

The data DB0–DB7 connected internally on the Universal Control Board moves through data bus 408 to command/status register of RAM combination I/O Chip 204 (FIG. 10b) and to the input of holding registers 410 and 412. The STROBE signal from the bus timing control circuit 540 (FIG. 10m) is fed through inverter 414 to a register 410. The $\overline{\text{INCDMA}}$ signal and READ signal are the inputs of NAND gate 416 having its output $\overline{\text{REN}}$ to the register 412. The $\overline{\text{REN}}$ signal is also fed through an inverter 418 and through one input of the NOR gate 406. The output of the NOR gate 406 is connected to the bus data drivers/receivers 400 and 402.

Holding register 420 has its input connected to the output of holding register 410 to generate an overlapped transaction. A byte of data loaded into register 410 from the bus is immediately transferred to the register 420, so that register 410 is ready to read another byte of data from the bus. The cable timing control circuit 340 is running simultaneously with the bus timing control circuit 540 to send bytes of data through the cable while the bus timing control circuit 540 is reading bytes of data from the bus. Holding registers 410 and 420 create this overlapped transaction when moving data from the bus memory to the cable. The output of register 420, IB0–IB7, is placed on cable bus 422 to cable bus drivers 424 and 426, which serve as translation devices to take the data from the internal environment of the board and put it on the external environment of the cable. A parity generator 428 takes the eight data bits IB0–IB7 and generates a ninth data bit, IB8, which is an odd parity representation of the rest of the data. The IB8 output of the parity generator 428 is input to a line driver 429 to generate the $\overline{\text{PAR}}$ signal. A RESSTBIN signal is also input to the other D-input of the line driver 429, the B output of which is connected to an optional jumper 431 to generate a $\overline{\text{RESSTB}}$ signal and a $\overline{\text{SYSRE}}$ $\overline{\text{SET}}$ signal. The jumper 431 is added to make the connection, as shown by the dashed lines, to generate the output signals.

The holding registers 412 and 420 provide an overlapped condition in input, when data is moving from the cable into the bus memory. Data received by cable drivers/receivers 424 and 426 is transferred through a register 430 to a bus 432 as data bits OR0–OR7 as the input of holding register 420. The data stored in the holding register 420 is immediately moved into the holding register 412, so that register 420 is available to do another transaction simultaneously, moving the first data byte into holding register 412. Thus, holding register 420 switches functions depending on whether the system is in the input or output function in order to provide the overlapped condition.

A parity checking generator 434 takes the eight data bits RD0–RD7 from the cable drivers/receivers 424 and 426 to generate a ninth data bit, RD8, which is an odd parity representation of the rest of the data. Generation of the parity bit is stored in flip-flop 436 which generates the signal PARER to the RAM combination chip 202 of the microprocessor circuit.

The holding register 420 is clocked by three different functions through an OR gate 438. One function is the input function when the system is reading from the cable. In this input function, the READ signal and the DMAINSY signal are the inputs to a NAND gate 440, which has its output connected to the input terminal of the OR gate 438. In the output function, the WRITE and G1012 signals are connected to the input terminals of NAND gate 442 which has its output connected to OR gate 438. The third function of the holding register 420 involves single byte transfers on the bus, transfers which do not involve the cable. The DATACLK signal from the RAM combination chip 202 is fed through one input terminal of the OR gate 438.

A bus address switch 450 is also connected to the cable bus 422 to provide a unique address for a Universal Control Board. The microprocessor circuit through its RAM combination chip 202 has an output signal RDSWT connected to the bus address switch 450 to read the preset switches which are the input to the bus address switch 450. The switch 450 has eight inputs labeled SW0, SW1, SW2, SW3, SW4, SW5, SW6 and SW7 referring to the number of switches present. By selectively grounding a combination of switches, a unique code can be manually placed into an individual Universal Control Board. This is part of the initialization function of the microprocessor circuit.

The microprocessor circuits of the Universal Control Boards communicate with one another to determine which Universal Control Boards have access to the cable bus and to determine whether they are in the master or slave mode. The DATAIN, IINTR and SDATAIN signals from the microprocessor circuit are switched through a control multiplexer 452 to switch the three signals to either a master cable bus driver/receiver 454 or a slave cable bus driver/receiver 456. If microprocessor 200 is in the master mode, the control signals are switched to the master cable bus driver/receiver 454. If the SLAVE.1 signal is received by the control multiplexer 452, the microprocessor 200 is in the slave mode and the control signals are directed to the slave cable bus driver/receiver 456.

In the master mode, the driver/receiver 454 is driving the interrupt line, INTR, and the request lines, DMAREQ and DATAREQ. In the master mode, the slave cable bus driver/receiver is receiving the attention, ATTEN, signal as well as the response signals, DMARESP and DATARESP. In the Universal Control Board in the slave mode, just the reverse happens. The master driver/receiver 454 is receiving the interrupt signal, INTR, and the request signals, DATAREQ and DMAREQ. The slave driver/receiver is driving the attention signal, ATTEN and the response signals, DMARESP and DATARESP.

Figure 10K:
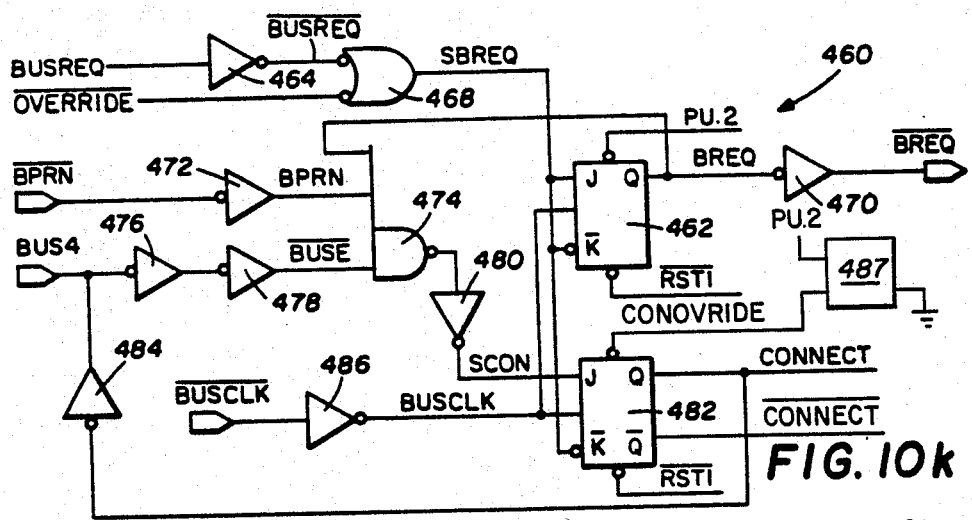
Figure 10L:
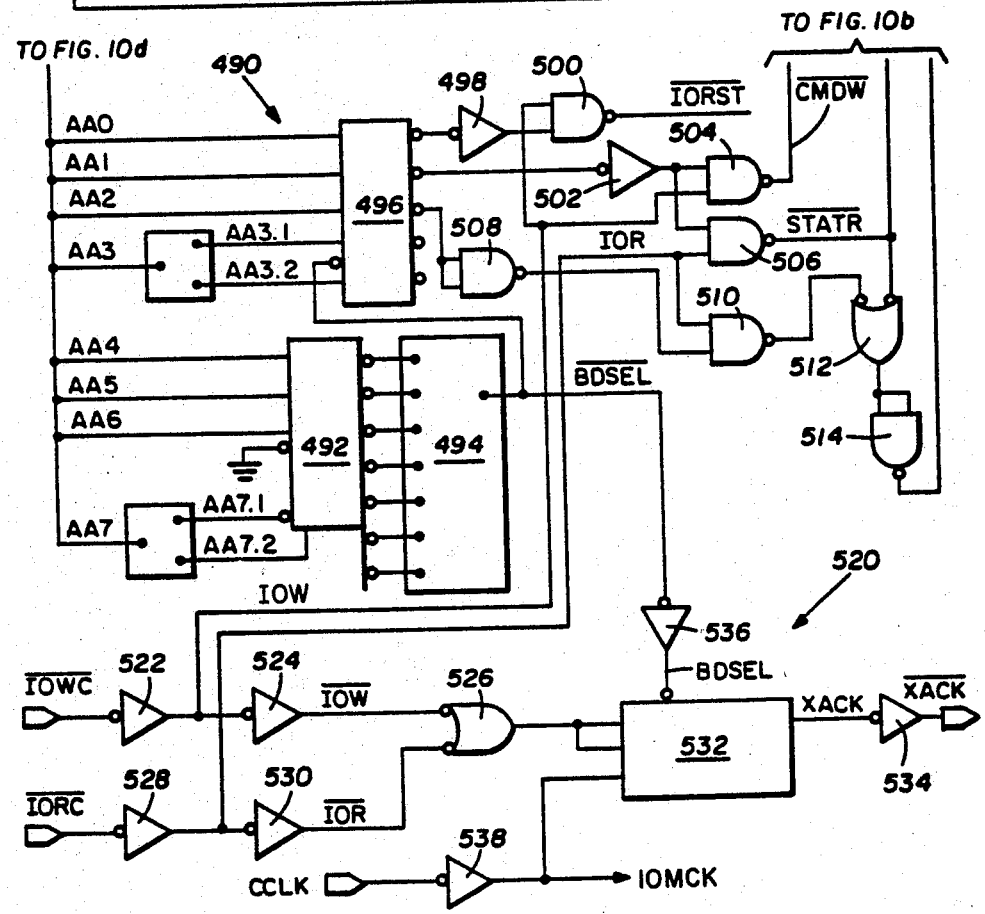
Figure 10M:
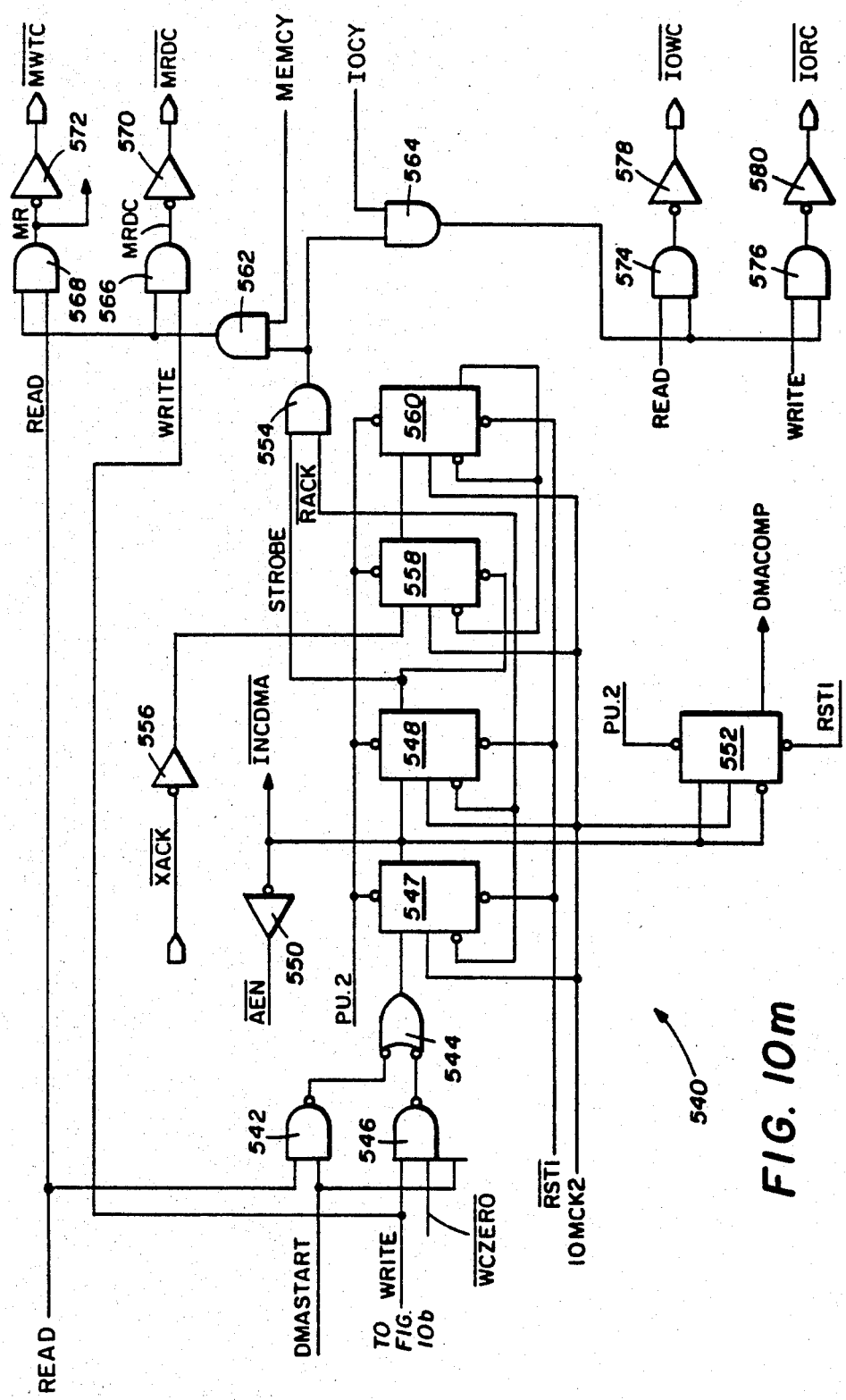

As shown in FIG. 10k, access to the bus is controlled by contention logic circuit 460. The contention logic circuit 460 is controlled by three signals, BUSY and BPRN from the bus and BUSREQ from the ROM sequencer 290. The BUSY signal is an indication that the bus is busy with a transaction in progress. The BPRN signal is an indication of whether or not the Universal Control Board has priority. The BUSREQ signal is generated by the ROM sequencer 290 when it is doing either signal or block mode transfers. The OVERRIDE signal is from an input/output port of the ROM input/output port chip 206. A bus request flip-flop 462 may be set by either the BUSREQ signal or the OVERRIDE signal. The BUSREQ signal is fed through an inverter 464 to one input of an OR gate 468 having its second input terminal tied to the OVERRIDE signal. The output of OR gate 468, SBREQ, sets the bus request flip-flop 462. The BREQ signal from the output of the flip-flop 462 is fed through inverter 470 to appear as the signal BREQ which goes on the bus to some external logic which will arbitrate bus priority. This external controller determines priority and upon receipt of priority for the requesting Universal Control Board the BPRN signal is received by the control board fed through inverter 472 to one input terminal of NAND gate 474. The BREQ signal is fed back through the output of the bus request flip-flop 462 to another input gate of the NAND gate 474. When the bus is no longer busy, the BUSY signal is fed through an inverter 476 and inverter 478 to the third input terminal of NAND gate 474. The output of NAND gate 474 is the output signal SCON fed through an inverter 480 to set a connect flip-flop 482. The output connect signal is fed back through inverter 484 to generate the BUSY signal. The only way to reset the connect flip-flop 462 is for the bus request signal to be reset. A BUSCLK signal is received from the bus and fed through an inverter 486 as the bus clock signal to the bus request flip-flop 462 and the connect flip-flop 482. The connect flip-flop 482 has an override circuit 487 attached to the input thereof. The override circuit generates the signal CONOVRIDE to connect a pullup to the flip-flop 482.

As shown in FIG. 10-l, an address decode circuit 490 functions to decode the addresses AA0–AA7 from address drivers 262 and 264. Address signals AA4–AA7 are fed through address decoders 492 and 494 to generate output signal BDSEL, the board select signal. The other four signals AA3–AA0 are fed through address decoder 496 to select one of three functions on the board. The input/output reset function, the IORST signal, is fed through an inverter 498 and one input terminal of NAND gate 500. The other input of NAND gate 500 is from the IOW signal from the bus timing control circuit 540. The input/output reset function indicates that some other controller on the bus desires this Universal Control Board to be reset, and the IORST signal is fed to the reset circuitry 210 described hereinabove.

The remaining two functions decoded by the address decoder 496 are used to communicate with one of the input/output ports of the RAM input/output combination chip 204. The integrated combination chip 204 can be configured through software to function as either a status register or a command register. The command register function is fed from the address decoder 496 through an inverter 502 to one input terminal of NAND gate 504. The second input terminal of NAND gate 504 is controlled by the IOW signal. The output of NAND gate 504 is the $\overline{\text{CMDW}}$ signal to port A of the RAM combination I/O chip 204. The output from the inverter 502 is also fed to one input of NAND gate 506 having its other input connected to the IOR signal from the bus timing control circuit 540 (FIG. 10m). The output of NAND gate 506 is the signal $\overline{\text{STATR}}$ which goes to port B of the RAM combination I/O chip 204.

The command register functions to allow some other control board to load data into the register so that it can be read and responded to by the microprocessor circuit. The status register functions to allow the microprocessor circuit to store information here and some other Universal Control Board can read that information through the bus and the address decode circuit 490.

A third function of the address decoder 496 is an output fed through both input terminals of NAND gate 508 which has its output applied as one input to NAND gate 510. The outputs of NAND gates 506 and 510 are fed to the inputs of OR gate 512 which has its output connected to the input of NAND gate 514 which has its output connected to a data bus interface device 516.

Reviewing the three commands implemented through the address decoder device 496, the output of NAND gate 504 loads a byte of data into the command register of the RAM combination I/O chip 204. The output of NAND gate 506 creates and simultaneously resets the status register of the RAM I/O chip 204, while the output of NAND gate 510 reads the status register of chip 204 without resetting it. The output of the status and command registers, DB0–DB7, is placed on the DB data bus 408 (FIG. 10h).

A bus slave timing circuit 520 receives the strobes $\overline{\text{IOWC}}$ and $\overline{\text{IORC}}$ from the output of the bus timing control circuit 540. The $\overline{\text{IOWC}}$ signal is fed through inverters 522 and 524 to one input of OR gate 526. The $\overline{\text{IORC}}$ signal is fed through inverters 528 and 530 to the other input of OR gate 526. The output of OR gate 526 is input to shift register 532 to generate an output XACK fed through an inverter 534 to be conditioned as the signal $\overline{\text{XACK}}$. The $\overline{\text{XACK}}$ signal is an acknowledgement to the bus that read and write strobes have been detected and the board select address has been detected. The board select signal is fed through an inverter 536 to the shift register 532. Shift register 532 also has a clock signal, CCLK, fed through an inverter 538.

FIG. 10m illustrates the bus timing control circuit 540. A NAND gate 542 has its input connected to the READ signal and the DMASTART signal from the ROM sequencer 290. The output of the NAND gate 542 is connected to one input terminal of OR gate 544. The second input terminal of the OR gate 544 is connected to the output terminal of AND gate 546, having its input terminals connected to the WRITE signal, the WCZERO signal and the DMASTART signal from the ROM sequencer 290.

The output of the OR gate 544 sets flip-flop 547. The output of flip-flop 547 is the origin of the $\overline{\text{INCDMA}}$ signal and it is also fed through an inverter 550 for the $\overline{\text{AEN}}$ signal. The output of the flip-flop 547 also controls the input of a flip-flop 552 for setting the DMA-COMP signal to be fed to the ROM sequencer 290. The output of a flip-flop 548 is used to set one input of AND gate 554.

The $\overline{\text{XACK}}$ signal from the bus slave timing circuit 520 is fed through an inverter 556 to set a flip-flop 558. One output terminal of the flip-flop 558 is connected to a second flip-flop 560 having its output fed back to the K terminals of the flip-flops 558 and 560. The second output terminal of the flip-flop 558 is identified as the $\overline{\text{RACK}}$ signal connected to the second input terminal of an AND gate 554.

The output of the AND gate 554 is connected to one input terminal of AND gate 562 and AND gate 564. The second input terminal of the AND gate 562 is the MEMCY signal from the ROM combination I/O chip 202. The output of AND gate 562 is connected to the first input terminal of AND gates 566 and 568. The second input terminal of AND gate 566 is the WRITE signal from the ROM combination I/O chip 206, and the second input terminal of AND gate 568 is the READ signal also from the ROM combination I/O chip 206. The output of AND gate 566 is fed through an inverter 570 and identified as the $\overline{\text{MRDC}}$ signal, and the output of the AND gate 568 is fed through inverter 572 identified as the output signal $\overline{\text{MWTC}}$.

The AND gate 564, having one input terminal connected to the output of AND gate 554, has a second input terminal connected to the IOCY signal from the RAM combination I/O chip 202. The output of AND gate 564 is fed to input terminals of AND gates 574 and 576. The second input terminal of the AND gate 574 is the READ signal, and the second input terminal of the AND gate 576 is the WRITE signal. The output of AND gate 574 is fed through an inverter 578 and is the $\overline{\text{IOWC}}$ signal used as an input to the bus slave timing circuit 520. The output of the AND gate 576 is fed through an inverter 580 which has as its output the $\overline{\text{IORC}}$ signal used as another input to the bus slave timing circuit 520.

Referring now to FIG. 10n, there is illustrated a schematic diagram of the reset circuitry for individually resetting one of the Universal Control Boards that is connected to the VMS system. An inverter 582 has the input thereof connected to one of the switch inputs on the bus address switch 450 (FIG. 10h), and the other input thereof is connected to one input of NOR gate 584. The output of the NOR gate 584 is connected to the input of an inverter 586, the output of which is input to the jumper board 431 of FIG. 10i. A NOR gate 588 has one input thereof connected to the input of the inverter 582, the other input thereof connected to the output of the inverter 586 and the output thereof connected to one input of a NOR gate 590. The output of the NOR gate 590 is connected to the input of an inverter 592 which has its output connected to the "B" input of an IC 594. The IC 594 is a parallel shift register, of which the output is conditioned by an inverter 596 to provide the output signal $\overline{\text{INIT}}$. The output of the inverter 592 is also connected to the CLEAR input of the IC 594. The clock input of the IC 594 is connected to the 5MCK. A comparator 598 receives the inputs RD0, RD1, RD2, and RD3 on the A0–A3 input thereof. And the SW0, SW1, SW2, and SW3 signals on the B0–B3 inputs thereof. The output of the comparator 598 is input to the other input of the NOR gate 590. The comparator 598 compares the bit word on the input A0–A3 with the bit word on the input B0–B3. The inputs to the B0–B3 input are taken from the inputs to the bus address switch 450 (FIG. 10h) and denote the unique code for a given Universal Control Board. When the A0–A3 inputs correspond to that on the B0–B3 inputs, the output is activated and the B input of the IC 594 is activated. The switch signal SW7 that is connected to both the input of the inverter 582 and the input of the NOR gate 588, denotes the Universal Control Board that is selected as the master board.

In the VMS system, one of the Universal Control Boards is designated as the master board and input SW7 of the bus address switch 450 is grounded. This places a high logic signal on the A input of the IC 594 and allows the $\overline{\text{INI}}$ to control the operation of the NOR gate 588. If the board is not designated as the master board, a high signal is input to the inverter 582 and the NOR gate 588 which activates the NOR gate 584 and deactivates the NOR gate 588. This prevents the $\overline{\text{INI}}$ signal from activating the IC 594 and allows the comparator 598 to control the NOR gate 590, thus controlling the IC 594. The reset circuitry of FIG. 10n allows the VMS system to selectively reset only one of the Universal Control Boards without resetting all at one time.

The VMS 10 utilizes several microprocessor controlled Universal Control Boards connected to one bus instead of a single minicomputer. The Intel bus is the main bus which connects all the microprocessors together. The Universal Control Board has two distinct capabilities for moving data around in the VMS 10. First, the microprocessor 200 of the Universal Control Board may transfer data in single bytes in and out of the bus memory at a relatively slow rate to communicate with other microprocessors 200. Secondly, the Universal Control Board may also control the transfer of data in block form at a very high rate of speed through the cable or data bus interconnecting the Universal Control Boards. The ROM sequencer 290 has the function of coordinating the timing of the transfer of information from one cable to another cable with the microprocessor 200 instruction transfers to or from the bus.

The VMS 10 is an advanced communication system for audio signals, including facsimile, data, cryptographic and voice signals. The VMS 10 implemented in the preferred embodiment is described above in connection with voice signals, but the concept of the communication system has application for other audio signals as well. The VMS 10 of the preferred embodiment allows users to deposit voice messages which are recorded and later delivered to the intended recipients. In addition, users may call the VMS 10 at any time and inquire if any messages have been deposited for them. The VMS 10 may also answer a telephone while the user is absent or otherwise unavailable to receive the call and record a voice message for subsequent delivery to the user.

While the VMS 10 is intended primarily for use within medium to large corporations, it may be effectively used to improve the operator efficiency of any communication system. It offers an improved method of communications and at the same time it provides an excellent return on invested capital, achieved through increased personnel productivity at all levels within the company, as well as through personnel reduction and elimination of many existing, costly communication facilities. The VMS 10 also provides a number of usage reports to monitor the operation of the system.

The three basic features of the VMS 10, DEPOSIT, DELIVERY and INQUIRY, have been simplified to provide an easy to use system. The VMS 10 includes instructional and "canned" messages ("Voice Message System", "VMS", and "Voice-messages" are trademarks of Applicants' assignee, VMX, Inc.). Each of the three basic features of the VMS 10 will be described below.

FIGS. 11 to 14 represent the flow chart for the DEPOSIT feature of the VMS 10. "DEPOSIT" is the procedure by which one or more voice messages are placed into the VMS 10 for subsequent delivery. Referring to FIG. 10, the DEPOSIT procedure is initiated by dialing into the VMS 10 to access the system 600, causing the VMS 10 to answer 602 by playing a canned massage, such as "This is VMS."

A timer is started when the VMS 10 answers a call and identifies itself at step 602. The user then must complete the entire DEPOSIT process within a preset time interval (for example, 4 minutes). Approximately 30 seconds before this interval expires the VMS 10 will begin signaling the user with an alarm, such as a "beep" every 3 seconds. If the user has not completed the DEPOSIT operation by the end of the time interval, the VMS 10 will abort the DEPOSIT operation and terminate the user's access to the system.

After the VMS 10 answers 602, the user then dials a unique authorization number 604 for identification purposes to gain access to the system. The VMS 10 will allow the user a preset amount of time to dial a signed authorization number, e.g., 45 seconds. Upon entry of a valid authorization number, the VMS 10 responds with a short progress tone indicating it is ready to process an addressee 606. When all addresses have been entered, the user dials an End-of-Address indicator, e.g., "0," and VMS 10 will provide a record-mode "idle" tone, such as a repeating "beep-beep . . . " signal. The next step in the DEPOSIT routine 608 determines if the end of record indicator has been entered. If it has not, he returns to step 606 for the entry of an addressee number. If it has determined that a "0" was dialed, the user dials "1," removing the VMS 10 idle tone which enables this to record a voice message 610. At the conclusion of the recording step 610, the user may elect to either DEPOSIT another message 612, inquire for messages 614 or hang up 616.

In the system's step 606 in processing an addressee, the user may dial one or more addresses to which the voice messages are to be sent. "Addressees" are generally no more than telephone numbers, local extension numbers, distant company locations, or "off net" long distance numbers. A system parameter may be entered from the console to set the maximum number of individual addresses which may be entered. In addition, a distribution list code may be used as an address. This is a three digit address which is automatically translated by the VMS 10 into the previously defined individual telephone numbers of the group. The user of the VMS 10 in this way may send a single voice message to a number of people by using a single address, analogous to using a distribution list for a memo or letter. The VMS 10 will then deliver the voice message independently to each person within the group.

The VMS 10's step 604 for processing a user ID is set forth in further detail in FIG. 12. The procedure is initiated by the user dialing the identification code digits 618. The user may dial an "*" 620, if he discovers a dialing error before dialing the last digit. The VMS responds with a single "beep-beep" tone 622 to acknowledge that the user is allowed to redial the identification code. The VMS 10 next validates the identification code of the user 624. In determining the validity of the code 626, the VMS 10 acknowledges if a valid code has been entered 628 with an audible signal, such as a single "beep." This completes the user-ID processing 604 to allow the user to proceed to process an addressee 606 (FIG. 11). However, if the user identification code has been determined to be invalid, the VMS 10 determines if this is the first or second invalid entry 630. If it was the first attempt to enter a valid user code, the VMS 10 plays a canned message 632, such as: "The ID (_) is not valid. Please try again." The program then returns the user to program step 618 for redialing of the identification code. If the second try for the validity test 630 determines that this is the second entry of an invalid code, the VMS 10 plays a canned massage and hangs up 634. The canned massage at step 634 would be: "The ID you entered is again not valid. Please dial (_) for information or assistance. Thank you." There is an alternative to the progress tone provided at program step 628 to the VMS 10's acknowledgement of a valid ID code. A canned massage may instruct the user as follows: "To deposit a message, you may now dial the addressees. For any other function dial the 3 digit special function code." The user may access the VMS 10 through a special code to provide for verbal instructional commands in lieu of progress tones.

Figures 13, 14:
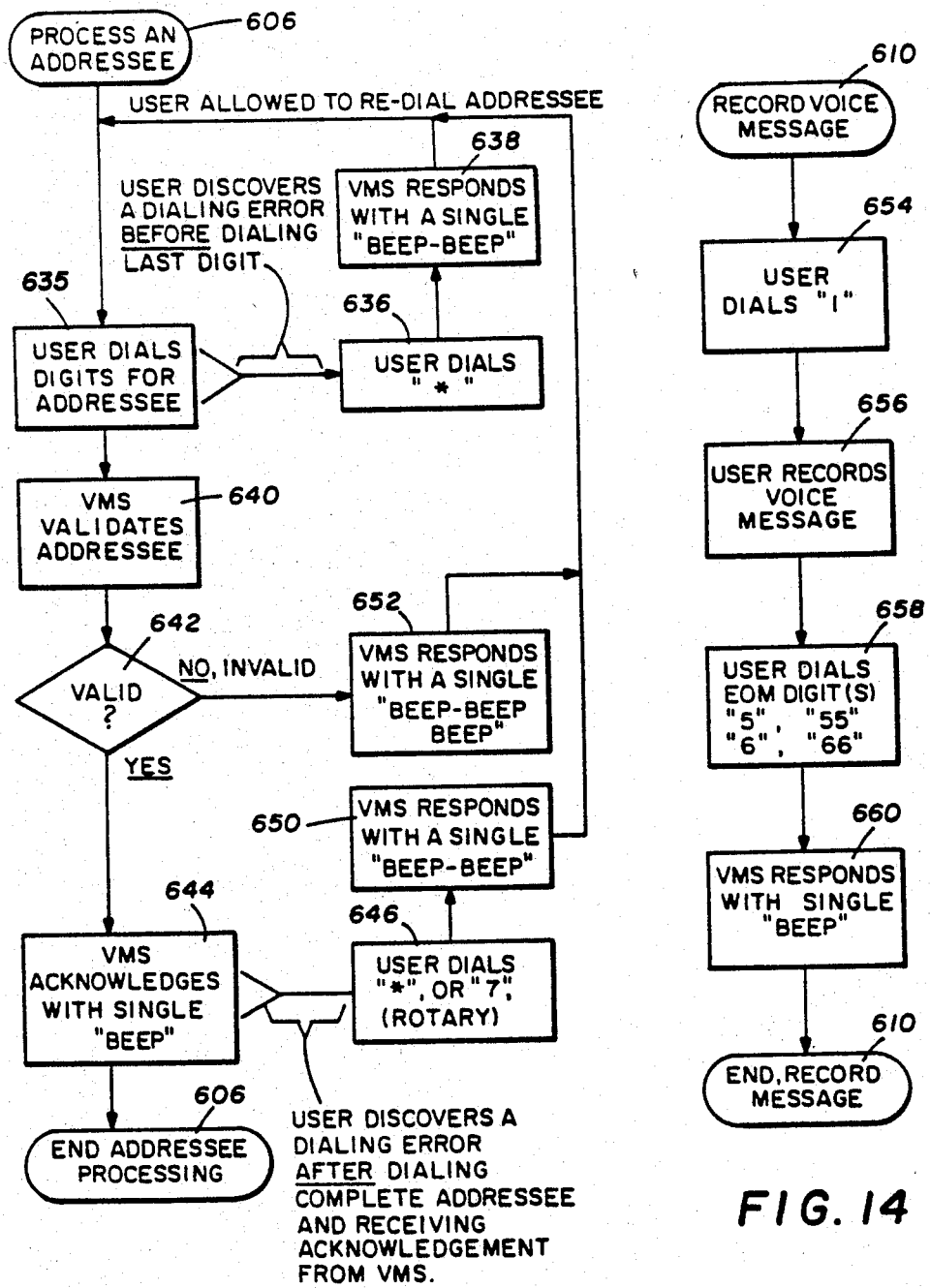
FIG. 14 is a flow chart of the record voice message subroutine of the message deposit function of the voice message system.

FIG. 13 is a flow chart of the process and addressee program step 606 of FIG. 11. In the first program step 635, the user dials digits for an addressee. If the user discovers a dialing error before dialing the last digit he may branch to program step 636 by dialing a "*" to delete the addressee number. The VMS 10 responds with an audible signal, 638 "beep-beep," and allows the user to redial the addressee. Upon the user's entry of the digits for an addressee, the program provides for the VMS 10 to validate the addressee 640. The program step 642 determines the validity of the addressee. If a proper addressee code has been entered, the VMS acknowldeges with an audible signal 644, "beep." If the user discovers a dialing error after dialing a complete addressee and receiving acknowledgement from the VMS 10, he may branch to program 646 by dialing "*" on a touch signaling phone or "7" on a rotary phone. The VMS 10 program next responds with an audible signal 650, "beep-beep" and allows the user to reenter at program step 635 to dial the digits for the addressee. If at the validity determination step 642, the VMS 10 determines that an invalid addressee number has been entered, the signal, "beep-beep-beep," and allows the user to redial the addressee.

Referring to FIG. 14, the record voice message block 610 of FIG. 11 is shown in greater detail. The VMS 10 emits a repetitive audible tone such as an idle tone prior to the recording of any message. The user dials "1" in block 654 to remove the idle tone from the VMS 10 and to allow the user to record a voice messge 656. During the speaking of the voice message, the following dial commands are available to control the recording procedure:

| DIAL COMMAND | VMS ACTION |
| --- | --- |
| 1 | Start recording. |
| 1 | Stop recording and return the record mode idle tone. |
| 3 | Back up (approximately 10 seconds) and start playing. |
| 4 | Back up to the beginning of the voice message and start playing. |
| 9 | Skip forward (approximately 10 seconds) and play. |
| 99 | Skip forward to end of recorded data and return to the record mode idle tone. |

Following the end of the voice message step 656, the user next dials an End-of-Messge indicator (EOM) at step 658 by dialing "5" for normal message delivery and "6" for priority delivery. The EOM can also be used to activate the nondelivery notification (NDN) feature. This feature allows the voice message originator to be notified automatically if the message is not delivered to the intended recipient the next business day. If this happens, the voice message is automatically readdressed to the originator, and the following "canned massage" appended to its beginning: "This is VMS, the following message was not delivered (the voice message follows)." NDN is activated by dialing the EOM twice ("55"), or ("66"). Upon the user's dialing the EOM digits in step 658, the VMS 10 responds with a "beep" at program step 660. At the end of record voice message program step 610 the user has the three program options, as illustrated in FIG. 11 and described hereinabove.

The DEPOSIT function of the VMS 10 further provides for discarding the voice message if the user hangs up prior to EOM. The VMS 10 DEPOSIT program also provides for three different types of time periods which are predefined for the customer at the time of system generation. These predefined time periods may be subsequently changed from the system operator's console 104 of FIG. 6. The first of the three time periods the VMS 10 uses to monitor the message DEPOSIT process is an overall call duration timer. About 30 seconds prior to the elapse of the message DEPOSIT operation within the remaining time, the VMS 10 will abort and hang up. There is a second short duration time period that VMS activates while waiting for the user to dial a "parameter" such as the user ID step 604, a single addressee in step 635, or dialing "0" to signal the end of addressees in step 608. Finally, a third predefined time period is used by the VMS 10 to monitor the time that the user is in the record mode idle state prior to the user dialing "1" in step 654. This record mode idle state is entered afer dialing the "0" for the end of addressees code in step 608.

The DEPOSIT function also includes program means for negating one or more numbers in a distribution code. For example, if a particular distribution code equated to fifty individual telephone numbers, one of these numbers that the originator did not wish to send a message to could be deleted for the entry of a suitable program code. After the entry, the distribution code will have the effect of negating that address from a list of numbers on the distribution code to receive that voice message.

In addition, the DEPOSIT function of the VMS 10 is also programmed to allow a user to call the VMS 10 by a Special Function Code to turn on or off the Enhanced Verbal Commands and Reply (EVCR). The user's selection of the EVCR mode causes the VMS 10 to play prerecorded instructional messages in place of progress of error tones, e.g., tones which might relate to incorrect user ID's and addresses.

"DELIVERY" is the second of the three system features of the VMS 10, which enables voice messages to be played to their recipients. FIG. 5 illustrates a flowchart of the program of the VMS 10 for the message DELIVERY function 670. In initial step 672 of the program the VMS 10 calls the message recipient by dialing the telephone of the recipient. In the next step 674, the user answers and the VMS 10 may identify itself by playing canned massage as follows: "This is VMS. There are __ messages for you. Please dial your authorization number if you wish to receive them. Thank you." If the message addressee had not answered the initial telephone call from the VMS 10, the VMS 10 is programmed to wait and attempt to redeliver the message at a later time. Likewise, if the message addressee's telephone had been busy, the VMS 10 would again be programmed to attempt to deliver the message a predetermined number of times at predetermined time intervals. The number of attempts and time intervals between each of the attempts by the VMS 10 to deliver the message are programmed parameters that are definable by the customer through the system console 104 of the VMS 10.

When the VMS 10 establishes contact with the message addressee, the message addressee responds by dialing his unique authorization number and the VMS 10 processes the user's ID at step 676. After the process user ID has been accepted at program step 676, the VMS 10 emits an idle tone at the program step 678, indicating the non-lay mode. The user or message addressee then dials "2" to begin playing the voice message program 680.

During the playing of a voice message, the following dial commands are available to the message addressee to control the VMS 10 message delivery 670:

| DIAL COMMAND | VMS ACTION |
| --- | --- |
| 2 | Start Playing. |
| 2 | Stop playing, followed by nonlaying indicator, a periodic "beep." |
| 3 | Back up and play approximately the last 10 seconds. |
| 4 | Back up to the beginning of the voice message and start playing. |
| 9 | Skip forward approximately 10 seconds and play. |
| 99 | Skip forward to end of message. |

At the conclusion of the voice message, the VMS 10 is programmed to play some audible tone, such as three short "beeps" indicating the end of message, or an EOM canned message if EVCR is turned on. The VMS 10 is then programmed to wait approximately 5 seconds for the next user action 682. The message addressee then has the option of taking no action 684 or initiating some action with the VMS 10 through one of the special function codes redirect 686, reply 688, save 690 and file 691.

If the user decides to take no action 684, the VMS 10 is programmed to determine whether there are more messages 692. If there are no more messages, the VMS 10 is programmed to play a canned message and hang up 694. Thus a suitable canned massage could state: "This is VMS. This concludes your voice message delivery. Thank you." If the VMS 10 determines that there are more messages for the addressee 692 the VMS 10 indicates such message to addressee at program step 696 by playing a suitable canned message, such as: "This is VMS. Here is another message for you." The program is then returned to step 678 for the VMS 10 to admit an idle tone prior to playing a voice message step 680.

The message addressee can enter the VMS 10 through one of the special function codes redirect 686, reply 688, save 690, and file 691. These program steps are described below.

The VMS 10 is ordinarily programmed if a message addressee hangs up during the playing of a voice message. That message and all other undelivered messages will be delivered at a later time or could be available to the message addressee through the INQUIRY function (FIG. 21).

Figure 16:
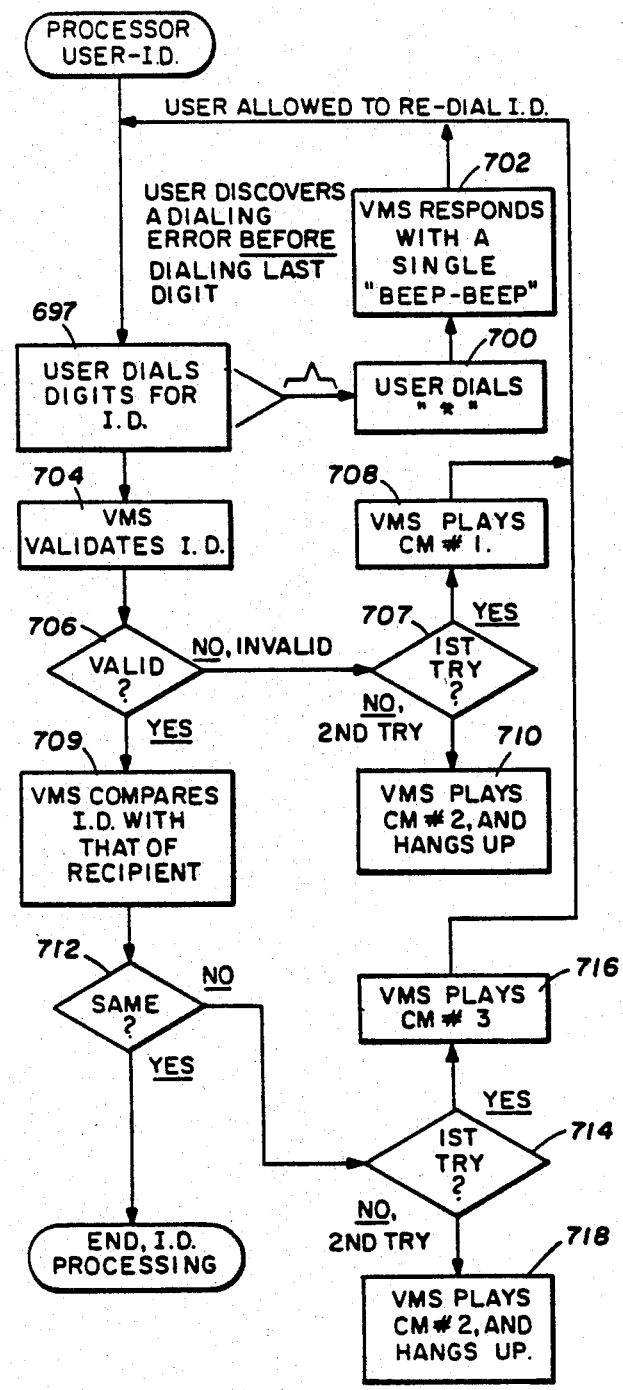
FIG. 16 is a flow chart of the process user I.D. subroutine of the message delivery function of the voice message system.

The VMS 10 program routine for the process user ID step 670 is illustrated further in the flowchart presented in FIG. 16. The user first dials digits for its identification code step 697. The system enables a user to dial "*" in step 700 if he discovers a dialing error before dialing the last digit. If the user dials "*" 700, the VMS 10 responds with an audible tone, "beep-beep" at step 702 and returns the user to step 697 for reentry of the authorization code. After the user has entered his authorization code, the VMS 10 validates the ID at program step 704. The VMS 10 determines the validity of the ID at step 706, and if it determines that the user has entered an invalid ID then it determines at step 707 whether this is the first or second attempt to enter a valid ID. If its is the first attempt, the VMS 10 plays a suitable canned message at step 708 and returns the user to program step 696 for reentry of the authorization code. A suitable canned message would be the following: "The ID (__) is not valid. Please try again." If the VMS 10 determines at step 707 that this is the second attempt to enter a valid ID the VMS 10 proceeds to play another canned massage step 710 and hangs up. A suitable canned message upon the detection of the second entry of an invalid user ID would be the following: "The ID you entered is not the correct one for the message recipient. Please try again."

The VMS 10 at program step 706 determines that a valid user ID has been entered. The VMS 10 next compares the ID with that of the recipient at step 709. This concludes the process user ID processing of program 676 of flowchart of FIG. 15. If the VMS 10 at step 712 determines that the ID is not the same as that of the recipient, then program step 714 determines whether this is the first or second attempt to determine if it is the recipient's identification code. If it is the first attempt, the VMS 10 at step 716 plays a suitable canned message and returns the user to program step 697 for reentry of the user identification code. A suitable canned message at program step 716 could be the following: "The ID you entered is not the correct one for the message recipient. Please try again." If the VMS 10 determines that this is the second unsuccessful attempt in comparing the recipient's ID, the VMS 10 at program step 718 plays a suitable canned message and hangs up. The VMS 10 at program step 718 will play the same canned message included in program step 710.

FIG. 17 illustrates the play voice message subroutine 680 of the message delivery program 670 of FIG. 15. The play voice message subroutine 680 begins with the user dialing "2" in step 720 to remove the VMS 10 idle tone and initiate the playing of the voice message. The VMS 10 plays the voice message to the user at step 722, during which time the user can control the playback process by dialing certain digits on his telephone, as described above.

At the conclusion of the voice message, the VMS 10 emits an audible tone at step 724 to indicate end of message. The VMS 10 is returned to program step 682 of FIG. 15.

Figure 18:
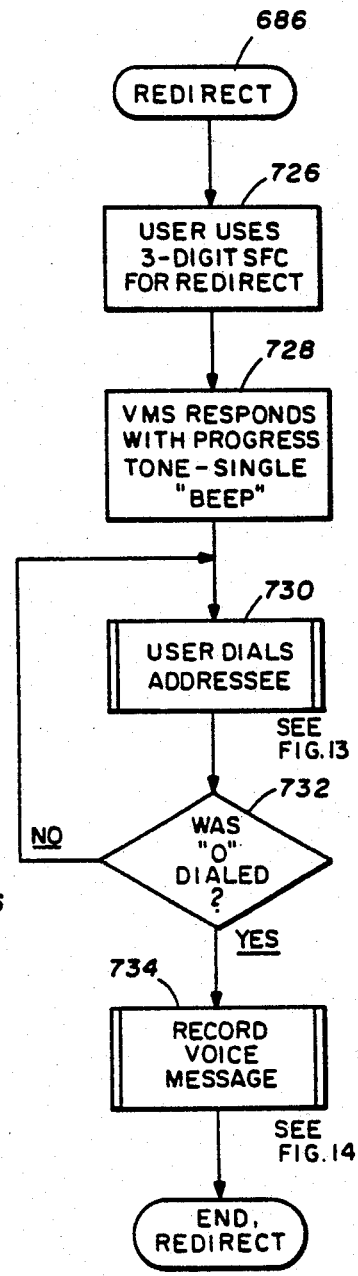
FIG. 18 is a flow chart of the redirect special function code subroutine of the message delivery function of the voice message system.

As described above, the VMS 10 waits approximately five seconds for the next user action 682 which enables the user to enter certain special function codes if he so chooses to access the VMS 10. The REDIRECT special function code (SFC) subroutine program 686 is illustrated in FIG. 18. The user enters a three digit SFC at redirect program step 726. The VMS 10 responds with a progress tone at step 728, such as a "beep." The user then dials the addressee at program step 730, and the program proceeds through a subroutine as illustrated in FIG. 13 of the message deposit flowchart. The program then determines at step 732 if a "0" was dialed at end of addressee number. If it was not entered, the user is returned to program step 730 for dialing an addressee. If the user has dialed a "0" he may record a voice message at program step 734, which voice message is appended to the beginning of the original voice message and delivered to the newly designated addressees. The original voice message with recipient's comments then will be sent to the new addressees. The program step 734 follows the subroutine of the message deposit flowchart of FIG. 14. The user is then returned to the VMS 10 program step 682 of FIG. 15, which allows the user the opportunity again to select another special function code.

The REPLY special function code (SFC) flowchart 688 is illustrated in FIG. 19. The message addressee which desires to reply to the voice message immediately may enter a special three digit SFC at program step 736. The VMS 10 responds with a progress tone at program step 738, which enables the user to record a reply message at program step 740, which follows the flowchart subroutine of the message DEPOSIT flowchart of FIG. 14. The REPLY SFC feature enables the user to have a voice message delivered to the voice message originator without having to call the VMS 10 to enter an authorization number and the address of the originator. After the reply message has been entered, the VMS 10 returns to its normal procedures at program step 682 of FIG. 15 starting with playing the end of message indicator.

Following the program step 682, the user may also elect to enter the file special function code 691 for the verbal file folder. This is accomplished by dialing the code for the verbal file folder plus the verbal file folder number (0 through 99). A copy of that message will then be retained in one of the 99 verbal folder categories along with all other voice messages in that verbal file folder for later retrieval.

FIG. 20 illustrates the SAVE SFC program flowchart of the message delivery function 670 of FIG. 15. At the conclusion of the end of message indicator program step 682, the user may decide to save a voice message for later retrieval. The user may accomplish this by dialing the SAVE special function code which causes the voice message to be saved for a predetermined period one complete business day. The user simply dials the three digit special function code for the SAVE program step 742, and the VMS 10 responds with a progress tone at program step 744. The VMS 10 is programmed such that undelivered messages which did not have nondelivery notification (NDN) will be discarded at the midnight following their retention for one full business day. The appropriate summary report will be created by the VMS 10 for each message so discarded, showing the originator ID, input time and date and delivery time and date.

FIG. 21 illustrates the INQUIRY function 750 which enables the user to call the VMS 10 to determine if there are any messages for him. If there are no messages, the VMS 10 so notifies the user. If there are messages, they are delivered immediately.

The INQUIRY function 750 begins with the user dialing the VMS 10, and the VMS 10 program responds at step 752 with an acknowledgment in the form of a short progress tone or a canned message. The user then enters an identification code at step 754 to be processed in the manner previously set forth in the message DEPOSIT flowchart of FIG. 12. The user next dials the INQUIRY special function code at step 756, and the VMS 10 makes the determination at program step 758 if there are any messages for the user. If there are none, the VMS 10 plays an appropriate canned message at program step 760 and gives the user the option to deposit a message. If the program step 758 determines that there are any messages, the VMS 10 plays an appropriate canned message at step 762, which might include an instruction advising the user to dial a particular digit if he wishes to receive the messages. The VMS 10 will then play the voice message at program step 764 in the same manner previously set forth in the message DELIVERY flowchart of FIG. 15. At the end of message indicator, the VMS 10 will determine at program step 766 if there are any more messages for the addressee. If there are none, the VMS 10 plays an appropriate canned message at program step 768, allowing the user the option to deposit any messages with the VMS 10. If there are more messages, the VMS plays an appropriate canned message at program step 770 and returns the user to the play voice message routine 764 of the flowchart.

FIG. 2 contains a VTOC (Visual Table of Contents) of all the programs included in the VMS system software 800. At the top level these programs are divided into six categories as follows:

(1) ROM—resident programs 802,
(2) "System support" programs 804,
(3) Master processor utility programs 806,
(4) Master processor "online" programs 808,
(5) Slave processor "online" programs 810,
(6) Call processor "online" programs 812.

All of these programs run in the 80/30 SBC's (Single Board Computers) that are used to implement the call processor in the call processor subsystem 62 or the master and slave processors in the administrative subsystem 60.

80/30 ROM-Resident Programs

The processor programs are contained in readonly memory (ROM), and are used in all three catagories of processors ("master," "slave," and "call"). An operating system nucleus 814 is the resident operating system that controls the multi-tasking environment of the application programs. A Basic Monitor 816 is the program that receives control on power-up, or system reset. It provides some simple CRT-based functions, such as examining and modifying the contents of memory cells, and also controls memory loading/dumping. A Memory Load/Dump 818 operates under control of the Basic Monitor 816. It provides the functions of loading "memory-image" data into memory from disk, and dumping memory to disk. An area of the disk is reserved for these memory-images that are used by this program.

80/30 "System Support" Programs

The System Monitor 820 program is used only in the master processor. Its function is to load programs from disk into memory as instructed to do so by an operator at the console CRT 104. The Overlay Manager program 822 is a support function that is used to load individual program-segment overlays into memory. The Memory Allocation Manager program 824 is a support function that manages a "pool" of memory space from which blocks (of memory space) are dynamically allocated to requesting programs.

80/30 Master Processor Utility Programs

The Master Processor Utility Programs 806 are not normally used when the VMS system 10 is online. The functions they provide can be regarded as "tools" that are used to maintain, update, and debug the system. A Data Base Creation program 826 is used to create a completely new user record data base on the system disk. A Data Base Update Program 828 and Data Base Print Program 830 will print the contents of the user records in the data base on the system line printer 108 (See FIG. 6). A Memory Dump Analyzer program 832 will display on the console CRT 104 or the line printer 108 the contents of a memory dump (or a portion thereof) as recorded in one of the disk storage areas reserved for memory dump/loads. A Disk Utility Program 834 provides a variety of functions that are concerned with moving, saving, and restoring information on the system disks 120; for example, transferring information from one area to another in disk storage, or transferring data from disk storage to/from diskettes. A Canned Voice Message (CVM) Utility program 836 prepares in a form suitable for storage on the system disks 120 the digitized voice data for the VMS canned voice messages.

80/30 Master Processor Online Programs

The Master Processor Online Program 808 runs in the master processor of the administrative subsystem 60 during online operation. Some of these programs are not limited to online use only (for example—the device handlers for the console CRT 104 and the line printer 108). A VMS Online Initializer program 838 performs a variety of initialization functions that are required to bring the system into an online state. These functions include initializing (or restoring) global system tables in memory, and giving instructions for the other processors (the master and the multiple call processors) to initialize themselves. A VMS Command Processor (COMSUP) program 840 provides all the functions required to support the VMS online command set. These commands are entered into the system via the console CRT 104. A Journal/Alarm Message Generator program 842 is to create and format, at the request of other programs in the system, journaling and alarm messages that are destined to be displayed on the system line printer 108. Journal messages, which are normally no more than one or two lines in length, are used to create a running log of "events" that occur during normal system operation. Alarm messages are used to log the occurrence of "abnormal" conditions that may require action by the system operator. A Printer Spooler program 844 "spools" the incoming requests for log messages to the system disk, and also to subsequently "de-spool" the messages and print them on the line printer 108. This mechanism allows printed messages to be temporarily buffered on disk while waiting for the line printer 108 to become available.

The CRT Control program 846 is a device handler that provides an interface between the CRT 104 keyboard/display and any program requesting I/O operations within the CRT 104. An LP Control program 848 is a device handler that provides an interface between the line printer 108 and any programs requesting output operations to the printer.

Report Generator Programs 850 prepare, in a form suitable for the line printer, statistical reports on various aspects of system operations. The following types of reports are included:

(1) A Port Usage Report 852 provides usage statistics for the voice communication ports.

(2) A Call Report 854 provides statistics related to the incoming and outgoing calls that occurred during the report period.

(3) A Message Report 856 provides statistics related to new messages received and messages delivered during the report period.

(4) A User Command Usage Report 858 provides usage statistics for the use-frequency of the VMS 10 functions that may be invoked by users at their telephones.

(5) A Disk Storage Report 859 provides information on utilization of disk storage, and "soft errors" that may have occurred on individual disks.

80/30 Slave Processor Online Programs

The programs of the Slave Processor Online Programs 810 runs in the administrative subsystem 60 during online operation. The functions of most of these programs can be summarized by saying that they perform support operations that are requested by commands coming "upstream" from programs in the call processors 62A–62C.

A Message Router program 860 is informed of each occurrence of a new incoming message that has been received and stored in the system. It is responsible for creating the Message Control Block on disk, and insuring that the message is queued to each of its addresses. The program is also responsible for "expanding" distribution codes that are used as addresses.

A Message Dispatcher program 862 acts on requests coming up from the call processors 62A–62C to provide messages for delivery. For each request it will provide the address in disk storage 120 of the next message to be delivered to a user. There is an existing connection with this user for the purpose of delivering messages. After the message has been delivered it will be dequeued. A Voice-Data Cell Allocator program 864 allocates disk space for storing voice messages. Requests for space come "upstream" from programs in the call processors 62A–62C. The Allocator responds to these requests by returning (to the requesting programs) the addresses of the allocated disk storage.

A Message Storage Overwrite Protector program 866 protects "old" undelivered voice messages from being overwritten. As the Allocator program 864 continues to allocate disk storage space, the point will eventually be reached where some of this space must be re-used. It is the responsibility of the overwrite protector program 866 to insure that any undelivered messages in the space that is about to be re-used are protected or moved. A Circuit Control program 868 is responsible for overall control of the voice circuits. Information that comes upstream from the call processors 62A-62C that reflects changes in circuit status is handled by this program, as are status changes that result from commands by the system operator. A Call Scheduler program 870 is responsible for scheduling and initiating outgoing calls to users that have messages in queue awaiting delivery. Also included is the assignment of circuits for the outgoing calls.

An Inter-Processor Exchange Control program 872 is to pass information from programs running in the master processor 808 to those in the slave processor 810, and vice-versa. The external interface to this program looks like that for the block-bus control program. Internally, the main difference is that the data to be exchanged is passed through common memory that is addressable by both master and slave processors instead of being transmitted across the block-bus. There are two complementary sections of this program. One runs in the master, and one in the slave.

80/30 Call Processor Online Programs

The Call Processor Online programs 812 run in the call processor 62A-62C during online operation. Most of the functions provided by these programs are concerned with implementing the VMS user functions (those functions a user may invoke from his telephone).

A Transaction Timer Control program 874 is to manage the various "watchdog" timers that control the time limits applied to the various VMS 10 user functions. A Circuit Control and Status program 876 is responsible for overall control of the voice circuits attached to a single circuit subsystem. It reports changes in the status of circuits "upstream" to the slave processor, and responds to explicit requests for circuit state changes that come "downstream" from the slave processor. A Circuit Adapter control program 878 is a "device handler" that directly controls the hardware interface to a circuit module adapter. All I/O operations for the circuit modules and circuits are directed to this program.

A Block-Bus Adapter Control program 880 is a device handler program that directly controls the hardware interface to a block-bus adapter. The purpose of the block-bus, its hardware adapters (one in the administrative subsystem 60, and one in each circuit subsystem), and its handler program is to provide a path for communication between programs that are running in the different subsystems. A Disk Adapter Control program 882 directly controls the hardware interface to a disk adapter 114 or 116. All requests for data transfer to/from the data storage subsystem 64 are sent to this program. Notice in FIG. 1 that identical copies of this program run in the call processors and in the slave processor of the administrative subsystem. A Call Processor Initializer program 884 provides all of the functions required to bring a Call Processor into an online state after an initial program load.

A VMS User Function Processors program 886 provides all of the functions required to communicate with a VMS user at his telephone, and executes the VMS commands that are invoked by the user (by dialing digits). These function processors can be divided into five categories as follows:

(1) An Incoming Call Processor 888—controls the "answering" of incoming calls to VMS from users.

(2) An Outgoing Call Processor 890 controls the dialing and connection establishment for outgoing calls to users.

(3) Delivery and Inquiry Processors 892 control the process of delivering voice messages to a user; either for the "normal" delivery function (on an outgoing call), or the Inquiry function (on an incoming call).

(4) A Deposit Processor 894 controls the process of receiving and storing new voice messages from users.

(5) Miscellaneous SFC Processors 896 are processors for Special Functions Codes other than those that are included in the Delivery and Inquiry Processors.

VMS SYSTEM CONTROL AND DATA FLOW

Figure 22:
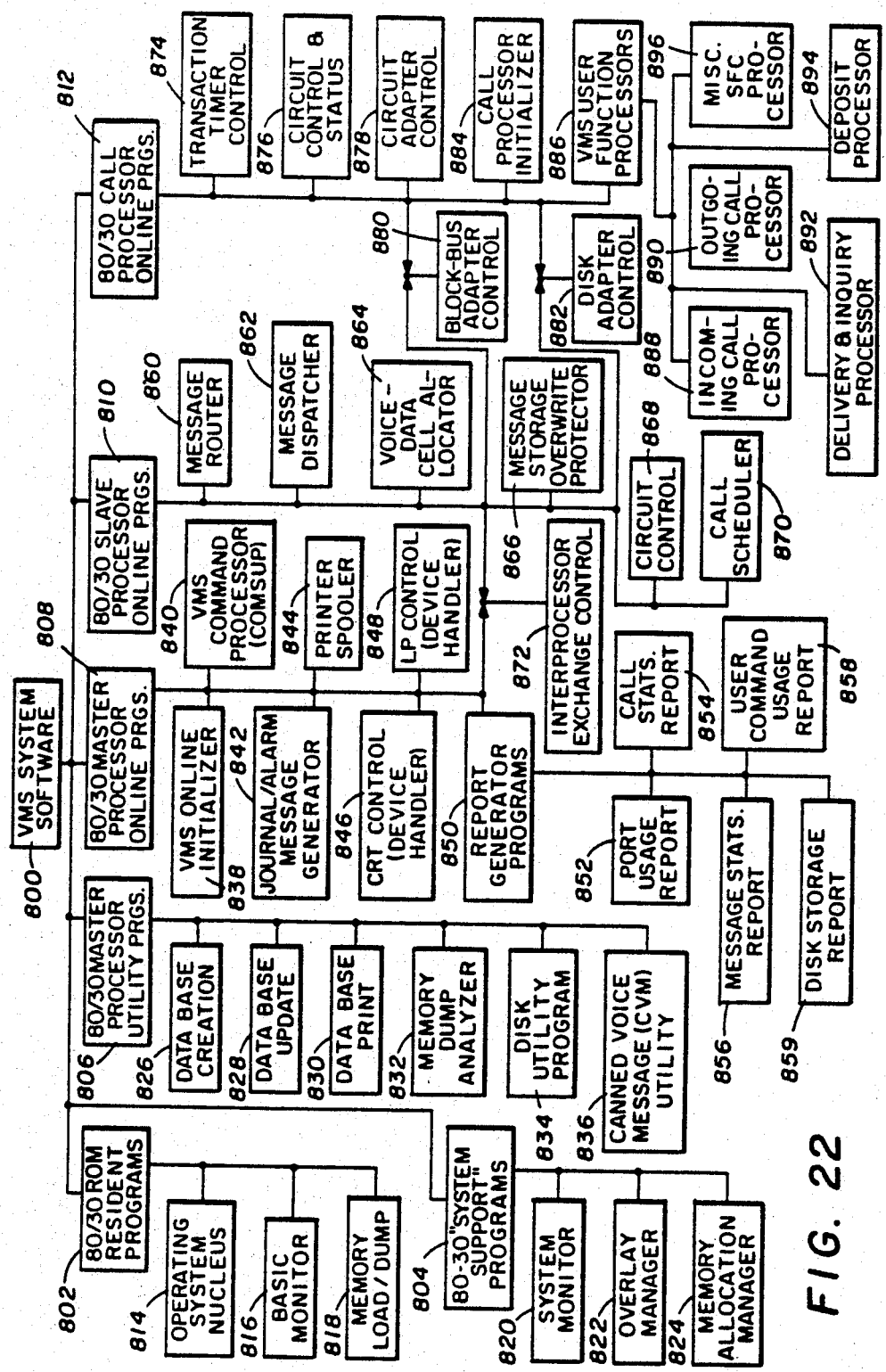
FIG. 22 is a visual Table of Contents of all the programs in the VMS system software.
Figure 23:
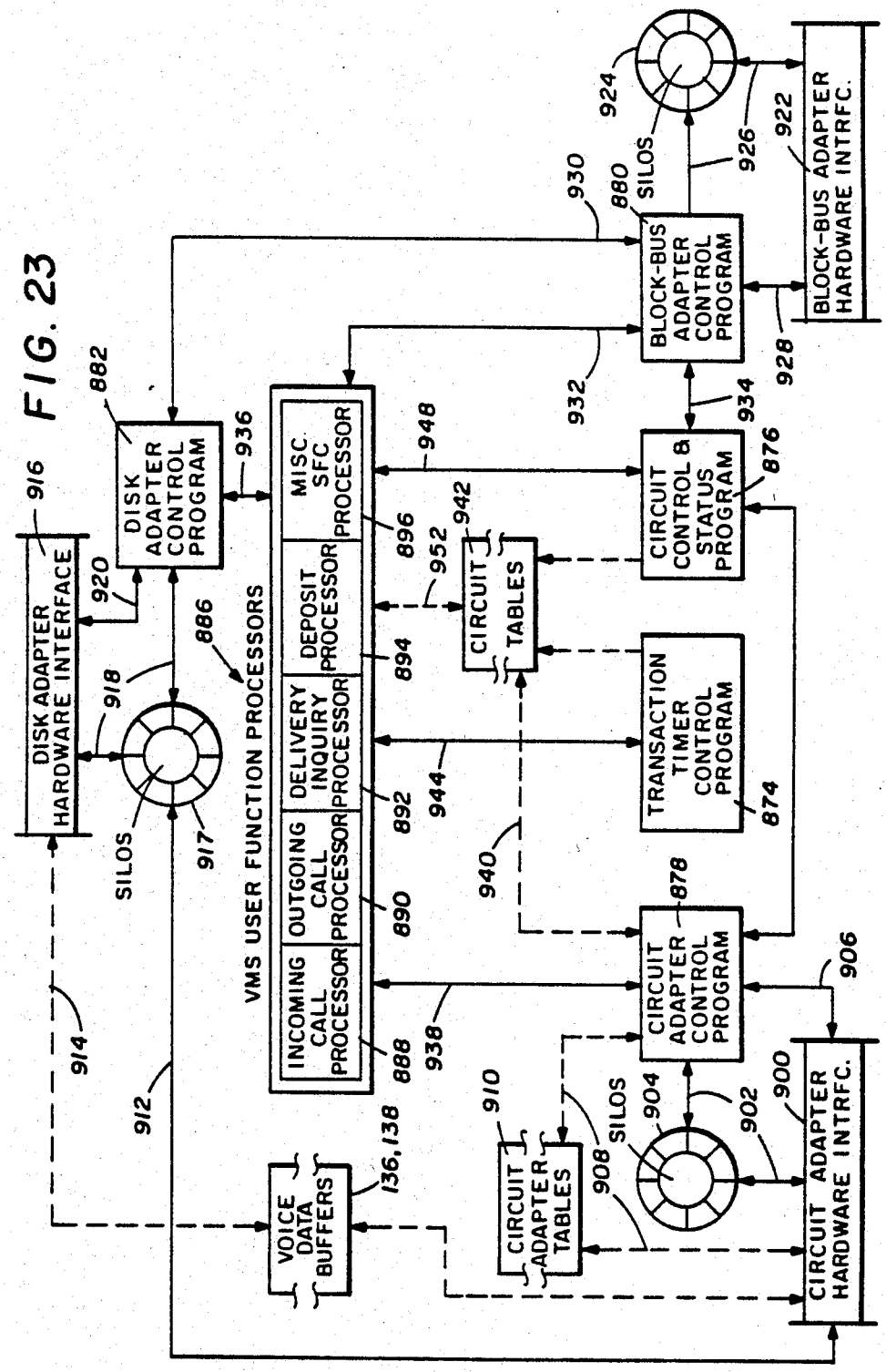
FIG. 23 illustrates the control and data flow for the programs running in the call processors.
Figure 24:
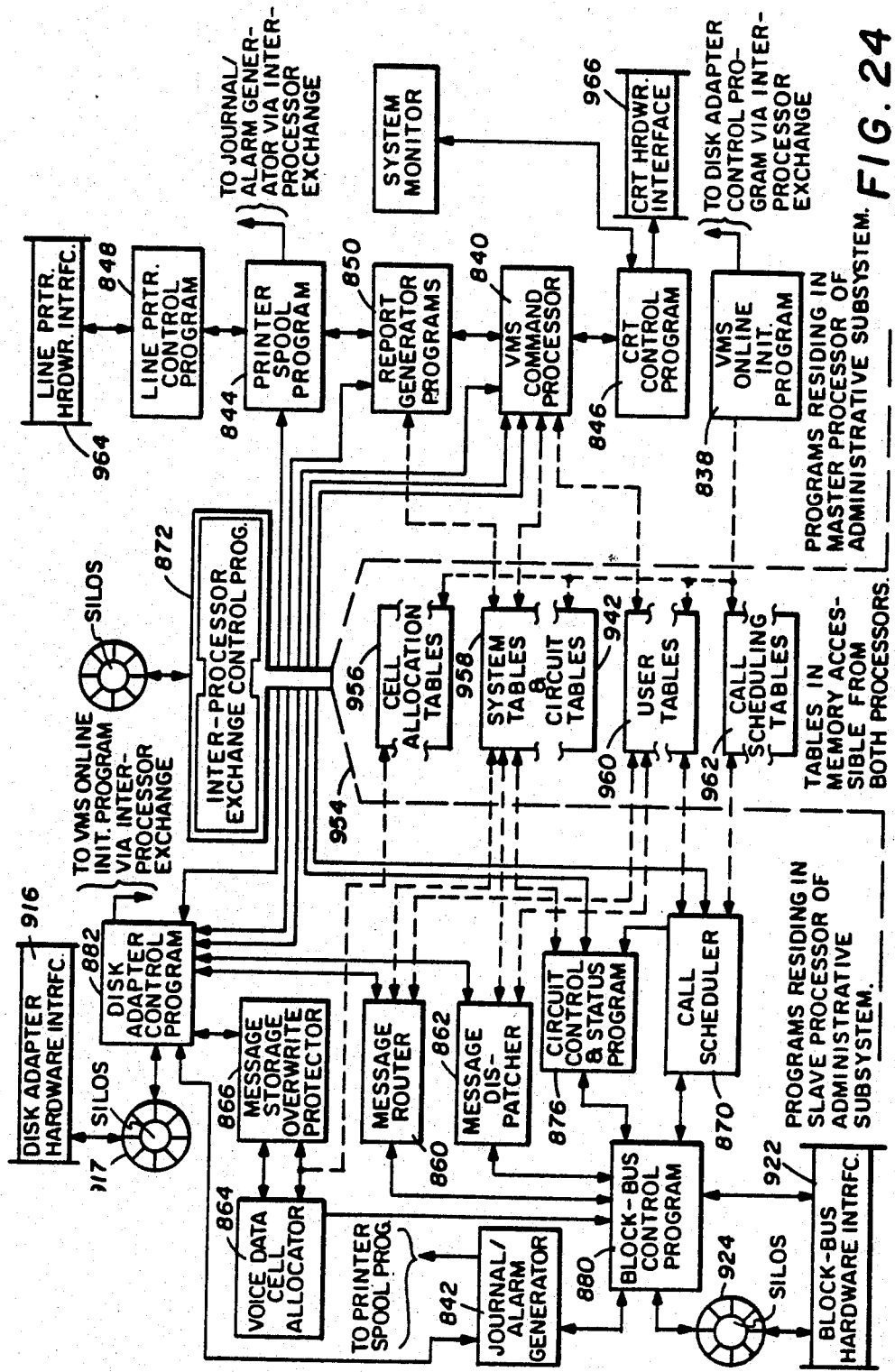
FIG. 24 illustrates the control and data flow for the programs residing in the master and slave processors of the administrative subsystem.

FIGS. 23 and 24 show the control and data flow of the VMS 10 online system and software. Those programs shown in FIG. 22 that are used in an offline mode only do not appear in FIGS. 23 and 24. The solid line between programs denote paths of control flow. The dashed lines denote paths of data flow.

Call Processor Control and Data Flow

FIG. 23 shows the control and data flow for the programs that run in the call processor 62A-62C. All of the programs which must communicate with the voice circuit hardware do so via the Circuit Adapter Control Program 878. It is the "device handler" program for a circuit adapter hardware interface 900. Interface 902 represents the communication between this program and the circuit adapter hardware via a silo data structure 904 in shared memory. At least two silos are actually required; one for "downstream" commands from the program to the circuit controllers (via the circuit adapter), and one for status information coming "upstream" from the circuit controllers. Interface 906 represents hardware I/O commands issued by the control program directly to the circuit adapter interface. This is normally required only when the circuit adapter is being initialized after an initial program load (IPL), or after a change in the state of a silo (i.e., from an "empty" to a "not empty" state). Interface 908 represents the flow of data to/from Circuit Adapter Tables 910 and the control program 878 and hardware interface 900. These tables are used for data that is related to commands going downstream or status coming upstream. There is a separate entry in these tables for each voice circuit attached to the circuit subsystem. In summary, commands from the program 878 to the interface 900 pass through the downstream silo of silo structure 904. Status information from the interface to the program passes through the upstream silo of silo structure 904. Additional information related to the commands and status is deposited in and extracted from the adapter tables 910 by both the program and the hardware interface.

Circuit Adapter/Disk Adapter Interface

Interface 912 and 914 represent the information flow between the Circuit Adapter hardware interface 900 and a Disk Adapter hardware interface 916. The Circuit Adapter control program 878 may issue read/write commands directly to the Disk Adapter 76 or 78 (FIG. 4) and no related processing is required by programs running in the 80/30 call processor 72 (FIG. 4). The Circuit Adapter program 878 accomplishes this by depositing requests for disk I/O operations directly in the Disk Adapter downstream silo of silo 917, thus bypassing the Disk Adapter Control Program 882. The disk I/O operations that may be requested by the Circuit Adapter are associated with writing/reading segments of voice messages to/from disk. The data comprising these message segments is temporarily stored in voice data buffers 136 or 138 (FIG. 8) (in shared memory). These buffers are allocated from and released to a buffer pool that is managed by both the Disk Adapter 114, 116 and the Circuit Adapter. The memory used for these buffers is located outside the 64K address space of the Call Processor 72, and is therefore not addressable by this processor.

Disk Adapter Control Program/Hardware Interface

All programs residing in the 80/30 Call processor 72 that must perform disk I/O do so by issuing requests to the Disk Adapter Control Program 882 which, in turn, interfaces directly with the disk adapter hardware interface 916. This interface is implemented with at least one "downstream" silo and "upstream" silo (see interfaces 918 and 920). Requests for disk I/O operations are deposited by the control program into the downstream silo, and status information (usually indicating I/O request completions) is inserted into the upstream silo by the disk adapters 114, 116. Interface 920 denotes hardware I/O operations (including interrupts) that pass directly between the control program and the hardware interface. These are normally used only to initialize the disk adapters 114, 116 and to signal a change in state of a silo (for example, from "empty" to "not empty").

Block-Bus Adapter Control Program/Hardware Interface

The communication of information between programs running in the Call Processors 62A–62C (in Circuit Subsystems) and programs in the Administrative Subsystem 60 is accomplished by passing this information across the block-transfer-bus (or "Block-Bus"). Application programs interface with a block-bus adapter hardware interface 922 by issuing requests to the Block-Bus Adapter Control Program 880, which, in turn, interfaces with the adapter hardware with a silo control mechanism 924 (Interfaces 926 and 928). This mechanism is almost exactly the same as that described above for the disk adapter, and it does not need to be repeated.

Application Program Interfaces to Block-Bus Control Program

Interface 930 represents requests originating in the Disk Adapter Control Program 882 for alarm messages to be printed on the line printer 108, which will occur when disk errors are detected. Interface 932 represents all of the communication paths between the VMS User Function Processors 886 and the Slave Processor in the Administrative Subsystem 60. These include:

(1) downstream commands to originate outgoing calls, (2) upstream notification of answered incoming calls, (3) upstream notification when a new voice message has been received (this information is processed by the Router Program 860 in the Slave Processor, which creates the Message Control Block [MCB] for the new message, and inserts entries in the queues for the addresses of the message), (4) downstream commands to deliver outgoing messages, and upstream notification of message delivery (this information is processed by the Message Dispatcher Program 862 in the Slave Processor, which issues commands for message delivery, and then dequeues messages after they are delivered), (5) miscellaneous upstream requests to Slave Processor programs 810 that originate in the Special Function Code Processors 896. Interface 934 consists of upstream requests from the Circuit Control and Status Program 876 that are reporting a status change in a circuit, and downstream commands from the Slave Processor 810 that force a change in the status of a circuit.

Interfaces With User Function Processors

Interface 936 represents any requests for disk I/O that originate in the VMS User Function Processors 886.

Interface 938 represents commands originating in the User Function Processors 886 that are destined for individual voice circuits, and upstream status information that originates in the voice circuit controllers. Associated with this status information is data deposited through interface 940 by the Circuit Adapter Control Program 878 in the Circuit Tables 942.

Interface 944 represents control functions performed by the Transaction Timer Control Program 874. It consists primarily of requests to "awaken" the continuation of processing for a particular circuit when a "watchdog timer" has expired.

Interface 948 represents control function flow between the User Function Processors 886 and the Circuit Control and Status Program 876 that occur as a result of circuit status changes.

Interface 952 represents data flow between the User Function Processors 886 and the Circuit Tables 942. These tables contain entries (an "entry" is a single circuit table) for all of the voice circuits controlled by the Call Processors 62A–62C. Each circuit table, in turn, contains all of the information required for the Call Processors 62A–62C to control the circuit, and to execute the VMS functions during calls that use the circuit. Note that several programs other than the User Function Processors 886 must also access selected information in Circuit Tables 942. These are the Circuit Adapter Control Program 878, the Transaction Timer Control Program 874 and the Circuit Control and Status Program 876.

Master and Slave Processors Control and Data Flow

FIG. 24 shows the control and data flow for those programs residing in the master and slave processors of the administrative subsystem 60. Although these two processors run asynchronously with respect to each other, a part of their addressable memory space 954 is shared. Tables which must be accessed by programs in both processors reside in this common memory space and include cell allocation tables 956, system tables 958, circuit tables 942, user tables 960 and call scheduling tables 962.

Two programs residing in the slave processor that control hardware interfaces, the Disk Adapter Control Program 882 and the Block-Bus Control Program 880, are essentially these same programs residing in the Call Processor of FIG. 23. These have already been discussed in the description of the control and data flow for the Call Processor, and will not be discussed again here.

Interprocessor Exchange Control Program

The Interprocessor Exchange Control program 872 provides a mechanism for the transfer of information between programs running in the slave processor and those running in the master processor. The external interface to this program is very similar to that for the Block-Bus Control Program 880. The major internal difference is that, instead of transferring the messages between programs via the block-bus, the transfer is by way of common memory. The mechanism uses silos for interprocessor synchronization; however, there is no hardware interface like the block-bus interface involved in the process.

Voice-Data Call Allocator and Message Overwrite Protector

The Voice-Data Call Allocator 864 services requests for allocation of voice-data storage cells that originate in the Call Processor 62A–62C. Using data in the Cell Allocation Tables 956, disk space is allocated, and the address of this space is returned to the requesting programs. When almost all of the voice-data cells on a particular disk have been allocated, the address of this space is returned to the requesting programs. When almost all of the voice-data cells on a particular disk have been allocated, the Message Overwrite Protector 866 is activated. This program checks for the presence of any cells still in use that reside in the storage areas that are about to be re-used or allocated again. Any such cells are "protected" by moving them. The requests for disk I/O are made by the Overwrite Protector 866 for the purpose of moving voicedata cells to the Disk Adaptor Program 882.

Message Router

When a new message has been received and stored on disk, the appropriate Call Processor sends a request upstream to the Message Router program 860. This program performs two major functions. First, it creates the Message Control Block (MCB) from information contained in the upstream request. The MCB contains most of the bookkeeping and control information required for subsequent processing of the message. The second function performed by the Message Router Program 860 is to deposit entries in the output queues for the addresses of the message.

Message Dispatcher

The Message Dispatcher 862 provides Call Processor information concerning the pending delivery of an outgoing message. When the delivery process on a call has progressed to the point where delivery of an outgoing message is to begin, the Message Dispatcher 862 is notified by the appropriate Call Processor 62A–62C through Block-Bus Control Program 880. The Message Dispatcher 862 selects a message from a queue and returns information concerning the identity and location of the message to the Call Processor 62A–62C. The Dispatcher 862 always selects a message that is at the top (beginning) of a particular queue to be delivered next. If there is more than one queue to be considered (some message recipients may have more than one FIFO queue), then the selection of the queue is made on a priority basis. The Call Processor 62A–62C will again notify the Dispatcher 862 after it has successfully delivered the selected message. The Dispatcher 862 will respond by dequeueing this message, and selecting another message for delivery. If there are no additional messages awaiting delivery, then the Dispatcher 862 informs the Call Processor 62A–62C that the queues for this addressee are empty.

Circuit Control

The Circuit Control and Status Program 876 communicate with one of the Call Processors 62A–62C via Block-bus 880. Communication across this interface occurs for the following types of events:

(1) Circuit Control is notified when an autonomous change in the status of a circuit occurs. The new state is duly recorded in the Circuit Tables 942, and if the new state is an "abnormal" one (such as circuit out of service), a request is sent to the Journal/Alarm Program 842 to generate an appropriate alarm message.

(2) Circuit Control is also notified when a circuit autonomously goes off-hook (an incoming call is answered), and when a disconnect occurs on an existing call.

(3) Circuit Control interfaces with the VMS Command Processor Program 840 (in the master processor) for operator commands which dictate changes in the state of a voice circuit.

In these cases Circuit Control will update the appropriate items in the System Tables 958 and Circuit Tables 942, and, if necessary, the appropriate commands downstream to the affected Call Processor 62A–62C.

Call Scheduler

The Call Scheduler 870 is responsible for the scheduling of outgoing calls to message addresses. It uses information recorded in the User Tables 960 and Call Scheduling Tables 962 to decide when to initiate a call. The actual request to initiate a call is sent to the Circuit Control and Status program 876.

Journal/Alarm Generator

The Journal/Alarm Generator 842 receives requests for specific journal or alarm messages that are to be "logged" on the system line printer 108. It formats the messages, and then passes them to the Printer Spool Program 844 in the master processor.

Line Printer Control and Printer Spool Programs

When the VMS system 10 is operating online, all requests for the printing of information on the line printer 108 are sent to the Printer Spool Program. These requests originate in the Journal/Alarm Generator 842 and the Report Generator Programs 850. The Spool Program 844 "buffers" these requests by writing them on the disks. It then schedules the print requests in an orderly manner to the Line Printer Control Program 848. This program, in turn, directly controls the line printer hardware interface 964.

Report Generator Programs

The requests for the different types of reports originate directly, or indirectly, in the VMS Command Processor Program 840. The direct requests are caused by VMS commands that explicitly request the generation of a specific report. The indirect requests are caused by VMS commands that set the time-of-day and time intervals for generation of specific reports. These reports are then created on a time-periodic basis. Most of the information required for creating a report is contained in the System Tables 958 and Circuit Tables 942.

VMS Command Processor

This program receives system operator commands from the CRT Control Program 846, performs the function requested by the command, and returns a response to the operator. Some of these command functions have already been discussed, such as report generation requests and circuit control requests. Other commands are requests for various types of status information. The Command Processor 840 extracts this information from the System Tables 958 and Circuit Tables 942 and the User Tables 960.

Console CRT Control Program

This is a "device handler" program which directly controls the CRT hardware interface 966. It acepts read and write requests for the CRT 104.

VMS Online Initializer

The VMS Online Initializer program 838 performs a variety of functions that are required to bring the system into an online state. To do this it must access information from the following tables shown in shared memory 954:
 (1) the Cell Allocation Table 956,
 (2) the System Tables 958 and Circuit Tables 942,
 (3) the User Tables 960, and
 (4) the Call Scheduling Tables 962.

At least a portion of the information in each of the above tables, the portion accessed by the Initializer, is maintained in non-volatile memory so that it is not destroyed when system power is removed.

Figure 25A:
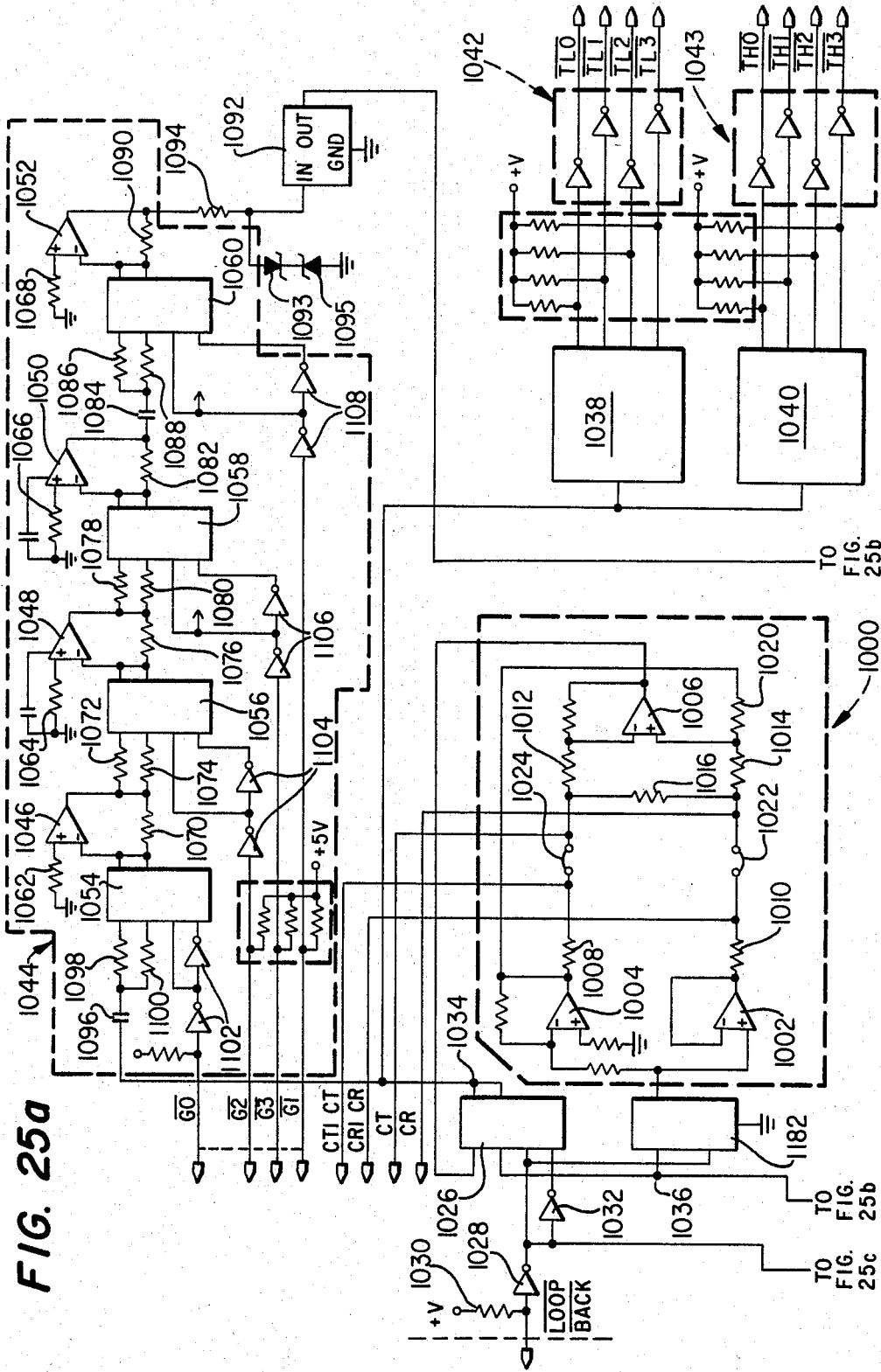
FIGS. 25a to 25c are the schematic drawings of the Codec of FIG. 9.
Figure 25B:
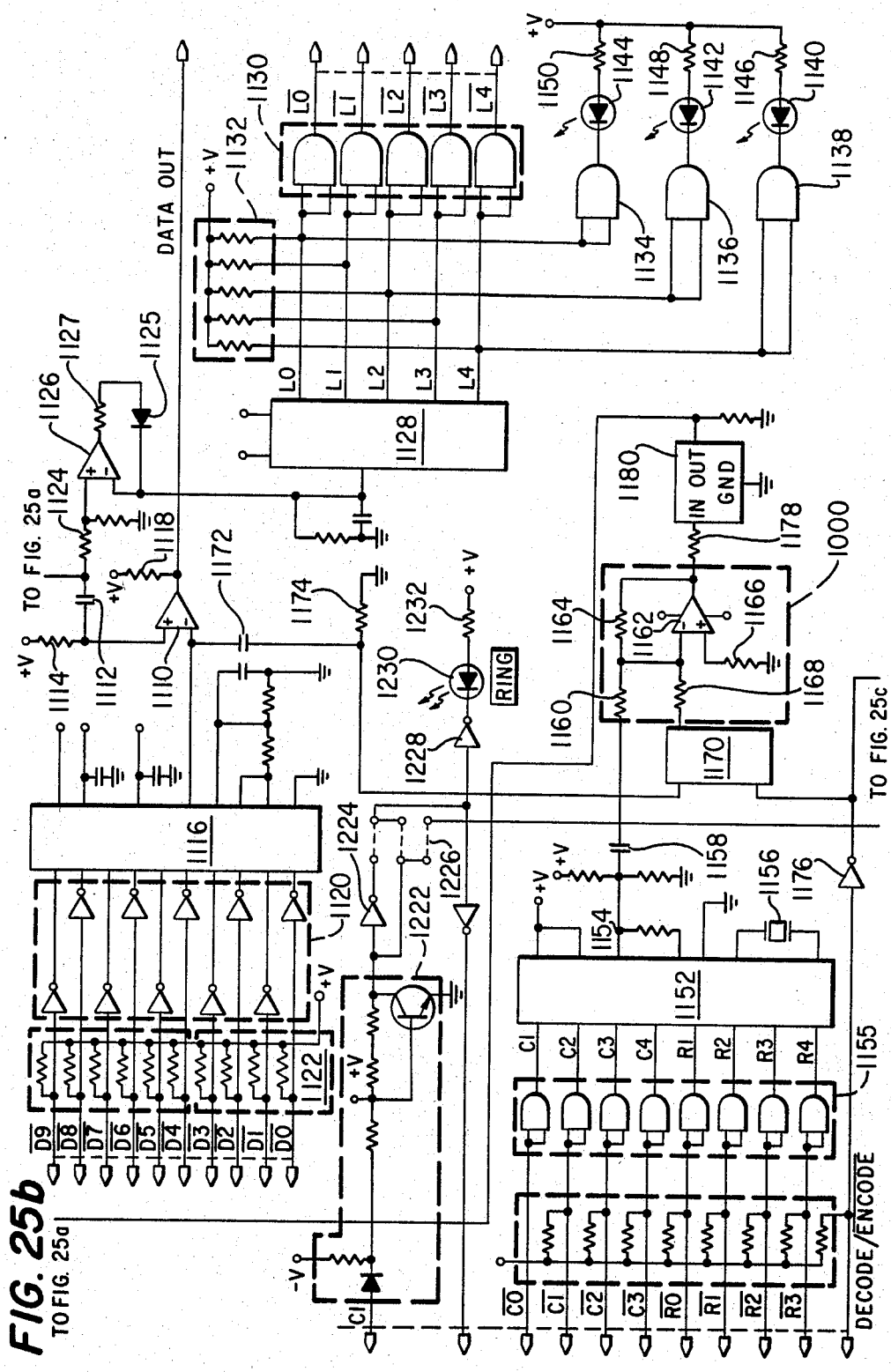
Figure 25C:
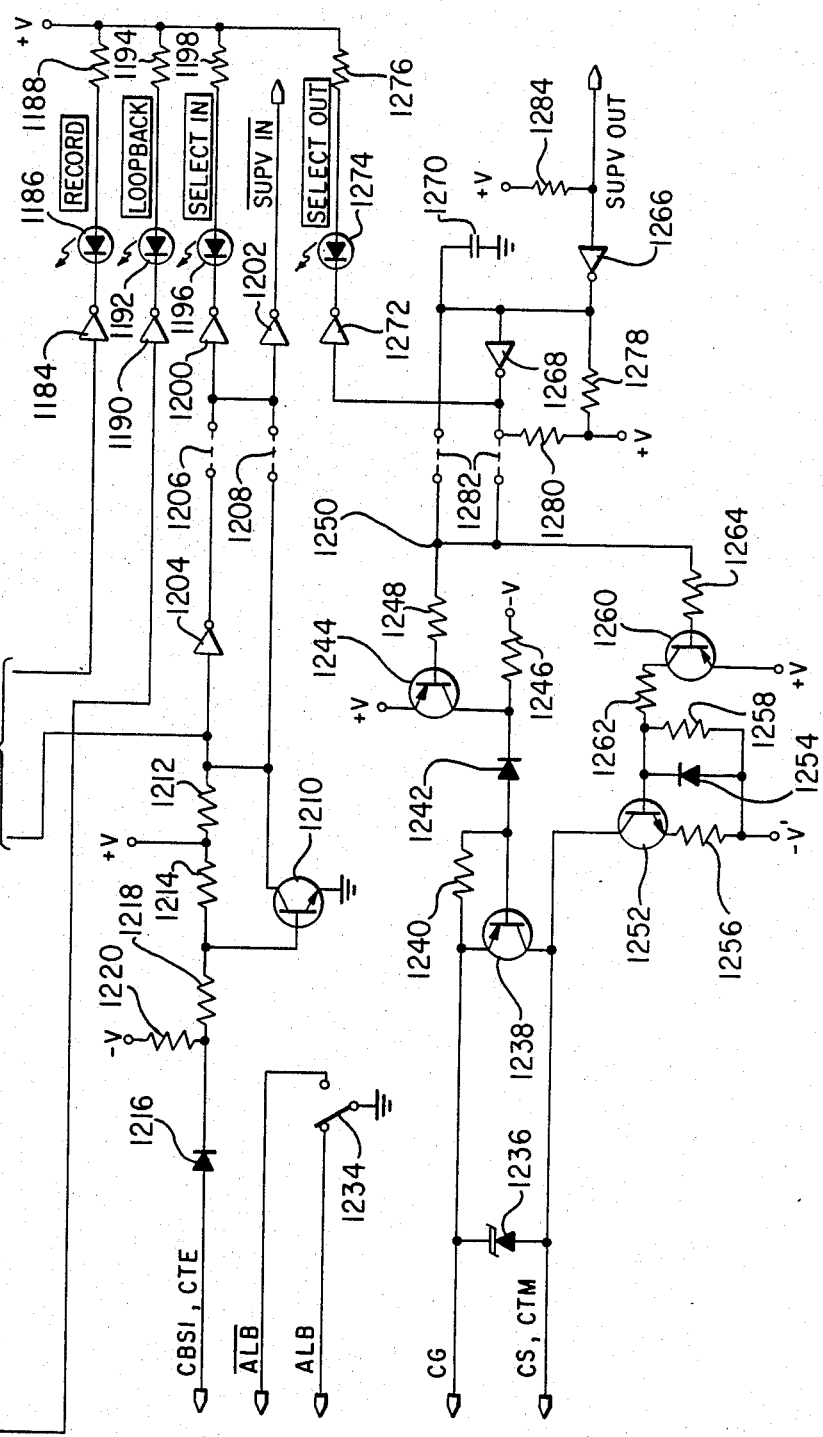
Figure 26A:
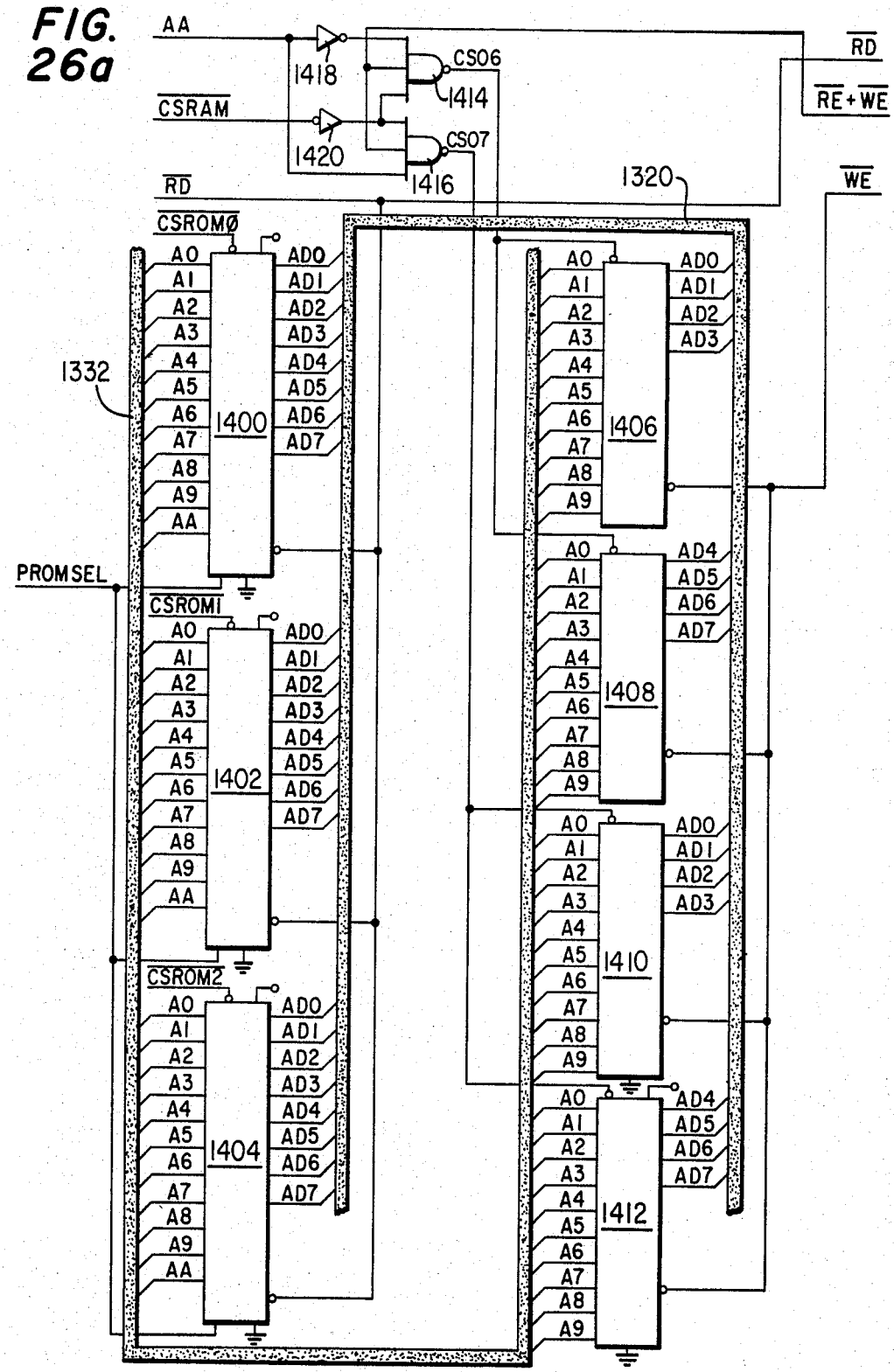
FIGS. 26a to 26h are the schematic drawings of the port driver suosystem of FIG. 8.
Figure 26B:
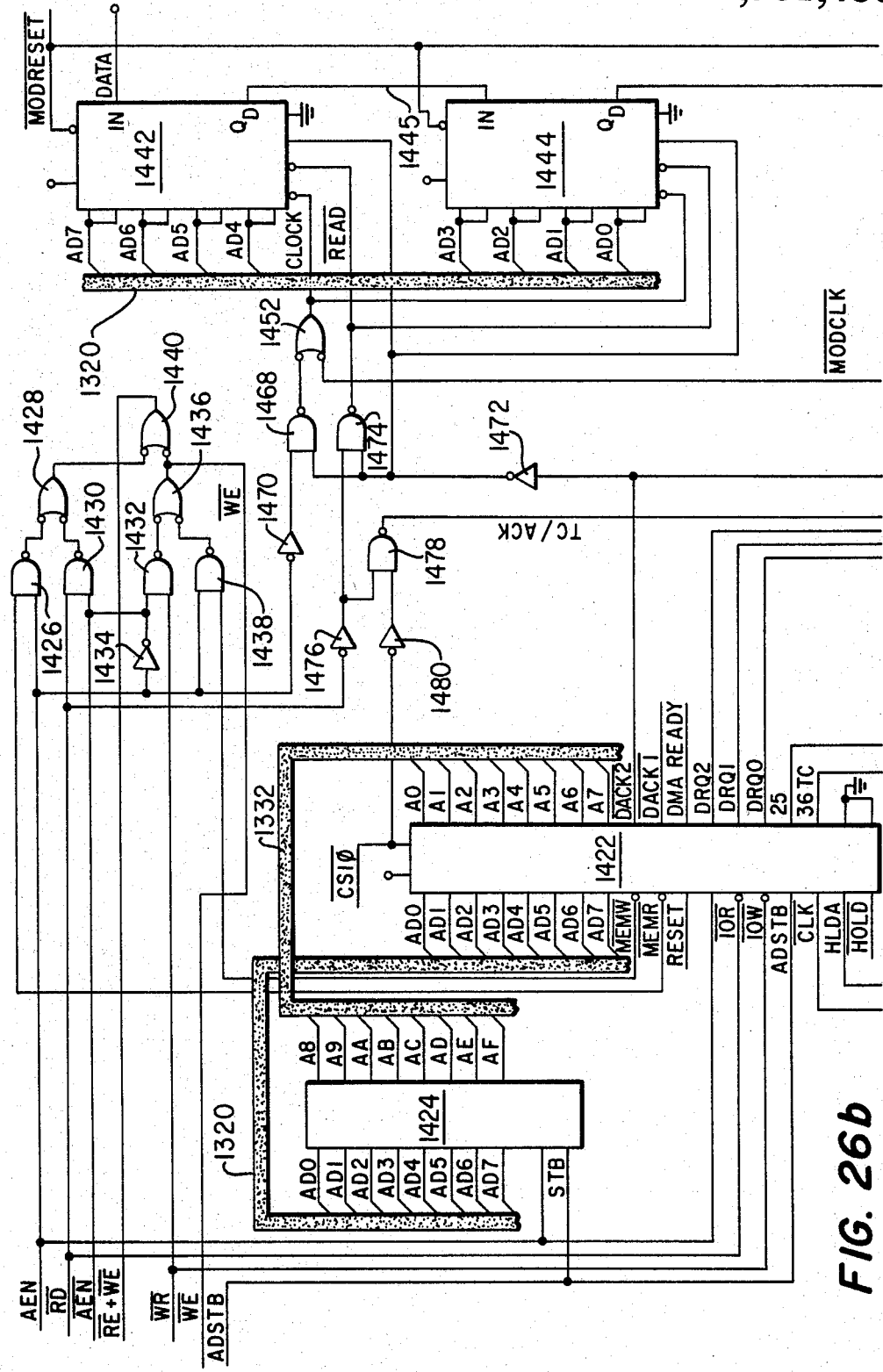
Figure 26C:
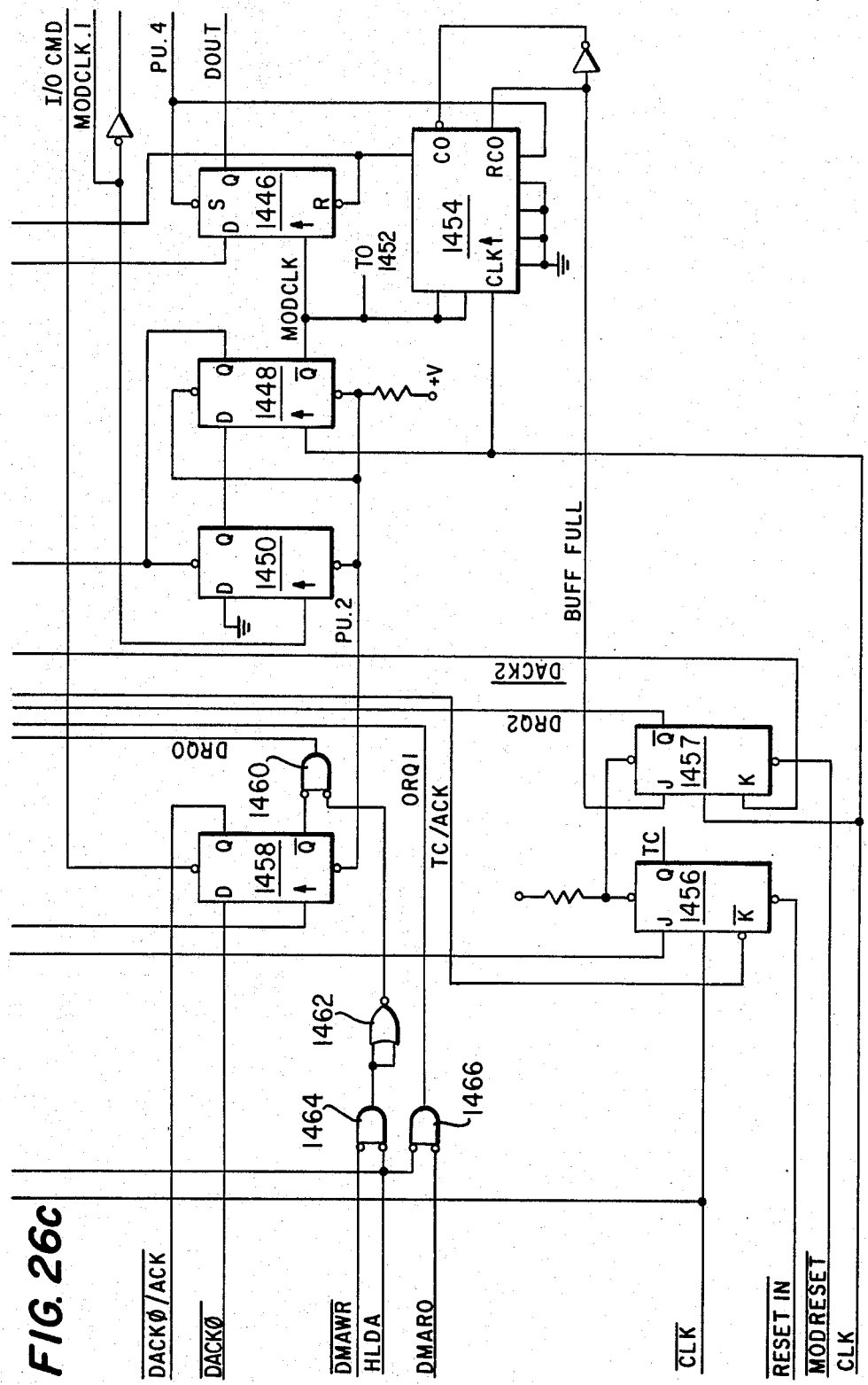
Figure 26D:
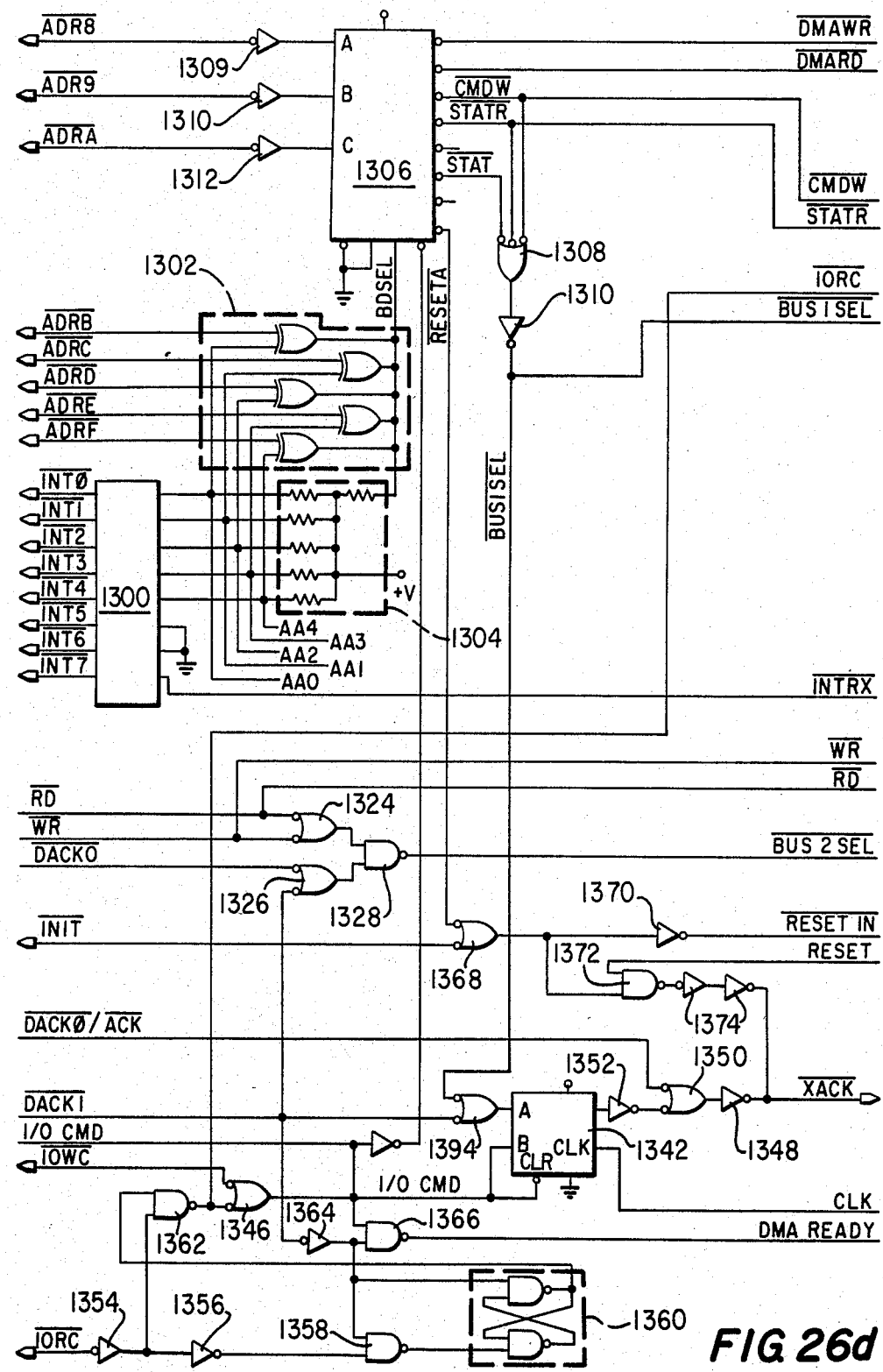
Figure 26E:
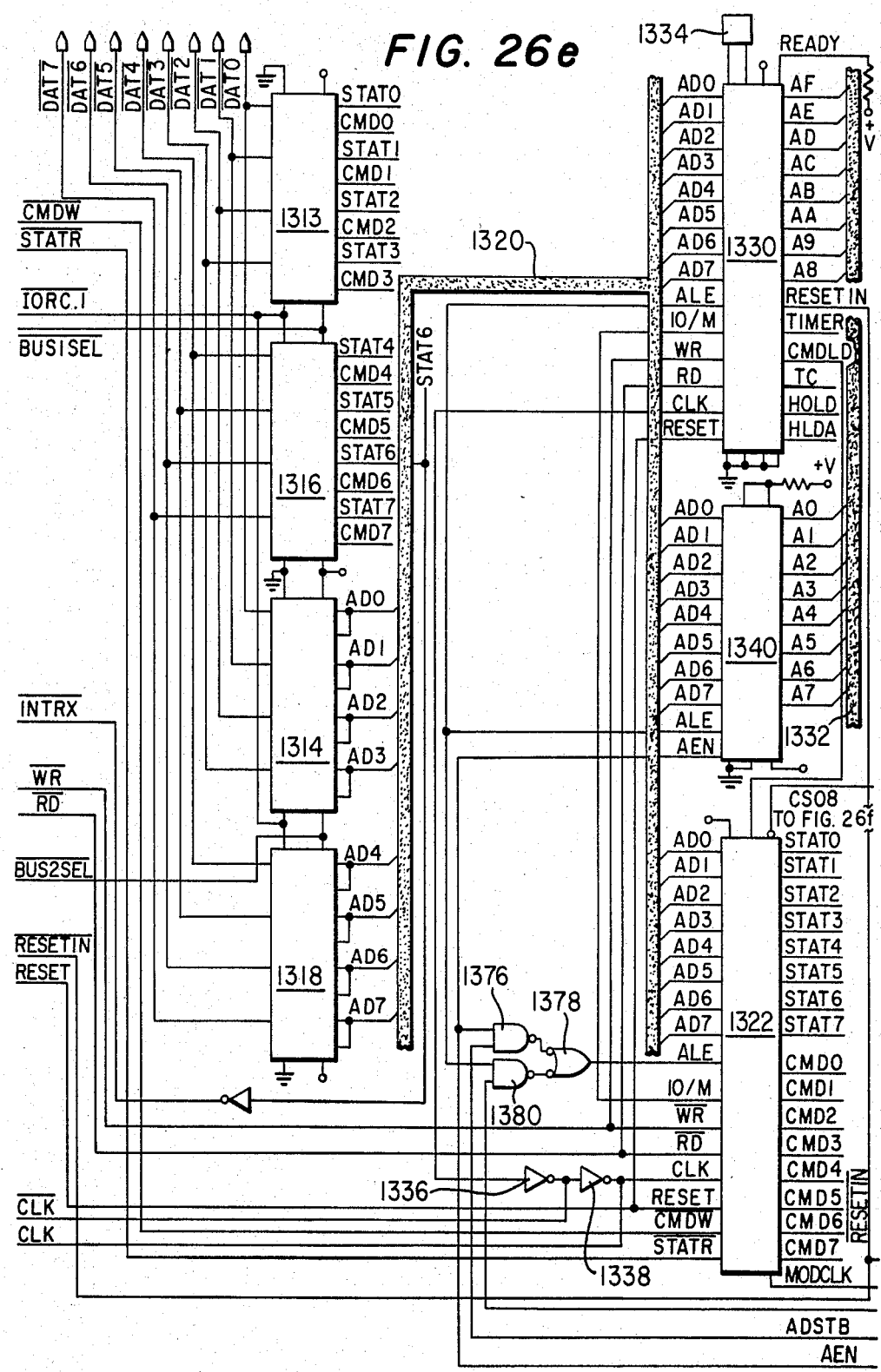
Figure 26F:
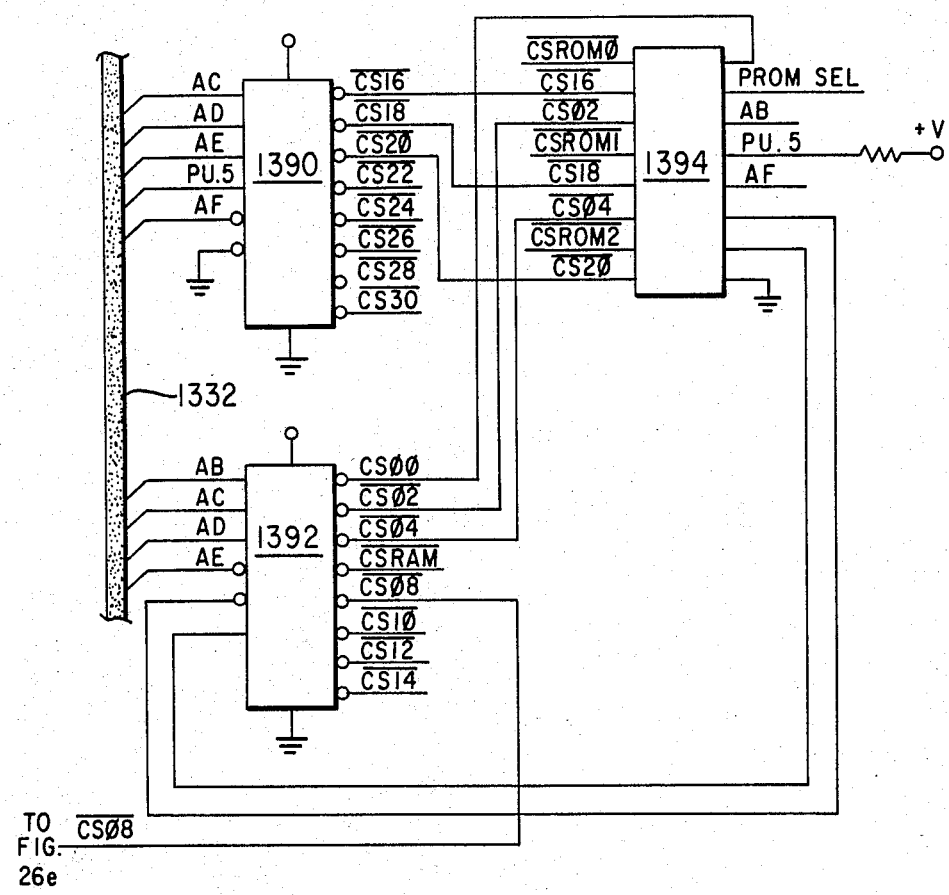
Figure 26G:
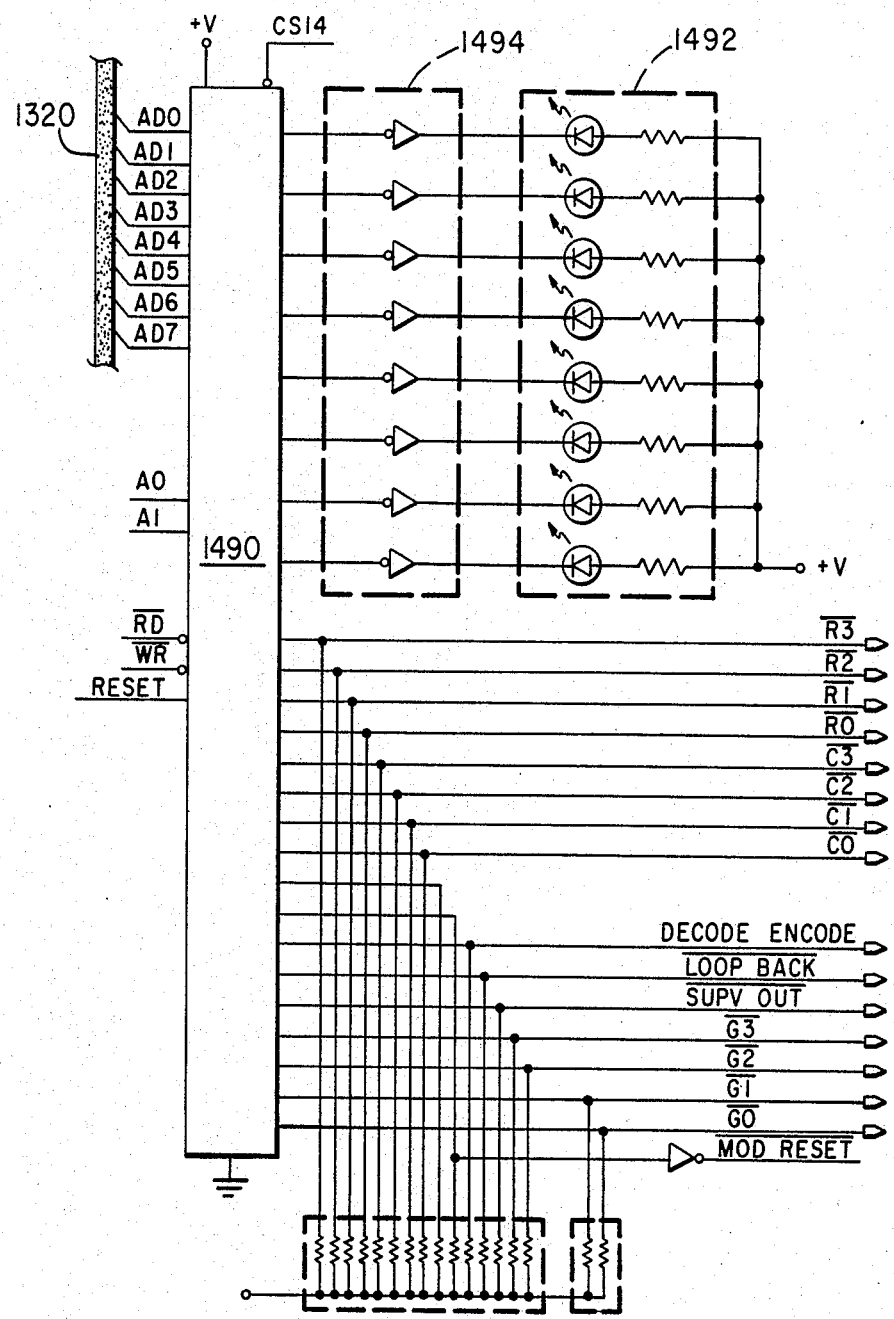
Figure 26H:
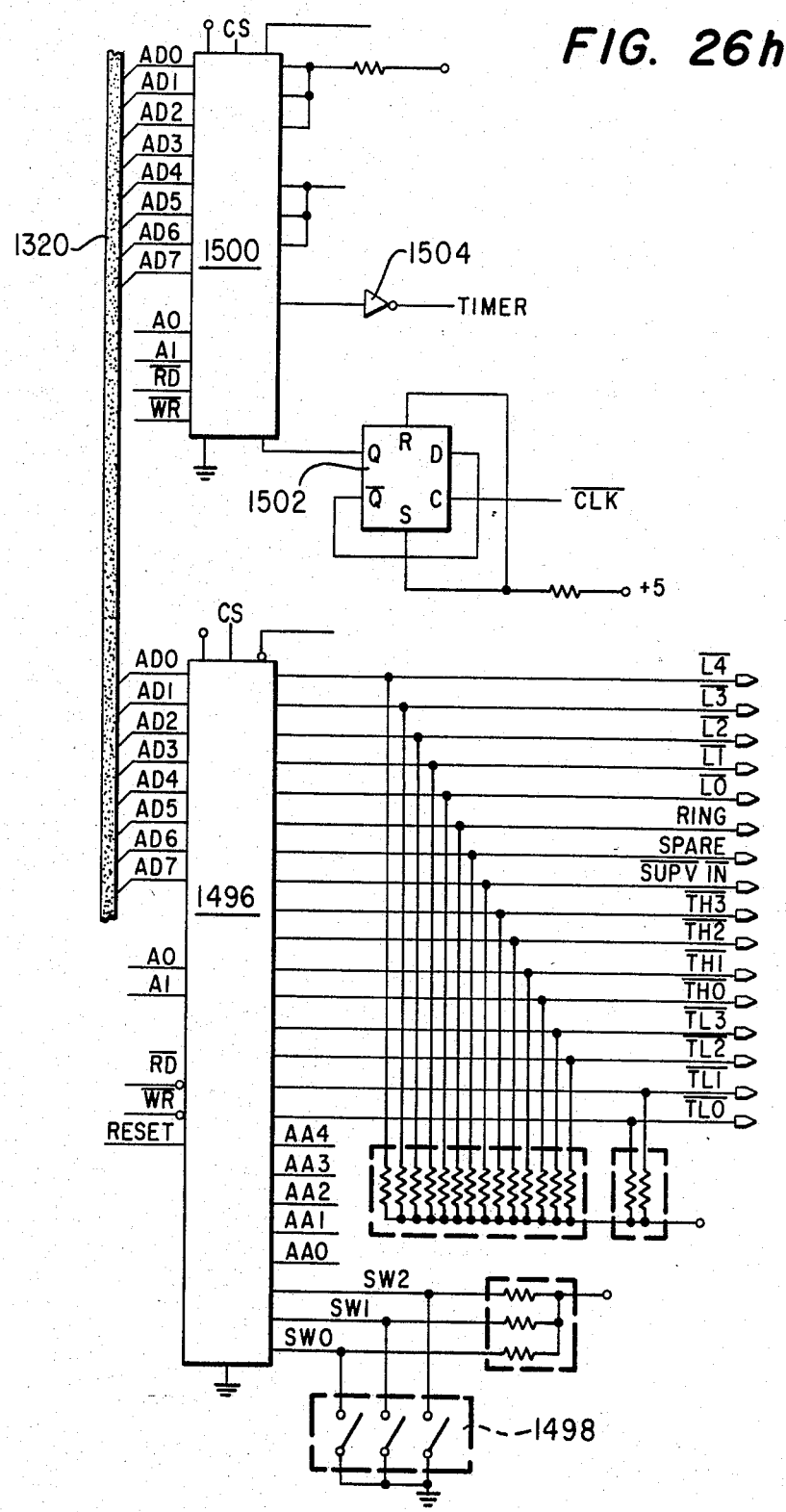

Referring now to FIG. 25a–25c, there is illustrated a schematic diagram of a portion of the Codec illustrated in FIG. 9. The schematic diagram refers to the portion of the Codec that converts the analog to the digital and the digital to the analog. The schematic diagrams of FIG. 25 also include the tone receiver 164 and the tone generator 166 of FIG. 9 that convert a digital signal to a DTMF digit and also convert a DTMF digit back to a digital word. The VCA interface logic 156 of FIG. 9 now outputs a tip and ring signal which is input to the circuit of FIG. 25a on the connectors labeled CTI CT and CR1, CR. This is for two-wire transmission only. The situation where four-wire transmission is allowed by the telephone company will be described hereinbelow.

The tip and ring signals are input to a signal conditioning circuit 1000 which is comprised of operational amplifiers 1002, 1004 and 1106 (hereinafter referred to as op amps). Op amp 1002 is configured as a unity gain noninverting amplifier by connecting the negative input thereof to the output thereof. The op amp 1004 is configured as an inverting amplifier. The components attached to the input terminals and the output terminal of op amp 1004 have values determined by the desired gain. These values can be determined from design equations that are found in the Linear Applications Handbook from National Semiconductors Corp. In the present application, the gain of the op amp 1004 is set for unity gain. It should be understood that although a unity gain amplifier has been utilized for the amplifier 1002, a design for an op amp having a gain larger than one can be implemented by inserting a noninverting gain operational amplifier circuit in place of the unity gain amplifier.

The output of op amp 1004 is connected to the CT1 CR input line by a resistor 1008. The output of op amp 1002 is connected to the input line CR1, CT through a resistor 1010. The resistors 1008 and 1010 are buffer resistors and provide a certain degree of isolation between the outputs of the op amps 1002 and 1004 and the lines CR1, CR and CT1, CT. In the configuration shown, op amps 1002 and 1004, both having unity gain, form a complementary amplifier. This complementary amplifier is used to drive the telephone line which is connected to the lines CT1, CT and CR1, CR. The impedance of the telephone line is 600 ohms.

Op amp 1006 is configured as a differential amplifier having the positive input thereof connected through a resistor 1012 to the CT1, CT terminal and the positive input thereof connected through a resistor 1014 to the CR1, CR terminal. The gain of the differential amplifier is set equal to unity for the present application and it functions as a receiver to receive signals from the telephone line. A resistor 1016 is connected between the terminal CT1, CT and CR1, CR. The output of the op amp 1004 is connected through a resistor 1020 to the positive input of the op amp 1006. The resistor 1020 acts as a summing resistor to allow the output of the op amp 1004 to sum with the difference signal detected by the op amp 1006. The resistor 1020 in effect subtracts or cancels the two signals at the positive input of the op amp 1006. The purpose of the resistor 1020 is to reduce or eliminate transmitted signals output by op amps 1002 and 1004 from appearing on the output of op amp 1006.

A jumper 1022 and a jumper 1024 are connected between the resistors 1010 and 1014 and the resistors 1008 and 1012, respectively. The purpose of the jumpers 1022 and 1024 is to accommodate four-wire telephone lines. The four-wire telephone line makes provisions for transmission on two of the four wires and reception on the remaining two wires thereby providing increased isolation. In a four-wire system, the transmission occurs on the terminal CT1, CT and CR1, CR and reception occurs on the input terminals CT and CR which are connected to the opposite sides of the jumpers 1022 and 1024 from the terminals CT1, CT and CR1, CR.

In applications where a particular system requires the presence of higher gain receiving amplifiers or higher gain transmitting amplifiers, the signal conditioner 1000 is constructed such that it can be replaced to accommodate a particular system. This allows the circuit a higher degree of flexibility from unit to unit which can be customized to a customer's specificiation.

The output of the op amp 1006 is connected to one input of a dual analog gate 1026. The analog gate 1026 is of the type 7G201 manufactured by Siliconix, Inc. An inverter 1028 has the input thereof connected to a signal line labeled LOOP BACK and the output thereof is connected to one of the control inputs of the analog gate 1026 and controls the connection of the output of the op amp 1006 to the output of the analog gate 1026. A pullup resistor 1030 is connected between the input of the inverter 1028 and the positive supply voltage. An inverter 1032 has the output thereof connected to the other control input of the analog gate 1026 and input therof connected to the output of the inverter 1028. The two outputs of the dual analog gate 1026 are connected to a node 1034 and the inverters 1028 and 1032 are operable to selectively connect one of the inputs of the dual analog gate 1026 to the node 1034. The other input of the analog gate 1026 is connected to a node 1036.

A DTMF receiver 1038 and a DTMF receiver 1040 have the input thereof connected to the node 1034. The DTMF receivers are operable to receive the received analog signal and, if DTMF signals are present, discriminate the signals into logic signals corresponding to the various tones. The receivers 1038 and 1040 output a separate digit for each of eight discrete tones. The eight tones are 697 Hz, 770 Hz, 852 Hz, 941 Hz, 1209 Hz, 1336 Hz, 1477 Hz, and 1633 Hz. The receivers 1038 and 1040 are of the type 550 manufactured by Frequency Devices Inc. The presence of the four lower frequencies are operable to individually activate one of the four outputs of the receiver 1038. The four outputs of the receiver 1038 are inverted by a group of inverters 1042 to provide the signals $\overline{TL0}$, $\overline{TL1}$, $\overline{TL2}$, and $\overline{TL3}$, which correspond to increasing frequencies. The four digital outputs of the receiver 1040 are individual activated by the four higher frequencies and these outputs are inverted by a group of four inverters 1043 to provide the output signals $\overline{TH0}$, $\overline{TH1}$, $\overline{TH2}$, and $\overline{TH3}$. The output $\overline{TL0}$-$\overline{TL3}$ are the low tone digital outputs of the DTMF and the outputs $\overline{TH0}$-$\overline{TH3}$ are the high tone digital outputs. The outputs provide a digital signal that is input to the circuit of FIG. 8.

A programmable gain amplifier 1044 is comprised of op amps 1046, 1048, 1050 and 1052. Each of the op amps 1046–1052 is configured as an inverting amplifier having a gain specified by the components attached thereto. The gain of each of the op amp circuits is controlled by a series of four dual analog gates 1054, 1056, 1058, and 1060 similar in type to the analog gate 1026. Each of the dual analog gates 1054–1060 have both outputs connected together and each of the outputs are connected to the negative input of each of the op amps 1046–1052, respectively. The positive input of the op amp 1048 is connected to ground through a resistor 1064. The op amp 1050 has the positive input thereof connected to ground through a resistor 1066. The op amp 1052 has the positive input thereof connected to ground through a resistor 1068. The output of the op amp 1046 is connected to the negative input thereof through a series resistor 1070 and connected to the first and second inputs of the dual analog gate 1056 through resistors 1072 and 1074, respectively. The op amp 1048 has the output connected to the negative input thereof through a series resistor 1076 and connected to both inputs of the dual analog gate 1058 through series resistors 1078 and 1080, respectively. The op amp 1050 has the output thereof connected to the negative input thereof through a series resistor 1082 and to the input of a capacitor 1084. The other end of the capacitor 1084 is connected to both inputs of the dual analog gate 1060 through series resistor 1086 and 1088, respectively.

The op amp 1052 has the output thereof connected to the negative input thereof through a series resistor 1094. A zener diode 1093 has the cathode thereof connected to the cathode of a zener diode 1095 and the anode thereof connected to the input of the filter 1092. The anode of the diode 1095 is connected to ground. Diodes 1093 and 1095 provide a limiting function for the input of the filter 1092. The filter 1092 reduces some of the high frequency components to allow conversion to digital signals. It is of the type 28–1637 manufactured by Alladdin. The node 1034 is connected to one side of a capacitor 1096 and the other end of the capacitor is connected to both inputs of the dual analog gate through series resistors 1098 and 1100, respectively.

A digital signal $\overline{G0}$ is connected to the control inputs of the dual analog gate 1054 by a serially connected pair of inverters 1102. The serially connected inverters 1102 provide both the inverted and noninverted forms of the signal $\overline{G0}$. This allows the signal $\overline{G0}$ to control the operation of the digital analog gate 1054. In this manner, the analog signal passed through the capacitor 1096 is input to the op amp 1046 through a selected one of the resistors 1098 and 1100 depending upon the state of the signal $\overline{G0}$. A digital signal $\overline{G2}$ is connected to the control inputs of the analog gate 1056 by a serially connected pair of inverters 1104. A digital signal $\overline{G3}$ is connected to the control inputs of the analog gate 1058 by a pair of serially connected inverters 1106. A digital signal $\overline{G1}$ is connected to the control inputs of the analog gate 1060 through a pair of serially connected inverters 1108. The digital signals $\overline{G1}$-$\overline{G3}$ control the operation of the analog gates 1056–1060 in a manner similar to the control of the analog gate 1054 by the signal $\overline{G0}$.

The operation of each of the op amps 1046 1052 and the gain thereof will be described with reference to only the op amp 1046. The op amp 1046 is connected as an inverting amplifier with the resistor 1070 serving as the feedback resistor and the resistors 1062 and one of the resistors 1098 and 1100 serving as the gain select resistors. The analog gate 1054 selects which of the resistors 1098 or 1100 are to be part of the gain circuit. The values of these resistors can be selected according to design equations that can be found in the Linear Applications Handbook published by National Semiconductor Corporation. Depending upon the state of the signal $\overline{G0}$, resistor 1098 or resistor 1100 can be selectively connected to the negative input of the op amp 1046 to comprise one leg of the gain circuit. This provides two degrees of freedom in choosing the gain of the amplifier. The resistor 1070 has a value equal to the value of one of the resistors 1100 and 1098 such that a gain can be set to unity. Therefore, the gain of the amplifier circuit can be either unity or higher depending upon the value of the remaining resistor of the pair connected to the input of the analog gate 1054. Each of the op amp circuits 1048, 1050 and 1052 operate in a similar manner, thereby providing 16 levels of gain depending upon the signals $\overline{G0}$-$\overline{G3}$. In the present application, the gain range is from 0 60 Db in increments of approximately 4 Db.

The output of the filter 1092 is connected to the positive input of a comparator 1110 through a series capacitor 1112. The positive input of the comparator 1110 is connected to the positive voltage supply through a resistor 1114. The negative input of the comparator 1110 is connected to the output of a digital to analog converter (D/A) 1116. The output of the comparator 1110 is connected to the positive voltage supply through a pullup resistor 1118. The comparator 1110 is of the type LM311 manufactured by National Semiconductor Corp.

The D/A converter 1116 is a general purpose 10 bit device which is operable to receive 10 bits of information from the Delta modulator 150 of FIG. 9 and convert this digital information to analog signals. The digital word is input on the line labeled $\overline{D0}$-$\overline{D9}$ and inverted by a series of ten inverters 1120. The inverters 1120 each have the input thereof connected to one of the data lines $\overline{D0}$-$\overline{D9}$ and the outputs thereof connected to one of the ten inputs of the D/A converter 1116. Each of the inverters 1120 has the inputs thereof connected to one of a plurality of resistors in a resistor bank 1122, each of the resistors having the other end attached to the positive voltage supply. The resistors 1122 perform a pullup function for the input of the inverter 1120. The D/A converter 1116 outputs an audio signal in response to a digital signal input from the bus on the data lines $\overline{D0}$-$\overline{D9}$ and this audio signal is input to the negative input of the comparator 1110. The comparator 1110 compares the output of the D/A converter 1116 and the output of the filter 1092 to output a signal DATA OUT.

When the signal is being received off of the telephone line and an analog signal is output from the filter 1092 having an amplitude determined by the gain of the programmable gain amplifier 1044, the system generates another signal on the data lines $\overline{D0}$–$\overline{D9}$ which is output by the D/A converter 1116 for comparison. This is a correction signal that is generated in response to a signal that the system thinks is present. This drives the digital portion of the Delta modulator 150 of FIG. 9 to adjust its digital value to the converter 1116 for the next sample. It should be understood that when the analog to digital conversion is not performed on the circuit shown in FIGS. 25A–C, an analog signal must be sampled in order to convert it to a digital representation. The compensation is performed for each sample to compensate for the quality of the sound. The rate of this sampling is many times faster than the frequencies present in voice of information.

The output of the filter 1092 is also connected through a resistor 1124 to the input of a peak detector 1126. The peak detector 1126 utilizes a general purpose op amp to perform the detection by connecting the output to the negative input thereof through a series connected diode 1125 and resistor 1127 and tapping the output off of the negative input thereof. A five-bit level detector IC 1128 has the input thereof connected to the output of the peak detector 1126 and each of the five outputs thereof connected to the input of an individual one of a series of five AND gates 1130 configured as buffers. Each of the outputs of the AND gates 1130 are labeled $\overline{L0}$, $\overline{L1}$, $\overline{L2}$, $\overline{L3}$, and $\overline{L4}$ and represent various levels for the audio signal. A series of pullup resistors 1132 connect each of the five outputs of the level detector 1128 to the positive voltage supply through a single resistor. The output of the five bit level detector outputs a digital bit on each output in a sequential fashion dependent upon the input analog level such that the lowest level corresponds to the signal $\overline{L0}$ and the highest level corresponds to the signal $\overline{L4}$. The IC 1128 is of the type TL489 manufactured by Texas Instruments Inc. An AND gate 1134 configured as a buffer has the input thereof connected to $\overline{L0}$ from the level detector 1128, an identically configured AND gate 1136 has the input thereof connected to $\overline{L2}$ from the level detector 1128 and an identically configured AND gate 1138 has the input thereof connected to $\overline{L4}$ from the level detector 1128. Each of the AND gates 1134–1138 has the output thereof connected to the cathode of a light-emitting diode (LED) 1140, 1142, 1144, respectively. Each of the LEDs 1140–1144 is connected to the positive voltage supply through a pullup resistor 1146, 1148, and 1150, respectively. LED 1144 indicates that the audio level is low, LED 1142 indicates that the audio level is medium, and the LED 1140 indicates that the audio level is high. The LED's are located physically on the front panel of the system so as to inform an operator of the condition of the audio level.

A tone generator 1152 receives digital information from the bus described above and generates an output DTMF signal on an output node 1154. The tone generator 1152 is of the type MK5089 manufactured by Mostek, Incorporated. The tone generator 1152 has the capability of producing eight different tones. These tones can be produced one at a time or two at a time. There are a series of high-frequency tones and low-frequency tones, the frequency of which were described hereinabove with reference to the receivers 1038 and 1040. The digital signals for the high-frequency tones are received on the data lines $\overline{R0}$, $\overline{R1}$, $\overline{R2}$, and $\overline{R3}$. The data lines $\overline{C0}$–$\overline{C3}$ and $\overline{R0}$–$\overline{R3}$ are buffered by a series of AND gates 1155 that have the individual inputs thereof connected to the respective data line and the outputs thereof connected to a corresponding individual input of the tone generator 1152. The frequency of the tones on the tone generator 1152 are controlled by a crystal 1156.

The output node 1154 is connected through a capacitor 1158 and through a series resistor 1160 to the negative input of an op amp 1162. The op amp 1162 is part of the signal conditioning circuit 1000, as indicated by the dashed line. A resistor 1164 is connected between the output and the negative input of the op amp 1162. A resistor 1166 is connected between the positive input of the op amp 1162 and ground. The resistors 1160, 1164 and 1166 in conjunction with the op amp 1162 form a unity gain inverting amplifier. A resistor 1168 is connected between the output of an analog gate 1170 and the negative input of the op amp 1162. The resistor 1168 in conjunction with the remaining resistors 1164 and 1166 results in a higher gain for the amplifier than that using the resistor 1160. The overall amplifier circuit utilizing the op amp 1162 is a summing amplifier, with resistors 1160 and 1168 serving as the summing resistors which sum the output of the analog gate 1170 and the tone generator 1152. The input to the analog gate 1170 is connected to the output of the D/A converter 1116 through a capacitor 1172. A resistor 1174 is connected between the input of the analog gate 1170 and ground. An inverter 1176 has the input thereof connected to a DECODE/$\overline{\text{ENCODE}}$ line and the output thereof connected to the control input of the analog gate 1170. The signal on the DECODE/$\overline{\text{ENCODE}}$ line is operable to sum the output of the D/A converter 1116 with the output of the generator 1152. The op amp 1162 performs a mixing function on the two outputs.

The output of the op amp 1162 is connected through a resistor 1178 to a filter 1180. The filter 1180 is similar to the filter 1092 and functions to filter out high frequency components of the D/A converter 1116 and the tone generator 1152. The output of the filter 1180 is connected to the input of an analog gate 1182 at the node 1036. The control input of the analog gate 1182 is connected to the output of the inverter 1028 and is controlled by the $\overline{\text{LOOP BACK}}$ signal.

In the encode mode, the analog gate 1170 connects the output of the D/A converter 1116 through the op amp 1162 on the signal conditioning board 1000 to the input of the analog gate 1182. When the analog gate 1182 is activated, the signals from the D/A converter 1116 are transmitted to the input of the op amps 1004 and 1002 along with the output of the tone generator 1152 and from there to the telephone line. In the decode mode, information from the D/A convertor is not mixed with the output of the tone generator 1152.

The analog gates 1026 and 1182 are operable to respond to the $\overline{\text{LOOP BACK}}$ signal to remove signals internal to the analog board from the telephone lines for purposes such as testing. When the $\overline{\text{LOOP BACK}}$ function is activated, the analog gate 1182 is deactivated to prevent signals from inputting to the signal conditioning circuit 1000. The dual analog gate 1026 has the analog gate connecting the output of the signal conditioning circuit 1000 to the programmable gain amplifier 1044 deactivated and the remaining gate therein activated to connect the output of the filter 1180 to the programmable gain amplifier 1044. This effectively connects the output of the op amp 1162 to the programmable gain amplifier 1044 which comprises the mixed signals from the tone generator 1152 and the D/A converter 1116.

An inverter 1184 has the input thereof connected to the output of the inverter 1176 and the output thereof connected to the cathode of an LED 1186 to provide a buffer for driving the LED 1186. The anode of the LED 1186 is connected to the positive voltage supply through a resistor 1188. The DECODE/ENCODE signal, in addition to controlling the gate input of the analog gate 1170, also drives the LED 1186 to indicate on the front panel if the system is in the encode mode which is the mode wherein a message is recorded. An inverter 1190 has the input thereof connected to the output of the inverter 1028 and the output thereof connected to the cathode of an LED 1192. The anode of the LED 1192 is connected through a resistor 1194 to the positive voltage supply. The LED 1192 indicates when the LOOP BACK signal is present.

An LED 1196 has the anode thereof connected to the positive voltage supply through a series resistor 1198 and the cathode thereof connected to the output of an inverter 1200. The LED 1196 indicates the select in function on the front panel of the system. The input of the inverter 1200 is also connected to the input of an inverter 1202 that outputs the SUPV IN signal. The input of the inverters 1200 and 1202 are connected to either the input or the output of an inverter 1204 by selectively connecting one of two jumpers 1206 and 1208, as indicated by the dashed lines. The input of the inverter 1204 is connected to the collector of a transistor 1210, the emitter of which is connected to ground. The collector of the transistor 1210 is connected to the positive voltage supply through a resistor 1212 and the base of the transistor 1210 is also connected to the positive voltage supply through a resistor 1214. A control signal CBS1, CTE, which is derived from the VCA 16, is input to the anode of a diode 1216, the cathode of which is connected to the base of the transistor 1210 through a series resistor 1218. The cathode of the diode 1216 is also connected to the negative voltage supply through a resistor 1220. The diode 1216 and the transistor 1210 with its associated components convert the signal input to drive the various inverters and logic that is normally comprised of TTL logic. The positive voltage supply is normally +5 volts for this type of logic. The jumpers 1206 and 1208 allow for positive or negative signalling to the input of the inverters 1200 and 1202.

Referring to FIG. 25b, a circuit 1222 converts a negative voltage signaling to a positive voltage signaling similar to the conversion afforded by the transistor 1210, the diode 1216 and the resistors 1212, 1214, 1218, and 1220. The signal input to the circuit 1222 is labeled C1 and is derived from the VCA board 16 and indicates when the VCA 16 detects a ring signal. The output of the circuit 1222 is connected to the input of an inverter 1224 and a series of jumpers 1226 are utilized to connect either the input of the inverter 1224 or the output of the inverter 1224 to the input of an inverter 1228. The output of the inverter 1228 is connected to the cathode of an LED 1230 and the anode of the LED 1230 is connected to the positive voltage supply through a resistor 1232. The LED 1230 indicates the presence of a ring signal and is labeled RING. The jumpers 1126 are operable to connect the detected RING signal to the input of the inverter 1204 to provide the noninverted signal.

A switch 1234 is operable to generate an alarm busy signal ALB. It is also used for maintenance mode operations. The switch 1234 in one position puts on an ALB signal and in the other position puts out the inverted ALB signal. This signal is input to the VCA 16 and forces a BUSY condition so that the line is busied, it also sends a signal to the circuit microboard of FIG. 8 which enables an operator to simulate an incoming call and do on-board testing.

Referring to FIG. 25C, a transient suppressor diode 1236 has the cathode thereof connected to the input line labled CG and the anode thereof connected to the input line labeled CS, CTM. A PNP transistor 1238 has the emitter thereof connected to the cathode of the diode 1236 and the collector thereof connected to the anode of the diode 1236. A resistor 1240 is connected between the emitter and the base of the transistor 1238. A diode 1242 has the anode thereof connected to the base and the cathode thereof connected to the collector of a PNP transistor 1244. The collector of the transistor 1244 is connected to the negative voltage supply through a resistor 1246 and the emitter thereof is connected to the positive voltage supply. A resistor 1248 connects the base of the transistor 1244 to a node 1250.

A transistor 1252 has the collector thereof connected to a negative voltage supply −V' through a resistor 1256. The base of the transistor 1252 is connected to −V' through a resistor 1258 and the anode of the diode is also connected to −V'. A PNP transistor 1260 has the emitter thereof connected to the positive voltage supply, the collector thereof connected to the base of the transistor 1252 through a resistor 1262 and the base thereof connected to the node 1250 through a resistor 1264. The transistors 1238 and 1244 and the diode 1242 form a circuit that converts positive voltage supply signaling that is output by TTL logic to a signaling voltage in the range of −24 volts. The transistors 1252 and 1260 with their associated circuitry provide a source for the signal to the −V' voltage level.

A signal input line labelled SUPV OUT is connected to the input of an inverter 1266. A resistor 1284 has one end thereof connected to the input of the inverter 1266 and the other end thereof connected to the positive voltage supply to provide a pullup function. The output of the inverter is input to the input of an inverter 1268 and one end of a capacitor 1270. The other end of the capacitor 1270 is connected to the ground. The output of the inverter 1268 is connected to the input of an inverter 1272. The output of the inverter 1272 is connected to the cathode of an LED 1274 and the anode thereof is connected to the positive voltage supply through a resistor 1276. The LED 1274 gives an indication of the SELECT OUT function that is on the front panel. Resistors 1278 and 1280 connect the outputs of the inverters 1266 and 1268 to the positive voltage supply, respectively. A pair of jumpers 1282 allow for selection of the inverted or noninverted function for input to the base of the transistor 1244 for conversion to −24 V signaling.

Referring now to FIGS. 26a–26h there is shown a schematic illustration of the port driver system 92 of FIG. 8, commonly referred to as the Circuit Microboard. The circuit microboard is interfaced to the expander 94 through the bus interface logic 134 to receive signals from the bus. Each of the circuit microboards is coded such that they can fit into any of the given slots that are inherent to the bus interface logic 134. By applying the proper code to the expander 94 from the bus, one of the plurality of circuit microboards can be selected for interface therewith.

Referring further to FIGS. 26a-26h, the addresses for the circuit microboards are input on the lines marked $\overline{ADRB}$, $\overline{ADRC}$, $\overline{ADRD}$, $\overline{ADRE}$, and $\overline{ADRF}$. Each address is unique for a particular microboard. A jumper board 1300 has eight input lines that are connected to the connectors labeled $\overline{INT0}$, INT1, INT2, INT3, INT4, INT5, INT6, and INT7. Internal jumpers are placed between the connector on the input side and one of the output ports, as shown by the dashed lines therebetween. The first five lines $\overline{INT0}$–$\overline{INT4}$ and the signals on these five lines are utilized to encode a particular board. Each of the five lines $\overline{INT0}$–$\overline{INT4}$ are selectively connected to ground elsewhere in the system (not shown) to provide a unique code for a particular circuit microboard. A resistor bank 1304 has an additional resistor having one end connected to the positive voltage supply and the other end connected to the output of the comparator 1302 which is also the output of all five exclusive OR gates. When one of the inputs $\overline{INT0}$–$\overline{INT4}$ is not connected to ground, the corresponding resistor in the resistor bank 1304 acts as a pull up resistor to set the logic state thereof to "high". The output of this jumper board 1300 is compared to the address code input on lines $\overline{ADRB}$–$\overline{ADRF}$. The digital signal on each of the signal lines $\overline{ADRB14}$ $\overline{ADRF}$ is compared to a corresponding bit of data $\overline{INT0}$–$\overline{INT4}$. The output of the jumper board 1300 is applied to a comparator circuit 1302 that is comprised of five open collector exclusive OR gates. Each of the data bits input on the lines $\overline{ADRB}$–$\overline{ADRF}$ is input to one input of one of the exclusive OR gaes in comparator 1302 and a correspoding one of the outputs from the jumper board 1300 is also input to each of the exclusive OR gate the comparator 1302. The output line of the comparator 1302 is labeled BD SEL and this line is activated when a code deteced on the bus matches the particular board coded on the lines $\overline{INT0}$–$\overline{INT4}$.

A demultiplexer 1306 has the A, B and C inputs thereof connected to the outputs of inverters 1308, 1310 and 1312, respectively. The inputs of the inverters 1308–1312 are connected to the address lines $\overline{ADR8}$, $\overline{ADR9}$, and $\overline{ADRA}$, respectively. The demultiplex circuit 1306 has a total of eight output ines that correspond to the three-bit address word on the input thereof. The demultiplex circuit 1306 outputs the DMA write ($\overline{DMAWR}$), DMA read ($\overline{DMARD}$), command write ($\overline{CMDW}$), read status register and reset status bit ($\overline{STATR}$) and read status register without resetting status bit ($\overline{STAT}$). The last bit output is a signal $\overline{RESETA}$ to provide a signal to reset the board. By inputting the correct 3-bit address on the lines $\overline{ADR8}$–$\overline{ADRA}$, a desired function can be selected.

Although the address lines $\overline{ADR8}$–$\overline{ADRA}$ provide the three-bit word that allows the bus to convey to the circuit microboard the desired functions that the board is to perform, it is still necessary to have the BD SEL enable signal to select the desired board and enable the demultiplex circuit 1306. With the use of the comparator circuit 1032 and the signals input thereto, multiplexing of the bus is enhanced in that both the function and the particular board codes are placed onto the bus, and, when a particular board is selected, this particular board performs the required functions. This allows a plurality of boards (depending upon the allocated address bits) to be utilized to perform the various functions individually.

The $\overline{CMDW}$, $\overline{STATR}$, and $\overline{STAT}$ gnals are input to a three-input NOR gate 1308. The output of the NOR gate 1309 is input to an inverter 1310 the output of which provides the $\overline{BUS\ 1\ SEL}$ signal. The use of the $\overline{BUS\ 1\ SEL}$ signal provides a further multiplexing function that will be described hereinbelow.

The bus data is input on lines $\overline{DAT0}$, $\overline{DAT1}$, $\overline{DAT2}$, $\overline{DAT3}$, $\overline{DAT4}$, $\overline{DAT5}$, $\overline{DAT6}$, and $\overline{DAT7}$. The first four bits of data, $\overline{DAT0}$–$\overline{DAT3}$, are input to multiplexing circuits 1313 and 1314. The multiplexing circuits 1313–1318 have tri-state outputs that allow a particular port to output both states of binary data or to "float", that is, the output is open-circuited. In addition, both inputs can be connected to make them bi-directional. The multiplexing circuits are of the type 8226 manufactured by INTEL. The $\overline{BUS\ 1\ SEL}$ is input to the multiplexers 1313 and 1314 provides a chip select signal thereto. The chip select signal activates the particular pair of multiplexers to output binary data. A $\overline{BUS\ 2\ SEL}$ signal is input to the chip select input of the multiplexers 1314 and 1318 to provide the chip select signal thereto. The output of the multiplexer 1313 has four inputs thereof connected to the $\overline{STAT0}$, $\overline{STAT1}$, $\overline{STAT2}$, and $\overline{STAT3}$ signal lines, and the multiplexer 1316 has its four inputs connected to the $\overline{STAT4}$, $\overline{STAT5}$, $\overline{STAT6}$, and $\overline{STAT7}$ signal lines, which are all part of the internal status signals. The four outputs of the multiplexer 1313 are connected to the $\overline{CMD0}$, $\overline{CMD1}$, $\overline{CMD2}$, and $\overline{CMD3}$ signal lines and the four outputs of the multiplexer 1316 are connected to the $\overline{CMD4}$, $\overline{CMD5}$, $\overline{CMD6}$ and $\overline{CMD7}$ lines which are all part of the command internal bus. The multiplexer 1314 has four outputs and four inputs that are connected to an internal address bus 1320 and are labeled $\overline{AD0}$, $\overline{AD1}$, $\overline{AD2}$, and $\overline{AD3}$. The multiplexer 1318 has four outputs and four inputs connected to the address data bus 1320 and are labeled $\overline{AD4}$, $\overline{AD5}$, $\overline{AD6}$, and $\overline{AD7}$. The address/data bus 1320 carries both address and data information.

The output of the multiplexers 1313 and 1316 or 1314 and 1318 that is selected is determined by the signal on either the $\overline{BUS\ 1\ SEL}$ chip select line or the $\overline{BUS\ 2\ SEL}$ chip select line. If the BUS 1 SEL chip select signal is activated which activates the multiplexers 1313 and 1316, the binary signal on the $\overline{IORC.1}$ line controls which direction (in/out) that the data signals $\overline{DAT0}$–$\overline{DAT7}$ are to be "steered". For example, in one state of the $\overline{IORC.1}$ signal, all of the data is directed from the $\overline{STAT0}$–$\overline{STAT7}$ inputs and in the other state, all of the data is directed toward the $\overline{CMD0}$–$\overline{CMD7}$ outputs. When the $\overline{BUS\ 1\ SEL}$ signal is not activated, the outputs of the multiplexers 1313 and 1316 are floating. The multiplexers 1313–1318 allow the lines $\overline{DAT0}$–$\overline{DAT7}$ to be connected to either the status lines, the command lines or the address/data bus 1320. The inputs/outputs of the multiplexers 1313 and 1316 are connected to either the $\overline{STAT0}$–$\overline{STAT7}$ outputs or the $\overline{CMD0}$–$\overline{CMD7}$ inputs. The IC 1322 provides the command/status register interface in addition to the modulator clock function. It is also connected to the system clock (CLK), system reset (RESET), $\overline{CMDW}$ signal, $\overline{STATR}$ signal, write ($\overline{WR}$), read ($\overline{RD}$) and the IO/M signal and also provides 256 bytes of RAM.

A NOR gate 1324 has one input thereof connected to the $\overline{RD}$ signal and the other input thereof connected to the $\overline{WR}$ signal. A NOR gate NAND has one input thereof connected to the DMA acknowledge signal for channel 0 ($\overline{DACK0}$) and the other input thereof connected to the DMA acknowledge signal for channel 1 ($\overline{DACK1}$). A NAND gate 1328 has one input thereof connected to the output of the NOR gate 1324 and the other input thereof connected to the output of the NOR gate 1326. The output of the NAND gate 1328 provides the $\overline{BUS\ 2\ SEL}$ signal for controlling the chip select input of the multiplexers 1314 and 1318. The gates 1324–1328 therefore comprise the circuitry that controls the multiplexers 1314 and 1318.

A central processing unit (CPU) 1330 controls the operation of the circuit microboard. The CPU 1330 is of the type 8085 manufactured by INTEL Corporation. The CPU 1330 is connected to the internal bus 1320 through connecting lines labelled AD0–AD7. An internal address bus 1332 is connected to the CPU 1330 by the signals A8, A9, AA, AB, AC, AD, AE, and AF. A crystal 1334 is connected to the CPU 1330 to provide a reference for the internal clock thereof. A clock signal (CLK) is output by the CPU 1330 to the input of an inverter 1336. The output of the inverter is connected to the input of an inverter 1338. The inverter 1336 provides a $\overline{CLK}$ signal and the inverter 1338 provides the CLK signal as a buffer output. The CPU 1330 performs the primary control of the circuit microboard and the DMA controller 1422 aids the CPU 1330 by performing slave functions. This allows for a more efficient allocation of CPU time. A latch circuit 1340 has inputs connected to the internal bus 1320 and labeled AD0–AD7 and outputs connected to the internal bus 1332 labeled A0–A7. The latch 1340 is operable to receive information from the internal bus 1320 and transfer this information to the internal bus 1332 on address lines A0–A7. An AEN signal enables the latch 1340 to demultiplex the address from the address/data bus 1320.

When the master Universal Control Board on the bus generates a command desiring to do an I/O read or an I/O write, the master Universal Control Board waits for an acknowledge signal before generating another command. The purpose for this procedure is to allow sufficient time for the prior command to be completed. This acknowledge signal is labeled $\overline{XACK}$ and is output by an inverter 1348 or 1374.

An eight-bit shift register 1342 is part of the acknowledge circuit. The shift register is of the type 74LS164 manufactured by Texas Instruments, Inc. The shift register 1342 is incremented by the CLK signal and takes a bit of data that is input to the shift register 1342 and clocks it through a defined number of clock pulses. This in effect delays the output signal by the number of clock pulses that the bit shifted. The input is received from a NOR gate 1344 which has one input connected to the $\overline{BUS\ 1\ SEL}$ signal and the other input connected to the DACK1 signal. The B input of the shift register 1342 is connected to the output of a NOR gate 1346 which has one of the inputs thereof connected to the $\overline{IOWC}$ signal received from the bus. The input of the inverter 1348 is connected to the output of a NOR gate 1350, the inputs of which are connected to the $\overline{DACK0/ACK}$ signal and an inverter 1352. The input of the inverter 1352 is connected to the output of the shift register 1342.

An inverter 1354 has the input connected to the $\overline{IORC}$ command from the bus and the output thereof connected to the input of an inverter 1356. The output of the inverter 1356 is connected to one input of a NAND gate 1358. The output of the NAND gate drives one input of a flip-flop 1360 and the other input of the flip-flop is connected to the output of the inverter gate 1364. The output of the flip-flop 1360 is connected to the input of a NAND gate 1362, the other input of which is connected to the output of the inverter 1354. The input of the NAND gate 1358 that is connected to the other input of the flip-flop 1360 is driven by an inverter 1364 that has its input connected to the $\overline{DACK1}$ signal. The output of the inverter 1364 is also connected to one input of a NAND gate 1366 which has the other input thereof connected to the I/O CMD signal line. The output of the NAND gate 1366 supplies a DMA READY signal to the DMA controller 1422. The DMA READY signal output by the NAND gate 1366 is a synchronizing signal to synchronize the I/O read command on the bus to the DMA READ register function because, although they are supposed to be synchronous, in actuality, they are asynchronous.

A NOR gate 1368 has one input thereof connected to the $\overline{RESETA}$ signal, the other input thereof connected to the INIT signal from the bus and the output thereof connected to the input of an inverter 1370 and one input of a NAND gate 1372. The other input of the NAND gate 1372 is connected to the RESET signal from the CPU 1330. The output of the inverter 1370 supplies the $\overline{RESET\ IN}$ signal which is supplied to the CPU 1330. The output of the NAND gate 1372 is connected to a pair of inverters 1374 to provide buffering and also outputs the acknowledge signal $\overline{XACK}$ signal to the bus. The NAND gate 1372 is operable to provide the acknowledge signal $\overline{XACK}$ to the bus to indicate that the RESET command that was generated for the CPU 1330 has been carried out.

A NAND gate 1376 has one input thereof connected to the address-enable strobe AEN, the other input thereof connected to the ADSTB signal of the DMA controller 1422 and the output thereof connected to one input of a NOR gate 1378. A NAND gate 1380 has one input thereof connected to the ALE output of the CPU 1330, the other input thereof connected to the AEN signal and the output thereof connected to the other input of the NOR gate 1378. The output of the NOR gate 1378 is connected to the IC 1322. The NAND gates 1376 and 1380 and the NOR gate 1378 comprise a multiplexer for the address-enable strobe on the IC 1322.

A chip select circuit 1390 and a chip select circuit 1392 perform demutliplexing of the address on the internal bus 1322. The chip select circuit 1390 receives the AC, AD and AE inputs and demultiplexes this 3-bit address into eight outputs. The chip select circuit 1392 receives the AB, AC, and AD inputs and demultiplexes this 3-bit address into eight outputs. The chip selects 1390 and 1392 are of the type 74LS138 manufactured by Texas Instruments, Incorporated. Three of the outputs of the chip select circuit 1390, $\overline{CS16}$, $\overline{CS18}$ and $\overline{CS20}$, are input into a jumper matrix 1394. Three of the outputs from the chip select circuit 1392, $\overline{CS00}$, $\overline{CS02}$, and $\overline{CS04}$, are also input to the jumper matrix 1394. The matrix 1394 outputs the chip select signals for a desired ROM. The outputs are $\overline{CSROM0}$, $\overline{CSROM1}$, and $\overline{CSROM2}$ corresponding to three separate ROMs. It should be understood that more than three ROMs may be included, which would require additional addresses. The jumper matrix outputs a PROM SEL signal and receives two bits of data, AB and AF, from the internal bus 1332. The signal AF on the internal bus 1332 controls the enable operation of the chip select circuit 1390.

A ROM 1400 has the address inputs A0-AA connected to the internal bus 1332 and the data outputs AD0-AD7 connected to the internal bus 1320. A ROM 1402 has the address inputs A0-AA connected to the internal bus 1322 and the data outputs AD0-AD7 connected to the internal bus 1320. A ROM 1404 has the address inputs A0-AA connected to the internal bus 1332 and the data outputs AD0-AD7 connected to the internal bus 1320. The ROM 1400 is controlled by the signal $\overline{\text{CSROM0}}$, the ROM 1402 is controlled by the signal $\overline{\text{CSROM1}}$, and the ROM 1404 is controlled by the signal $\overline{\text{CSROM2}}$. The signal PROM SEL selects the EPROMS 1400-1404. The EPROMs of the type 2716 provide 6K of ROM memory space. EPROMs of the type 2732A can be utilized to provide 112K of ROM memory space. Each of the ROMs 1400-1404 has the $\overline{\text{RD}}$ signal connected thereto to allow the CPU 1330 to read the information contained therein. The information is located in each of the ROMs 1400-1404 by inputting the correct address on the lines A0-AA on the internal bus 1332.

A RAM 1406 has the address inputs A0-A9 connected to the internal bus 1332 and the address/data inputs AD0-AD3 connected to the bus 1320. A RAM 1408 has the address inputs A0-A9 connected to the internal bus 1332 and the address/data inputs AD-4-AD7 connected to the internal bus 1320. A RAM 1410 has the address inputs A0-A9 connected to the internal bus 1332 and the address/data inputs AD-0-AD3 connected to the internal bus 1320. A RAM 1412 has the address inputs A0-A9 connected to the internal bus 1332 and the address/data inputs AD-4-AD7 connected to the internal bus 1320. The RAMs 1406 and 1408 comprise a complementary pair and the RAMs 1410 and 1412 comprise another complementary pair. The RAMS 1406-1412 have the capability to receive and store data from the internal bus 1320 and output data to the internal bus 1320. A signal CS06 is connected to the complementary pair of RAMs 1406-1408 and enables this pair to either write data on or read data from its internal bus 1320. A write enable signal $\overline{\text{WE}}$ controls this operation. The complementary pair of RAMs 1410-1412 is controlled by a CS07 signal. The CS06 and CS07 signals are operable to select either pair of RAMs. The address A0-A9 and AA determines the area of memory space within the RAMs 1406-1412 that the information is either stored in or retrieved from the RAMs 1406-1412 which are of the type 2114 in manufactured by Mostek Incorporated.

A three-input NAND gate 1414 provides the signal CS06 and a three-input NAND gate 1416 provides the signal CS07. The data bit AA from the internal bus 1332 is input to one input of the NAND gate 1416 and is inverted by an inverter 1418 and then input to one input of the NAND gate 1414. The RAM select signal $\overline{\text{CSRAM}}$ from the chip select circuit 1392 is passed through an inverter 1420 and input to one input of both the NAND gate 1414 and the NAND gate 1416. The remaining inputs for the NAND gates 1414 and 1416 are the READ or WRITE ENABLE signals, $\overline{\text{RE}}+\overline{\text{WE}}$. The NANO gates 1414 and 1416 allow the circuit microboard to read or write on the internal RAM when the $\overline{\text{CSRAM}}$ signal is present from the chip select circuit 1392.

A DMA controller 1422 interfaces with the internal bus 1320 on address data lines AD0-AD7 and also interfaces with the internal bus 1332 on the address lines A0-A7. The DMA controller 1422 is of the type 8257 manufactured by INTEL Corporation. The DMA controller 1422 is a slave CPU that assists the CPU 1330 by performing some functions such as read and write independant of the CPU 1330. This provides for more efficient use of CPU time. The DMA controller 1422 generates the address lines A0-A7. A latch circuit 1424 of the type 8212 manufactured by INTEL interfaces with the address data lines AD0-AD7 on the internal bus 1320 and is operable to demultiplex these address data lines to the higher order address lines AA-AF on the internal bus 1332. A strobe signal from the controller 1422 is connected to the strobe input of the latch 1424 to latch the address over from the internal bus 1320 to the internal bus 1332. The strobe signal also is connected to one input of the NAND gate 1376 that performs a multiplexing function for the IC 1322.

A NAND gate 1426 has one input thereof connected to the $\overline{\text{MEMR}}$ signal from the DMA controller 1422 and the other input thereof connected to the address enable signal AEN and the output thereof connected to one input of a NOR gate 1428. A NAND gate 1430 has one input thereof connected to the $\overline{\text{RD}}$ signal, the other input thereof connected to the $\overline{\text{AEN}}$ signal and the output thereof connected to the other input of the NOR gate 1428. A NAND gate 1432 has one input thereof connected to the output of an inverter 1434, the other input thereof connected to the $\overline{\text{WR}}$ signal and the output thereof connected to one input of a NOR gate 1436. The input of the inverter 1434 is connected to the $\overline{\text{AEN}}$ signal. A NAND gate 1438 has one input thereof connected to the AEN signal, the other input thereof connected to the $\overline{\text{MEMW}}$ output by the DMA controller 1422 and the output thereof connected to the other input of the NOR gate 1436. The output of the NOR gate 1436 is connected to one input of a NOR gate 1440, the other input of which is connected to the output of the NOR gate 1428. The output of the NOR gate 1436 is also interconnected with the $\overline{\text{WE}}$ signal. The output of the NOR gate 1440 provides the READ or WRITE ENABLE signal, $\overline{\text{RE}}+\overline{\text{WE}}$, which is input to the NAND gates 1414 and 1416. The gates 1426-1440 provide a logic memory interface to allow the DMA controller 1422 and the CPU 1330 to access the same RAM space thereby providing a multiplexing function. Whenever the controller 1422 desires to do a memory read or a memory write for the RAMs 1406-1412, either a memory write $\overline{\text{MEMW}}$ or a memory read $\overline{\text{MEMR}}$ is generated and input to the NAND gates 1426 and 1438, respectively. These gates are part of the multiplexer for the RAM.

Parallel to serial and serial to parallel converters 1442 and 1444 interface with the internal bus 1320 on the address lines AD0-AD7 to convert a parallel address word to a serial bit stream that is then connected to the Delta Modulator. The converters 1442 and 1444 are operable to receive serial data from the Delta Modulator and convert it to parallel data for transfer along the internal bus 1320 to the RAM and for reception of data from the internal bus 1320 and sent serially to the Delta Modulator. The converters 1442 and 1444 comprise the Codec interface logic 140 of FIG. 8. The input data is input to the DATA LINE of the converter 1442. The output of the converter 1442 is connected to the input of the converter 1444 by a connecting line 1445. The converters 1442 and 1444 are of the type 74LS395 manufactured by Texas Instruments, Inc.

The output of the converters 1442 and 1444 to the Delta modulator is output by a synchronizing circuit 1446 that is a D-type flip-flop of the type 74LS74 manufactured by Texas Instruments, Inc. which receives the data input from the output of the converter 1444. The synchronizer 1446 outputs a bit stream that is in the proper synchronization format for the Delta Modulator which is necessary since the bit stream output by the converter 1444 is slightly out of synchroniziation. D-type flip-flops 1448 and 1450 are connected in a configuration to form a quasi-one-shot function. The modulator clock MODCK.1 from the IC 1322 is input to the clock input of the D-type flip-flop 1450 and the output of the D-type flip-flop 1448 is a short pulse for each clock pulse that is present. The Q output of the flip-flop 1448 is input to the clock input of the synchronizer circuit 1446 and the Q output thereof is input to one input of a NOR gate 1452 that outputs a clock signal Clock to the input of the converters 1442 and 1444. A counter-circuit 1454 generates a signal for the DMA logic to read another byte or to write another byte for the converters 1442 and 1444. The signal is labeled $\overline{\text{BUFF FULL}}$. The circuit counter 1454 is of the type 74161 manufactured by Texas Instruments, Inc.

A J-K flip-flop 1456 is operable to generate a terminal count signal, TC, that is an interrupt signal to indicate that the DMA register has reached its terminal count and requires service. The input for the J-K flip-flop 1456 is received from the terminal count output TC of the controller 1422 and the other input of the J-K flip-flop 1456 is from the TC/ACK signal for terminal count knowledge. A D-type flip-flop 1458 is operable to synchronize the $\overline{\text{DACK0}}$ signal output by the DMA controller 1422. An output of the D-type flip-flop 1458 is input to one input of a NAND gate 1460, the output of which is the DRQ0 or DMA request signal. The other input of the NAND gate 1460 is connected to the output of a NOR gate 1462 configured as an inverter. A NAND gate 1464 has one input thereof connected to the $\overline{\text{DMAWR}}$ signal, the other input thereof connected to the bold acknowledged signal, HLDA, and the output thereof connected to the inputs of the NOR gate 1462. A NAND gate 1466 has one input thereof connected to the DMARD signal, the output of which provides the DRQ1 input to the DMA controller 1422. The gates 1462-1464 synchronize the bus control lines and the command lines using the DMAWR from the demultiplexer 1306. These gates provide synchronization and also generate the DMA request signals. When the controller 1422 requires the use of the internal buses, a signal for hold request, $\overline{\text{HOLD}}$, is generated by the DMA controller 1422 and the CPU 1330 relinquishes control of the internal bus to the controller 1422. The HLDA signal is generated by the CPU 1330 to indicate that the CPU 1330 has finished its cycle on the bus and the controller 1422 can begin utilizing the internal buses.

A NAND gate 1468 has one input thereof connected to the inverted AEN signal, $\overline{\text{AEN}}$, that is inverted by an inverter 1470, the other input thereof connected to the $\overline{\text{DACK2}}$ signal inverted by an inverter 1472 and the output thereof connected to one input of the NOR gate 1452. A NAND gate 1474 has one input thereof connected to the inverted $\overline{\text{RD}}$ signal inverted by an inverter 1476, the other input thereof connected to the inverted $\overline{\text{DACK2}}$ signal and the output thereof connected to the converters 1442 and 1444 to provide a $\overline{\text{READ}}$ signal. The gates 1452, 1468, and 1474 provide an interface between the Codec and the internal bus on the circuit microboard.

A NAND gate 1478 has one input thereof connected to the output of the inverter 1476 to receive the inverted RD signal, the other output thereof connected to the inverted $\overline{\text{CS10}}$ signal inverted by an inverter 1480, and the output thereof connected to the J-K flip-flop 1456 to provide the TC/ACK signal. J-K flip-flop 1456 puts out the terminal count TC that indicates that the terminal count has occurred and the NAND gate 1478, which outputs the TC/ACK signal, indicates that a read and chip select function has been acquired by the system and automatically resets the interrupt so that the interrupt is processed.

A J-K flip-flop 1457 receives the output of the counter circuit 1454 labeled BUFF FULL on the J-input thereof that indicates a full buffer. The K input thereof is connected to the $\overline{\text{DACK2}}$ output of the DMA controler 1422 and the $\overline{\text{Q}}$ output thereof is connected to the DRQ2 input of the DMA controller 1422. The J-K flip-flop 1457 provides the DMA request signa to the DMA controller 1422.

Input-output (I/O) circuits provide interfaces to the internal bus 1320 on the address/data lines AD0-AD7. The I/O circuit 1490 interfaces to the internal bus 1320 and to the lines A0 and A1 of bus 1332 and to the read, write and system wide reset signal, RESET. The I/O circuit 1490 is programmed primarily as an output chip in the present application. It provides eight outputs to a group of eight LEDs 1492 on a front panel. Each of the eight LEDs in the group 1492 is internally regulated by an individual series resistor connected between the positive voltage supply and the anode of each of the LEDs. A group of eight buffers 1494 are utilized to drive the LEDs. Each LED is provided with one driver to interface between one of the outputs of the I/O 1490 and the cathode of one of the LEDs in the group 1492. The I/O 1490 also outputs the digital code for the DTMF tone generator 166 of FIG. 9 on the output lines marked $\overline{\text{C0–C3}}$ and $\overline{\text{R0–R3}}$. The outputs marked $\overline{\text{G0–G3}}$ control the AGC circuit 160 on the analog board of FIG. 9. Also provided as outputs are the $\overline{\text{DECODE/ENCODE}}$, the $\overline{\text{LOOP BACK}}$ and the $\overline{\text{SUPV OUT}}$ which is the supervise out that is transmitted to the analog board at a proper level for the VCA to connect to the phone line. The I/O 1490 also outputs a modulator reset signal $\overline{\text{MOD RESET}}$ that resets the Delta Modulator to a known state.

An I/O circuit 1496 is identical to the I/O 1490 except that it is programmed for input only. The I/O 1496 is interfaced to the internal bus 1320 on the lines AD0-AD7 and interfaced to the internal bus 1332 on the lines A0 and A1 and the I/O 1496 also receives the inputs $\overline{\text{RD}},\overline{\text{WR}}$, and RESET, for read, write and system reset, respectively. Three inputs to the I/O 1496 labeled SW0, SW1, and SW2 are connected to a group of switches 1498 that switch each of these lines independently to ground. Five of the inputs on the I/O 1496 are attached to the addresses AA0-AA4 that are output from the circuit 1300 to allow the I/O 1496 to read the address of the particular circuit microboard when it's inserted into the bus. The $\overline{\text{SUPV IN}}$ is the supervised in signal that comes from the VCA and gets buffered by the analog board of FIG. 25 to provide an indication that there is a connection to the telephone line. The input labeled RING is a ring signal which comes from the VCA 16 and gets buffered to the analog board and it provides an indication that the telephone line has a ringing signal on it and needs servicing. The signals $\overline{\text{TL0–TL3}}$ and $\overline{\text{TH0–TH3}}$ are received to indicate the low and high tones. The signals L0–L4 are received from the analog board to indicate the level of the incoming signal.

A timing interrupt circuit 1500 is interfaced to the internal bus 1320 on lines AD0–AD7 and also interfaced to the internal bus 1332 on lines A0 and A1. The IC 1500 also receives the $\overline{RD}$ and $\overline{WR}$ signals. A D-type flip-flop 1502 receives the $\overline{CLK}$ signal and divides it down to a rate at which the IC 1500 can count and perform a timing interrupt function. The output is buffered by an inverter 1504 to output a TIMER signal.

Figure 27A:
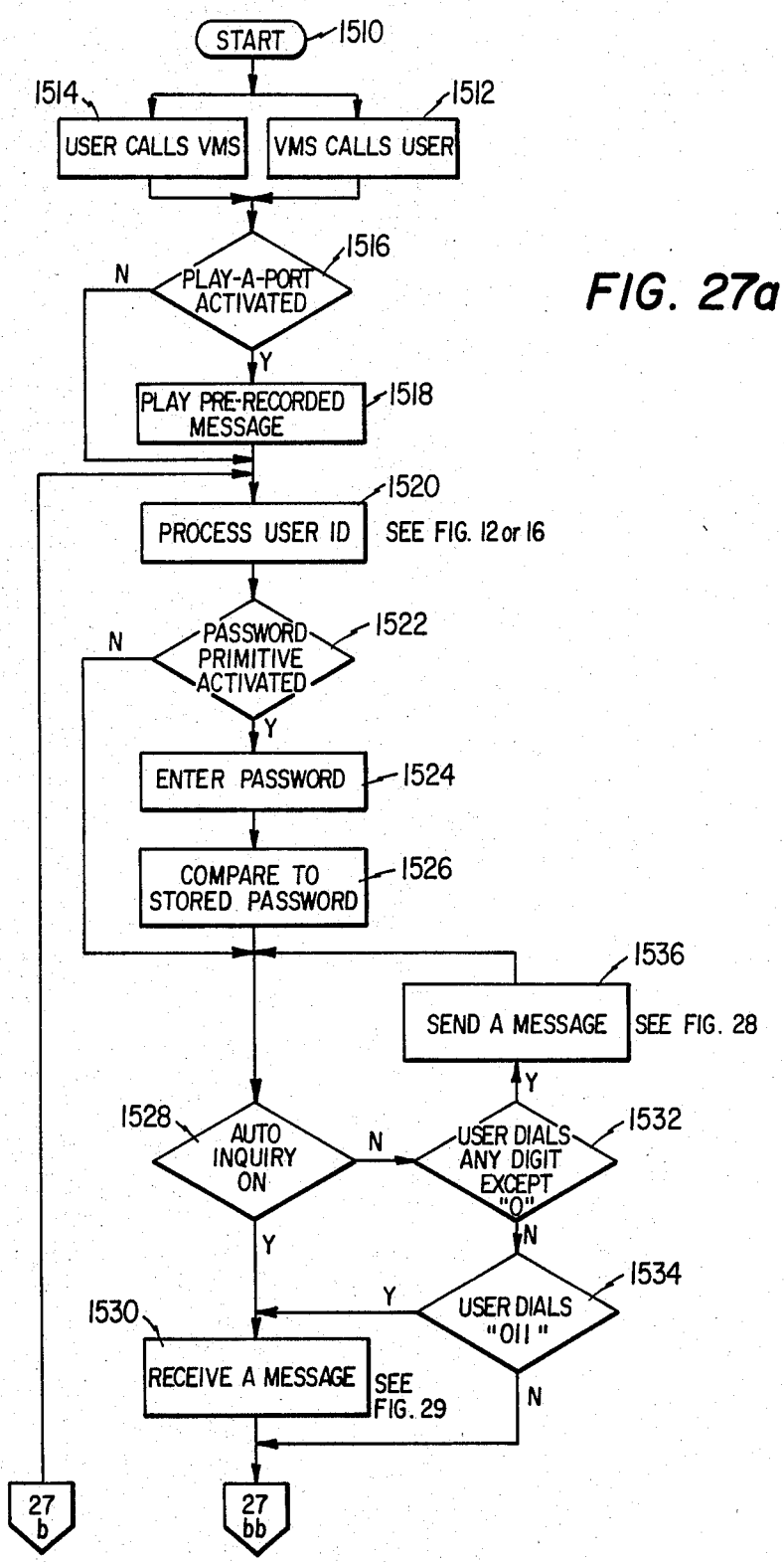
FIGS. 27a and 27b illustrates a flow chart of an alternate embodiment of the message delivery function.
Figure 27B:
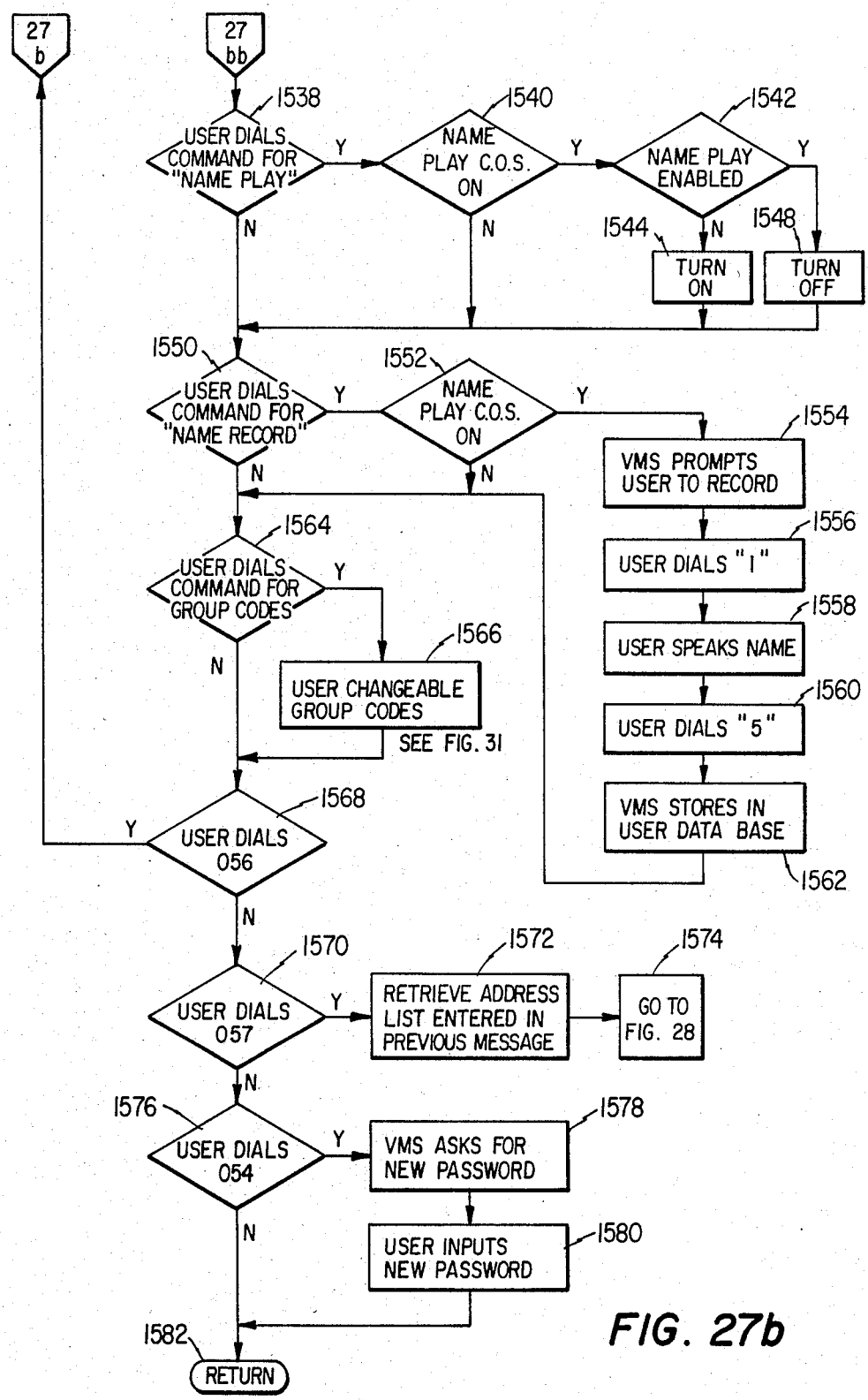

Referring now to FIGS. 27a and 27b, there is illustrated a flow chart for an alternate embodiment of the VMS system for sending and receiving messages and setting up the various primitives, as will be described hereinbelow. The flow chart is initiated with a START block 1510 and then proceeds along two branches to either a function block 1512 labeled VMS CALLS USER or a function block 1514 labeled USER CALLS VMS. The function block 1514 is utilized whenever a user desires access to the VMS system to either send or receive a message. The function block 1512 is utilized whenever VMS calls the user. As will be described hereinbelow, there are certain circumstances in which VMS takes the initiative of calling a user to deliver the message without the user having to retrieve the deposited message.

Play-a-Port

After the connection between VMS and the user has been achieved, the program flows to a decision block 1516 to decide whether a PLAY-A-PORT feature has been activated. The PLAY-A-PORT feature is a system parameter that is controlled by the system operator to deposit general messages for transmission to each user in the user's data base whenever a telephone connection is made. For example, it may be necessary to service the system and a prerecorded message is output to each user upon access to the system, such as "Hello, this is VMS. We are sorry but the system will be down on (date) for service". This feature is also useful for announcing daily messages to the users regarding such items as stock quotes, recently implemented and future VMS features and anything else that would constitute a daily or periodic announcement. If the PLAY-A-PORT feature is activated, the program flows along the "Y" path to a function block 1518 and the prerecorded message is played for the user's benefit. If the feature is not activated, the program follows the "N" path to bypass the function block 1518.

Password

The next step in the flow chart is to proceed to a function block 1520 wherein the user I.D. is processed. When VMS calls the user, the user I.D. is processed by the procedure depicted in the flow chart illustrated in FIG. 16 and when the user calls VMS, the user I.D. is processed by the procedure depicted in the flow chart in FIG. 12. After the user I.D. is processed, the program flows to a decision block 1522 to inquire whether the password primitive has been activated. As will be described hereinbelow, primitives are features of a system that a user is afforded to either expand or restrict his particular voice mailbox Class of Service (C.O.S.). The user purchases a general C.O.S. that contains the various primitives that are available to the user. However, there are many different C.O.S.'s available, each with its own set of primitives.

A password is similar to a user I.D. in that it affords the user access to the system. However, the password is only known to the user and to no one else. The user's I.D. number is normally given to him by a system administrator who, along with several other people, have access to the user's I.D. The password, on the contrary, is entered only by the user and only the user has knowledge of the password. If the password primitive has been activated in a function block described hereinbelow, the program flows along the "Y" path to a function block 1524 wherein the password is entered. After the password is entered, the program flows to a function block 1526 and the password is compared to the previously entered and stored password (described hereinbelow). Although not shown, an invalid password will case the program to return to the input of the function block 1524 whereas a valid password advances the program to a decision block 1528. If the password primitive has not been activated, the program flows along the "N" path of the decision block 1522 to the input of the decision block 1528.

Auto Inquiry

Figure 29A:
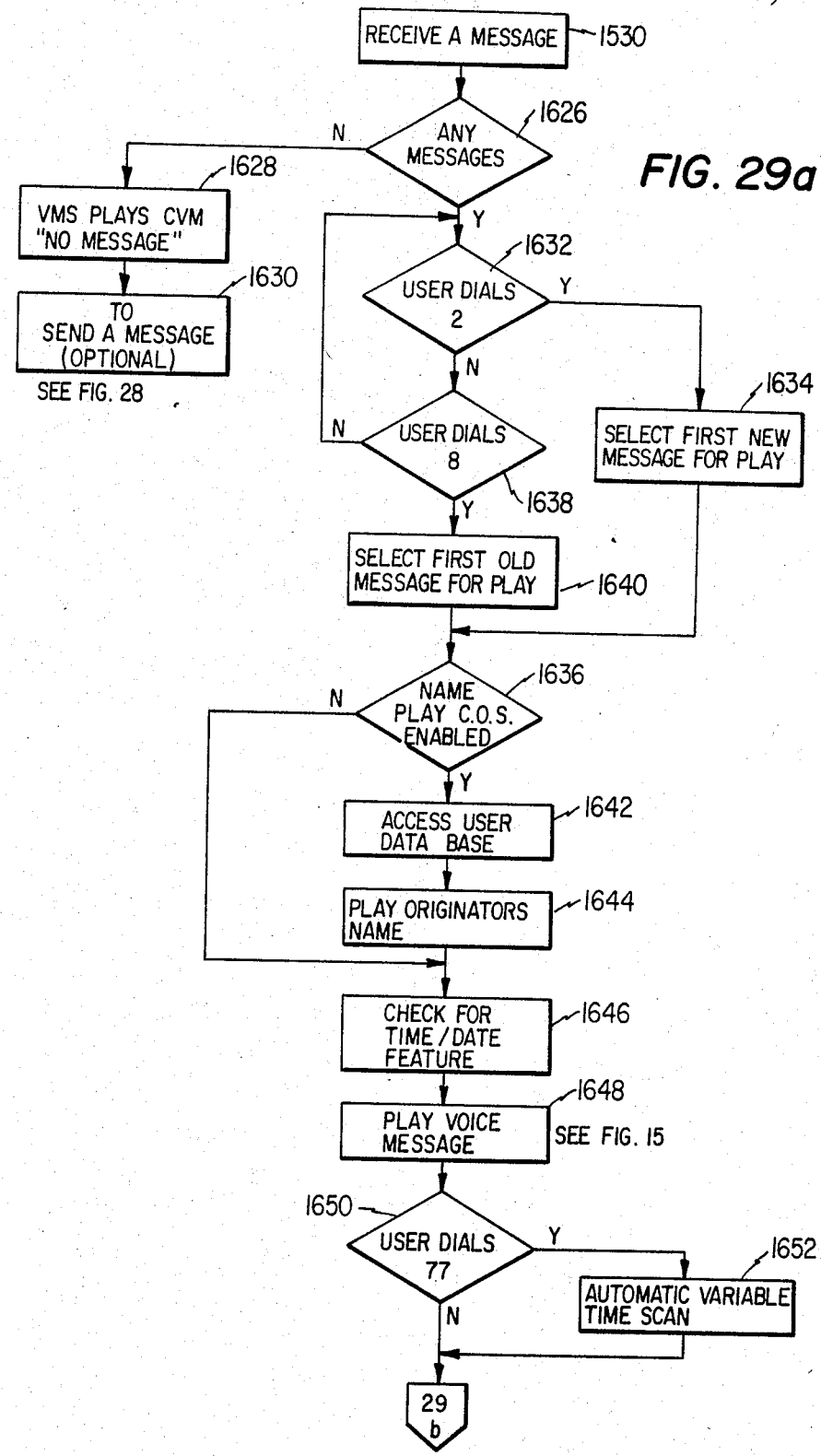
FIGS. 29a and 29b illustrate a flow chart of the send message subroutine in the flow chart of FIGS. 27a and 27b.
Figure 29B:
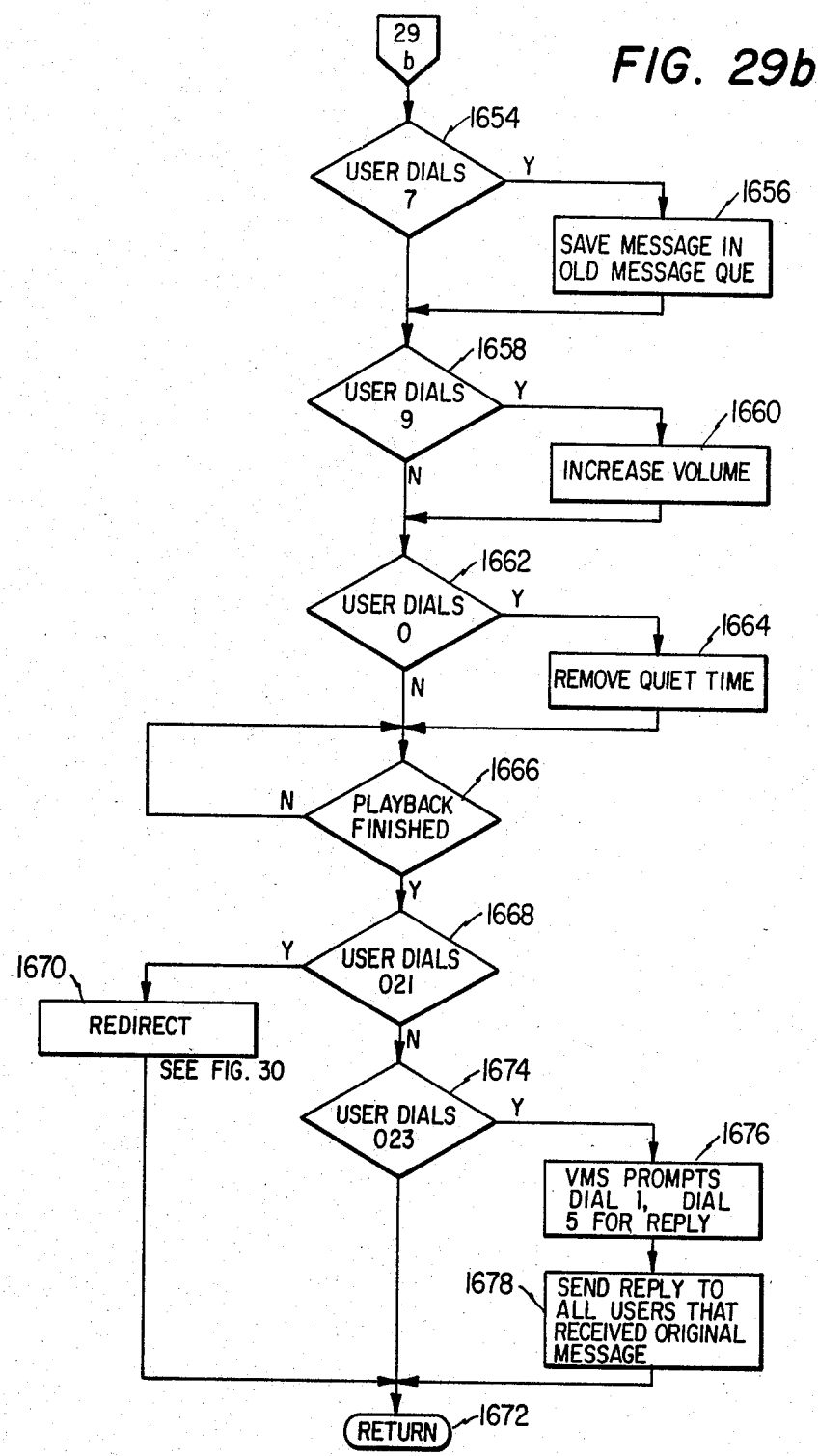

The decision block 1528 decides whether the AUTO INQUIRY function is activatd. AUTO INQUIRY is a primitive of the user's C.O.s. and enables the user to automatically bypass the requirement for inputting a Special Function Code (SFC) to receive messages. If AUTO INQUIRY is turned on, the flow chart proceeds along the "Y" path to a function block 1530 labeled RECEIVE A MESSAGE which will be described hereinbelow with reference to FIGS. 29a and 29b. If AUTO INQUIRY is not on, the program flows along the "N" path to a decision block 1532 to decide if the user has dialed any digit except "0". If the user had dialed "0", the program flows along the "N" path to a decision block 1534. The decision block 1534 decides whether the user has dialed the digits "011". If the digits "011" have been dialed, the program proceeds along the "Y" path to the input of the function block 1530 to enable the user to receive messages. If the user has dialed digits other than "011", the program returns along the "N" path thereof. The decision blocks 1532 and 1534 are the primary logic steps that the AUTO INQUIRY feature in decision block 1528 eliminates and, as such, the need to dial "011" to receive messages that are deposited is eliminated by AUTO INQUIRY. When AUTO INQUIRY is activated, after the user I.D. has been processed and a possible password entered, VMS automatically checks to see if there have been any messages deposited for the user, as will be described hereinbelow with reference to FIGS. 29a and 29b.

Referring back to the decision block 1522, if the user dials a digit other than "0", the program flows along the "Y" path to a function block 1536 labeled SEND A MESSAGE. The SEND A MESSAGE function block 1536 is operable to allow the user to record a message for deposit in another user's mailbox or for delivery to a non-user, as will be described hereinbelow with reference to FIG. 28. After a message has been deposited, the program returns to the input of the decision block 1528.

Name Play

After the user has opted to either send a message or to receive a message already deposited in his message address, the program proceeds to a decision block 1538 to decide whether the user desires to activate the NAME PLAY feature. This feature allows the user to listen to the name of the message originator in the message originator's own voice. The message originator's name is prerecorded by the originator-user himself for retrieval with each message that the originator deposits in a recipient's message address. When a message is retrieved from a user's message address, the message begins with the name of the originator and then proceeds to the remaining text of the original message. For example, a user retrieving a message would hear "Hi, this is John Doe" followed by the full text of the message. This feature allows the user to determine if he wants to hear the remaining portion of the message or to save that message and go on to another message. In addition, this feature allows the user to skip through a plurality of messages that may be in his message address and only listen to those messages by a particular originator. An important aspect of this feature is that the originator's name is voiced by the originator himself. This provides both a more humanized greeting than the voice of VMS itself and an aural recognition of the originator. This aural recognition permits a user to terminate the message merely by the sound of the originator's voice before the entire name is heard. It should be understood that once the originator-user deposits his name in the user's data base, this feature is available to all recipients of messages from the originator-user that have the NAME PLAY feature available in their C.O.S.

If the NAME PLAY feature is activated, the program flows along the "Y" path to a decision block 1540. The decision block 1540 inquires as to whether a NAME PLAY C.O.S. is activated. If the C.O.S. is activated, the program flows along the "Y" path to a decision block 1542 to decide whether the NAME PLAY feature is enabled or not. If the NAME PLAY feature is enabled, the program flows along the "Y" path to a function block 1544 that turns off the NAME PLAY feature and then returns to the main program. If the NAME PLAY feature is not enabled, the program flows along the "N" path to a function block 1548 that turns on the NAME PLAY feature and then returns to the main program. If the NAME PLAY C.O.S. has not been activated, the decision block 1540 returns to the main program thus preventing a particular user that has not purchased this C.O.S. from accessing this feature. As described hereinabove, a particular C.O.S. must be activated from the central office and not by a particular user.

Name Record

If the user having the NAME PLAY feature in his C.O.S. does not request the feature, the program proceeds to a decision block 1550. The decision block 1550 decides whether the user has requested a feature termed NAME RECORD. NAME RECORD is the step whereby a user's name is deposited in the VMS memory banks for transmittal with each of the user's deposited messages. If the user requests the NAME RECORD feature, the program flows along the "Y" path to a decision block 1552 that decides whether the NAME PLAY C.O.S. is activated. If this C.O.S. is not activated, the program flows along the "N" path and returns to the main program and if this C.O.S. is activated, the program flows along the "Y" path to a function block 1554 wherein VMS prompts the user to record his name. The program then flows to a function block 1556 where the user dials a "1" and then to a function block 1558 where the user speaks his name. It should be understood that the user can introduce any message he desires at this point within reasonable limits depending upon his particular requirements, that is, it does not necessarily have to be the user's name. After the user has deposited his name and/or message, the program flows to a function block 1560 where the user dials a "5" to advance the program to a function block 1562 where the VMS stores the spoken name and/or address in the user's data base. The program then returns to the main program at the "N" path of the decision block 1550.

At certain times, a particular user may not desire to listen to the spoken name of each of the message originators that has deposited messages in the user's mailbox. This is the purpose of the toggle operation of the function blocks 1544 and 1548, namely, the user can turn off this function if he so desires. It should be understood that when the NAME PLAY feature is enabled, a user must listen to at least one name before he can terminate this feature. However, normally the system is initiated in the disabled mode such that a user must actively enable the feature to have it present.

Group Codes

If the NAME RECORD feature is not selected, the program flows from the decision block 1550 along the "N" path to a decision block 1564. The decision block 1564 decides whether a user has dialed the command for GROUP CODES. If the user has requested GROUP CODES, the program flows along the "Y" path to a function block 1566 to a USER CHANGEABLE GROUP CODE feature that is described hereinbelow with reference to FIG. 31. The program then returns to the main program.

Enter New I.D.

If the user has not dialed the command for GROUP CODES, the program flows along the "N" path to a decision block 1568. The decision block 1568 decides whether the user has dialed the SFC "056". If the user has dialed this SFC, the program flows along the "Y" path and returns to the input of the function block 1520 to reprocess the user I.D. The purpose of the decision block 1568 is to allow a user the option to enter a new I.D. without having to exit the program, terminate the telephone connection and reaccess the VMS. The primary purpose for this feature is for users who have a number of different addresses to access a different address without having to disconnect and reconnect to VMS. One reason for a user having a number of different addresses is to possess addresses that are not listed in the general directory, thereby affording the user the luxury of a "private" line. This is similar to having an unlisted phone number for a separate phone in an office.

If the user does not desire to enter a new user I.D., the program then flows along the "N" path to a decision block 1570. The decision block 1570 decides whether the user has dialed the SFC "057". If the user has dialed this SFC, the program flows along the "Y" path to a function block 1572 that is a subroutine for retrieving the address list that was entered by the user while he was sending his previous message. This address is used in sending the next message. This allows a user to send another message to the previous addressee or even a group of addressees without having to reenter an address. After the address list has been retrieved, the program proceeds to a function block 1574 which routes the program into the SEND A MESSAGE program of FIG. 28, as will be described hereinbelow.

If the user has not dialed the SFC for the address retrieval feature, the program flows along the "N" path to a decision block 1576. The decision block 1576 decides whether the user has dialed the SFC "054". This SFC is for inputting a new password for later processing in the decision block 1522 and the function blocks 1524 and 1526. If a new password is desired, the program proceeds along the "Y" path to a function block 1578 wherein VMS requests a new password from the user and then proceeds to a function block 1580 where the user inputs the new password which is stored in VMS. The program then returns to the main program at the "N" path of the decision block 1576 which would be followed if the SFC for the new password were not dialed. The program of FIG. 27 then proceeds to a return block 1582 to return to the main program for the system.

Priority Hold

The PRIORITY HOLD feature allows a user to place VMS in a mode wherein a priority message can be automatically relayed to the telephone of the user. For example, if VMS were instructed to give priority to messages from user "X", VMS would automatically dial the user's telephone rather than deposit the message in user's address, thereby forcing delivery of the message. In this manner, the user has immediate access to messages from desired users. There are four criteria that a user can utilize to instruct VMS to force deliver the messages to the user. The criteria are as follows:

(a) Any priority or non-priority voice messages in user's message address.

(b) Any priority voice messages in user's message address.

(c) Any priority or non-priority voice messages from a particular addressee in user's message address.

(d) Any priority voice message from a particular addressee in user's message address.

The priority nature of a message is determined by an SFC input by the originating user of the message. If this SFC is input to VMS when the message is recorded, the nature of the message is then priority and will be transferred according to the above criteria. For example, in a corporate environment, there are many situations which require immediate attention from a supervisor. By placing a priority nature on a voice message, a user can insure that the voice message is handled in an expedient way. However, it should be understood that it is necessary for the selected recipient to input the proper SFC to select immediate receipt of a priority voice message.

Time—I.D. Validity

The TIME—I.D. VALIDITY feature provides a user the versatility to determine a "window" within which a selected recipient can receive a message. An SFC is input to access this feature, and then an analog prompt from VMS asks for the time and date after which VMS should attempt to deliver the message to the selected recipient's address for access thereof. If the user desires to send the message only after a certain date, he inputs a time and day. However, if the user does not desire to restrict the time and day at which VMS first attempts to deliver the message, he inputs another SFC to bypass this portion of the feature. VMS then prompts the user to enter a time and day wherein the messages will be deleted. This in effect prevents "stale" messages from being delivered to a recipient who may, for some reason, be unavailable.

Shared System

SHARED SYSTEM is a feature that allows a plurality of companies or users to share a common VMS. This situation occurs, for example, where a company does not have a requirement for storing a great deal of messges. As the storage capability of a VMS is finite, only a certain number of messages can be stored at any given time. By sharing the memeory space, a large number of users can utilize the same memory space and even the same user I.D.'s. The various ports that are available on a VMS system must be divided among the companies. This is the only restriction that the companies have. In addition, the different companies can acess users between the companies. This requires only an intercompany transfer code followed by the message address of the user in the adjacent company.

Figure 28:
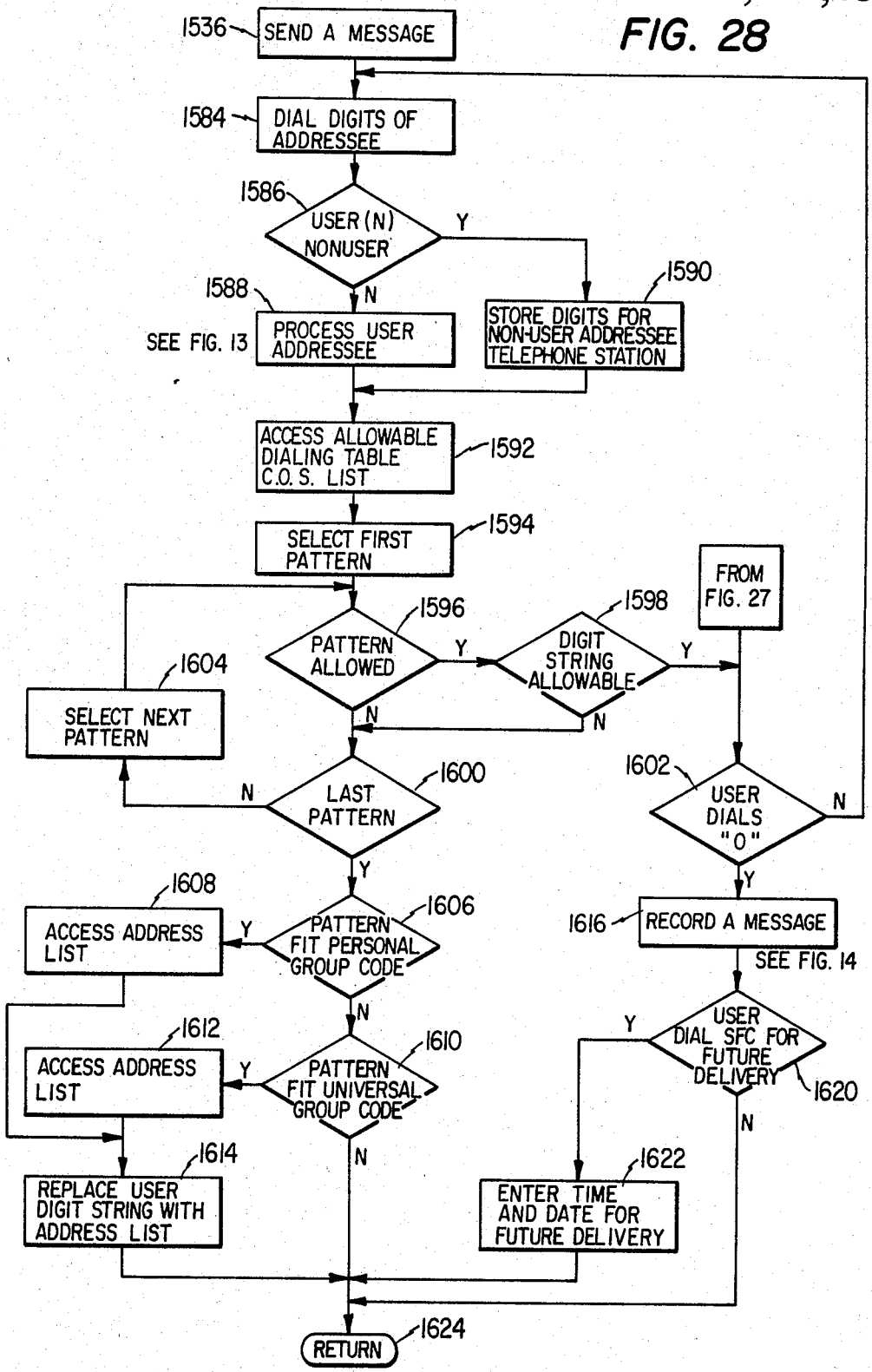
FIG. 28 is a flow chart of the message receipt subroutine in the flow chart of FIGS. 27a and 27b.

Referring now to FIG. 28, there is illustrated the flow chart for the SEND A MESSAGE function of function block 1536 of FIG. 27. The program flows from the function block 1536 to a function block 1584, wherein the digits of an addressee are entered by the user. After the digits are entered, the program flows to a decision block 1586 to decide whether the digits are for a user or for a non-user. A user would have digits that are stored and would have a mailbox that a message could be deposited in. A nonuser, unlike the user, must have the message delivered directly to him rather than deposited in a message address. If the message addressee is a user, the program proceeds along the "N" path to a function block 1588 to process the user addressee.

The function block 1588 is similar to the subroutine depicted in FIG. 13. If the message addressee is a nonuser, the program proceeds along the "Y" path to a function block 1590 where the digits for the non-user addressee's telephone station are stored in the VMS system.

Restricted Dialing Pattern

After the addresses for the user or non-user are processed, the program flows from the function block 1588 or 1590 to the input of a function block 1592 where the VMS system accesses the allowable dialing table C.O.S. list. This allowable dialing list provides the VMS system with the capability of restricting the access that a user has to the telephone systems. For example, some users may have the ability to command VMS to dial long-distance phone numbers to reach a particular message addressee. However, long-distance calls require additional expense, and, as such, must be accounted for in the C.O.S. that a user is entitled to. This restriction can apply to the user's access of long-distance users, local users, local non-users, networking (described hereinbelow), and many other features.

Once the allowable dialing table has been retrieved, the program proceeds to a function block 1594 wherein the first pattern is selected. After selection, the program proceeds to a decision block 1596 to decide if the pattern is allowed. If allowed, the program flows along the "Y" path to a decision block 1598 and if disallowed, it flows along the "N" path to a decision block 1600. The decision block 1598 decides whether the digit string itself is allowable and if so, the program proceeds to a decision block 1602 and if disallowed, the program proceeds along the "N" path to the input of the decision block 1600.

Personal Group Codes

In the situation where the pattern is disallowed the program proceeds to the input of the decision block 1600 where a decision is made as to whether the pattern is the last pattern in the dailing table. If there are additional patterns to compare the addressee's address with, the program proceeds along the "N" path to a function block 1604 to select the next pattern and then returns to the input of the decision block 1596. Once the last pattern has been processed, the program flows to a decision block 1606 along the "Y" path to decide if the pattern fits within the PERSONAL GROUP CODE pattern. PERSONAL GROUP CODE is a feature that consists of a group of addresses associated with a particular user and has a pattern that is delineated by the particular user. This pattern is normally input by the system operator as a "customized" feature that essentially associates a pattern of digits with the user's I.D. such that a user can access stored information with these digits. PERSONAL GROUP CODES would be oriented toward things such as lists of members on a bowling team or the tennis team or some committee that the user is on himself. This is generally a short list or group of people that would be of interest only to a particular user. As will be described hereinbelow, this group code can be altered by the user adding or deleting names therefrom.

Universal Group Code

If the pattern fits the personal group code pattern, the program flows along the "Y" path to a function block 1608 to access the address list. If the pattern does not fit, the program proceeds along the "N" path to a decision block 1610 that decides whether the pattern fits a UNIVERSAL GROUP CODE pattern. The UNIVERSAL GROUP CODE pattern is similar to the PERSONAL GROUP CODE except that it is a permanent group code that is normally set up by a company that owns the VMS system. This type of group code would contain groups like all department managers, all supervisors or all officers and these groups are accessible by all users associated with the user's data base. The PERSONAL GROUP CODE, on the other hand, is only accessible by the user within the restrictions of the group code pattern set up by that user. If the pattern does fit the UNIVERSAL GROUP CODE pattern, the program proceeds along the "Y" path to a function block 1612 that accesses the address list. Once the address list is accessed in either function block 1608 or 1612, the program proceeds to a function block 1614 where the user digit string is replaced with the address list. The program then returns to the main program.

Referring back to the decision block 1598, if the digit string were allowable, the program would proceed along the "Y" path to the input of the decision block 1602. The decision block 1602 determines whether the user had dialed an SFC "0" that determines whether the user wishes to record a message or not. If the user wishes to record a message, the program flows along the "Y" path to a function block 1616 which is similar to the subroutine of FIG. 14 to record a message. If the user does not wish to record a message, the program returns to the input of the function block 1584 to dial the digits of a new addressee.

Future Delivery

After a message has been recorded in function block 1616, the program proceeds to a decision block 1620 to decide if the user has dialed the SFC for FUTURE DELIVERY. The FUTURE DELIVERY feature allows the user to specify a time and date in the future when the message should be delivered. This even allows a user to ring his own telephone at a predetermined time. Within reasonable constraints, this time can be on the order of days, weeks or months. If the FUTURE DELIVERY SFC has been entered, the program flows along the "Y" path to a function block 1622 wherein the time and date for delivery are entered and if the feature is not selected, the program flows to the input of a RETURN block 1624. The program also flows to the RETURN block 1624 from both the decision block 1610 and the function block 1614 along the "N" path thereof.

Referring now to FIG. 29, there is illustrated a flow chart for the RECEIVE A MESSAGE subroutine of function block 1530 of FIG. 27. After the RECEIVE A MESSAGE subroutine has been entered, the program flows to a decision block 1626 to decide if there are any messages present that are addressed to the user. If there are no messages present, the program flows to a function block 1628 wherein VMS plays the CVM "No Message" and then proceeds to a function block 1630. The function block 1630 transfers the program to the SEND A MESSAGE subroutine 1536 of FIG. 28 so that the user has the option to send a message if there are no voice messages delivered to his address. It should be understood that this is also a function of the AUTO INQUIRY feature of decision block 1528 of FIG. 27 in that if AUTO INQUIRY is on, the program proceeds into the RECEIVE A MESSAGE subroutine and then proceeds out of the RECEIVE A MESSAGE subroutine to the SEND A MESSAGE subroutine.

Old and New Message Que

If there are messages, the program proceeds along the "Y" path out of the decision block 1626 to a decision block 1632 to decide if the user has dialed the SFC "2". This SFC decides whether to select a new message from a NEW MESSAGE QUE. If the user desires a new message, the program proceeds along the "Y" path to a function block 1634 that selects the first or the most recent new message for play. The NEW MESSAGE QUE is actually an accumulation of new messages deposited by other originators in addition to non-delivered messages that have a non-delivery notification attached (NDN). After the message is played and the user saves the message, the message is then inserted into an OLD MESSAGE QUE and the program proceeds to the input of a decision block 1636.

If the user does not desire to listen to new messages, the program proceeds to a decision block 1638 to decide if the user has dialed the SFC "8". This SFC determines if the user wishes to select an old message from the OLD MESSAGE QUE for replay. If the user does not desire to listen to an old message, the program proceeds along the "N" path to the input of the decision block 1632 to again allow the user the option of selecting a new message. If the user desires to select an old message, the program proceeds along the "Y" path to a function block 1640. The function block 1640 selects the first old message from the OLD MESSAGE QUE for replay and then deletes the message. However, a user can save the old message, but this message then becomes the last message in the list. The NEW MESSAGE QUE and the OLD MESSAGE QUE allow the user to distinguish between two types of messages, new messages and old messages. In addition, the NDN messages are also stored in the NEW MESSAGE QUE. This allows the user to listen to only new messages if he desires without having to stumble through the old messages that have been stored for later replay.

After listening to any messages present, the program proceeds to a decision block 1636 that determines whether the NAME PLAY C.O.S. is enabled. If the NAME PLAY C.O.S. is enabled, the program proceeds along the "Y" path to a function block 1642 wherein the user's data base is accessed to retrieve the name of the originator that is associated with the particular message deposited in the user's maibox. Once the name has been accessed, the program proceeds to a function block 1644 where the originator's name is played. The program then proceeds to a function block 1646 and the time/date feature is implemented whereby VMS outputs the time and date of the message. If the NAME PLAY C.O.S. is not enabled, the program proceeds along the "N" path of the decision block 1636 to the input of the time/date function block 1646 to bypass the NAME PLAY feature.

Variable Time Scan

After the originator's name and the time/date have been output by VMS, the voice message is played as indicated by a function block 1648 that is a subroutine similar to that depicted in 1616. Once the voice message has been output, the program then proceeds to a decision block 1650. The decision block 1650 determines whether the user has dialed an SFC 77 that determines whether the AUTOMATIC VARIABLE TIME SCAN feature is to be utilized. If this feature is desired, the program flows along the "Y" path to a function block 1652 that implements the feature and allows the user to specify a predetermined portion of the message in time units to be played for each message. In this manner, a user can increment through each of the messages in his address without having to listen to the whole message. The operation of this feature will be described hereinbelow with reference to FIG. 31.

If AUTOMATIC VARIABLE TIME SCAN is not selected, the program flows along the "N" path to the input of a decision block 1654. Also, the output of the function block 1652 flows to the input of the decision block 1654. The decision block 1654 decides whether the user has dialed an SFC "7" which allows the user to save a message in the OLD MESSAGE QUE. If a user decides to save the message, the program flows along the "Y" path to a function block 1656 and the message is saved and then the program returns to the input of a decision block 1658.

Variable Volume

If the user does not desire to save the message, then the program flows along the "N" path of the decision block 1654 to the input of a decision block 1658 to decide whether the user has dialed an SFC "9" for varying the volume. If the user desires to increase the volume, the program flows along the "Y" path to a function block 1660, and the volume is increased by an incremental amount, and then the program proceeds to a decision block 1662. If the user does not desire to increase the volume, the program flows along the "N" path to the decision block 1662. The volume increase is realized by generating a command that is input to both the circuit micro and the circuit analog boards of FIG. 25 and 26 to increase the level of the output signal.

Variable Speed

The decision block 1662 decides if the user has dialed an SFC "0". If the user has dialed the SFC, the program proceeds along the "Y" path to a function block 1664. The function block 1664 commands the VMS system to remove "QUIET TIME" from the audio message. This function provides a quasi-variable speed function whereby events such as pauses or hesitations in the voice message are not transmitted. The operation of this feature is described in more detail hereinbelow with reference to FIG. 33. After the QUIET TIME has been removed, the program proceeds to the input of a decision block 1666. If the user does not desire to remove QUIET TIME, the program flows along the "N" path from the decision block 1662 to the decision block 1666. The decision block 1666 decides whether the playback has finished and, if so, the program proceeds along the "Y" path, whereas if the playback has not finished, the program proceeds along the "N" path back to the input of the decision block 1666. The "N" path provides a looping function that, because of the finite clock period of the system's central processing unit, a time delay occurs for each loop thereof.

Once the playback has finished, the program proceeds to the decision block 1668. The decision block 1668 decides whether the user has dialed an SFC "021". If the user has dialed this SFC, the program proceeds along the "Y" path to a function block 1670 to implement a REDIRECT feature which is described hereinbelow with reference to FIG. 30. After the REDIRECT feature has been implemented, the program proceeds to a return block 1672.

Group Reply

If the REDIRECT feature is not desired, the program flows from the decision block 1668 along the "N" path to a decision block 1674. The decision block 1674 decides whether the user has dialed an SFC "023". If the user has dialed this SFC, the program proceeds along the "Y" path to a function block 1676 wherein VMS prompts the user to dial 1 to acknowledge and then dial "5" to reply to the message. The program then proceeds to a function block 1678 where the user sends a reply to all users that received the original message. The function blocks 1676 and 1678 provide the feature termed GROUP REPLY. The GROUP REPLY feature is a feature that is activated after the message is received and normally used in a committee situation. For example, after a message has been replied to, the GROUP REPLY command would send the reply to every person that had received the original message. Of course, the original group that receives the message is determined by the originator. This feature is available to everybody that received the original message such that each recipient can send and receive replies. It should be understood that these replies only go to the members of the group and not necessarily to the originator of the message unless he also is a member of the group. To send the messages selectively to the other members of the group or to other users in general, the REDIRECT feature in function block 1670, as will be described hereinbelow, is utilized. If the user does not desire to reply, the program flows from the decision block 1674 to the return block 1672. This is also the terminating point for the program after a reply has been sent to the group.

Redirect

Figure 30:
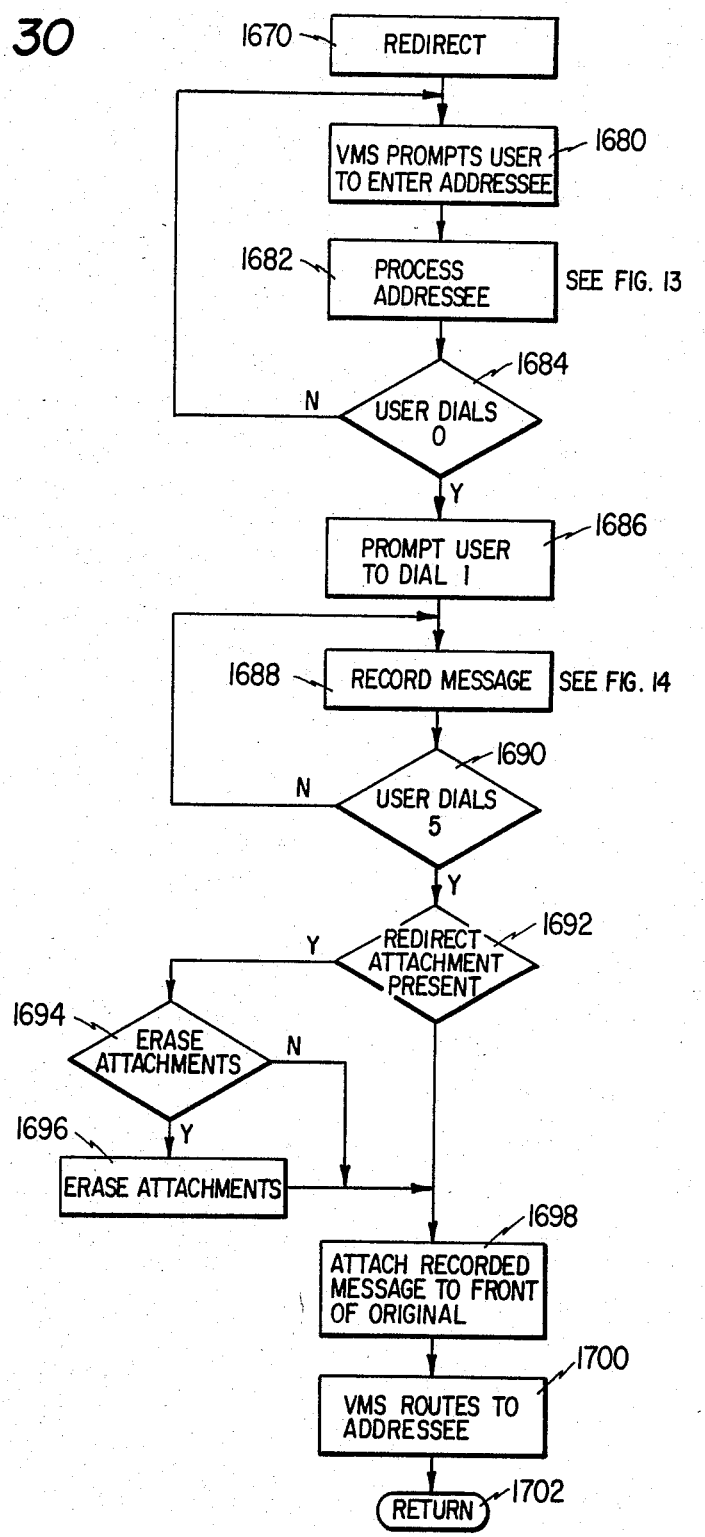
FIG. 30 is a flow chart of the redirect feature.

Referring now to FIG. 30, there is illustrated a flow chart for the REDIRECT feature illustrated by the function block 1670 FIG. 29. After the program has entered into the subroutine for REDIRECT, the program flows to a function block 1680 that prompts the user to enter the digits for the addressee. The program then proceeds to a function block 1682 to process the addressee, which is similar to the subroutine depicted in FIG. 13. After the addressee has been processed, the program flows to a decision block 1684 to determine if the user has dialed the SFC "0". If "0" has been dialed, the program flows along the "Y" path to record the message and if the user has not dialed "0", the program proceeds along the "N" path to return to the input of the function block 1680. After the addressee has been processed and the user has dialed the SFC to record the message, the program proceeds to a function block 1686 wherein VMS prompts the user to dial an SFC "1" to record a message. The program proceeds then to a function block 1688 to record the message in the manner similar to that depicted by the subroutine flow chart in FIG. 14. To exit the record mode, the user dials the SFC "5". This is depicted by a decision block 1690 that proceeds along an "N" path to the input of the RECORD MESSAGE function block 1688 until the SFC "5" is dialed wherein the program proceeds along the "Y" path to a decision block 1692.

The decision block 1692 decides whether a REDIRECT attachment is present. The REDIRECT attachment is a previously-recorded message that is attached to the original message by another user. For example, when user A wants user B to hear a message that was delivered to user A from user C, user A would add a short introductory message to the message such as, "Hi user B, this is user A and I would like you to hear this message I received from user C." If the REDIRECT attachment is present, the program proceeds along the "Y" path to a decision block 1694 to decide whether the messages that are attached to the original message should be erased. This is a procedure whereby VMS would prompt a user to decide whether he wishes to leave the previously-attached message intact. If the user desires so, then the program proceeds along the "N" path but, if the user desires to erase the attachment, then an SFC is entered and the program proceeds along the "Y" path to a function block 1696 where the attachments are erased. After the attachments are either erased or left intact, the program proceeds back to the main program, and input to a function block 1698.

If the REDIRECT attachment was not present in the first place, the program would proceed from the decision block 1692 along the "N" path to the function block 1698 wherein the recorded message is attached to the front of the original message. After the message has been attached, the program proceeds to a function block 1700 wherein the VMS routes the original message with the attached messages to the particular addressee. The program then proceeds to a return block 1702 to return to the main program of FIG. 29.

If a user desires to retain the previously-attached messages when he redirects the original message to another user with a new attached message, the REDIRECT function allows him to do so. For example, user A sends a message to user B who redirects the original message to user C with an attached message. At this point, user C has two options; first he can redirect the original message with only his attached message to a fourth user, user D, or, second, user C can redirect the original message to user D with both user B's attached message and his own attached message. This allows a series of users/recipients to sequentially redirect an original message and yet retain all of the attached messages in the string of redirecting users. Although a function block 1698 indicates that each of the attached messages precede the original message, it should be understood that the previous messages can be attached to the back of the original messages and only the presently-recorded attached message is attached to the front of the original message. In addition, the original message can be redirected to the originator.

User Changeable Group Codes

Figure 31:
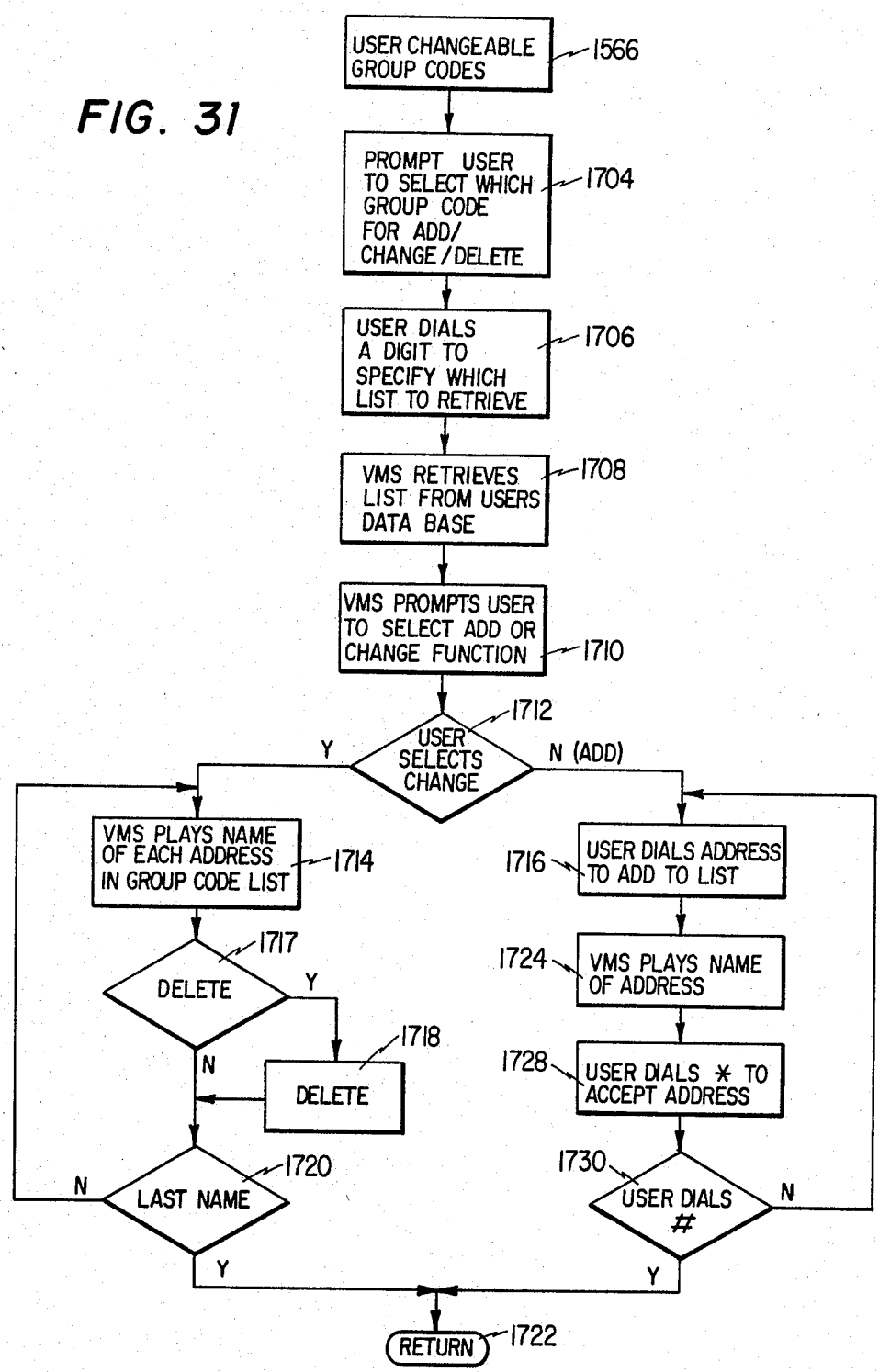
FIG. 31 is a flow chart of the user changeable group codes feature.

Referring now to FIG. 31, there is illustrated a flow chart for the USER CHANGEABLE GROUP CODES of function block 1566 of FIG. 27. After the user has selected the SFC for changing a group code, the program proceeds to a function block wherein the VMS prompts the user to select which group code he desires to add, change or delete. The program then proceeds to a function block 1706 where the user dials the digits to specify the list to retrieve. After the digits have been dialed, the program proceeds to a function block 1708 where VMS retrieves the list from the user's data base. It should be understood that the user must have the proper C.O.S. that makes this feature available to him in order to access a particular list. The type of lists that would be stored in the user's data base would be such things as personal committees that the user is on, lists of the tennis team or the soccer team and even social club lists.

After the particular list is retrieved from the user's data base, the program then proceeds to a function block 1710 wherein the VMS prompts the user to select the ADD or CHANGE function. The program then proceeds to a decision block 1712 to decide if the user has entered the SFC to select the CHANGE function. If the CHANGE function has been chosen, the program proceeds along the "Y" path to a function block 1714. If the user has not chosen the CHANGE function, that is, the user has dialed digits different from the SFC, the program flows along the "N" path to a function block 1716. If the user desires to change the list, the "Y" path is followed and the function block 1714 is where the VMS sequentially plays the name of each address in the group code list. For example, if the list were the members of a tennis team, then each name on the tennis team would be sequentially played and voiced by the VMS system. After each of the names has been played, the program proceeds to a decision block 1717 that inquires whether the user wishes to delete the name. If the user wishes to delete the name, the program proceeds along the "Y" path to a delete function block 1718 and if the user wishes to retain the name, the program proceeds along the "N" path to a decision block 1720. To delete a name, the user has available to him an SFC as supplied to him by VMS as a prompt, or it is supplied to the user in the operating manual. The decision block 1720 decides whether the last name in the group code list has been played and, if so, the program proceeds along the "Y" path to a return block 1722. If there are names remaining in the group code list, the program proceeds along the "N" path to return to the input of the function block 1714 to increment the list and play the next sequential name.

When a user desires to add a name to the group code list, the program proceeds from the decision block 1712 along the "N" path to the function block 1716 wherein the user dials the address to be added to the list. After the user has added the address, an important aspect of the present invention is that VMS plays back the name of the addressee to the user, as indicated by a function block 1724. This provides feedback so that the user is certain that he has dialed the correct address. The program then proceeds to a function block 1728 wherein the user dials a "*" to accept the address. After the address is accepted and stored by VMS, the program proceeds to a decision block 1730 to decide if the user desires to exit this portion of the program. If the user does not wish to exit, the program automatically proceeds along the "N" path back to the input of the function block 1716. If the user wishes to exit the route comprised of the function blocks 1716, 1724 and 1728, the user dials a "#" and the program proceeds along the "Y" path to the return block 1722.

When a user desires to add an addressee to the group code list, the user enters the address of the addressee and VMS plays back the name of the addressee rather than the digits dialed. For example, if a user desires to access a list of all salesmen in one portion of the United States, he would retrieve this list and then enter the ADD portion of the subroutine. When the VMS prompts for an address, the user enters the address. VMS then responds with "The address you have dialed is for John Doe." This alleviates the requirement for the user to search through a directory or such to double check the address of a particular addressee since the USER CHANGEABLE GROUP CODE verbal feedback of the name of the addressee.

Variable Time Scan

Figure 32:
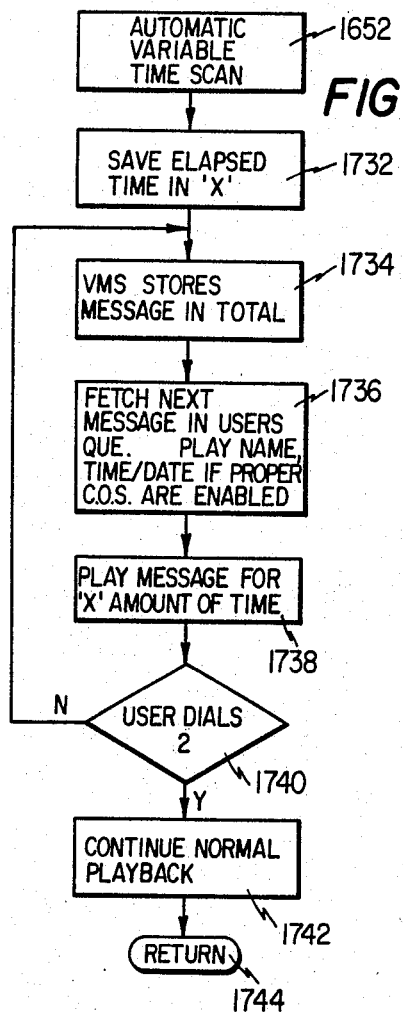
FIG. 32 is a flow chart of the automatic variable time scan feature.

Referring now to FIG. 32, there is illustrated a flow chart for the AUTOMATIC VARIABLE TIMESCAN feature of function block 1652 in FIG. 29. After the user has dialed "77", the program enters the subroutine for AUTOMATIC VARIABLE TIMESCAN. This SFC is normally dialed during the delivery of a message. The SFC is dialed after a user-determined amount of time has elapsed and the program proceeds to a function block 1732 wherein the length of time that the message has played is stored in the system memory in a position termed "X". Once this time is stored, the program proceeds to a function block 1734 wherein the message is saved in total. This is a similar procedure to the user dialing the SFC "7" to save a message. After the total message is stored, the program proceeds to a function block 1736 and the next message in the user queue is retrieved. After the message has been retrieved, the system plays the originator's name and the time/date stamp if the proper C.O.S. has been enabled, as shown in function block 1644 and 1646 of FIG. 29. After the preliminary attachments are played, the message itself is played out, but only for "X" amount of time as indicated by a function block 1728. After the message has played for "X" amount of time, the program proceeds to a decision block 1740 to decide whether the user wishes to proceed to the next message or to hear the remaining portion of the present message. If the user takes no positive action, the program proceeds along the "N" path to the input of the function block 1734 to save this message and retrieve the next message for playback for "X" amount of time. However, if the user decides that this message is of particular importance and wishes to receive the full text of the message, the user dials an SFC "2" and proceeds along the "Y" path to a function block 1742 that continues normal playback. After this message has been played, the program proceeds to a return block 1744 to return to the original program of FIG. 29 at the input of the decision block 1654.

The AUTOMATIC VARIABLE TIMESCAN feature affords the user a method by which he can determine the specific length of time that each message is to be played. For example, if the user has an inordinate number of messages in his message address, he can activate the feature after listening to a certain portion of the first message and he can save this amount of time. With no further action, the user can just listen to portions of each message in his message address until he hears one that he deems particularly important. This is a scanning function with a user-determined time factor that utilizes not only the time factor, but also the voice of the originating user. For example, if the user is searching for a message from a friend or business associate whose voice is familiar to him, it is only necessary to listen to a very short portion of the message in order to make an association.

Quiet Time Compression

Figure 33:
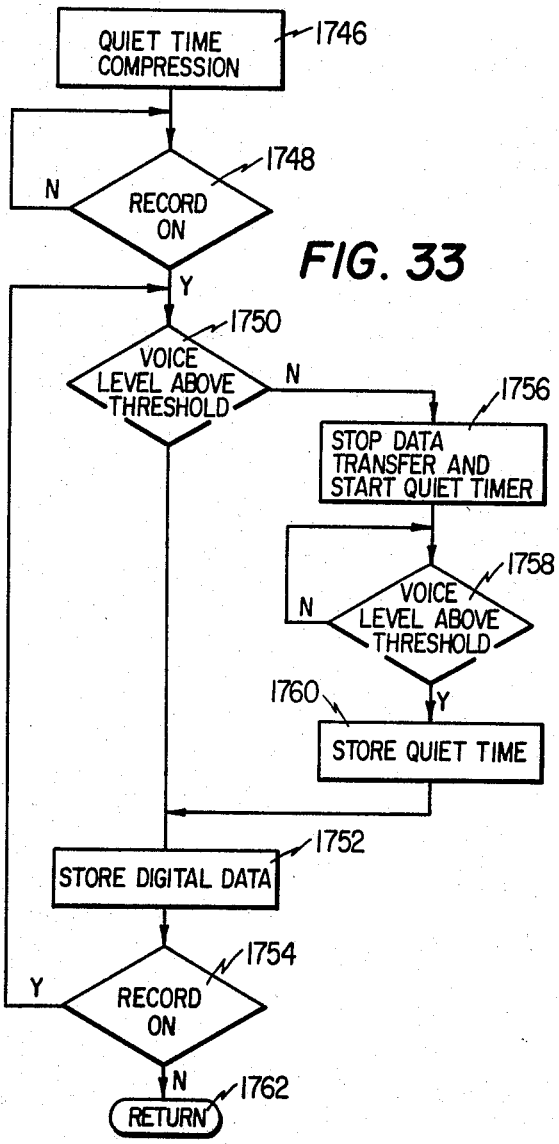
FIG. 33 is a flow chart of the quiet time compression feature.

Referring now to FIG. 33, there is shown a flow chart for QUIET TIME COMPRESSION 1746. QUIET TIME COMPRESSION is the ability of the VMS to remove periods of time from a recorded message during which there are pauses, low-level mumbling or generally inaudible sounds. The portion of the circuitry utilized for QUIET TIME COMPRESSION is found primarily in FIGS. 25a–25c. It is also somewhat software oriented in that the programmable gain amplifier 1044 controls a software timer in response to the level of the sound received. The outputs $\overline{L0}$–$\overline{L4}$ indicate five different levels that the software utilizes to detect level. By varying the gain of the programmable gain amplifier 1044 and sensing the level of the signal, VMS can compare the audio signal to an internal threshold and increment a timer whenever the audible signals fall below the threshold to store this time. It should be understood that the software timer for QUIET TIME COMPRESSION is referenced to the elapsed time such that the full message can be reconstituted. For example, if a message originator pauses after he has delivered approximately 10 seconds of his message, the duration of this pause must be added back to the message at the proper place in the message when it is reconstituted.

During recording of a message, as indicated by the "Y" path on a decision block 1748, the program proceeds to a decision block 1750 to decide whether the voice level is above the internal software threshold. If the voice level is above the threshold, the program proceeds along the "Y" path and the digital data corresponding to the voice message is stored as indicated by a function block 1752. The program then proceeds to a decision block 1754 to decide if the record mode is still on and, if so, proceeds along the "Y" path back to the decision block 1750. It should be understood that the QUIET TIME COMPRESSION 1746 is part of the RECORD MESSAGE block 1616 of FIG. 28 which is referenced to FIG. 14.

If the voice level falls below the threshold, the program proceeds along the "N" path of the decision block 1750 to a function block 1756 which stops recording the digital data and increments the QUIET TIME timer which, as described hereinabove, is a software timer. The program then proceeds to a function block 1758 that again determines if the voice level is above the threshold and, if so, the program proceeds along the "Y" path to a function block 1760 wherein the elapsed time of the QUIET TIME is stored in the VMS. It should be understood that the time that the QUIET TIME timer was activated is referenced to the point at which the storage of digital data was temporarily terminated. This allows the data to be reconstituted with all pauses and hesitation, et cetera. If the voice level remains below the threshold, the program goes into a looping function along the "N" path of the decision block 1750 to the beginning until the threshold has been exceeded. This is essentially a software timer that utilizes the finite clock cycles that are required to loop from the end of a decision block to the beginning as an amount of elapsed time.

Once the QUIET TIME has been stored, the program returns to the input of the function block 1752 to begin storing data again. The program then proceeds until the message has been completed and the RECORD function has been turned off and then follows the "N" path of the decision block 1754 to a return block 1762.

Edit

Figure 34:
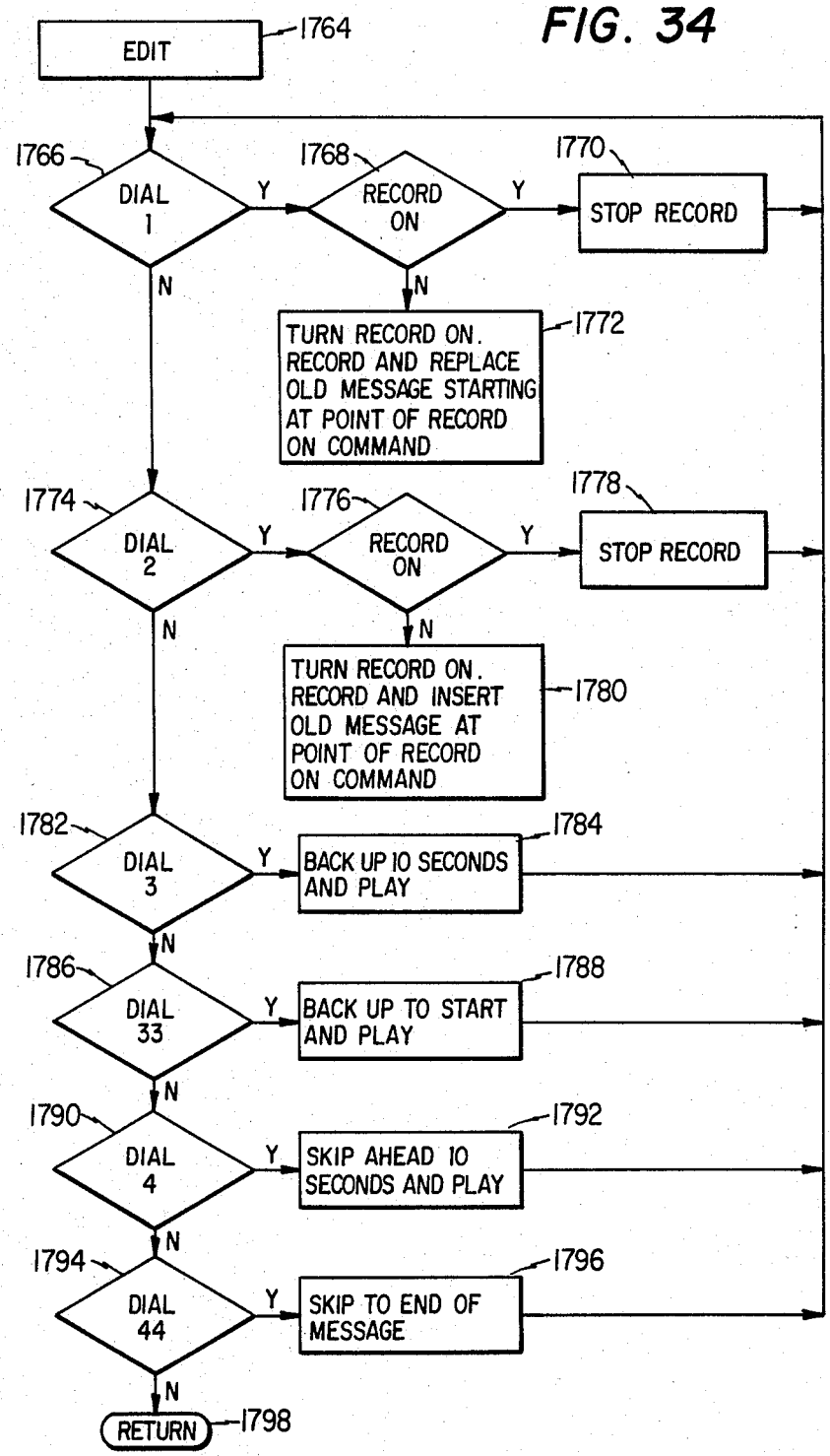
FIG. 34 is a flow chart of the edit feature.

Referring now to FIG. 34, there is shown a subroutine 1764 entitled EDIT. The EDIT feature provides a user with the versatility to manipulate the content of his message. The EDIT subroutine 1764 is part of the RECORD A MESSAGE function block 1616 of FIG. 28. During recording of a message, the program proceeds to a decision block 1666 to decide whether the user has dialed the SFC "1". If this SFC has been dialed, the program proceeds along the "Y" path to a decision block 1768 to decide whether the program is in the RECORD mode. If the program is in the RECORD mode, the program proceeds along the "Y" path to a STOP RECORD function block 1770 that turns the RECORD function off and stops storing digital message data. The program then returns to the input of the decision block 1766. If the RECORD function is on after dialing the SFC "1", the program proceeds along the "N" path of the decision block 1768 to a function block 1772 wherein the RECORD mode is turned on and a message is recorded and replaced over the old message at the point that the SFC "1" was dialed. This allows a user to record over his old message. For example, if a user desires to change a sentence in the middle of his message, this feature allows the user to record over only a portion of the message without having to delete the entire message and start over. Once the user begins recording, the program returns back to the input of the decision block 1766. If the user does not desire to either STOP RECORD or RECORD over his old message, the program proceeds along the "N" path to a decision block 1774 to decide if the user has dialed the SFC "2". If the user has dialed this SFC, the program proceeds to a decision block 1776 to decide whether the system is in the RECORD mode. If the system is in the RECORD mode, the program proceeds to a function block 1778 to stop recording and then returns to the input of the decision block 1766. If the system is not in the RECORD mode, the program proceeds along the "N" path to a function block 1780 wherein the RECORD mode is activated and a message may be inserted in the old message at the point that the SFC "2" was dialed. This feature allows the user to insert a new message in the middle of an old message. The procedure to return to the middle portion of the old message will be described hereinbelow.

If a user does not desire to insert a message, the program proceeds to a decision block 1782 to decide whether the user has dialed the SFC "3". If this SFC is dialed, VMS is instructed to back up ten seconds in the message and begin replaying the messages indicated by a function block 1784 and then the program returns to the input of the decision block 1766. If the SFC "3" has not been dialed, the program proceeds along the "N" path to a decision block 1786 to decide if the user has dialed the SFC "33". If this SFC has been dialed, VMS backs up to the start of the message and replays the message as indicated by a function block 1788. The message will continue to play until the user dials the SFC "1" to begin recording again. If the SFC "33" is not dialed, the program proceeds along the "N" path to a decision block 1790 that decides whether the user has dialed the SFC "4". If this SFC has been dialed, VMS is instructed to skip forward ten seconds in the message and begin playing as indicated by a function block 1792. If this SFC has not been dialed, the program proceeds along the "N" path to a decision block 1794 that decides whether the user has dialed the SFC "44". If this SFC has been dialed, VMS is instructed to skip to the end of the message as indicated by a function block 1796. The program then returns to the input of the decision block 1766 and, if the SFC "44" was not dialed, the program proceeds to a return block 1798.

In operation, the system will either be in a RECORD mode, a HOLDING mode, or a REPLAY mode. By dialing one of the SFCs in the program of FIG. 34, a user can manipulate the particular portion of the message that he wishes to hear and he can either record over this portion of the old message or insert a new audio message into the old message.

DID/ICH

Figure 35:
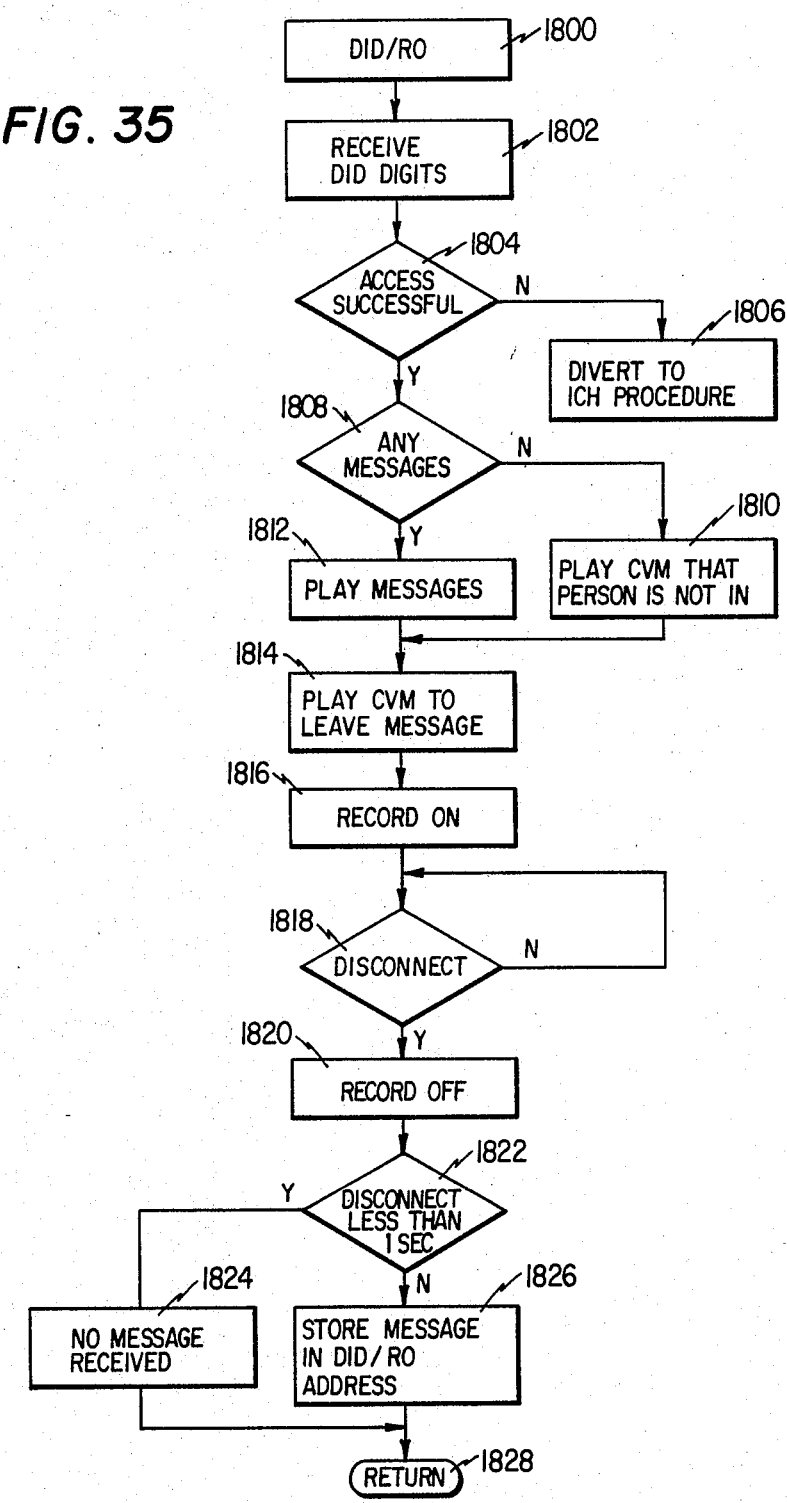
FIG. 35 is a flow chart of the DID/ICH feature.

Referring now to FIG. 35, there is illustrated a flow chart for Incoming Call Handling (ICH) on a Direct Inward Dial Line (DID). ICH is normally referred to as the message desk and a normal system refers callers that have been unable to access the system through a given I.D. to this message desk. DID is a special kind of telephone number that is purchased in blocks of 100 from the telephone company, for example, the numbers 987-4000 through 5000. The DID number has a characteristic that when anybody in the world dials one of these telephone numbers, the connection is made between the telephone company and the call instrument. Call instruments can be either a PBX or the VMS or a similar type system. The last three or four digits that are outpulsed by the telephone company indicate to the system the number that was dialed. For example, if a DID number were dialed to a PBX, the call would bypass the operator and ring the desired recipient's telephone directly.

Each of the users that is afforded the ICH/DID feature, must own a RECEIVE ONLY (RO) message address that is associated with the user's message address and is accessible to anyone dialing the particular DID that is associated with the user's RO message address. One application of the RO message address would be a "CALL FORWARDING" feature wherein the user forwarded his telephone number at home or at the office to his DID/RO number. This would then forward a call that was directed toward his home or office to his DID number thereby allowing the caller to access the messages stored in the RO message address. The caller would then hear the messages in the RO message address previously deposited by the user/owner and then, if the user/owner desires, be able to deposit a responsive message in the user/owner's message address.

Referring back to FIG. 27, a function block 1800 labeled DID/RO indicates the initiating block of the subroutine for handling the call. After the program is initiated, the DID digits are received as indicated by the function block 1802. Upon receipt of the digits, the program flows to a decision block 1804 to decide if the access was successful. If not successful, the program flows along the "N" path to a function block 1806 that diverts the caller to the normal ICH procedure which essentially allows the operator at the message desk to handle the incoming call. This may possibly be due to the fact that the user/owner forwarded the call to the wrong DID number or there was an error in the system. If the access was successful, the program flows along the "Y" path to a decision block 1808 to decide if there are any messages in the RO message address. If the user/owner has not deposited any messages in his RO message address, the program flows along an "N" patch to a function block 1810 that plays a CVM such as "This is the VMS answering service. The person you called is not in". The program then proceeds back to the main program. If there are messages in the RO message address, the program proceeds along the "Y" path to a function block 1812 and the messages in the RO message address are played. After messages are played, the program proceeds to a function block 1814 which is the same point that the program flows from the function block 1810 and a CVM is played to the caller such as "If you wish to leave a message, please do so at the tone. Hang up at the end of your message". The system then goes into the RECORD mode as indicated by the next sequential block 1816 to record any messages that might be input by the caller. The program then proceeds to a decision block 1818 to decide whether the caller has terminated the call. If the call has not been terminated, the program is looped back to the input of the decision block 1818 to an "N" path and if the call has been disconnected, the program flows along a "Y" path to a function block 1820 to turn the RECORD mode off. The program then proceeds to a decision block 1822 to decide if the disconnect occurred less than one second after the record mode had been turned on. If the disconnect occurred less than one second, the program flows along the "Y" path to a function block 1824 and the VMS system assumes that no message was received and does not store any message in the user's normal mailbox. However, if the connection was maintained more than one second after the record mode was turned on, the program flows along the "N" path to a function block 1826 and the message is stored in the user/owner's message address. The program flows from the output of the function blocks 1824 and 1826 to a RETURN block 1828 to return control of the system to the main program.

RO Deposit

Figure 36:
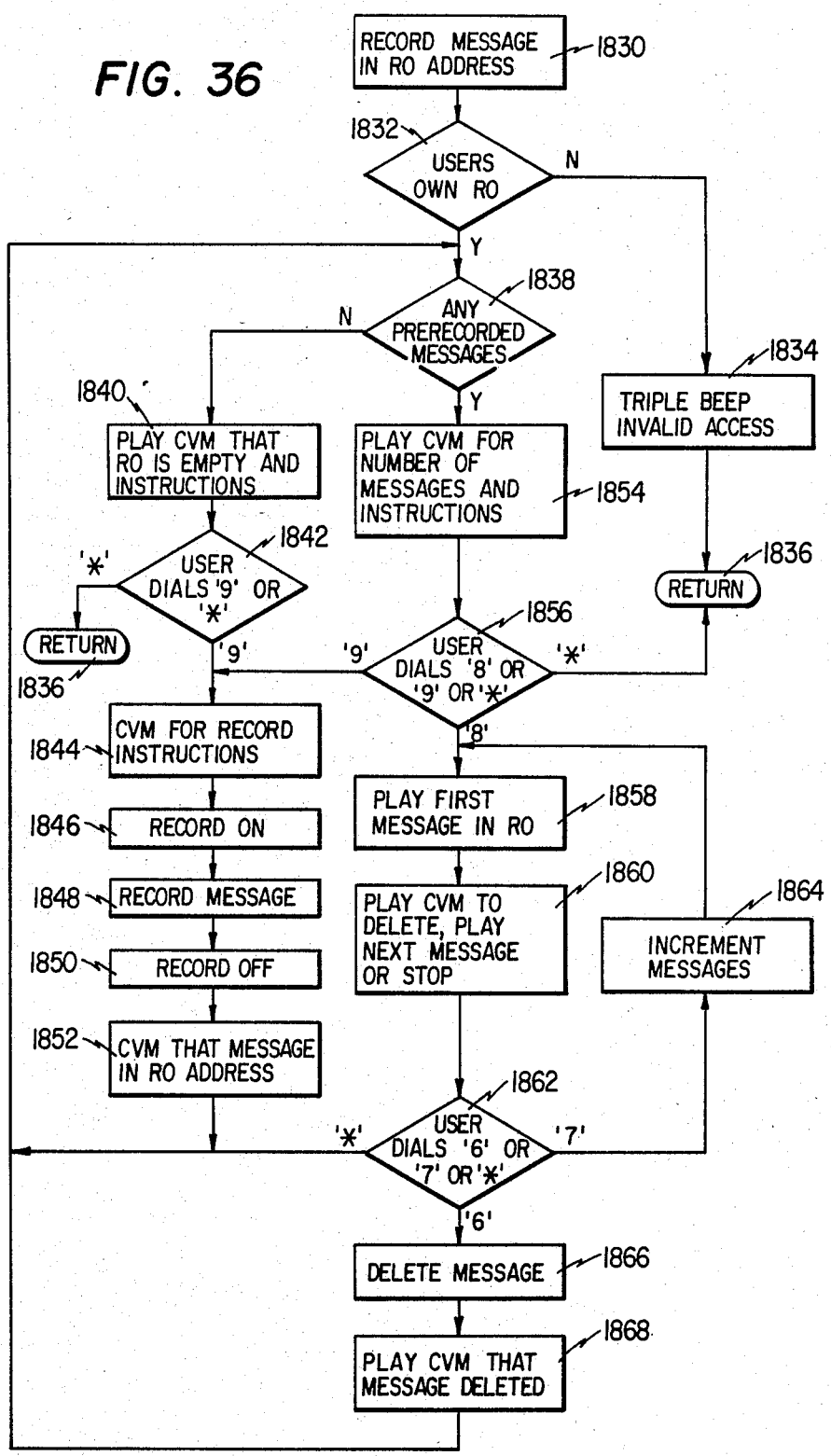
FIG. 36 is a flow chart of the RO message address recording feature.

Referring now to FIG. 36, there is illustrated a flow chart for the procedure to record a message in the user/owner's RO message address. This feature is activated in the main program of FIG. 27 by dialing an SFC having three digits starting with zero. If the user has dialed these digits, the program in FIG. 27 proceeds to the routine of FIG. 36 defined by a function block 1830 and proceeds to a decision block 1832 that decides whether the user that has dialed the particular SFC is the owner of the RO message address. If the user does not own an RO message address, the program proceeds along the "N" path to a function block 1834 wherein a triple beep is transmitted to the user to indicate that the special command that the user has dialed is invalid. The program then returns to the main program of FIG. 27 as indicated by a RETURN block 1836.

If the user is the owner of an RO message address, the program flows from the decision block 1832 along the "Y" path to a decision block 1838 to decide if there are any prerecorded messages in the user/owner's RO message address.

If there are no prerecorded messages, the program flows along the "N" path to a function block 1840 wherein a CVM is played such as "Your RO message address is empty. Dial "9" to insert a new message. Dial * to exit". The program then proceeds to a decision block 1842 that decides whether the user had dialed "9" or "*". If "*" is dialed, the program proceeds to the RETURN block 1836 to return to the main program of FIG. 27. However, if the SFC "0" has been dialed, the program proceeds to a function block 1844 to play a CVM such as "Dial '1' to record your message. Dial '5' at the end of your message". The user then dials "1" and the RECORD mode is turned on as indicated by a function block 1846 and he records his message as indicated by a function block 1848. At the end of his message, the user/owner dials a "5" and the RECORD mode is turned off, as indicated by a function block 1850. The program then proceeds to a function block 1852 wherein a CVM is played such as "The new message has been inserted in your RO message address". The program then proceeds back to the input of the decision block 1838.

At this point, the program decides whether there are any prerecorded messages and if so, the program proceeds along the "Y" path to a function block 1854 that plays a CVM such as "You have [N] RO messages. Dial '8' to hear your messages. Dial '9' to insert a new message. Dial "*" to exit RO message address". The program then proceeds to a decision block 1856 to decide which SFC the user has dialed. If the user has dialed "9", the program proceeds to the input of the function block 1844 to record the messages and if the user has dialed "*", the program proceeds to the return block 1836 for return to the main program of FIG. 27. However, if the user desires to hear the messages that are stored in his RO message address, he dials "8" and the program proceeds to a function block 1858 and the message at the top of the RO message address queue is played. At the end of the message, the program proceeds to a function block 1860 and a CVM instructing the user is played such as "Dial '6' to delete message. Dial '7' to play next message. Dial '*' to stop playing messages". The program then proceeds to a decision block 1862 to determine which of the three SFC's the user has dialed. If the user has dialed "7", the program proceeds to a function block 1864 to increment the messages and requeue the message at the top of the mailbox to the end of the mailbox queue and then the program proceeds back to the input of the function block 1858 to play the next message. If the SFC "6" was played, the program proceeds to a function block 1866 to delete the message and then proceeds to a function block 1868 to play a CVM that "The message was deleted from your RO message address". The program then returns to the input of the decision block 1838. If the user does not desire to delete the message or to hear the remaining messages in his RO message address, an "*" is dialed and the program returns to the input of the decision block 1838 for the next step.

Verbal Bulletin Board

Once the user has recorded messages in his RO message address, he can either use this information stored for connecting to a DID line by forwarding his telephone station to the DID line for access by forwarded callers. However, the RO message address can also be used for a feature known as VERBAL BULLETIN BOARD (VBB). This feature allows other users to access the RO message address to hear messages therein. This feature is useful for such people as office administrators who desire to leave general messages relating to the new office procedures, et cetera. For example, an office administrator that desires to inform the people in a certain group of a new office procedure would merely deposit a message regarding the new procedure in his RO message address. Each of the users in the group would be given this message address and be able to receive the deposited messages. In this manner, it is no longer necessary to locate the individuals and verbally tell them of the procedure or to distribute a general memorandum. It should be understood that only a user/owner can deposit messages in an RO message address whereas a general user can only receive messages from the RO message address.

RO Access

Figure 37:
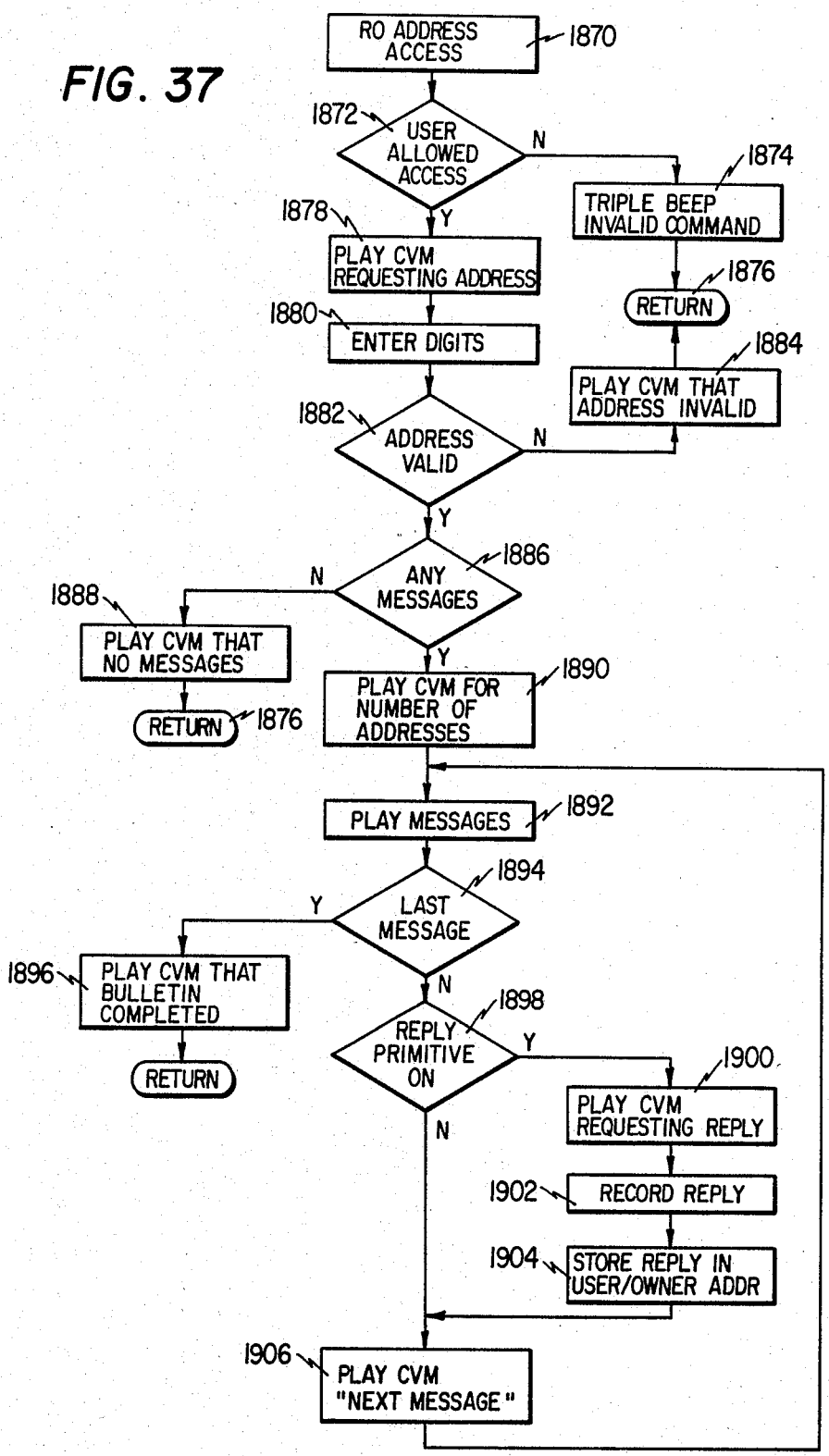
FIG. 37 is a flow chart for the RO message address access feature.

Referring now to FIG. 37, there is shown a flow chart for the RO message address access which is initiated in the main program of FIG. 27 by dialing an SFC having three digits starting with zero. If this SFC is dialed, the program proceeds to a decision block 1872 to decide whether the particular user is allowed access to RO message addresses. This is a C.O.S. that is only available to certain users and not a general primitive of owning a message address. If the user is not allowed access, the program proceeds along the "N" path to a function block 1874 that plays a triple beep informing the user that he has dialed an invalid command and then returns to the main program as indicated by a return block 1876.

If the user is allowed access to the RO message address, the program proceeds along the "Y" path to a function block 1878 to play a CVM requesting the address from the user such as "Dial the address of the RO message address". The user then enters the digits in response to the CVM, as indicated by a function block 1880, and then the program proceeds to a decision block 1882 to decide if the dialed address is valid. First, the decision must be made whether the address is valid and second, it must be decided whether an RO message address exists with this address. If the address is not valid or there is no RO message address with this address, the program proceeds along the "N" path to a function block 1884 to inform the user that he has dialed an invalid address by playing a CVM such as "The address is not a valid one for an RO message address". The program then proceeds to the RETURN block 1876 for return to the main program of FIG. 27.

If there are messages in the accessed RO message address, the program then proceeds from the decision block 1886 along the "Y" path to a function block 1890 to inform the user of the number of messages that are contained in the accessed RO message address by playing a CVM such as "There are [N] bulletin messages. The first one follows". The message is then played, as indicated by a function block 1982.

RO Reply

After the message has been completed, the program proceeds to a decision block 1894 to decide whether the message was the last message in the mailbox queue. If so, the program proceeds along the "Y" path to a function block 1896 informing the user that the bulletin has been completed by playing a CVM such as "This completes the bulletin message". The program then proceeds to the RETURN block 1876. However, if there are still messages in the mailbox queue, the program proceeds along the "N" path to a decision block 1898 to decide whether the REPLY primitive is on. The user/owner has the ability to decide whether he desires a reply to his messages or not. If so, the REPLY primitive is set during the procedure illustrated in FIG. 36 and the program will proceed along the "Y" path to a function block 1900 to play a CVM requesting the reply similar to the CVM in the function block 1844 of FIG. 36. The reply is then recorded in a manner similar to the function blocks 1846-1850 of FIG. 36, as indicated by a function block 1902 and then the program proceeds to a function block 1904 wherein the reply is stored in the user/owner's message address for later retrieval. The program then proceeds to a function block 1906 where a CVM "Next Message" is played. The program then proceeds to the input of the function block 1892 to replay another message. If the REPLY primitive were not off, the program would have proceeded from the decision block 1898 along the "N" path to the input of the function block 1906 to play sequential messages.

Send Only Message Address

A feature similar to the RO message address is the SEND ONLY (SO) message address. This is a message address that allows a user/owner to send messages to other user's message addresses but not to receive messages or listen to messages. This form of message address is a limited C.O.S. that is useful for people who deliver a great deal of messages but prefer not to receive messages from VMS.

Address Information Response

When an address is entered by a user, the system performs a simple format check on the address entered to decide whether the address is proper. Once the system decides the validity of the address and the nature of the address, a feature termed ADDRESS INFORMATION RESPONSE (AIR) is utilized by the system. AIR provides two types of enhanced response to an entered address. The first type is a set of canned phrases which provide additional information about the type of addresses. Without these features, the system responds to an entered address as follows. "The number you dialed is [spoken digits]." This CVM is replaced with the AIR feature by four different types depending on the address type as interpreted by the system. The types are users, non-users, networks and group codes. The four CVMs are as follows:

(a) "The user address you dialed is [address]."
(b) "The non-user telephone number you dialed is [digits]."
(c) "The network address you dialed is [digits]."
(d) "The group code you dialed is [digits]."

The second type of AIR applies only to user addresses; it is an address response which includes the spoken name of the user being addressed. In this case, the CVM in (a) is changed to "The user address you dialed is for [user name]." In the present invention, both types of response are used because there is a possibility that some users will not have their names recorded in the user data base. This feature is similar to the NAMEPLAY feature described hereinabove with reference to FIG. 29.

Personal Information Message

Another feature that provides the depositor of a voice message with additional information about the message address he enters is termed the PERSONAL INFORMATION MESSAGE (PIM). The PIM feature enables a user to exercise some control over the address response invoked when he is addressed by other users. The information provided by PIM is usually added to that provided by AIR. A PIM is a message that is invoked and played when the associated user is addressed in a message about to be deposited. The purpose of the PIM is to provide the message depositor "immediate" information about the address he is using. For example, when a user is setting up a PIM for his own message address, he has several options. First, he may select a prerecorded PIM or record his own "personalized" PIM. Secondly, for prerecorded PIMs, he may select a "short-term" or "longterm" version. The short-term version says that the addressee will be ". . . gone for several days. . ." and the long-term version will be ". . . gone for several weeks. . .". Third, he may specify that messages addressed to him be diverted to another user's message address, or, alternatively, that his message address is not allowed as an address for a deposited message. In the later case, the sender hears the PIM following a CVM stating that the address has been deleted. Both the PIM messages and the AIR messages are stored in RO-type message addresses.

Figure 38:
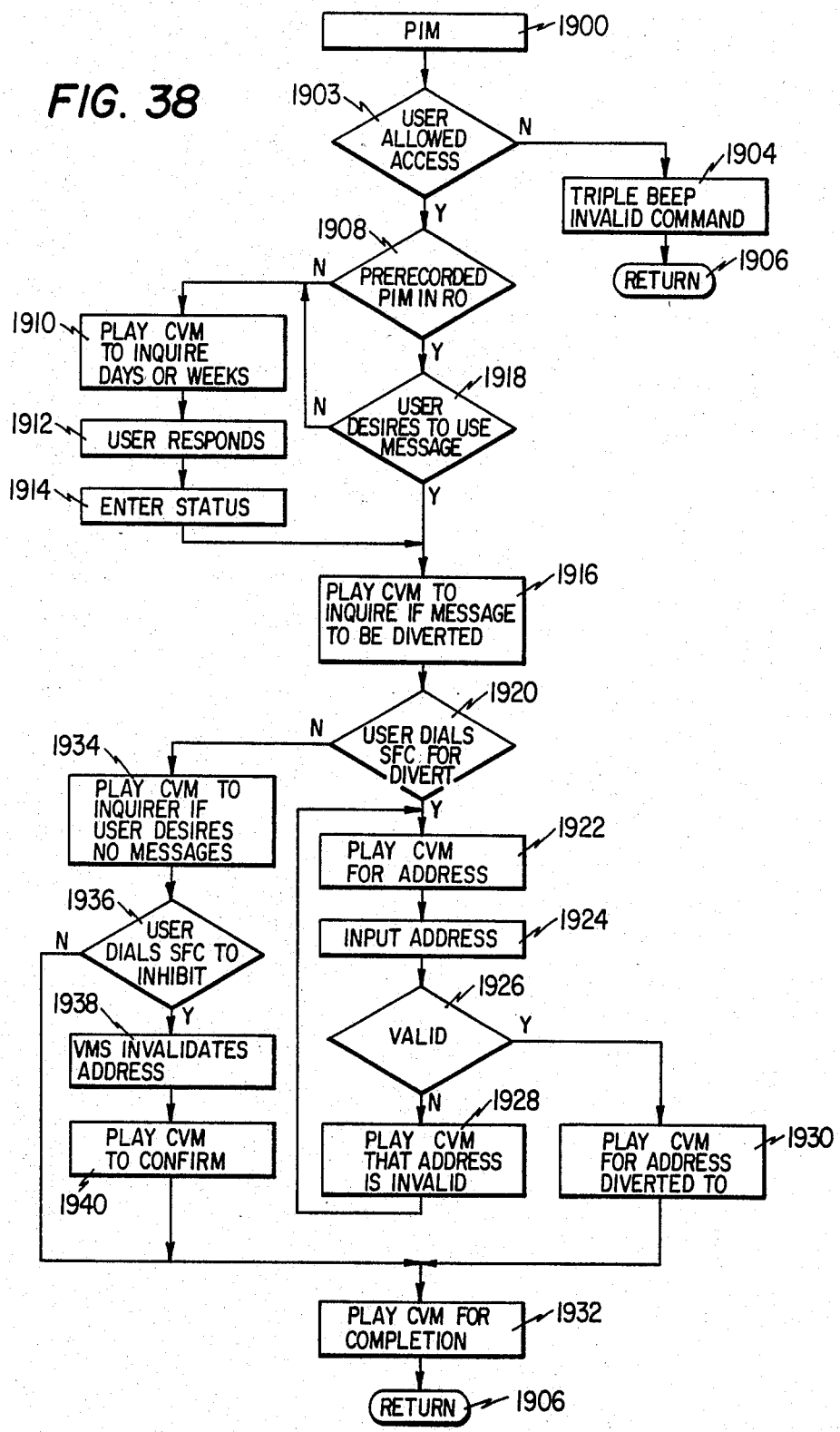
FIG. 38 is a flow chart for the personal information message feature.

Referring now to FIG. 38, there is illustrated a flow chart for the PIM special command. The user accesses the special command from the main program in FIG. 27 by dialing a three-digit special command starting with zero. After the program has been accessed, the main program in FIG. 27 proceeds to the program in FIG. 38 initiated at the function block 1900 labeled PIM. The program then proceeds to a decision block 1902 to decide if the user is allowed access to the PIM and, if not, a triple beep is output to the user as indicated by a function block 1904 along the "N" path. The program then proceeds to a RETURN block 1906.

If the user is allowed access, the program proceeds from the decision block 1903 along the "Y" path to a decision block 1908 that decides if there is a prerecorded PIM in the RO message address. If there is no prerecorded PIM in the RO message address, the program proceeds along the "N" path to a function block 1910 to inquire whether the user will be gone for several days or several weeks by outputting a CVM such as "Do you wish to say you will be gone for several days or several weeks: dial '1' for days, or '2' for weeks". The user then responds by dialing either a "1" or a "2", as indicated by a function block 1912. The program then proceeds to a function block 1914 wherein the VMS enters the status information into the user's record. The program then proceeds to the input of a function block 1916.

If there was a prerecorded PIM in the RO message address, the program would proceed from the decision block 1908 along the "Y" path to a decision block 1918 to inquire whether the user desires to use the prerecorded message. Normally, a CVM is played such as "You have a prerecorded PIM. Do you wish to use it? Dial '1' for yes, '2' for no". The user then responds by dialing the appropriate SFC and, if he desires not to use the message, the program flows along the "N" path to the input of the function block 1910 to set the status and, if he desires to use the message, the program flows along the "Y" path to the input of the function block 1916.

The function block 1916 plays a CVM to inquire if the message is to be diverted to another message address such as "Do you wish to have your messages diverted to another address? Dial '1' for yes, '2' for no". The program then proceeds to a decision block 1920 to decide whether the user has dialed the correct SFC to divert his messages. If the messages are to be diverted, the program flows along the "Y" path to a function block 1922 that plays the CVM: "Dial the message address". The user then inputs the correct address, as indicated by a function block 1924 and then the program proceeds to a decision block 1926 to decide if the address is valid. If invalid, the program proceeds along the "N" path to a function block 1928 to play a CVM: "The address you entered is not a valid message address". If, however, the address is valid, the program proceeds to a function block 1930 to play a CVM confirming the address such as "Your messages will now be diverted to the following address. [digits for address]". The program then proceeds to a function block 1932 to play a completion CVM such as "This completes the set-up of your PIM" and then the program proceeds to the RETURN block 1906.

If the user had not desired to divert his messages, as indicated in the decision block 1920, he would dial the appropriate SFC and the program would proceed along the "N" path to a function block 1934 to play a CVM inquiring whether the user desires no further messages from being deposited in his message address such as "Do you want to prevent people from addressing messages to you? Dial "1" for yes, '2' for no". Then the program proceeds to a decision block 1936 to decide whether the user has dialed the SFC for inhibit. If the user desires to inhibit, he dials the proper SFC and the program proceeds along the "Y" path to a function block 1938 to restrict the deposit of voice messages in the user's message address. The program then proceeds to a function block 1940 and plays a confirmation CVM such as "From now on, your address is not allowed for voice messages. To remove this restriction later, dial 'OXX'". The program then proceeds to the function block 1932 and exits the program. If, however, the user does not desire to inhibit future messages, the program flows from the decision block 1936 along the "N" path to exit the program. It should be understood that the SFC dialed in the decision block 1936 has a toggle operation, that is, if the user has restricted the user's address previously, the user need only dial the SFC to proceed along the "N" path to remove this restriction.

Self Teach/Help

The RO message addresses described above may also be supplied with "SELF-TEACH" and "HELP" features that make the VMS system easier to use for a newly indoctrinated user. The SELF-TEACH RO message addresses contain messages describing how to use various system features. In general, any user can access any of these RO message addresses and listen to the instructions they contain. The RO message addresses are organized in an inverted tree-structured manner, that is, the message address at the top of this pyramid contains messages that describe use of the system in general terms, and also provides the message addresses of other RO message addresses that contain more information about specific areas of system operations. There may be several levels of self-teach RO message addresses. The ones at the lowest levels would probably contain detailed instructions on the use of a single VMS function.

The HELP feature consists of a group of individual system enhancements that are designed to provide a user additional information, on an "as required" basis, about the particular VMS function he is currently using. For example, when VMS is waiting for the user to enter DTMF digits for some function, it will eventually "time out" and replay the last CVM prompt and again wait for digits to be entered. It will repeat this procedure a second time and then abort the function. In addition, the HELP feature is under direct control of the user. If he becomes confused at some point, he may dial an SFC such as "#", which causes the last CVM prompt to be replayed immediately. In addition, if a user dials invalid digits for some function, a CVM is output to the user to supply the user more information about what he did wrong. The SELF-TEACH and HELP functions allow a user to more quickly acquaint himself with the system and its various operating features.

When VMS initiates a call to an outside telephone station to force delivery of a message, VMS can be confronted by either a busy signal, continued ringing or an answer. VMS detects these signals in the Codec 96 of FIG. 9 in an answer detect series of filters. The filters distinguish between the various tones that result from a busy signal versus a continued ringing. If the phone is busy, VMS then returns the call within a very short time. However, if VMS detects that the selected recipient is not answering his telephone calls, VMS waits a longer period of time to return the call. In addition, VMS detects the dial tone that indicates an open line to determine if the call has been received before VMS dials the number.

The hardware for detecting the various signals consists of a frequency pair detection filter for the signal. A dial tone is in the range of a 350 Hz and 440 Hz tone signal that must be detected for at least one second. A busy signal is comprised of a 620 Hz and 420 Hz tone signal that alternates on and off for 0.5 second or 0.25 second intervals. The 0.5 second interval indicates that the called number is busy, and the 0.25 second interval indicates that the trunk is busy. A ring-back signal consists of a 440 Hz and a 480 Hz tone signal in a repeating cycle. This repeating cycle is on for one second and off for three seconds. This signal occurs when the called telephone is ringing but has not yet been answered. In order to detect that the call has been answered, VMS monitors the line after detecting the ring-back signal to determine if there is some audio energy above a predefined minimum level and that no ring-back signal is present. This event indicates that the called telephone has been answered.

Message Replay

MESSAGE REPLAY is a feature that gives the non-user who has just listened to the message the opportunity to hear it again. At the completion of playing the message (the first time), VMS would then play a CVM such as the "This is VMS. If you would like to hear this message again, please stand by for ten seconds. If you do not wish to hear it again, please hang up now". VMS would then monitor the line for a disconnect during the ten-second window, and, if it occurs, VMS would consider the message "delivered", and not play it a second time. If no disconnect occurs during the window, VMS plays the message again.

One important aspect of this feature to be decided by VMS is, if a disconnect occurs during the second playing of the message VMS must decide if it should consider the message "delivered". If a disconnect occurs during the first playing, the message is considered "not delivered", and another attempt will be made later on a subsequent call. The message should be considered delivered if a disconnect occurs during the second playing because the listener will not want to hear the entire message twice—only that portion which was not clear to him during the first playing.

Non User Reply

NON-USER REPLY is a feature that provides to the non-user who receives a message the option to reply to it. This is an option that is under the control of the message originator. The originator invokes an SFC associated with the non-user address for the message which triggers the offering of the reply option to the recipient. At the completion of playing the message, the recipient would hear a CVM such as "This is VMS. If you wish to reply to this message, please stand by. If you do not, please hang up now". If VMS does not detect a disconnect within, for example, five seconds, VMS then prompts the non-user to record his reply with the following CVM: "At the tone, please record your reply. Hang up at the end of your reply". VMS then emits a progress tone and then records everything said by the non-user until he hangs up. This reply message is then sent to the originator of the non-user message.

Interactive Voice Message System

A feature termed INTERACTIVE VOICE MESSAGE SYSTEM (IVM) provides a user with a feature that "leads" a user through a series of question and answer sessions (VMS asks the questions and the user provides the answers). The user's answers are stored in the system to be retrieved later by a designated user. The applications for this feature would be, for example, an out-of-town sales force that routinely enters a large amount of sales data such as purchase orders, quantities and customers. With the IVM, it is only necessary for a user to access VMS and respond to a series of questions by either dialing the requisite DTMF digits or applying the appropriate verbal response.

The questions, or queries, are prerecorded in the VMS system as either a CVM or as a general voice message stored in an RO message address. The CVMs can be accessed through a computer terminal or the like and it is possible to have a large quantity of CVMs available to the user that originates the set of questions. He can merely arrange the CVMs to provide a coherent sequence of questions. If the user so decides, he can input the questions from a telephone unit in his own voice and arrange the questions in a manner he desires. In addition, there are provisions for a user to place conditional flags on the question such that an answer to one question allows a calling user to skip through two or three questions, as will be described hereinbelow.

Figure 39:
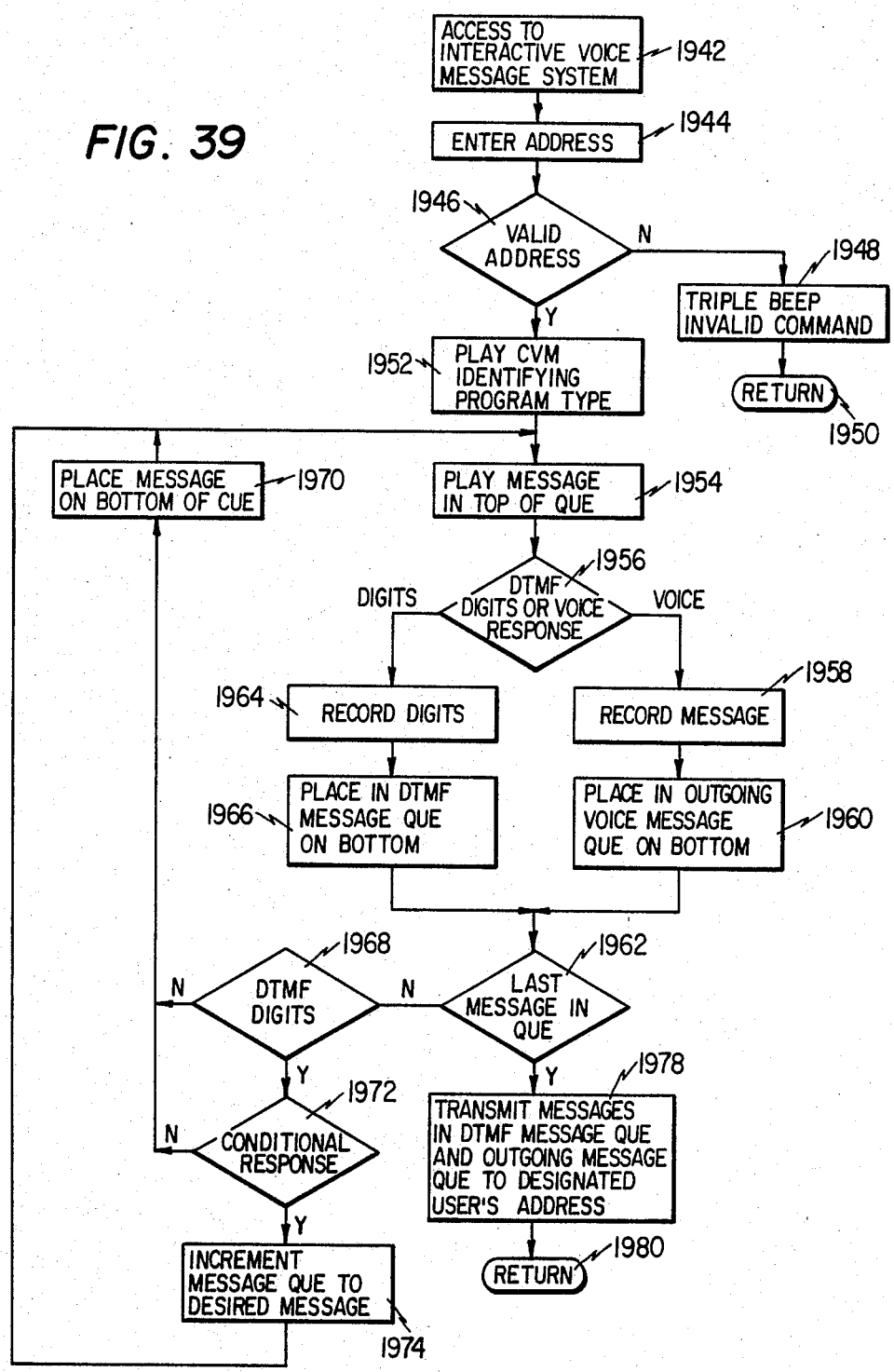
FIG. 39 is a flow chart for the interactive voice message system feature.

Referring now to FIG. 39, there is illustrated a flow chart for a user's access to the IVM. The user accesses his message address and then dials a three-digit command beginning with zero to access the IVM subroutine. However, a non-user can also access the IVM by dialing a requisite DID number that can be associated with the particular IVM. After the program is accessed, the program flows to a function block 1944 wherein the address of the particular IVM desired. The program then flows to a decision block 1946 that decides whether the address is valid, and, if not, the program proceeds to a function block 1948 that outputs a triple beep to the user indicating an invalid command. However, for a non-user, a CVM would be output such as "The address you have entered is invalid". The program then proceeds to a return block 1950.

If the address is valid, the program proceeds from the decision block 1946 along the "Y" path to a function block 1952 that plays an identifying CVM such as "Hello, this is VMS. You have selected the IVM for 'rotary gear' sales orders". After the identifying CVM is played, the program proceeds to a function block 1954 and plays the message at the top of the message queue. This message could be something such as "Please enter your name, your sales location and your supervisor". After the message has been played, the program proceeds to a decision block 1956 to decide whether DTMF digits or voice response is required. This is one of the primitives that the originating user programs in when he selects and/or records the messages.

If the voice response has been selected, the program proceeds to a function block 1958 wherein the message is recorded. The recording procedure is similar to that described above with reference to FIG. 36 wherein the user or non-user can select when he begins to record the message and when he is finished recording the message by dialing an appropriate SFC. In addition, if the caller happens to be a non-user, a CVM can be played instructing the user how to respond. This would normally be done prior to the function block 1952.

After the message has been recorded, the program proceeds to a function block 1960 that places the message in an outgoing voice message queue on the bottom thereof. The outgoing voice message queue is an accumulating memory that allows each voice message recorded to be sequentially tagged onto one another. This allows the entire message to be transmitted to the originating user in a coherent fashion. After the message has been placed in the outgoing voice message queue, the program proceeds to a decision block 1962 to determine if there are any messages left in the message queue.

If the message transmitted to the caller requires a DTMF response, the program would proceed from the decision block 1956 to a function block 1964 to record the digits. After the digits were recorded, they would be placed in a DTMF message queue on the bottom thereof. Although not shown, it is possible that the DTMF digits are merely used to advance the message queue to a different position in the message queue. However, there are some applications that may require the cumulation of digits for information purposes. After the messages have been placed in the DTMF message queue, the program proceeds to the input of the decision block 1962.

If there are messages remaining in the message queue, the program proceeds along the "N" path from the decision block 1962 to a decision block 1968 to determine if the response was DTMF digits. If the response was not DTMF digits, the program proceeds along the "N" path to a function block 1970 that places the previously-played message on the bottom of the message queue and increments the message queue such that the next message is on the top of the queue and ready to be played. The program then proceeds to the input of the function block 1954 to play the next message.

If the response was not DTMF digits, the program would proceed along the "Y" path from the decision block 1968 to the decision block 1972 to determine if the response was a conditional response. If the response was a conditional response, the program would proceed along the "Y" path to a function block 1974 to increment the message queue to the desired message. If the response was not conditional, the program would proceed along the "N" path to the input of the function block 1970.

When the last message in the queue has been played, the program proceeds from the decision block 1962 along the "Y" path thereof to a function block 1978 wherein the message is accrued in the outgoing voice message queue or transmitted to the originating user's message address for later retrieval. In addition, the DTMF digits stored in the DTMF message queue can also be transmitted to a designated user's message address for retrieval and process at a later time. The program then returns to the main program in FIG. 27.

Figure 40:
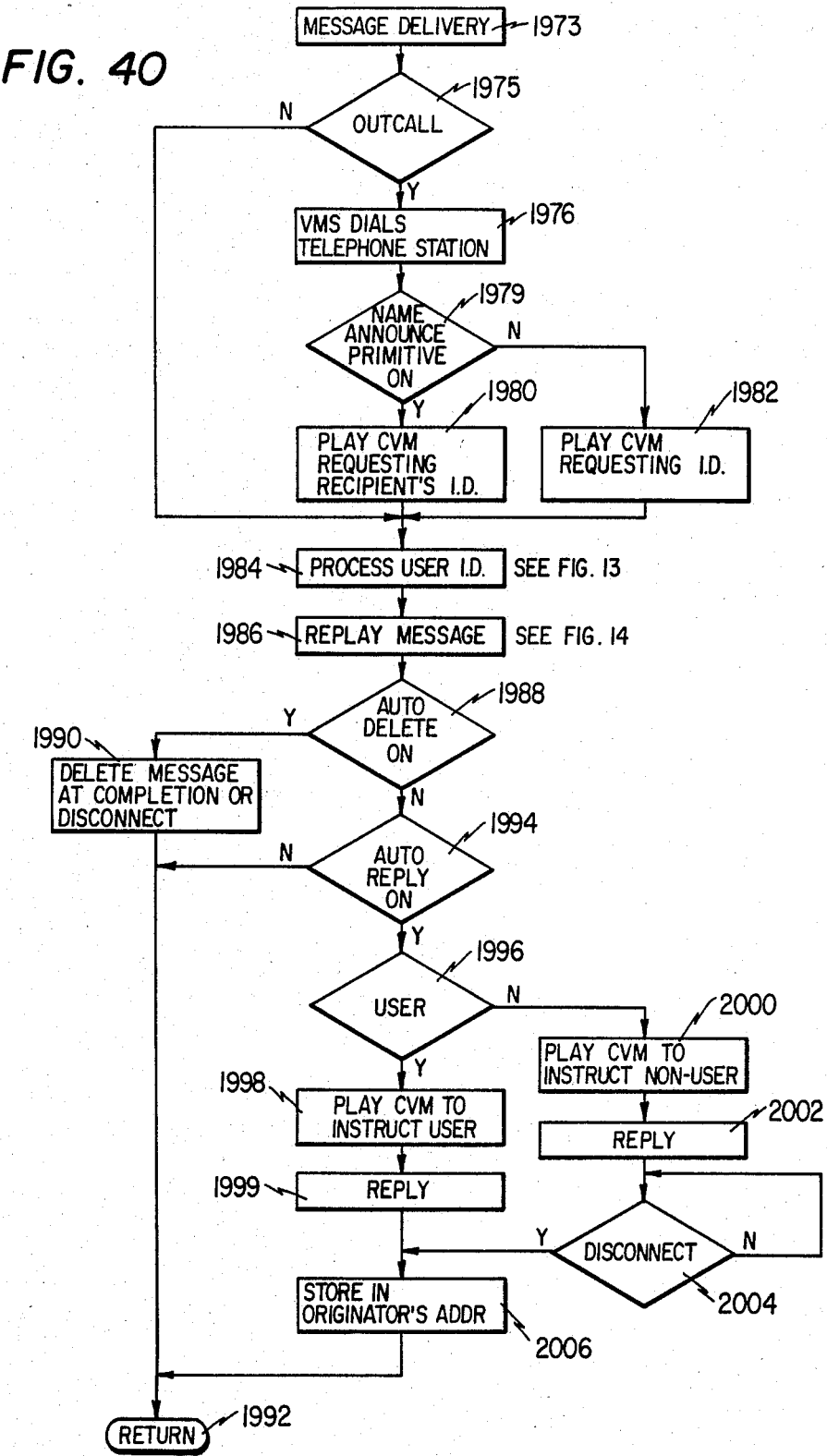
FIG. 40 is a flow chart of an alternate embodiment of the message delivery feature.

Referring now to FIG. 40, there is shown an alternate embodiment of the message delivery of FIG. 15 implementing the feature of NAME ANNOUNCEMENT, AUTO MESSAGE DELETE, and AUTO REPLY. The program is entered through a function block 1973 labeled MESSAGE DELIVERY and then proceeds to a decision block 1975 to decide whether the message is to be delivered by depositing it in a user's address or by making an outcall to a telephone station. If VMS is to make an outcall, the program proceeds along the "Y" path to a function block 1976 wherein VMS dials the telephone station.

Name Announce

After the telephone station is dialed, the program then proceeds to a decision block 1979 to decide whether the NAME ANNOUNCE primitive is on. The NAME ANNOUNCE feature provides a method for VMS to call a telephone station and inform the person answering the telephone station who the call is for. For example, if the NAME ANNOUNCE primitive is on, a CVM will be played such as "Hello, this is VMS. There is a voice message for [name]. Please dial your I.D." The CVM is indicated by a function block 1980. The applications for this feature are in situations where possibly two people share the same office and the same phone such that there is a possibility that the person being called will not answer. In initiating this feature, the originating user has available to him the names of all users stored in the user's data base. Once the primitive is on, the system automatically retrieves the name of a user/recipient and plays the CVM with his name inserted therein. It should be understood, however, that this feature can be available for outcalls to non-users by inputting the digits corresponding to the name of the non-user. If the NAME ANNOUNCE primitive has not been turned on by an originating user, upon message delivery, the program will proceed from the decision block 1979 along the "N" path to a function block 1982 that plays a standard CVM similar to the CVM in the function block 1980 without the name. After the recipient has entered his I.D., the program flows to the input of a function block 1984 to process the user I.D. as described above with the reference to FIG. 13. This is also the point of the program that the program flows to for a message delivery that does not utilize an outcall, for example, a user accessing his own voice mailbox for messages.

Auto Message Delete

After the I.D. has been processed, the program proceeds to a function block 1986 to replay the message, as described above with reference to FIG. 15. The program then proceeds to a decision block 1988 to decide if the AUTO MESSAGE DELETE parameter has been turned on. If the primitive has been turned on, the program flows along the "Y" path to a function block 1990. At this point in the program, the connection is sensed such that if the recipient disconnects the telephone, the message will automatically be deleted or, upon completion of the message, the message will be deleted. For example, if an employer wishes to direct a message to a recipient that is very confidential, the AUTO MESSAGE DELETE feature allows the employer to restrict the number of times that the message may be played. In this manner, only the recipient would ever hear the message. This is also applicable to messages that may be incriminating to an originating user if these messages were stored for later replay or redirected to another user. After the message has been deleted, the program returns to the original program, as indicated by a return block 1992.

Auto Reply

If the AUTO MESSAGE DELETE feature is not on, the program proceeds from the decision block 1988 along the "N" path to a decision block 1994 to decide if the AUTO REPLY feature is on. This feature is initiated by the originating user during recording of the message by setting a primitive at this telephone station. If the AUTO REPLY feature is not on, the program flows along the "N" path to the return block 1992 and if the feature is on, the program flows along the "Y" path to the decision block 1996 to decide whether the message is directed to a user or a non-user. If a user is receiving the call, the program proceeds along a "Y" path to a function block 1998 to play a CVM to instruct the user to reply such as "Dial '1' to record your reply and dial '5' when you are through. Your message will then automatically be transmitted to the originator".

The program then flows to a REPLY block 1999. If the message was directed at a non-user, the program flows along the "N" path to a function block 2000 to play an instructional CVM to the non-user such as "At the tone, please record your reply, five seconds of silence denotes the end of your reply. Thank you.". The program then proceeds to the function block 2002 to turn the RECORD mode on and record the reply. The program then flows to a decision block 2004 to determine whether there has been five seconds of silence which the VMS interprets as a disconnect. If a disconnect has not occurred, the program flows along an "N" path to return to the input of the decision block 2004. At disconnect, the program proceeds along the "Y" path to the input of a function block 2006 that stores the reply in the originator's message address. After the reply the program proceeds to the RETURN block 1992.

The AUTO REPLY function allows an originating user to instruct VMS to automatically record a reply without having the recipient initiate the procedure. In this manner, an originating user does not have to request a reply in his voice message but, rather, need only activate the proper primitive.

Sequential Group Calling

Figure 41:
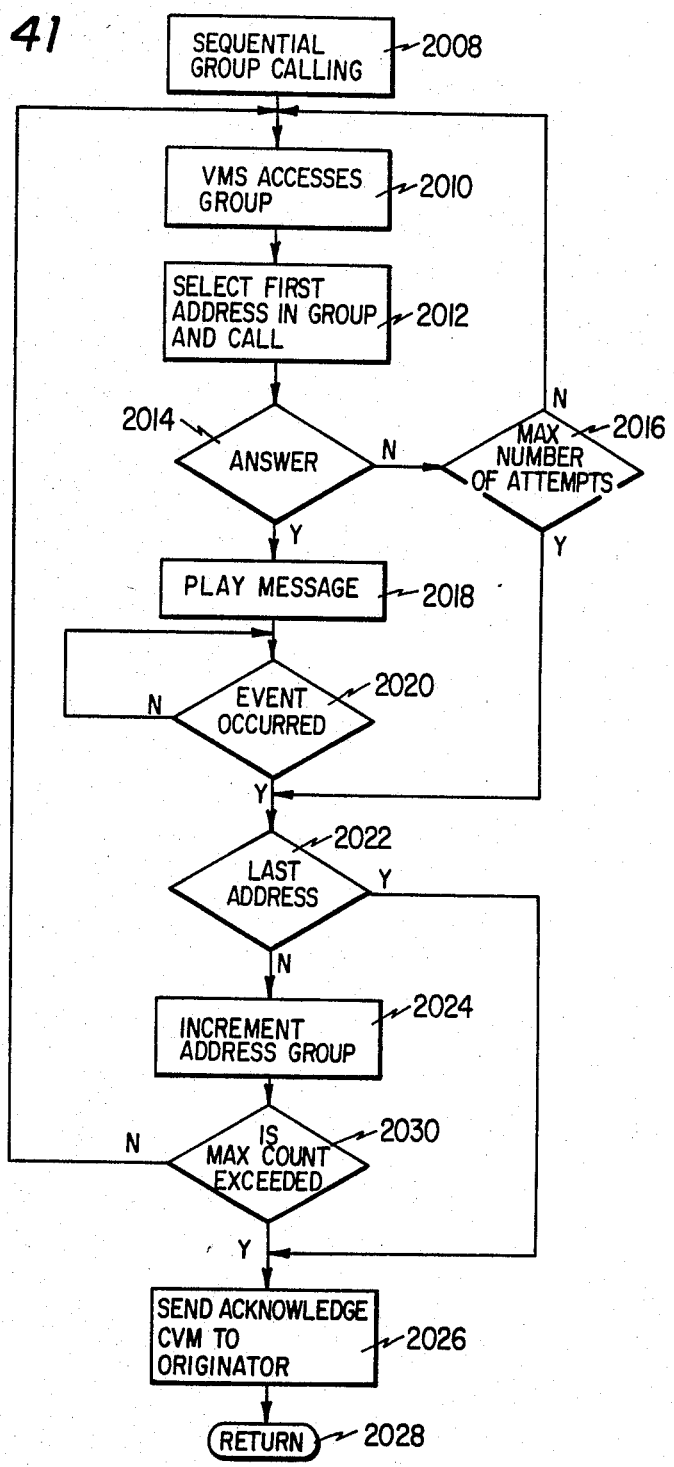
FIG. 41 is a flow chart of the sequential group calling feature.

Referring now to FIG. 41, there is shown a flow chart for a feature termed SEQUENTIAL GROUP CALLING (SGC). SGC is a feature that allows a user to access a group of people and sequentially deliver a message to each of the persons therein. VMS then waits a certain period of time for some event to occur such as a given amount of time elapsing within which a message recipient must respond to the message. After this event, VMS plays the next call in sequence until the last call has been placed. This will continue until all addresses in the group have been called. The program is initiated by the originating user dialing an SFC that allows him to deposit a message and access a particular group for transmission of the message thereto. This is indicated by a function block 2008. The program then proceeds to a function block 2010 wherein VMS accesses the group from the user's data base. The program then proceeds to a function block 2012 and the first address in the group is selected and called by VMS. The program then proceeds to a decision block 2014 to determine whether the addressee has answered or not. If there has been no answer, the program proceeds along the "N" path to a decision block 2016 to decide whether the maximum number of attempts has been tried. This maximum number of attempts may be set by the originating user and, if not, the maximum number of attempts will be that allowed by the VMS system in general. If the maximum number of attempts has not been surpassed, the program returns to the input of the function block 2010 along the "N" path. If the maximum number of attempts have been tried, the program proceeds along the "Y" path.

If the addressee answers, the program proceeds from the decision block 2014 along the "Y" path to the function block 2018 and the message is played to the addressee. The program then proceeds to a decision block 2020 to decide whether a particular event has occurred. As described above, this event can be, for example, the passage of a discrete amount of time within which the addressee can reply to the originating user by other means or it can merely be a reply through the VMS system. In addition, a discrete event can occur such as the recipient dialing a digit that indicates a positive response, thereby not requiring further calls to the remaining members of the group. As described below, this results in exiting the program and returning. If the event has not occurred, the program returns along the "N" path to the input of the decision block 2020 and waits until the event occurs before proceeding. Although shown as a looping function, normally the program returns to the main program and waits for the event to occur before returning to this particular point in the program.

After the event has occurred, the program proceeds along the "Y" path from the decision block 2020 to a decision block 2022 that inquires whether the last address has been dialed. If the last address has not been dialed, the program proceeds along the "N" path to a function block 2024 to increment the address. If the last address has been dialed, the program proceeds along the "Y" path to the input of a function block 2026 to send an acknowledging CVM to the originator to let him know that all addresses have been dialed. The program then returns through a return block 2028 to the main program.

If the last address has not been dialed, and the address has been incremented, the program proceeds to a decision block 2030 to decide if a maximum count has been exceeded. The maximum count is a software counter that provides an additional degree of versatility in the program. For example, if the event in the decision block 2020 requires only one person to answer the question with a positive response such as a digit, then the maximum count counter can be incremented such that the program will proceed from the decision block 2030 along the "Y" path to the function block 2026 to send the acknowledging CVM. Another example would be an originating user trying to obtain at least three crew members for his weekend yacht. Since he only requires a maximum of possibly three people, he would only require three positive responses. The input of three positive responses would exceed the maximum count and the program would then be exited. However, if the maximum is not exceeded, the program proceeds along the "N" path from the decision block 2030 back to the input of the function block 2010 to select the next address in the group. This continues until either the maximum amount has been exceeded or the last address has been dialed.

Status Check

Figure 42:
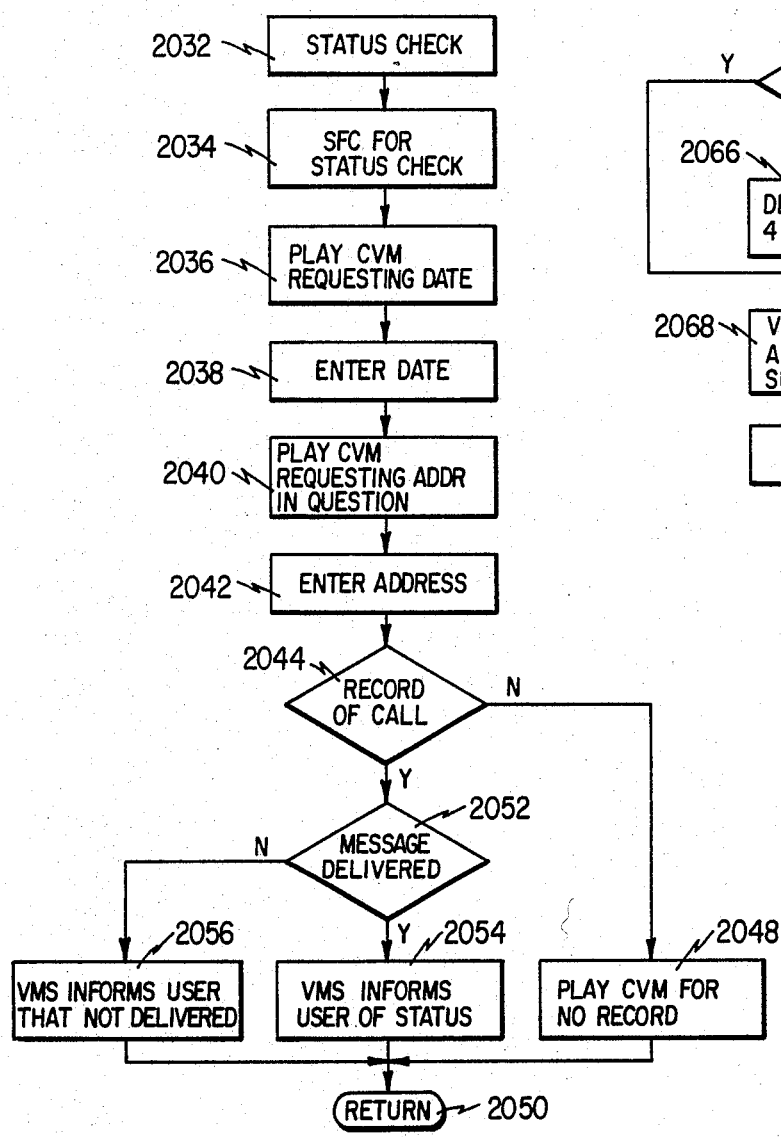
FIG. 42 is a flow chart of the status check feature.

Referring now to FIG. 42, there is illustrated a flow chart of a feature termed STATUS CHECK. The STATUS CHECK feature allows the user, by dialing an SFC to inquire into the status of a previously-recorded message on a specific date. The program is entered at a function block 2032 and then the program proceeds to a function block 2034 where the SFC for STATUS CHECK is entered. A CVM is then played such as "Dial the date of the message in question", as indicated by a function block 2036. The program then proceeds to a function block 2038 wherein the user enters the particular date that he deposited the message. After the date is entered, the program proceeds to a function block 2040 and VMS plays a CVM requesting the address and then the address is entered, as indicated by a function block 2042. The program then proceeds to a decision block 2044 to decide if there is a record of the call still stored in VMS. If there is no record, the program proceeds along the "N" path to a function block 2048 where a CVM is played such as "There is no record of your call. Thank you.". The program then proceeds to a return block 2050 to return to the main program.

If there is an existing record of the call, the program proceeds from the decision block 2044 along the "Y" path to a decision block 2052 to decide whether the message in question has been delivered. If the message has been delivered, the program flows along the "Y" path and informs the user of when the message was picked up. VMS plays a message such as "The voice message you sent to [addressee] at [time] on [date] was picked up at [time] on [date]." The program then proceeds to the RETURN block 2050. If, however, the message was not delivered, then the program proceeds along the "N" path to a function block 2056 to inform the user that the message has not been delivered by playing a message such as "The voice message you sent to [addressee] at [time] on [date] has not been picked up." The program then proceeds to the RETURN block 2050. The operation of the STATUS CHECK feature provides the user with the versatility of checking on the status of a message sent to a particular addressee on a particular date. However, if there were a number of messages sent to the same date, the messages would sequentially be sent back to the user.

DID Answer Delay

Figure 43:
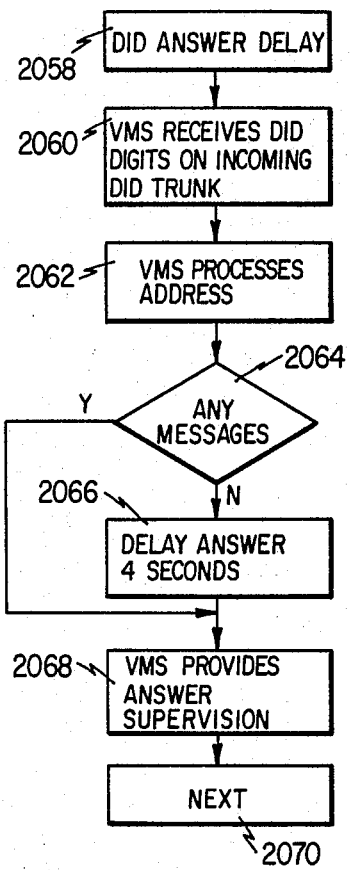
FIG. 43 is a flow chart of the DID answer delay feature.

Referring now to FIG. 43, there is shown a flow chart for a feature termed DID ANSWER DELAY. The DID ANSWER DELAY feature allows a user to place a call on a DID trunk line (described hereinabove) to inquire as to the status of their message address. If there are no messages in the message address, VMS delays answering by a predetermined time, for example, four seconds, and the user has the opportunity to disconnect the call. However, if there are messages in the message address, the phone is immediately answered. An incoming call on the DID trunk line is preceded by four identifying digits that VMS can use to identify the associated address. These digits are transmitted from the telephone system even though the call has not yet been answered by VMS. In not immediately answering the call, VMS provides an indication to the user that there are no voice messages in his mailbox without having to answer the incoming call.

The program is identified by a function block 2058 DID ANSWER DELAY and the program then proceeds to a function block 2060 wherein VMS receives the DID digits on the incoming DID trunk. After receiving the digits, VMS processes the address by the procedure shown in FIG. 13, as indicated by a function block 2062. After receiving the digits, VMS processes the address by the procedure shown in FIG. 13, as indicated by a function block 2062. After the address is processed, the program flows to a decision block 2064 wherein VMS checks the message address of the address for any messages contained therein. If there are no messages, the program proceeds to a function block 2066 along the "N" path and delays answering the DID call for approximately four seconds. It should be understood that this delay can be longer or shorter depending upon the initial system design.

If there are messages present in the address, the program flows along the "Y" path. After the answer has been delayed for four seconds when there are no messages or, alternatively, immediately answered when there are messages, the program proceeds to the input of a function block 2068 wherein VMS provides answer supervision which answers the call and the ringing stops. The program then proceeds to a function block 2070 labeled NEXT to indicate that the next step would be the normal procedure for processing a call in VMS.

Fax Transmission

Figure 44:
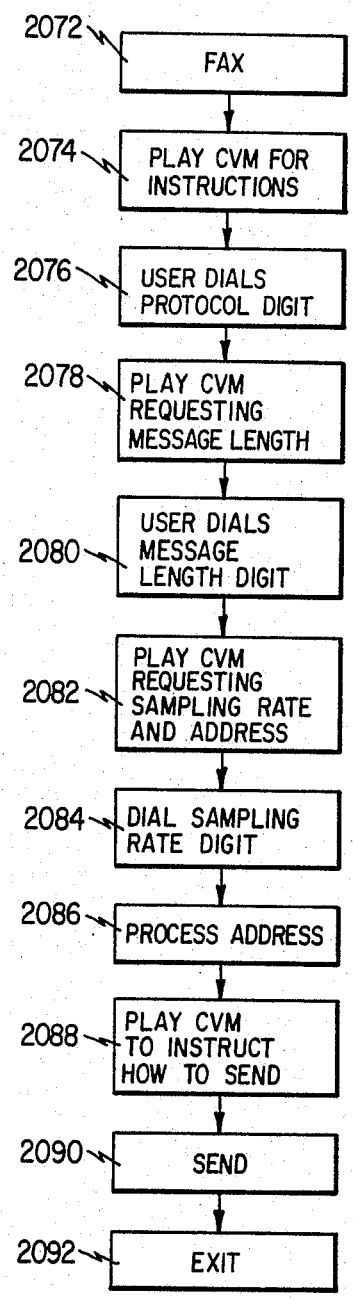
FIG. 44 is a flow chart of the FAX transmission feature.

Referring now to FIG. 44, there is shown the flow chart for a feature termed FAX TRANSMISSION. This feature allows the user to transmit data such as drawings and documents through VMS. This subroutine is entered by dialing an SFC to designate FAX DEPOSIT, as indicated by a function block 2072. The program then proceeds to a function block 2074 that plays an instructional CVM such as "Dial '1' to deposit FAX Group I, dial '2' to deposit FAX Group II, and dial '3' to deposit FAX Group III." The user then dials the digit designating the appropriate protocol to be given to the FAX deposit, as indicated by a function block 2076 to play a CVM requesting the approximate length of the FAX message to be deposited at function block 2078. This usually only requires a single digit. The user then dials the message length digit, as indicated by a function block 2080 and the program proceeds to a function block 2082 to play requesting CVM such as "Dial '1' for a 20 Kc sampling rate, dial '2' for a second sampling rate, and dial '3' for a third sampling rate." After this message has been transmitted, the program proceeds to a function block 2084 wherein the user dials the sampling rate digit. The address is then processed by a function block 2086 that processes the address according to the procedure in FIG. 13. After the address is processed, an instructional CVM is sent such as "Dial '1' to send your FAX message, dial '5' when you are through", as indicated by a function block 2088. The program then proceeds to a SEND block 2090 wherein the FAX is transmitted. To send a FAX, a user would normally insert his telephone hand unit into a receptacle on a FAX machine 19 (FIG. 1) and then process the document therethrough. The FAX machine 19 would encode the graphic material into signals suitable for transmission along a telephone line. Since each FAX machine may possibly have a different sampling rate, the sampling rate digit that was input in function block 2084 allows the system to compensate for any variations in sampling rates. After the message has been completed, the user dials the SFC "5" and the program proceeds to an exit block 2092.

Analog Networking

Figure 45:
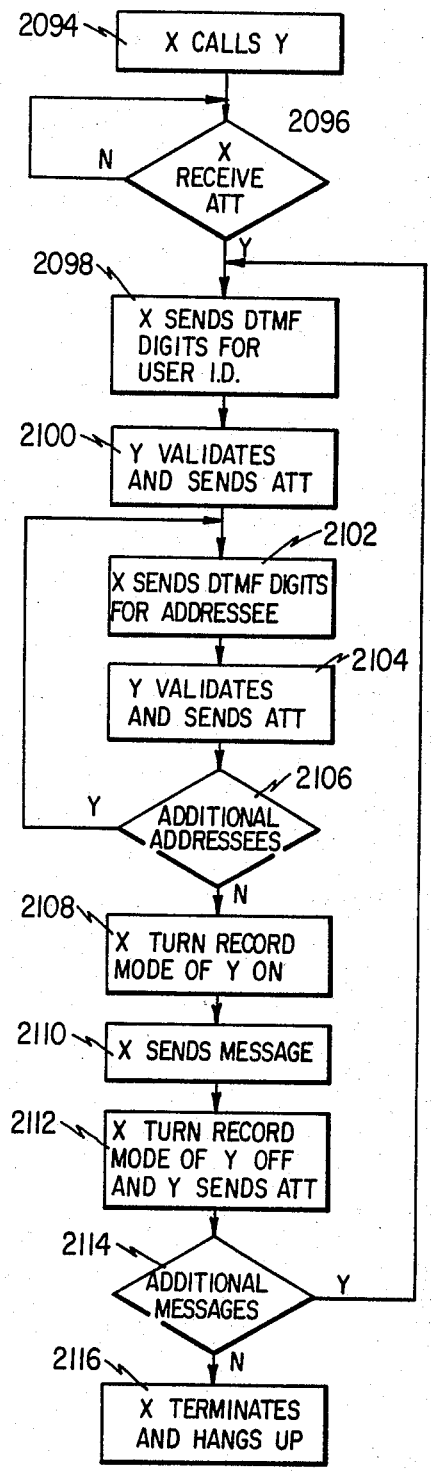
FIG. 45 is a flow chart of the analog networking feature.

Referring to FIG. 2, there are two modes of communication between two separate VMS systems. The first is via the data link 48 that allows digital data to be transferred therebetween and the second is through the public telephone network 29. In analog networking, all of the information, both route data and message data, are transferred between systems through the public telephone network. This procedure is illustrated in a flow chart in FIG. 45 for ANALOG NETWORKING. For purposes of explanation, there are assumed to be two systems. A first system "X" transmits the data and a second system "Y" receives the data.

A function block 2094 indicates the steps whereby VMS initiates a call to "Y" over the public telephone network. The program then flows to a decision block 2096 to decide whether an acknowledging touchtone signal (ATT) has been received by "X" and "Y". The ATT indicates to "X" that the telephone connection has been made between "X" and "Y". If "X" does not receive the ATT, the program proceeds along the "N" path back to the input of the decision block 2096 until the ATT is received. When the ATT is received, the program flows along the "Y" path to a function block 2098 wherein "X" sends the DTMF digits for the user I.D. of the voice message to be transported to "Y". "Y" receives these digits and validates the user I.D.

When the user I.D. is validated, "Y" again sends an ATT to "X", as indicated by a function block 2100. The program then proceeds to a function block 2102 wherein "X" sends the DTMF digits for the addressee to "Y". "Y" receives these digits and validates the address for the addressee and again sends an ATT to "X", as indicated by a function block 2104. The program then proceeds to a decision block 2106 to decide whether there are any additional addressees for transmission to "Y". If there are additional addressees, the program proceeds along the "Y" path to the input of the function block 2102 wherein "X" sends additional DTMF digits for additional addressees. However, if there are no additional addressees, the program flows along the "N" path to a function block 2108 wherein "X" transmits the proper sequence of DTMF digits to "Y" to turn the RECORD mode of "Y" on. For example, "X" sends a "0" DTMF digit to "Y", indicating the end of the addressees. "X" then sends a "1" DTMF digit that turns the RECORD mode of "Y" on. The program then proceeds to a function block 2110 and "X" transmits the spoken text of the voice message.

After the spoken text has been transmitted, "X" turns the RECORD mode of "Y" off by transmitting the proper DTMF digit such as a "5" that indicates the end of the message. When "Y" receives the "5" digit, the RECORD mode is terminated and "Y" sends an ATT to "X" indicating such, as indicated by a function block 2112. The program then proceeds to a decision block 2114 to decide if there are any additional messages and, if so, the program proceeds along the "Y" path to the input of the function block 2098 to send DTMF digits for further users. When all the messages are transmitted, the program flows from the decision block along the "N" path thereof to a function block 2116 wherein "X" terminates the call and hangs up. This is normally performed by transmitting a "*" DTMF digit to "Y" to indicate the end of the call. When "Y" receives the "*", "Y" also hangs up.

Hybrid Networking

Figure 46:
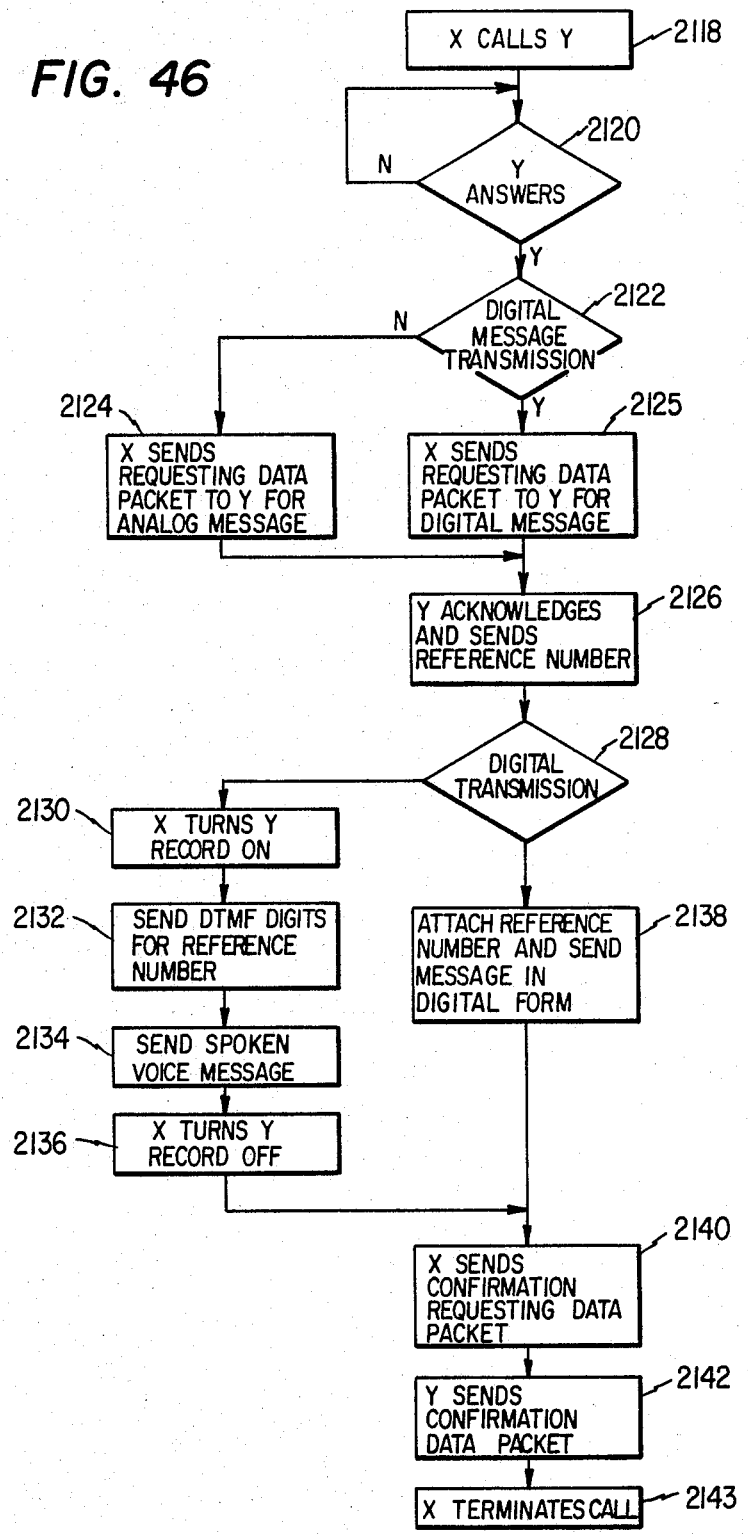
FIG. 46 is a flow chart of the hybrid networking feature.

A feature termed HYBRID NETWORKING allows VMS systems to communicate with each other via both the data link 48 of FIG. 2 and the public telephone network. This provides VMS with a means to transmit some data in the digital mode without having to first convert the digital information to analog format for transmission thereof and to transmit the audio messages in the analog format. Also, in some instances digital transmission for such items as route data occur at a faster rate using such techniques as time sharing, et cetera. A flow chart for both hybrid networking and digital networking, that is, transmitting everything on a digital data link networking is illustrated in FIG. 46.

The call is initiated by "X" and received by "Y", as indicated by a function block 2118. The program then proceeds to a decision block 2120 wherein "X" waits for "Y" to answer the call. The program proceeds along the "N" path back to the input of the decision block 2120 until "Y" answers and then flows along the "Y" path thereof to a decision block 2122 to decide whether the message information is to be sent by the public telephone network as a spoken voice or is to be sent by the digital data link as digital information. If the information is to be sent by the public telephone network, the program proceeds along the "N" path to a function block 2124. In function block 2124, "X" sends a requesting data packet along the digital data link to "Y" requesting permission to transmit the message on the public telephone network. The program then proceeds to a function block 2126 wherein "Y" acknowledges that it is ready to receive information and sends a data packet along the digital data link with a reference number. The reference number is necessary since all the acknowledging data packets are sent on one digital data link and the message will be sent on an additional digital data link.

If the mode of the message transmission is digital, the program flows from the decision block 2122 along the "Y" path to a function block 2125 wherein "X" sends a requesting data pack to "Y" for permission to send a digital message along the digital data link. The program then proceeds to the function block 2126 to receive an acknowledging data package from "Y".

After "Y" has acknowledged that it is ready to receive either digital information along the digital data link or analog information along the public telephone network, the program proceeds to a decision block 2128 to decide whether it is receiving a digital or an analog transmission of the message. If the message is analog along the public telephone network, the program proceeds along the "N" path to a function block 2130 wherein "X" turns the record mode of "Y" on. This is usually accomplished by "X" sending the digit "1" to "Y". The program then proceeds to a function block 2132 and "X" sends the DTMF digits corresponding to the reference number associated with the message. After the reference number has been transmitted, "X" transmits the spoken voice message, as indicated by a function block 2134. After the spoken voice message has been transmitted, "X" turns the record mode of "Y" off, as indicated by the function block 2136.

If the message is to be transmitted along the digital data link, the program proceeds from the decision block 2128 along the "Y" path thereof to a function block 2138 wherein the reference number is attached and the message is sent in digital form along the digital data link. When a message is received in either the digital or the analog form, the program proceeds from either the function block 2136 or the function block 2138 to a function block 2140 wherein "X" sends a confirmation requesting data packet to "Y" to determine if "Y" has received the message. If "Y" has received the message, "Y" returns a confirmation data packet to "X", as indicated by a function block 2142. After "X" receives the confirmation data packet, the program proceeds to a function block 2143 wherein "X" terminates the call and hangs up.

The two forms of networking described with reference to FIG. 46 are either digital networking or hybrid networking, that is transmission along both the digital data link and the public telephone network. It should be understood that for digital transmission of message, it is not necessary for "X" to initiate the original contact with "Y" through the public telephone network. The interaction between two VMS systems can be entirely through the digital data link.

Although the preferred embodiment has been disclosed in detail, it should be understood that various changes, substitutions and alterations can be made therein without departing from the spirit and scope of the invention as defined by the appended claims.

What we claim is:

1. An electronic communication message system for connection to a private branch exchange telephone facility for use in facilitating communication between users of the private branch exchange, comprising:
an electronic digital signal processing means for controlling operation of the message system;
means for enabling an audio message originator to access the message system through said signal processing means from a telephone unit of the private branch exchange;
digital memory means for storing digital representations of an audio message originating from the telephone unit of the private branch exchange;
means for selecting a pre-stored unique group of message addresses from said digital memory means to receive the audio message from said message originator, each of the message addressees having a telephone unit associated therewith;
means for transmitting the audio message from said message originator to all of the message addressees in said unique group;
reply means for each of said message addressees in said unique group to allow the message addressee to reply to the audio message; and
means for transmitting a reply from any one of said message addressees to at least one of the other message addressees in said unique group in response to signals transmitted from the telephone unit of the one of said message addressees in said unique group that originates the reply.

2. The message system of claim 1 further comprising:
means for storing in said digital memory means a digital representation of an audible name for each of the message addressees in said unique group in association with each of the message addressees' addresses;
means for accessing the digital representations of said names stored in said digital memory means;
means for reproducing said names in analog format in conjunction with the address of a particular message addressee from the stored digital representation; and
means for sequentially transmitting each of the audible names of each of said message addressees in said unique group.

3. The message system of claim 2 further comprising means for deleting the address of a selected one of said message addressees from said unique group after each of said audible names is transmitted to said telephone unit.

4. The message system of claim 3 further comprising means for adding message addresses to said unique group in conjunction with associated audible names.

5. An electronic communication message system for connection to a private branch exchange telephone facility for use in facilitating communication between users of the private branch exchange, comprising:
an electronic digital signal processing means for controlling operation of the message system;
means for enabling an audio message originator to access the message system through said signal processing means from a telephone unit of the private branch exchange;
digital memory means for storing digital representations of an audio message originating from the telephone unit of said message originator of the private branch exchange;
means for selecting a unique group of message addressees to receive the audio message;
said message addressees in said unique group each having associated therewith a telephone unit accessible through the private branch exchange, each of the message addressee's telephone units having a unique message addressee address, the addresses of said message addressees in said unique group arranged in a predetermined queue;

means for accessing the associated telephone unit of said message addressee associated with the address at the top of said queue;

answer means for determining if the accessed telephone unit has been answered;

means for transmitting the audio message stored by said message originator from the message system to the accessed telephone unit;

means for deleting said message addressee at the top of said queue and moving the next of the addresses of said message addressees in said queue to the top of said queue when a predetermined event occurs, said predetermined event comprising an accessed telephone unit not being answered or transmission of said audio message;

response means for receiving a predetermined response from the accessed telephone unit of said message addressee; and means for deleting the remaining addresses in said queue in response to receiving a predetermined number of said predetermined responses.

6. The message system of claim 5 wherein said deleting means comprises means for deleting the address of said message addressee at the top of said queue and moving the next of the addresses of said message addressees in said queue to the top of said queue in response to said answer means determining that the accessed telephone unit of said message addressee has been unanswered over a predetermined interval of time after accessing the telephone unit of said message addressee associated with the address at the top of said queue.

7. The message system of claim 5 wherein said deleting means comprises means of deleting the address of said message addressee at the top of said queue and moving the next of the addressees of said message addressees in said queue to the top of said queue in response to the absence of confirmation signals input from said originator's telephone unit and received by said response means for a predetermined interval of time.

8. The message system of claim 5 wherein said predetermined response comprises a positive analog response from said message addressee associated with the address at the top of said queue.

9. A method for receiving, storing and forwarding audio messages from a user's telephone facility, comprising:

transmitting audio messages and associated route data from the user's telephone facility to a storage location;

storing digital representations of the audio messages and route data received from the user's telephone facility;

selecting a unique group of message addressees to receive the audio messages from a message originator, each of the message addressees having a telephone unit associated therewith;

reproducing the audio messages from the stored digital representations;

transmitting the reproduced audio messages to all of the message addressees in the unique group;

enabling each of the message addressees in the unique group to reply to the audio message, the reply stored at the storage location; and transmitting a stored reply from any one of said message addressees to at least one of the other message addresses in the unique group in response to signals transmitted from the telephone unit of the transmitting one of the message addressees in the unique group that originates the reply.

10. The method of claim 9 wherein the step of transmitting the reply comprises transmitting the reply to all of the message addressees in the group and the message originator.

11. The method of claim 9 further comprising:

storing a digital representation of an audible name for each of the message addressees in the unique group;

accessing the digital representations of the stored names;

reproducing the names in analog format; and sequentially transmitting each of the audible names of each of the message addressees in the unique group.

12. A method for receiving, storing and forwarding audio messages from a user's telephone facility, comprising:

transmitting audio messages and route data from the user's telephone facility to a storage location;

storing digital representations of the audion messages and route data received from the user's telephone facility;

selecting a unique group of message addressees each having a unique address to receive audio messages input by a message originator;

each of the message addressees having associated therewith a telephone facility;

arranging the adresses of the message addressees in the unique group in a predetermined queue;

reproducing the stored digital representations of the audio messages received from the message originator in analog format;

accessing the telephone facility of the message addressee associated with the address in the top of the queue;

determining if the accessed telephone facility has been answered;

transmitting the reproduced audio messages to the accessed telephone facility if answered;

deleting the address at the top of the queue if the accessed telephone facility is unanswered or the reproduced audio messages are transmitted thereto;

receiving a predetermined response from the accessed telephone facility after the reproduced audio messages have been received; and deleting the remaining addresses in the queue after a predetermined number of predetermined responses have been received.

13. The method of claim 12 wherein the predetermined response is determined to be unreceived if it is not received after a predtermined interval of time has elapsed since delivery of the reproduced audio messages to the telephone facility of the message addressee associated with the address in the top of the queue.

* * * * *